United States Patent [19]

Nguyen et al.

[11] Patent Number: 5,931,917

[45] Date of Patent: Aug. 3, 1999

[54] SYSTEM, METHOD AND ARTICLE OF MANUFACTURE FOR A GATEWAY SYSTEM ARCHITECTURE WITH SYSTEM ADMINISTRATION INFORMATION ACCESSIBLE FROM A BROWSER

[75] Inventors: Trong Nguyen, Sunnyvale; Mahadevan P. Subramanian, Foster City; Daniel R. Haller, Menlo Park, all of Calif.

[73] Assignee: VeriFone, Inc., Santa Clara, Calif.

[21] Appl. No.: 08/721,167

[22] Filed: Sep. 26, 1996

[51] Int. Cl.$^6$ ........................................................ G06F 13/00
[52] U.S. Cl. ............................ 709/250; 709/203; 709/216
[58] Field of Search ............................ 395/200.8, 200.33, 395/200.46, 200.47, 200.49, 200.48; 709/250, 203, 216, 217, 218, 219; 380/24

[56] References Cited

U.S. PATENT DOCUMENTS

| 3,651,511 | 3/1972 | Andrews et al. | 345/148 |
| 4,799,156 | 1/1989 | Shavit et al. | 705/26 |
| 5,283,819 | 2/1994 | Glick et al. | 379/93.01 |
| 5,297,030 | 3/1994 | Vassigh | 705/25 |

(List continued on next page.)

FOREIGN PATENT DOCUMENTS

| 0 326 699 | 8/1989 | European Pat. Off. . |
| 0 416 482 | 3/1991 | European Pat. Off. . |
| 0 527 639 | 2/1993 | European Pat. Off. . |
| 0 658 862 | 6/1995 | European Pat. Off. . |
| 0 666 681 | 8/1995 | European Pat. Off. . |
| 0 668 579 | 8/1995 | European Pat. Off. . |
| 2 251 098 | 6/1992 | United Kingdom . |

OTHER PUBLICATIONS

Warr, Michael. "Business Wants Telecom of the Future—Today," Telephony's SUPERCOMM Wrap-up, pp. 12–3, Apr. 1991.

Müller, R., "Lon–Das Universelle Netzwerk, Teil 1." Elektronik., vol. 40, No. 22, Oct. 29, 1991, Munchen De, pp. 59–69, XP000268228.

Snow, C.R. et al: "Simple Authentication" Software Practice & Experience., vol. 24, No. 5, May 1994, Chichester GB, pp. 437–4478, XP0006555455, pp. 440–441.

Stallings, W. "Data and Computer Communications", 1994, MacMillan Publishing Co., New York, US, XP002069639, pp. 636–644, 663–666.

Anderson, R. et al. "NetCard –a Practical Electronic–cash System." International Workshop Proceedings, Security Protocols. International Workshop, Cambridge, UK, Apr. 10–12. p. 49. XP00203977.

Primary Examiner—Zarni Maung
Attorney, Agent, or Firm—Sanford E. Warren, Jr.; Daniel J. Chalker; Gardere & Wynne, LLP

[57] ABSTRACT

Secure transmission of data is provided between a plurality of computer systems over a public communication system, such as the Internet. Secure transmission of data is provided from a customer computer system to a merchant computer system, and for the further secure transmission of payment information from the merchant computer system to a payment gateway computer system. The payment gateway system receives encrypted payment requests from merchants, as HTTP POST messages via the Internet. The gateway then unwraps and decrypts the requests, authenticates digital signatures of the requests based on certificates, supports transaction types and card types as required by a financial institution, and accepts concurrent VPOS transactions from each of the merchant servers. Then, the gateway converts transaction data to host-specific formats and forwards the mapped requests to the host processor using the existing financial network. The gateway system architecture includes support for standard Internet access routines which facilitate access to system administration information from a commercial web browser.

20 Claims, 59 Drawing Sheets

U.S. PATENT DOCUMENTS

| | | | |
|---|---|---|---|
| 5,329,619 | 7/1994 | Pagé et al. | 395/200.33 |
| 5,442,791 | 8/1995 | Wrabetz et al. | 395/674 |
| 5,475,826 | 12/1995 | Fischer | 707/1 |
| 5,506,832 | 4/1996 | Arshi | 370/241 |
| 5,557,518 | 9/1996 | Rosen | 380/24 |
| 5,590,038 | 12/1996 | Pitroda | 705/41 |
| 5,590,197 | 12/1996 | Chen et al. | 380/24 |
| 5,611,048 | 3/1997 | Jacobs et al. | 395/200.09 |
| 5,671,279 | 9/1997 | Elgamal | 380/23 |
| 5,671,280 | 9/1997 | Aucsmith et al. | 380/24 |
| 5,677,955 | 10/1997 | Doggett et al. | 380/24 |
| 5,710,887 | 1/1998 | Chelliah et al. | 395/226 |
| 5,715,314 | 2/1998 | Payne et al. | 380/24 |
| 5,715,453 | 2/1998 | Stewart | 395/615 |
| 5,729,594 | 3/1998 | Klingman | 379/93.12 |
| 5,737,592 | 4/1998 | Nguyen et al. | 395/604 |
| 5,742,845 | 4/1998 | Wagner | 395/831 |
| 5,748,493 | 5/1998 | Lightfoot et al. | 364/514 |
| 5,751,961 | 5/1998 | Smyk | 395/200.47 |
| 5,754,772 | 5/1998 | Leaf | 395/200.33 |
| 5,761,499 | 6/1998 | Sonderegger | 395/610 |
| 5,761,663 | 6/1998 | Lagarde et al. | 707/10 |
| 5,768,578 | 6/1998 | Kirk et al. | 395/611 |
| 5,793,966 | 12/1995 | Amstein et al. | 395/200.33 |

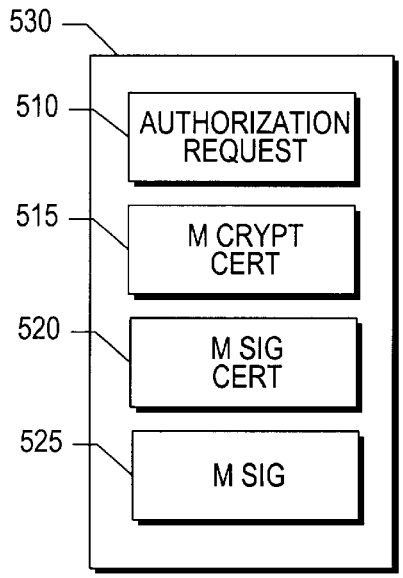
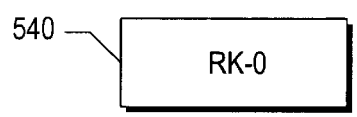
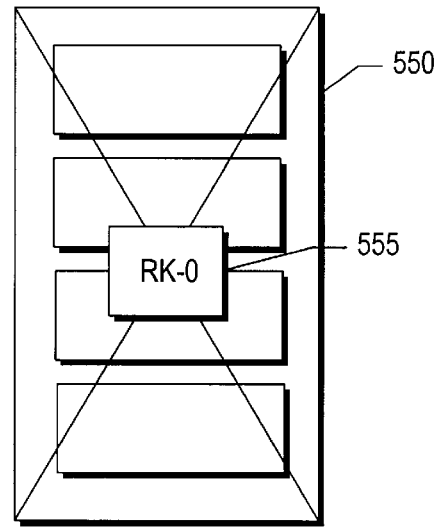
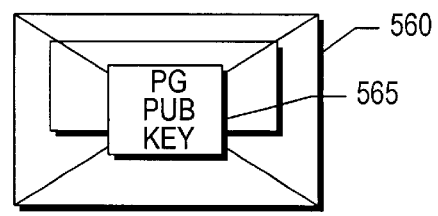
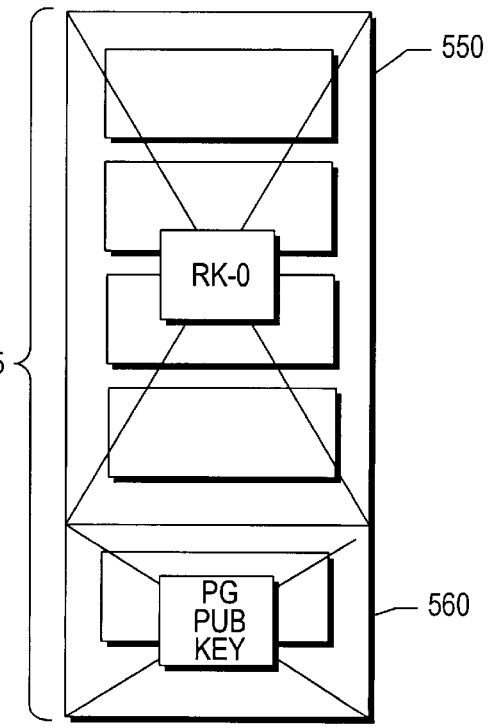

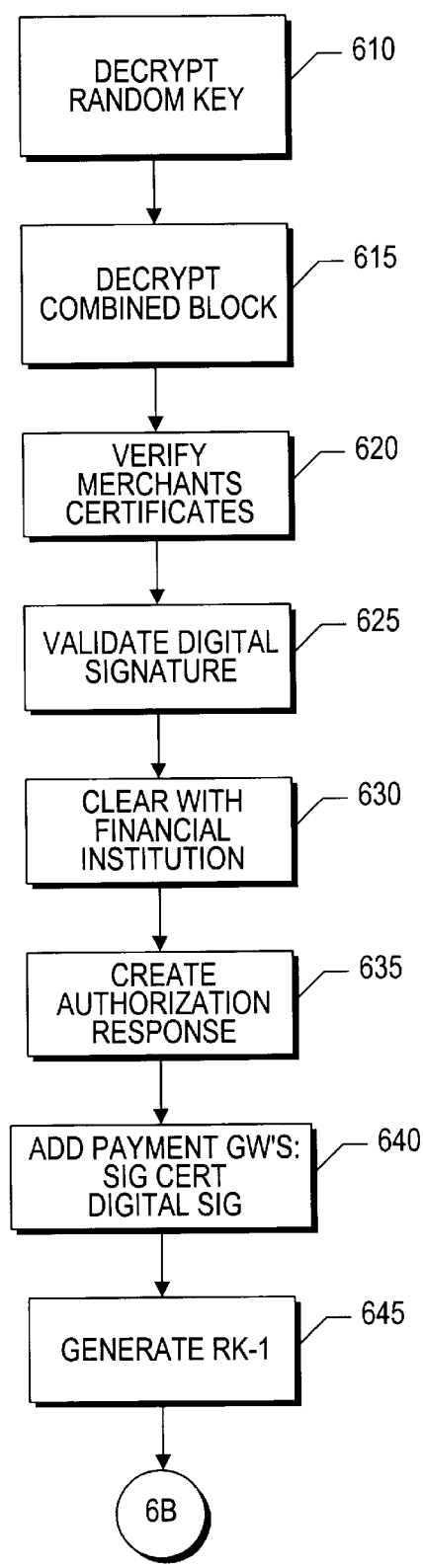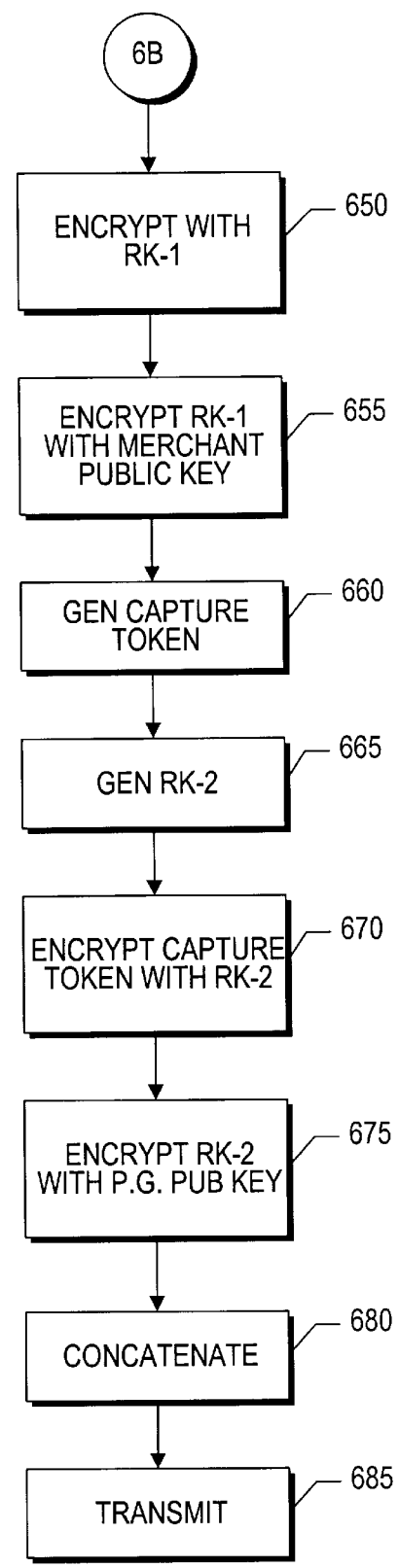
*FIG. 6A*  *FIG. 6B*

*FIG. 7A*  *FIG. 7F*
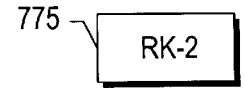
*FIG. 7G*
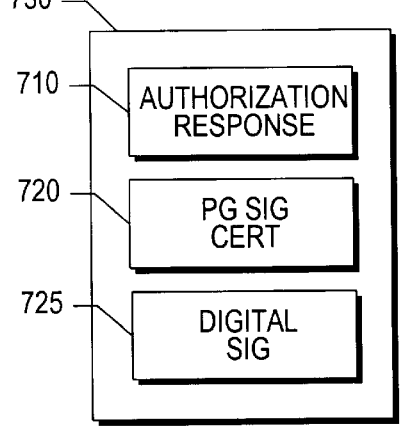
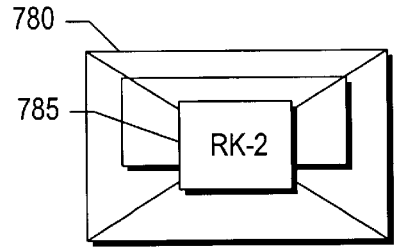
*FIG. 7B*  *FIG. 7H*
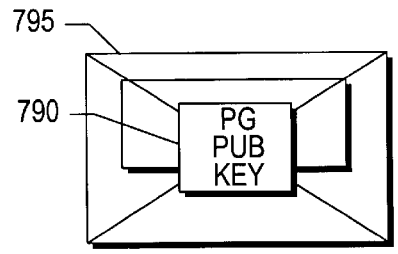
*FIG. 7C*  *FIG. 7I*
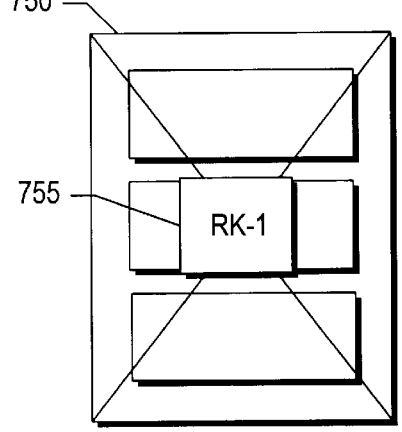
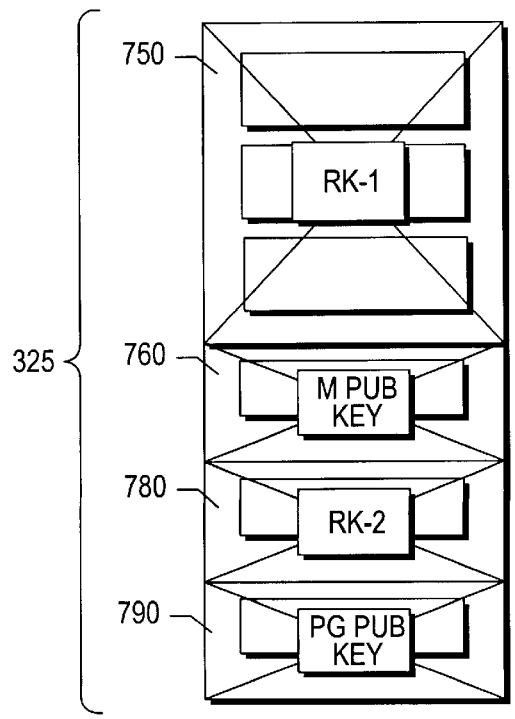
*FIG. 7D*
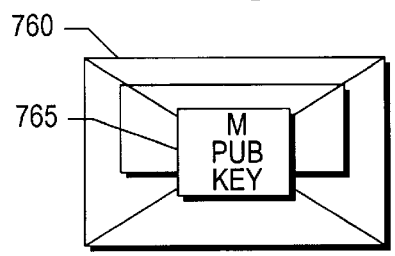
*FIG. 7E*  *FIG. 7J*

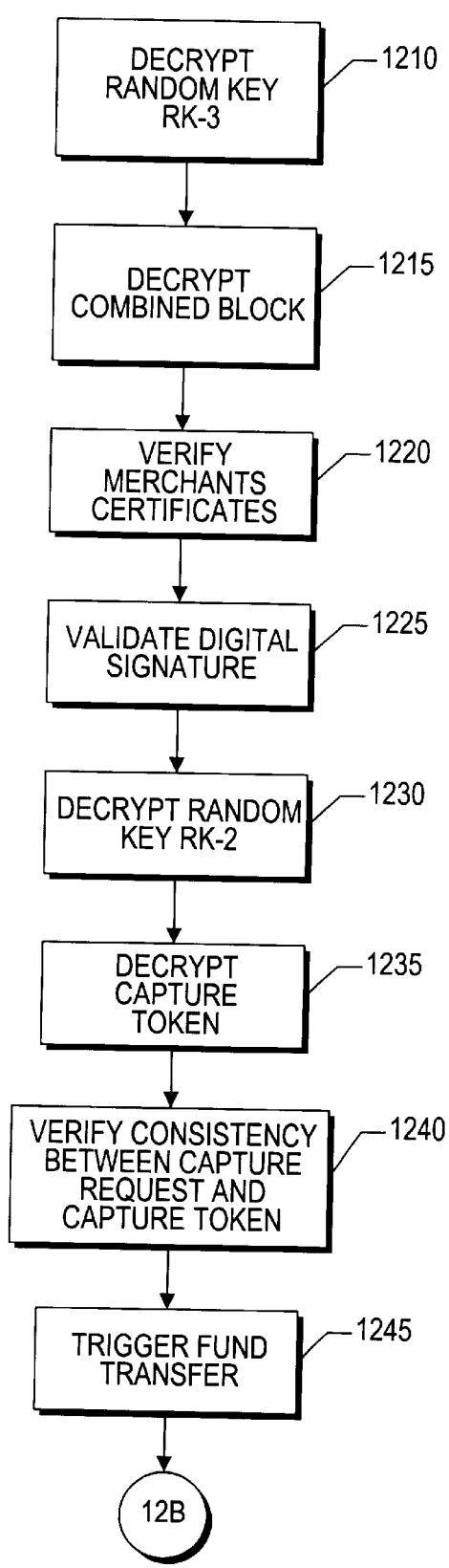
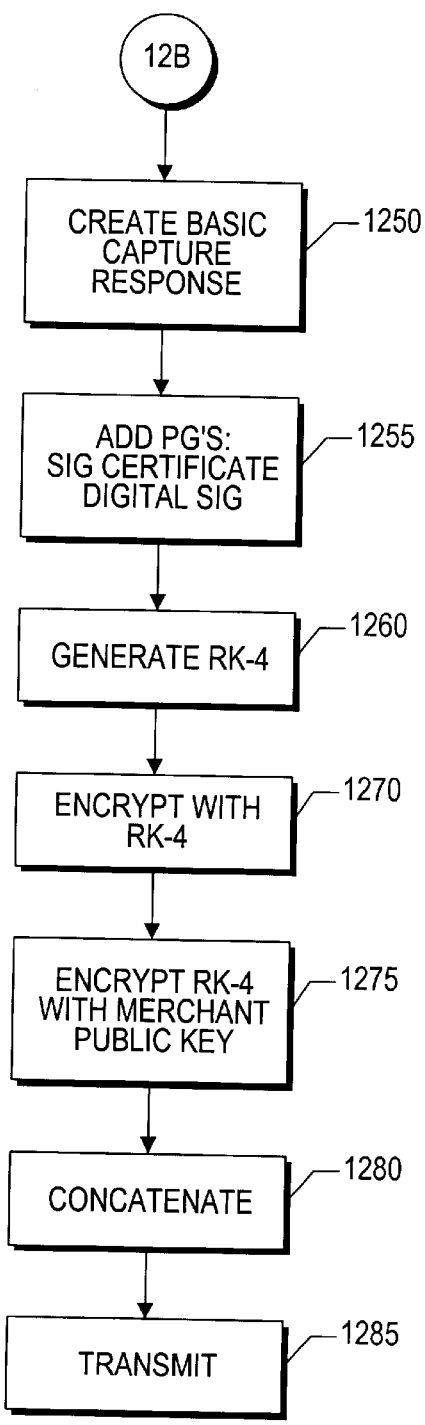
*FIG. 12A*
*FIG. 12B*

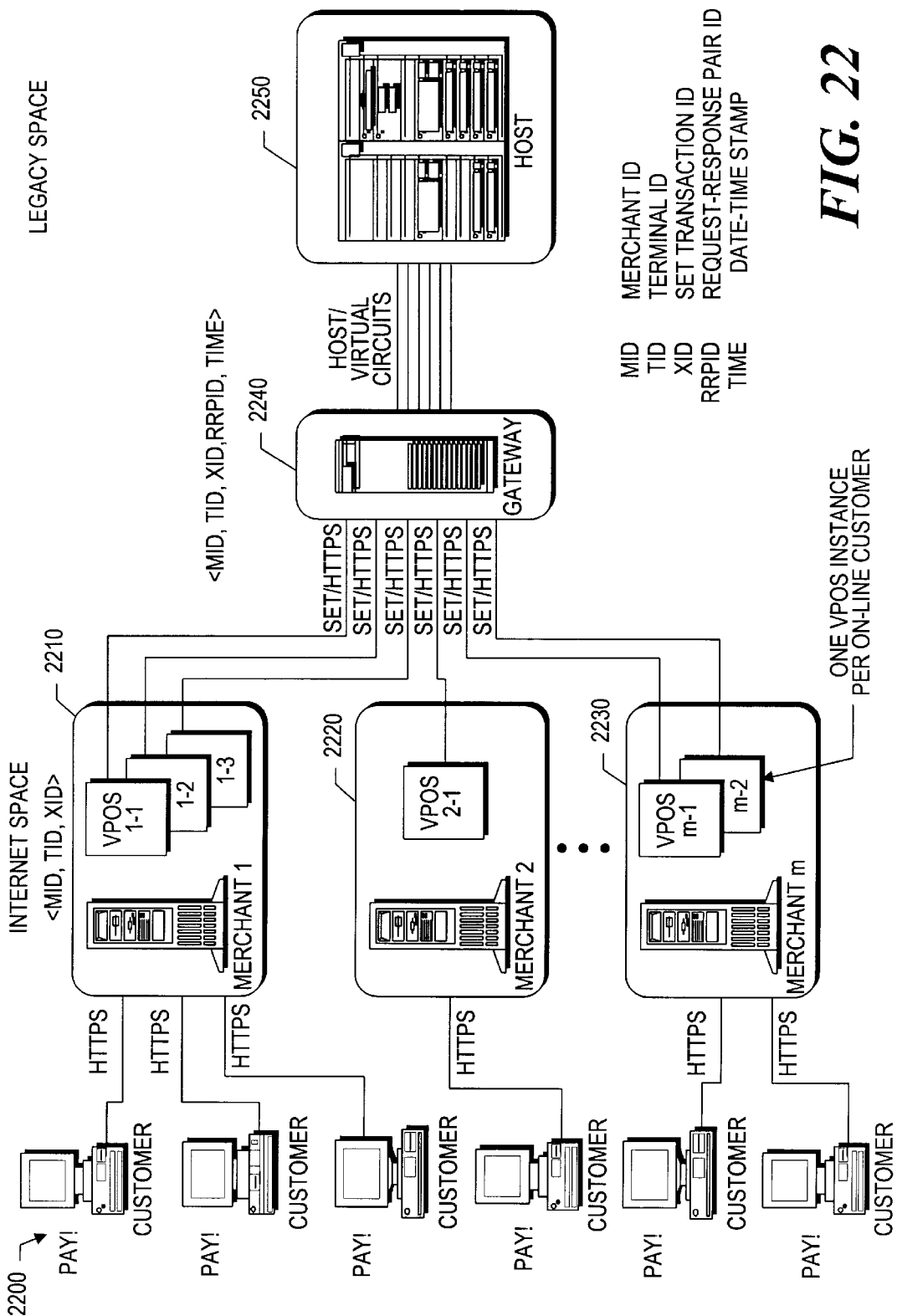

Certificate Issuance Form

Please enter information into all fields If a field does not apply to you, enter N/A

Card Information (2900)
- Card Number: 4417 2222 3333 9191
- Expiry Date: 12/98 (2902)

Personal Information (2904)
- First Name: John
- Middle: F.
- Last: Smith
- Home Phone #: 111 222-3333 (example: 555 555-5555) (2912)
- Social Security Number: 111-22-3333 (example: 999-99-9999) (2908)
- Date of Birth: 12/12/72 (month/day/year as 01/25/50) (2910)
- Mother's Maiden Name: Jones (for security purposes only)

Address (2906)
- Line 1: 141-22 Long Drive
- Line2: Kensington
- Apt. #:
- City: Palo Alto    State: CA    Zip: 94025

VeriFone Wallet Information
- Icon Preference: Wallet (2930)
- Password: **** (2932)
- Confirm Password: **** (2934)

*FIG. 29*

Terminal Totals Report

Note: The transaction is not currently implemented. The report below is a sample.

| Overall Terminal Totals | | |
|---|---|---|
| Sales | Trans. Count | 25 |
| | Amount | $6161.70 |
| Credits | Trans. Count | 5 |
| | Amount | ($11.70) |
| Net Sales | | $6150.70 |

| Visa Totals | | |
|---|---|---|
| Sales | Num. of Trans. | 5 |
| | Amount | $1232.34 |
| Credits | Num. of Trans. | 1 |
| | Amount | ($2.34) |
| Net Sales | | $1230.00 |

| MasterCard Totals | | |
|---|---|---|
| Sales | Trans. Count | 5 |
| | Amount | $1232.34 |
| Credits | Trans. Count | 1 |
| | Amount | ($2.34) |
| Net Sales | | $1230.00 |

| Discover Totals | | |
|---|---|---|
| Sales | Num. of Trans. | 5 |
| | Amount | $1232.34 |
| Credits | Num. of Trans. | 1 |
| | Amount | ($2.34) |
| Net Sales | | $1230.00 |

| American Express Totals | | |
|---|---|---|
| Sales | Num. of Trans. | 5 |
| | Amount | $1232.34 |
| Credits | Num. of Trans. | 1 |
| | Amount | ($2.34) |
| Net Sales | | $1230.00 |

*FIG. 40*

| JCB Totals | | |
|---|---|---|
| Sales | Num. of Trans. | 5 |
| | Amount | $1232.34 |
| Credits | Num. of Trans. | 1 |
| | Amount | ($2.34) |
| Net Sales | | $1230.00 |

ADMINISTRATOR

Copyright © 1996 VeriFone, Inc.

*FIG. 41*

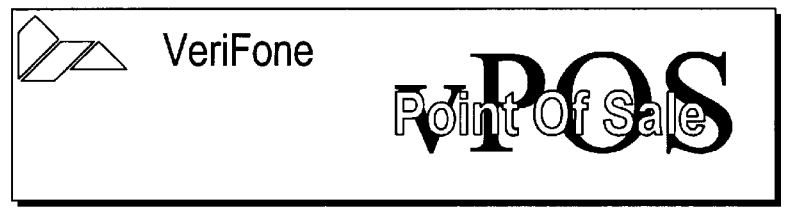

Terminal Setup

Terminal Tables Configuration
Card(s) Definition Table          Review
Acquirer(s) Definition Table      Review
Merchant Configuration Table      Review Help Copyright © 1996 VeriFone, Inc.

*FIG. 42*

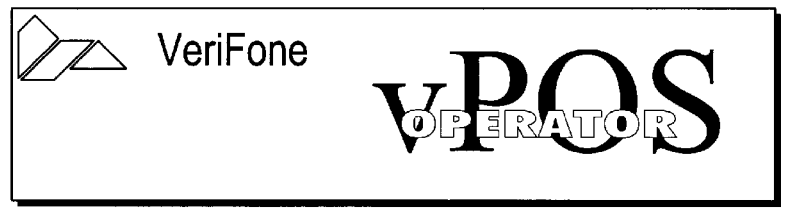

Terminal Type    CDT List Update/Review
Cards acepted by the merchant

Visa

Copyright © 1996 VeriFone, Inc.

*FIG. 43*

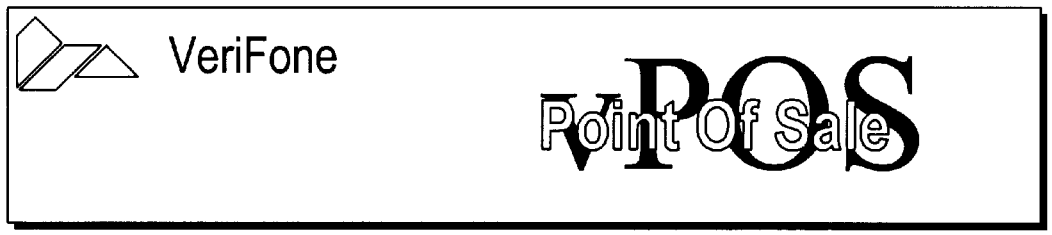
Order Number834100050
Bill To
Account Number   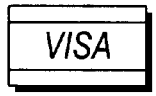
Name on Card         Good Through
Address Line 1
Address Line 2
City                 State/Province
Country              Zip/Postal Code
Email                Phone
If you wish to have billing defaults set in your browser, check this box
Total=$59.99
By pressing the PAY button I agree to pay the above total amount according to the card issuer agreement
RETURN TO SHOPPING    PAY
*FIG. 48*

SYSTEM, METHOD AND ARTICLE OF MANUFACTURE FOR A GATEWAY SYSTEM ARCHITECTURE WITH SYSTEM ADMINISTRATION INFORMATION ACCESSIBLE FROM A BROWSER

FIELD OF THE INVENTION

The present invention relates to the secure, electronic payment in exchange for goods and services purchased over a communication network, and more specifically, to a system, method and article of manufacture for a gateway system architecture with system administration information accessible from a browser.

BACKGROUND OF THE INVENTION

The present invention relates to an electronic graphical representation of a monetary system for implementing electronic money payments as an alternative medium of economic exchange to cash, checks, credit and debit cards, and electronic funds transfer. The Electronic-Monetary System is a hybrid of currency, check, card payment systems, and electronic funds transfer systems, possessing many of the benefits of these systems with few of their limitations. The system utilizes electronic representations of money which are designed to be universally accepted and exchanged as economic value by subscribers of the monetary system.

Today, approximately 350 billion coin and currency transactions occur between individuals and institutions every year. The extensive use of coin and currency transactions has limited the automation of individual transactions such as purchases, fares, and bank account deposits and withdrawals. Individual cash transactions are burdened by the need to have the correct amount of cash or providing change therefor. Furthermore, the handling and managing of paper cash and coins is inconvenient, costly and time consuming for both individuals and financial institutions.

Although checks may be written for any specific amount up to the amount available in the account, checks have very limited transferability and must be supplied from a physical inventory. Paper-based checking systems do not offer sufficient relief from the limitations of cash transactions, sharing many of the inconveniences of handling currency while adding the inherent delays associated with processing checks. To this end, economic exchange has striven for greater convenience at a lower cost, while also seeking improved security.

Automation has achieved some of these qualities for large transactions through computerized electronic funds transfer ("EFT") systems. Electronic funds transfer is essentially a process of value exchange achieved through the banking system's centralized computer transactions. EFT services are a transfer of payments utilizing electronic "checks," which are used primarily by large commercial organizations.

Automated Clearing House ("ACH") where a user can enter a pre-authorized code and download information with billing occurring later, and a Point Of Sale (POS) system where a transaction is processed by connecting with a central computer for authorization for the transaction granted or denied immediately are examples of EFT systems that are utilized by retail and commercial organizations. However, the payments made through these types of EFT systems are limited in that they cannot be performed without the banking system. Moreover, ACH transactions usually cannot be performed during off business hours.

Home Banking bill payment services are examples of an EFT system used by individuals to make payments from a home computer. Currently, home banking initiatives have found few customers. Of the banks that have offered services for payments, account transfers and information over the telephone lines using personal computers, less than one percent of the bank's customers are using the service. One reason that Home Banking has not been a successful product is because the customer cannot deposit and withdraw money as needed in this type of system.

Current EFT systems, credit cards, or debit cards, which are used in conjunction with an on-line system to transfer money between accounts, such as between the account of a merchant and that of a customer, cannot satisfy the need for an automated transaction system providing an ergonomic interface. Examples of EFT systems which provide non-ergonomic interfaces are disclosed in U.S. Pat, Nos. 5,476,259; 5,459,304; 5,452,352; 5,448,045; 5,478,993; 5,455,407; 5,453,601; 5,465,291; and 5,485,510.

To implement an automated, convenient transaction that can dispense some form of economic value, there has been a trend towards off-line payments. For example, numerous ideas have been proposed for some form of "electronic money" that can be used in cashless payment transactions as alternatives to the traditional currency and check types of payment systems. See U.S. Pat. No. 4,977,595, entitled "METHOD AND APPARATUS FOR IMPLEMENTING ELECTRONIC CASH," and U.S. Pat. No. 4,305,059, entitled "MODULAR FUNDS TRANSFER SYSTEM."

The more well known techniques include magnetic stripe cards purchased for a given amount and from which a prepaid value can be deducted for specific purposes. Upon exhaustion of the economic value, the cards are thrown away. Other examples include memory cards or so called smart cards which are capable of repetitively storing information representing value that is likewise deducted for specific purposes.

It is desirable for a computer operated under the control of a merchant to obtain information offered by a customer and transmitted by a computer operating under the control of the customer over a publicly accessible packet-switched network (e.g., the Internet) to the computer operating under the control of the merchant, without risking the exposure of the information to interception by third parties that have access to the network, and to assure that the information is from an authentic source. It is further desirable for the merchant to transmit information, including a subset of the information provided by the customer, over such a network to a payment gateway computer system that is designated, by a bank or other financial institution that has the responsibility of providing payment on behalf of the customer, to authorize a commercial transaction on behalf of such a financial institution, without the risk of exposing that information to interception by third parties. Such institutions include, for example, financial institutions offering credit or debit card services.

One such attempt to provide such a secure transmission channel is a secure payment technology such as Secure Electronic Transaction (hereinafter "SET"), jointly developed by the Visa and MasterCard card associations, and described in Visa and MasterCard's Secure Electronic Transaction (SET) Specification, Feb. 23, 1996, hereby incorporated by reference. Other such secure payment technologies include Secure Transaction Technology ("STT"), Secure Electronic Payments Protocol ("SEPP"), Internet Keyed Payments ("iKP"), Net Trust, and Cybercash Credit Payment Protocol. One of ordinary skill in the art readily comprehends that any of the secure payment technologies can be substituted for the SET protocol without undue experimentation. Such secure payment technologies require the customer to operate software that is compliant with the secure payment technology, interacting with third-party certification authorities, thereby allowing the customer to transmit encoded information to a merchant, some of which may be decoded by the merchant, and some which can be decoded only by a payment gateway specified by the customer.

Another such attempt to provide such a secure transmission channel is a general-purpose secure communication protocol such as Netscape, Inc.'s Secure Sockets Layer (hereinafter "SSL"), as described in Freier, Karlton & Kocher (hereinafter "Freier"), The SSL Protocol Version 3.0, March 1996, and hereby incorporated by reference. SSL provides a means for secure transmission between two computers. SSL has the advantage that it does not require special-purpose software to be installed on the customer's computer because it is already incorporated into widely available software that many people utilize as their standard Internet access medium, and does not require that the customer interact with any third-party certification authority. Instead, the support for SSL may be incorporated into software already in use by the customer, e.g., the Netscape Navigator World Wide Web browsing tool. However, although a computer on an SSL connection may initiate a second SSL connection to another computer, a drawback to the SSL approach is each SSL connection supports only a two-computer connection. Therefore, SSL does not provide a mechanism for transmitting encoded information to a merchant for retransmission to a payment gateway such that a subset of the information is readable to the payment gateway but not to the merchant. Although SSL allows for robustly secure two-party data transmission, it does not meet the ultimate need of the electronic commerce market for robustly secure three-party data transmission. Other examples of general-purpose secure communication protocols include Private Communications Technology ("PCT") from Microsoft, Inc., Secure Hyper-Text Transport Protocol ("SHTTP") from Terisa Systems, Shen, Kerberos, Photuris, Pretty Good Privacy ("PGP") which meets the IPSEC criteria. One of ordinary skill in the art readily comprehends that any of the general-purpose secure communication protocols can be substituted for the SSL transmission protocol without undue experimentation.

Banks desire an Internet payment solution that emulates existing Point of Sale (POS) applications that are currently installed on their host computers, and require minimal changes to their host systems. This is a critical requirement since any downtime for a bank's host computer system represents an enormous expense. Currently, VeriFone supports over fourteen hundred different payment-related applications. The large number of applications is necessary to accommodate a wide variety of host message formats, diverse methods for communicating to a variety of hosts with different dial-up and direct-connect schemes, and different certification around the world. In addition, there are a wide variety of business processes that dictate how a Point of Sale (POS) terminal queries a user for data and subsequently displays the data. Also, various vertical market segments, such as hotels, car rental agencies, restaurants, retail sales, mail sales/telephone sales require interfaces for different types of data to be entered, and provide different discount rates to merchants for complying with various data types. Moreover, a plethora of report generation mechanisms and formats are utilized by merchants that banking organizations work with.

Banks are unwilling to converge on "standards" since convergence would facilitate switching from one acquiring bank to another by merchants. In general, banks desire to increase the cost that a merchant incurs in switching from one acquiring bank to another acquiring bank. This is accomplished by supplying a merchant with a terminal that only communicates utilizing the bank's proprietary protocol, and by providing other value-added services that a merchant may not be able to obtain at another bank.

Internet-based payment solutions require additional security measures that are not found in conventional POS terminals. This additional requirement is necessitated because Internet communication is done over publicly-accessible, unsecured communication line in stark contrast to the private, secure, dedicated phone or leased line service utilized between a traditional merchant and an acquiring bank. Thus, it is critical that any solution utilizing the Internet for a communication backbone, employ some form of cryptography.

As discussed above, the current state-of-the-art Internet based payment processing is a protocol referred to as SET. Since the SET messages are uniform across all implementations, banks cannot differentiate themselves in any reasonable way. Also, since SET is not a proper superset of all protocols utilized today, there are bank protocols which cannot be mapped or translated into SET because they require data elements for which SET has no placeholder. Further, SET only handles the message types directly related to authorizing and capturing credit card transactions and adjustments to these authorizations or captures. In a typical POS terminal in the physical world, these messages comprise almost the entire volume of the total number of messages between the merchant and the authorizing bank, but only half of the total number of different message types. These message types, which are used infrequently, but which are critical to the operation of the POS terminal must be supported for proper transaction processing.

SUMMARY OF THE INVENTION

According to a broad aspect of a preferred embodiment of the invention, a server communicates bidirectionally with a gateway over a first communication link, over which all service requests are initiated by the server. Secure transmission of data is provided from a customer computer system to a merchant computer system, and for the further secure transmission of payment information regarding a payment instrument from the merchant computer system to a payment gateway computer system. The payment gateway system receives encrypted payment requests from merchants, as HTTP POST messages via the Internet. The gateway then unwraps and decrypts the requests, authenticates digital signatures of the requests based on certificates, supports transaction types and card types as required by a financial institution, and accepts concurrent VPOS transactions from each of the merchant servers. Then, the gateway converts transaction data to host-specific formats and forwards the mapped requests to the host processor using the existing financial network. The gateway system architecture includes support for standard Internet access routines which facilitate access to system administration information from a commercial web browser.

DESCRIPTION OF THE DRAWINGS

The foregoing and other objects, aspects and advantages are better understood from the following detailed description of a preferred embodiment of the invention with reference to the drawings, in which:

FIGS. 5A through 5F depict views of the payment authorization request and its component parts in accordance with a preferred embodiment;

FIGS. 6A and 6B depict the detailed steps of processing a payment authorization request and generating and transmitting a payment authorization request response in accordance with a preferred embodiment;

FIGS. 7A through 7J depict views of the payment authorization response and its component parts in accordance with a preferred embodiment;

FIGS. 12A and 12B depict the detailed steps of processing a payment capture request and generating and transmitting a payment capture request response in accordance with a preferred embodiment;

FIG. 22 is a flow diagram in accordance with a preferred embodiment;

FIG. 29 is an illustration of a certificate issuance form in accordance with a preferred embodiment;

FIGS. 36–48 are screen displays in accordance with a preferred embodiment;

DETAILED DESCRIPTION

Figure 1A:
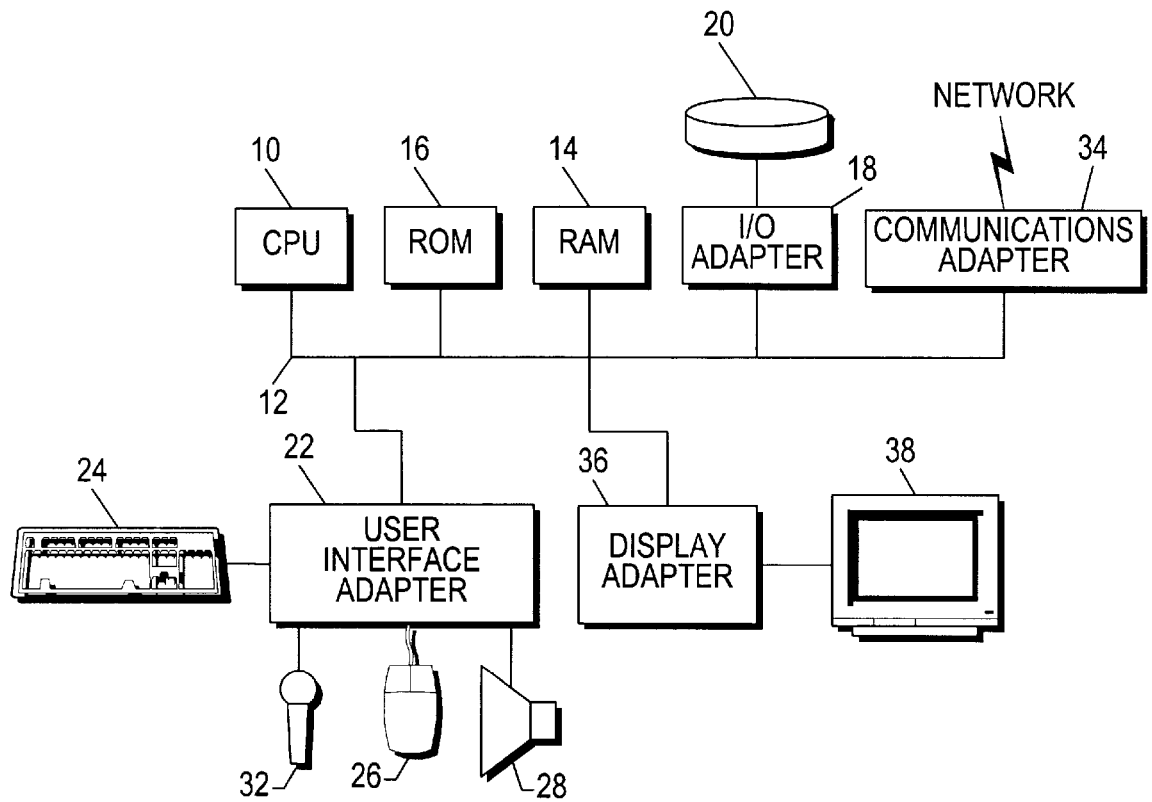
FIG. 1A is a block diagram of a representative hardware environment in accordance with a preferred embodiment.

A preferred embodiment of a system in accordance with the present invention is preferably practiced in the context of a personal computer such as the IBM PS/2, Apple Macintosh computer or UNIX based workstation. A representative hardware environment is depicted in FIG. 1A, which illustrates a typical hardware configuration of a workstation in accordance with a preferred embodiment having a central processing unit 10, such as a microprocessor, and a number of other units interconnected via a system bus 12. The workstation shown in FIG. 1A includes a Random Access Memory (RAM) 14, Read Only Memory (ROM) 16, an I/O adapter 18 for connecting peripheral devices such as disk storage units 20 to the bus 12, a user interface adapter 22 for connecting a keyboard 24, a mouse 26, a speaker 28, a microphone 32, and/or other user interface devices such as a touch screen (not shown) to the bus 12, communication adapter 34 for connecting the workstation to a communication network (e.g., a data processing network) and a display adapter 36 for connecting the bus 12 to a display device 38. The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on platforms and operating systems other than those mentioned.

A preferred embodiment is written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture.

It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, our logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built, objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, common lisp object system (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way.

Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the merchant. HTTP or other protocols could be readily substituted for HTML without undue experimentation. Information on these products is available in T. Berners-Lee, D. Connoly, "RFC 1866: Hypertext Markup Language—2.0" (November 1995); and R. Fielding, H, Frystyk, T. Berners-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879:1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;
Restricted user interface capabilities;
Can only produce static Web pages;
Lack of interoperability with existing applications and data; and
Inability to scale.

Sun Microsystem's Java language solves many of the client-side problems by:

Improving performance on the client side;
Enabling the creation of dynamic, real-time Web applications; and
Providing the ability to create a wide variety of user interface components.

With Java, developers can create robust User Interface (UI) components. Custom "widgets" (e.g. real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g. simple animations, page adornments, basic games, etc.). Applets execute within a Java-compatible browser (e.g. Netscape Navigator) by copying code from the server to client. From a language standpoint, ava's core feature set is based on C++. Sun's Java literature states that Java is basically "C++, with extensions from Objective C for more dynamic method resolution".

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

Figure 1B:
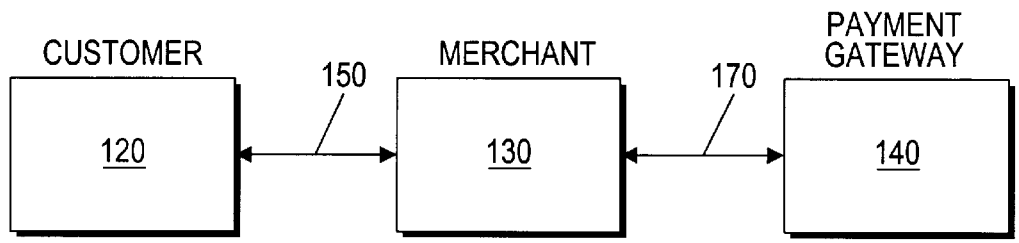
FIG. 1B depicts an overview in accordance with a preferred embodiment.

FIG. 1B depicts an overview of the present invention. Customer computer system 120 is in communication with merchant computer system 130. The customer-merchant session 150 operates under a general-purpose secure communication protocol such as the SSL protocol. Merchant computer system 130 is additionally in communication with payment gateway computer system 140. A payment gateway is a system that provides electronic commerce services in support of a bank or other financial institution, and that interfaces to the financial institution to support the authorization and capture of transactions. The customer-institution session 170 operates under a variant of a secure payment technology such as the SET protocol, as described herein, referred to as Merchant-Originated Secure Electronic Transactions ("MOSET"), as is more fully described herein.

Customer-to-Merchant Communication

Figure 2:
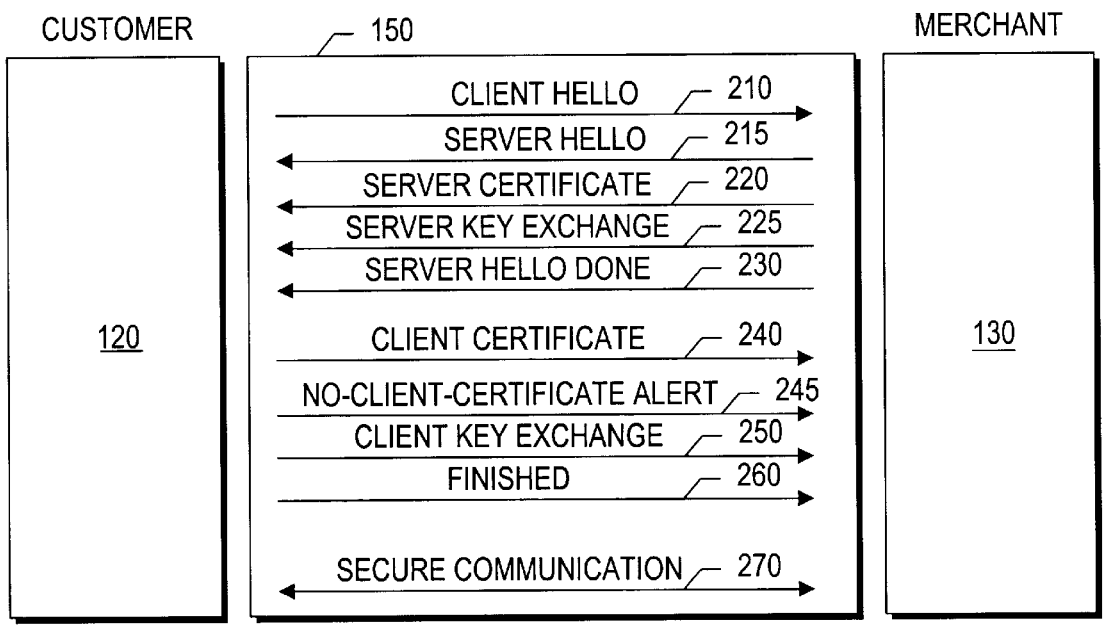
FIG. 2 depicts a more detailed view of a customer computer system in communication with merchant system under the Secure Sockets Layer protocol in accordance with a preferred embodiment.

FIG. 2 depicts a more detailed view of customer computer system 120 in communication with merchant system 130 using customer-merchant session 150 operating under the SSL protocol as documented in Freier and incorporated by reference.

Customer computer system 120 initiates communication with merchant computer system 130 using any well-known access protocol, e.g., Transmission Control Protocol/Internet Protocol ("TCP/IP"). A description of TCP/IP is provided in Information Sciences Institute, "Transmission Control Protocol DARPA Internet Program Protocol Specification (RFC 793)" (September, 1981), and Information Sciences Institute, "Internet Protocol DARPA Internet Program Protocol Specification (RFC 791)" (September, 1981). In this implementation, customer computer system 120 acts as a client and merchant computer system 130 acts as a server.

Customer computer system 120 initiates communication by sending "client hello" message 210 to the merchant computer system 130. When a client first connects to a server it is required to send the client hello message 210 as its first message. The client can also send a client hello message 210 in response to a hello request on its own initiative in order to renegotiate the security parameters in an existing connection. The client hello message 210 includes a random structure, which is used later in the protocol. Specifically, the random structure includes the current time and date in standard UNIX 32-bit format according to the sender's internal clock and twenty-eight bytes of data generated by a secure random number generator. The client hello message 210 further includes a variable length session identifier. If not empty, the session identifier value identifies a session between the same client and server whose security parameters the client wishes to reuse. The session identifier may be from an earlier connection, the current connection, or another currently active connection. It is useful to specify the current connection if the client only wishes to update the random structures and derived values of a connection. It is useful to specify another currently active connection if the client wishes to establish several simultaneous independent secure connections to the same server without repeating the full handshake protocol. Client hello message 210 further includes an indicator of the cryptographic algorithms supported by the client in order of the client's preference, ordered according to client preference.

In response to client hello message 210, if merchant computer system 130 wishes to correspond with customer computer system 120, it responds with server hello message 215. If merchant computer system 130 does not wish to communicate with customer computer system 120, it responds with a message, not shown, indicating refusal to communicate.

Server hello message 215 includes a random structure, which is used later in the protocol. The random structure in server hello message 215 is in the same format as, but has contents independent of, the random structure in client hello message 210. Specifically, the random structure includes the current time and date in standard UNIX 32-bit format according to the sender's internal clock and twenty-eight bytes of data generated by a secure random number generator. Server hello message 215 further includes a variable length session identifier. The session identifier value identifies a new or existing session between the same client and server. Server hello message 215 further includes an indicator of the cryptographic algorithms selected from among the algorithms specified by client hello message 210, which is utilized in further encrypted communications.

Optionally, Merchant computer system 130 transmits a server certificate 220. If transmitted, server certificate 220 enables customer computer system 120 to authenticate the identity of merchant computer system 130.

If merchant computer system 130 does not transmit a server certificate 220, or if server certificate 220 is suitable only for authentication, it may optionally transmit a server key exchange message 225. Server key exchange message 225 identifies a key that may be used by customer computer system 120 to decrypt further messages sent by merchant computer system 130.

After transmitting server hello message 215, and optionally transmitting server certificate 220 or server key exchange message 225, merchant computer system 130 transmits a server hello done message 230 and waits for a further response from customer computer system 120.

Customer computer system 120 optionally transmits client certificate 240 to merchant computer system 130. If transmitted, client certificate 240 enables merchant computer system 130 to authenticate the identity of customer computer system 120. Alternatively, customer computer system 120 may transmit a no-client-certificate alert 245, to indicate that the customer has not registered with any certification authority.

If customer computer system 120 does not transmit a client certificate 240, or if client certificate 240 is suitable only for authentication, customer computer system 120 may optionally transmit a client key exchange message 250. Client key exchange message 250 identifies a key that may be used by merchant computer system 130 to decrypt further messages sent by customer computer system 120.

After optionally transmitting client certificate 240, no-client-certificate alert 245, and/or client key exchange message 250, customer computer system 120 transmits a finished message 260.

At this point, customer computer system 120 and merchant computer system 130 have:

1) negotiated an encryption scheme that may be commonly employed in further communications, and
2) have communicated to each other a set of encryption keys that may be used to decrypt further communications between the two computer systems.

Customer computer system 120 and merchant computer system 130 may thereafter engage in secure communications 270 with less risk of interception by third parties.

Among the messages communicated by customer computer system 120 to merchant computer system 130 may be messages that specify goods or services to be ordered and payment information, such as a credit card number and related information, collectively referred to as "payment information," that may be used to pay for the goods and/or services ordered. In order to obtain payment, the merchant must supply this information to the bank or other payment gateway responsible for the proffered payment method. This enables the merchant to perform payment authorization and payment capture. Payment authorization is the process by which permission is granted by a payment gateway operating on behalf of a financial institution to authorize payment on behalf of the financial institution. This is a process that assesses transaction risk, confirms that a given transaction does not raise the account holder's debt above the account's credit limit, and reserves the specified amount of credit. Payment capture is the process that triggers the movement of funds from the financial institution to the merchant's account after settlement of the account.

Payment Authorization

Merchants utilize point-of-sale products for credit and debit transactions on a daily basis. An embodiment in accordance with the subject invention allows an acquirer processor to accept transactions from Internet storefronts without altering a current host environment. he system easily converts payment protocol messages and simultaneously manages ransactions from a number of Internet merchant servers. As the number of transactions grows, the payment gateway can be scaled to handle the increased business, and it can be configured to work with specific business processes used by the acquirer/processor. Thus, the payment gateway supports Internet processing utilizing payment processing operations.

The payment gateway provides support for configuring and installing the Internet payment capability utilizing existing host point-of-sale technology. The payment gateway also provides an intuitive Graphical User Interface (GUI) with support built in to accommodate future payment instruments such as debit cards, electronic checks, electronic cash and micropayments. The payment gateway implements secure transactions using RSA public-key cryptography and the MasterCard/Visa Secure Electronic Transaction (SET) protocol. The gateway also provides full functionality for merchant payment processing including authorization, capture, settlement and reconciliation while providing monitor activity with reporting and tracking of transactions sent over the Internet. Finally, the payment gateway also implements Internet payment procedures that match current processor business models to ensure consistency for merchants. Handling Internet transactions is destined to become a necessary function for every payment processing system. Today, merchants often transmit data received over the Internet inefficiently. Some fax the information or waste time keying data into a non-Internet system.

Figure 3:
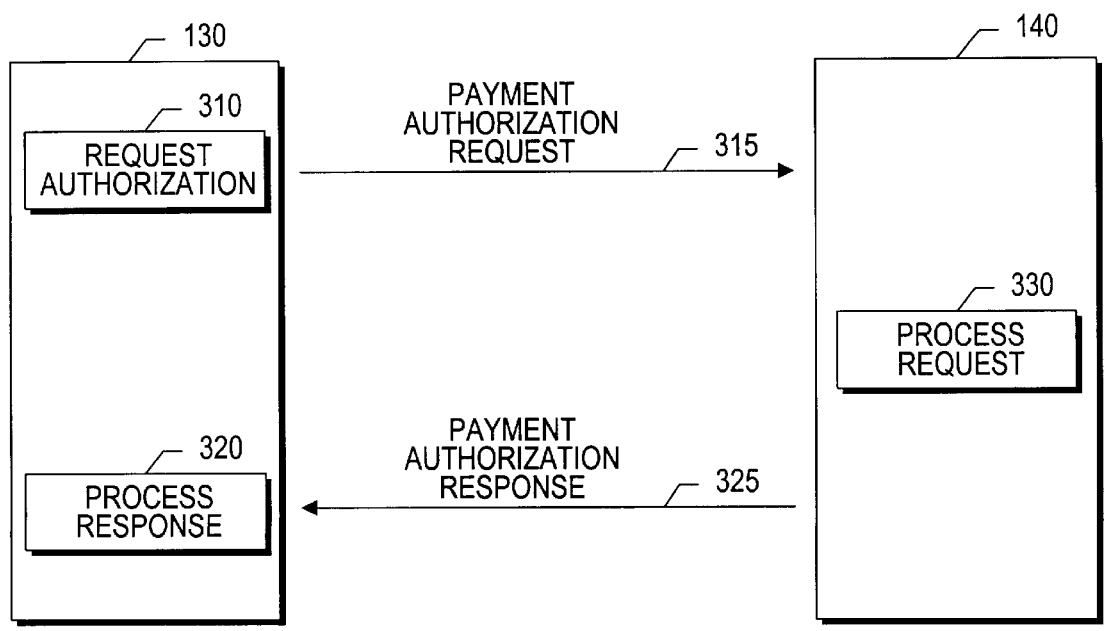
FIG. 3 depicts an overview of the method of securely supplying payment information to a payment gateway in order to obtain payment authorization in accordance with a preferred embodiment.

FIG. 3 depicts an overview of the method of securely supplying payment information to a payment gateway in order to obtain payment authorization. In function block 310, merchant computer system 130 generates a payment authorization request 315 and transmits it to payment gateway computer system 140. In function block 330, payment gateway system 140 processes the payment authorization request, generates a payment authorization response 325 and transmits it to merchant computer system 130. In function block 320, merchant computer system 130 processes payment authorization response 325 and determines whether payment for the goods or services sought to be obtained by the customer has been authorized.

Payment Authorization Request Generation

Figure 4:
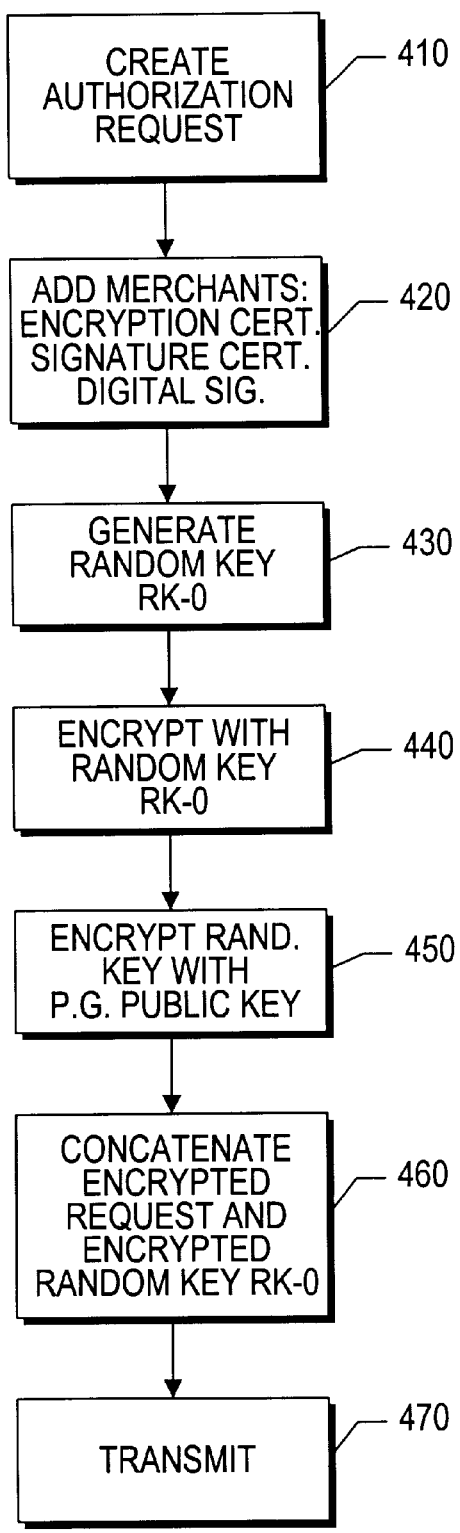
FIG. 4 depicts the detailed steps of generating and transmitting a payment authorization request in accordance with a preferred embodiment.

FIG. 4 depicts the detailed steps of generating and transmitting a payment authorization request. FIGS. 5A through 5F depict views of the payment authorization request and its component parts. In function block 410, merchant computer system 130 creates a basic authorization request 510. The basic authorization request is a data area that includes all the information for determining whether a request should be granted or denied. Specifically, it includes such information as the party who is being charged, the amount to be charged, the account number of the account to be charged, and any additional data, such as passwords, needed to validate the charge. This information is either calculated based upon prior customer merchandise selection, or provided by the customer over the secure link 270 established in the customer-merchant general-purpose secure communication protocol session. FIG. 5A depicts a basic authorization request 510.

In function block 420, merchant computer system 130 combines basic authorization request 510, a copy of its encryption public key certificate 515 and a copy of its signature public key certificate 520. Merchant computer system 130 calculates a digital signature 525 for the combined contents of the combined block 530 comprising basic authorization request 510, the encryption public key certificate 515 and the signature public key certificate 520, and appends it to the combination of the combined basic authorization request 510, the encryption public key certificate 515 and the signature public key certificate 520. The merchant computer system calculates digital signature 525 by first calculating a "message digest" based upon the contents of the combined basic authorization request 510, the encryption public key certificate 515 and the signature public key certificate 520. A message digest is the fixed-length result that is generated when a variable length message is fed into a one-way hashing function. Message digests help verify that a message has not been altered because altering the message would change the digest. The message digest is then encrypted using the merchant computer system's 130 digital signature private key, thus forming a digital signature.

FIG. 5B depicts the combined block 530 formed by function block 420 and containing basic authorization request 510, the encryption public key certificate 515, the signature public key certificate 520, and digital signature 525.

In function block 430, merchant computer system 130 generates a random encryption key RK-0 540, denoted as RK-0. Random encryption key RK-0 540 is a symmetric encryption key. A symmetric encryption key is a key characterized by the property that a message encrypted with a symmetric key can be decrypted with that same key. This is contrasted with an asymmetric key pair, such as a public-key/private-key key pair, where a message encrypted with one key of the key pair may only be decrypted with the other key of the same key pair. FIG. 5C depicts random encryption key RK-0 540.

In function block 440, merchant computer system 130 encrypts combined block 530 using random encryption key RK-0 540 to form encrypted combined block 550. FIG. 5D depicts encrypted combined block 550. The encryption state of encrypted combined block 550 is graphically shown by random key lock 555, which indicates that encrypted combined block 550 is encrypted using random key RK-0 540.

In function block 450, merchant computer system 130 encrypts random encryption key RK-0 540 using the public key of payment gateway system 140 to form encrypted random key 560. FIG. 5E depicts encrypted random key 560. The encryption state of encrypted random key 560 is graphically shown by payment gateway public key lock 565, which indicates that encrypted random key 560 is encrypted using the payment gateway public key.

In function block 460, merchant computer system 130 concatenates encrypted combined block 550 and encrypted random key 560 to form merchant authorization request 315. FIG. 5F depicts merchant authorization request 315 comprising encrypted combined block 550 and encrypted random key 560. In function block 470, merchant computer system 130 transmits merchant authorization request 315 to payment gateway system 140.

Payment Authorization Request Processing

FIG. 6 depicts the detailed steps of processing a payment authorization request and generating and transmitting a payment authorization request response. Function blocks 610 through 630 depict the steps of processing a payment authorization request, while function blocks 635 through 685 depict the steps of generating and transmitting a payment authorization request response.

In function block 610, payment gateway computer system 140 applies its private key to encrypted random key 560 contained within received merchant authorization request 315, thereby decrypting it and obtaining a cleartext version of random key RK-0 540. In function block 615, payment gateway computer system 140 applies random key RK-0 540 to encrypted combined block 550, thereby decrypting it and obtaining a cleartext version of combined block 530. Combined block 530 comprises basic authorization request 510, a copy of merchant computer system's 130 encryption public key certificate 515 and a copy of merchant computer system's 130 signature public key certificate 520, as well as merchant digital signature 525.

In function block 620, payment gateway computer system 140 verifies merchant computer system's 130 encryption public key certificate 515 and merchant computer system's 130 signature public key certificate 520. Payment gateway computer system 140 performs this verification by making a call to the certification authorities associated with each certificate. If verification of either certificate fails, payment gateway computer system 140 rejects the authorization request.

In function block 625, payment gateway computer system 140 validates merchant digital signature 525. Payment gateway computer system 140 performs this validation by calculating a message digest over the contents of the combined basic authorization request 510, the encryption public key certificate 515 and the signature public key certificate 520. Payment gateway computer system 140 then decrypts digital signature 525 to obtain a copy of the equivalent message digest calculated by merchant computer system 130 in function block 420. If the two message digests are equal, the digital signature 525 is validated. If validation fails, payment gateway computer system 140 rejects the authorization request.

In function block 630, payment gateway computer system 140 determines the financial institution for which authorization is required by inspection of basic authorization request 510. Payment gateway computer system 140 contacts the appropriate financial institution using a secure means, e.g, a direct-dial modem-to-modem connection, or a proprietary internal network that is not accessible to third parties, and using prior art means, obtains a response indicating whether the requested payment is authorized.

Payment Authorization Response Generation

Function blocks 635 through 685 depict the steps of generating and transmitting a payment authorization request response. FIGS. 7A through 7J depict views of the payment uthorization response and its component parts.

In function block 635, payment gateway computer system 140 creates a basic authorization response 710. The basic authorization request is a data area that includes all the information to determine whether a request was granted or denied. FIG. 7A depicts basic authorization response 710.

In function block 640, payment gateway computer system 140 combines basic authorization response 710, and a copy of its signature public key certificate 720. Payment computer system 140 calculates a digital signature 725 for the combined contents of the combined block 730 comprising basic authorization response 710 and the signature public key certificate 720, and appends the signature to the combination of the combined basic authorization response 710 and the signature public key certificate 720. The payment gateway computer system calculates digital signature 725 by first calculating a message digest based on the contents of the combined basic authorization response 710 and signature public key certificate 720. The message digest is then encrypted using the merchant computer system's 140 digital signature private key, thus forming a digital signature.

FIG. 7B depicts the combined block 730 formed in function block 640 and containing basic authorization response 710, the signature public key certificate 720, and digital signature 725.

In function block 645, payment gateway computer system 150 generates a first symmetric random encryption key 740, denoted as RK-1. FIG. 7C depicts first random encryption key RK-1 740.

In function block 650, payment gateway computer system 140 encrypts combined block 730 using random encryption key RK-1 740 to form encrypted combined block 750. FIG. 7D depicts encrypted combined block 750. The encryption state of encrypted combined block 750 is graphically shown by random key lock 755, which indicates that encrypted combined block 750 is encrypted using random key RK-1 740.

In function block 655, payment gateway computer system 140 encrypts random encryption key RK-1 740 using the public key of merchant computer system 130 to form encrypted random key RK 760. FIG. 7E depicts encrypted random key RK-1 760. The encryption state of encrypted random key 760 is graphically shown by merchant public key lock 765, which indicates that encrypted random key 760 is encrypted using the merchant public key.

In function block 660, payment gateway computer system 140 generates a random capture token 770. Random capture token 770 is utilized in subsequent payment capture processing to associate the payment capture request with the payment authorization request being processed. FIG. 7F depicts capture token 775.

In function block 665, payment gateway computer system 140 generates a second symmetric random encryption key 775, denoted as RK-2. FIG. 7G depicts second random encryption key RK-2 775.

In function block 670, payment gateway computer system 140 encrypts capture token 770 using random encryption key RK-2 770 to form encrypted capture token 780. FIG. 7H depicts encrypted capture token 780. The encryption state of encrypted capture token 780 is graphically shown by random key lock 785, which indicates that encrypted capture token 780 is encrypted using random key RK-2 770.

In function block 675, payment gateway computer system 140 encrypts second random encryption key RK-2 775 using its own public key to form encrypted random key RK-2 790. FIG. 7I depicts encrypted random key RK-2 790. The encryption state of encrypted random key 790 is graphically shown by payment gateway public key lock 795, which indicates that encrypted random key 790 is encrypted using the payment gateway public key.

In function block 680, payment gateway computer system 140 concatenates encrypted combined block 750, encrypted random key RK-1 760, encrypted capture token 780 and encrypted random key RK-2 790 to form payment authorization response 325. FIG. 7J depicts payment authorization response 325 comprising encrypted combined block 750, encrypted random key RK-1 760, encrypted capture token 780 and encrypted random key RK-2 790. In function block 685, payment gateway computer system 140 transmits payment computer authorization response 325 to merchant system 130.

Payment Authorization Response Processing

Figure 8:
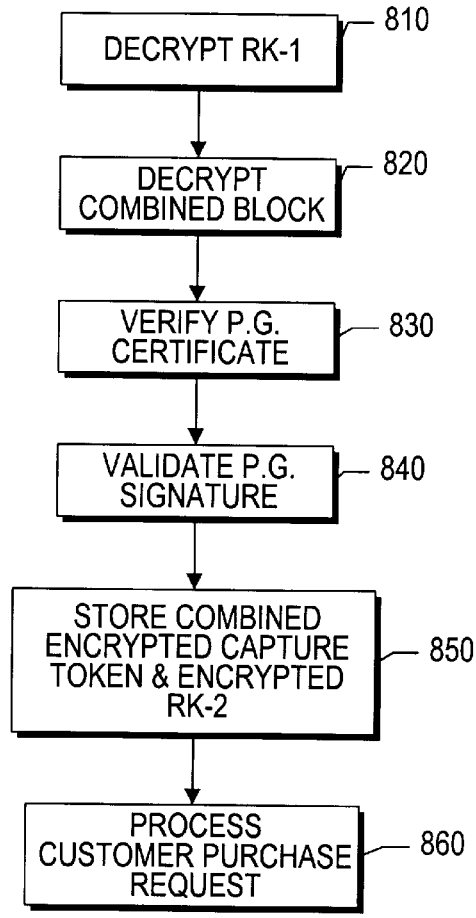
FIG. 8 depicts the detailed steps of processing a payment authorization response in accordance with a preferred embodiment.

FIG. 8 depicts the detailed steps of processing a payment authorization response. In function block 810, merchant computer system 130 applies its private key to encrypted random key RK-1 760 contained within received payment authorization response 325, thereby decrypting it and obtaining a cleartext version of random key RK-1 740. In function block 820, merchant computer system 130 applies random key RK-1 740 to encrypted combined block 750, thereby decrypting it and obtaining a cleartext version of combined block 730. Combined block 730 comprises basic authorization response 710, a copy of payment gateway computer system's 140 signature public key certificate 720, as well as payment gateway digital signature 725. In function block 830, merchant computer system 130 verifies payment gateway computer system's 140 signature public key certificate 720. Merchant computer system 130 performs this verification by making a call to the certification authority associated with the certificate. If verification of the certificate fails, merchant computer system 130 concludes that the authorization response 710 is counterfeit and treats it though the authorization request had been rejected.

In function block 840, merchant computer system 130 validates payment gateway digital signature 725. Merchant computer system 130 performs this validation by calculating a message digest over the contents of the combined basic authorization response 710 and the signature public key certificate 720. Merchant computer system 130 then decrypts digital signature 725 to obtain a copy of the equivalent message digest calculated by payment gateway computer system 140 in function block 640. If the two message digests are equal, the digital signature 725 is validated. If validation fails, concludes that the authorization response 710 is counterfeit and treats it though the authorization request had been rejected.

In function block 850, merchant computer system 130 stores encrypted capture token 780 and encrypted random key RK-2 790 for later use in payment capture. In function block 860, merchant computer system 130 processes the customer purchase request in accordance with the authorization response 710. If the authorization response 710 indicates that payment in authorized, merchant computer system 130 fills the requested order. If the authorization response 710 indicates that payment is not authorized, or if merchant computer system 130 determined in function block 830 or 840 that the authorization response is counterfeit, merchant computer system 130 indicates to the customer that the order cannot be filled.

Payment Capture

Figure 9:
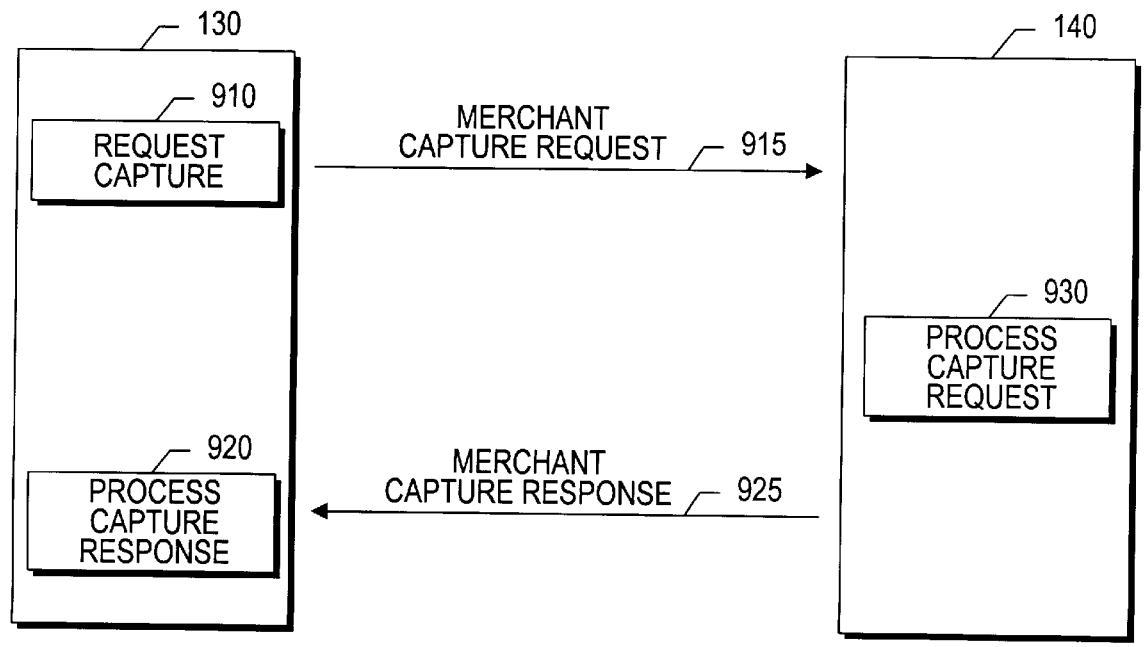
FIG. 9 depicts an overview of the method of securely supplying payment capture information to a payment gateway in accordance with a preferred embodiment.

FIG. 9 depicts an overview of the method of securely supplying payment capture information to payment gateway 140 in order to obtain payment capture. In function block 910, merchant computer system 130 generates a merchant payment capture request 915 and transmits it to payment gateway computer system 140. In function block 930, payment gateway system 140 processes the payment capture request 915, generates a payment capture response 925 and transmits it to merchant computer system 130. In function block 920, merchant computer system 130 processes payment capture response 925 and verifies that payment for the goods or services sought to be obtained by the customer have been captured.

Payment Capture Request Generation

Figures 10, 14:
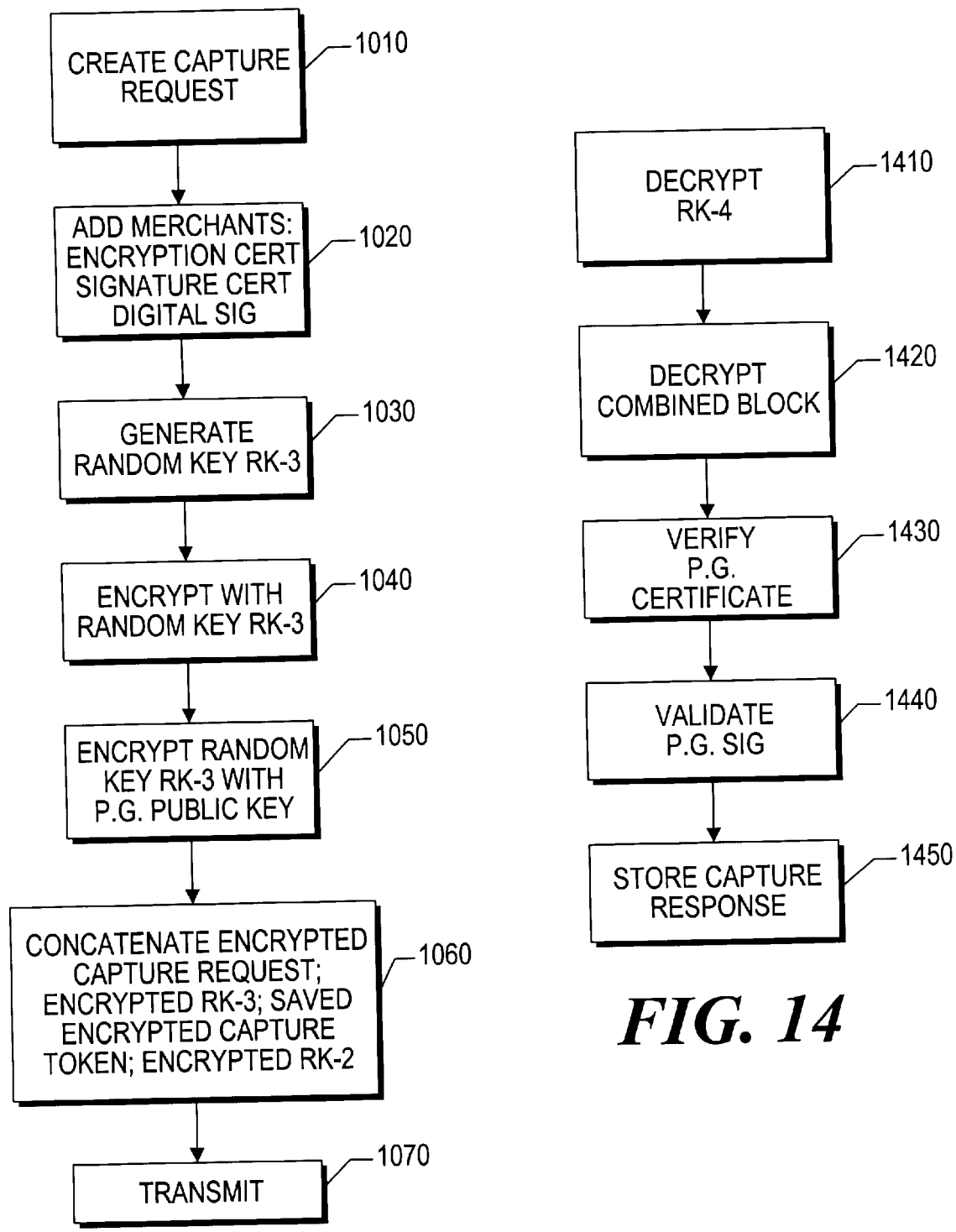
FIG. 10 depicts the detailed steps of generating and transmitting a payment capture request in accordance with a preferred embodiment.
FIG. 14 depicts the detailed steps of processing a payment capture response in accordance with a preferred embodiment.

FIG. 10 depicts the detailed steps of generating and transmitting a payment capture request. FIGS. 11A through 11F depict views of the payment capture request and its component parts. In function block 1010, merchant computer system 130 creates a basic capture request 510. The basic capture request is a data area that includes all the information needed by payment gateway computer system 140 to trigger a transfer of funds to the merchant operating merchant computer system 130.

Figure 11A:
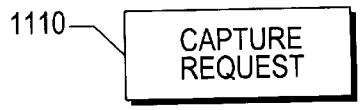
FIGS. 11A through 11F depict views of the payment capture request and its component parts in accordance with a preferred embodiment.

Specifically, a capture request includes a capture request amount, a capture token, a date, summary information of the purchased items and a Merchant ID (MID) for the particular merchant. FIG. 11A depicts basic capture request 1110.

In function block 1020, merchant computer system 130 combines basic capture request 1110, a copy of its encryption public key certificate 1115 and a copy of its signature public key certificate 1120. Merchant computer system 130 calculates a digital signature 1125 for the combined contents of the combined block 1130 comprising basic capture request 1110, the encryption public key certificate 1115 and the signature public key certificate 1120, and appends it to the combination of the combined basic capture request 1110, the encryption public key certificate 1115 and the signature public key certificate 1120. The merchant computer system calculates digital signature 1125 by first calculating a message digest over the contents of the combined basic capture request 1110, the encryption public key certificate 1115 and the signature public key certificate 1120. The message digest is then encrypted using the merchant computer system's 130 digital signature private key, thus forming a digital signature.

Figure 11B:
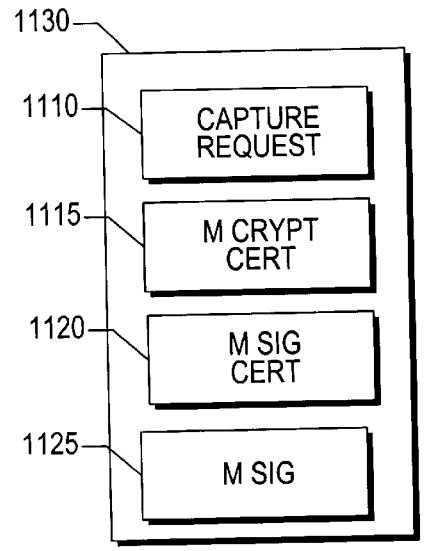
Figure 11C:
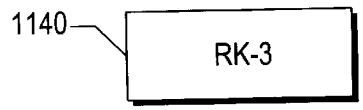
Figure 11D:
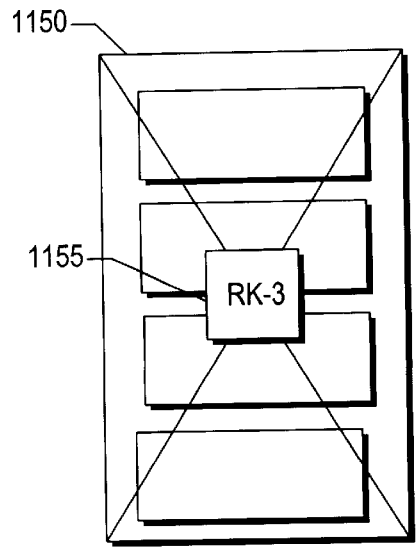
Figure 11E:
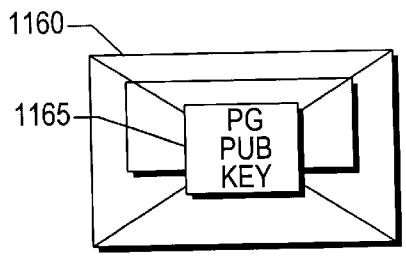

FIG. 11B depicts the combined block 1130 formed by function block 1020 and containing basic capture request 1110, the encryption public key certificate 1115, the signature public key certificate 1120, and digital signature 1125. In function block 1030, merchant computer system 130 generates a random encryption key 1140, denoted as RK-3. Random encryption key RK-3 1140 is a symmetric encryption key. FIG. 11C depicts random encryption key RK-3 1140. In function block 1040, merchant computer system 130 encrypts combined block 1130 using random encryption key RK-3 1140 to form encrypted combined block 1150. FIG. 11D depicts encrypted combined block 1150. The encryption state of encrypted combined block 1150 is graphically shown by random key lock 1155, which indicates that encrypted combined block 1150 is encrypted using random key RK-3 1140. In function block 1050, merchant computer system 130 encrypts random encryption key RK-3 1140 using the public key of payment gateway system 140 to form encrypted random key 1160. FIG. 11E depicts encrypted random key 1160. The encryption state of encrypted random key 1160 is graphically shown by payment gateway public key lock 1165, which indicates that encrypted random key RK-3 1160 is encrypted using the payment gateway public key.

Figure 11F:
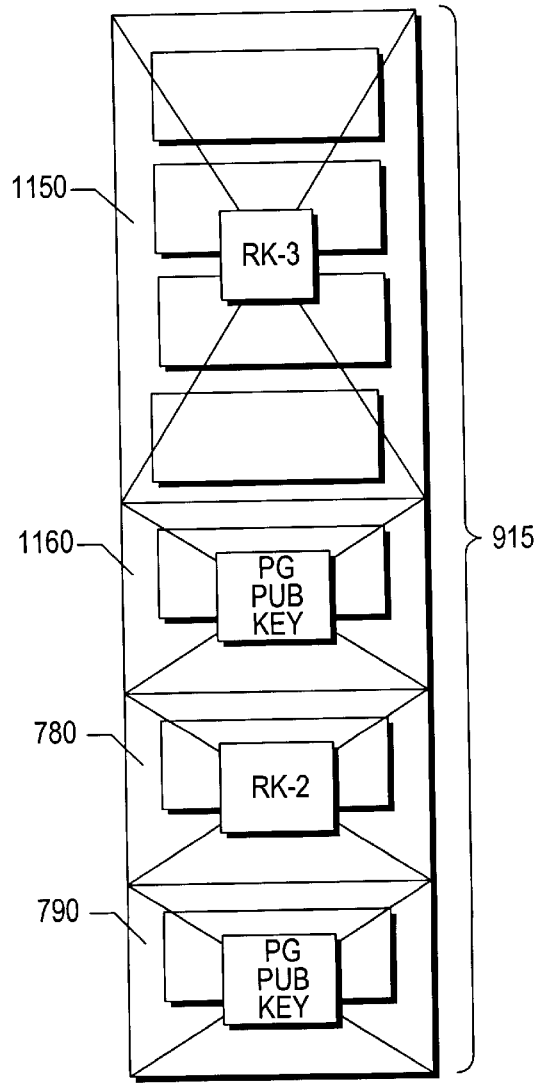

In function block 1060, merchant computer system 130 concatenates encrypted combined block 1150, encrypted random key 1160, and the encrypted capture token 780 and encrypted random key RK-2 790 that were stored in function block 850 to form merchant capture request 915. FIG. 11F depicts merchant capture request 915, comprising encrypted combined block 1150, encrypted random key 1160, encrypted capture token 780 and encrypted random key RK-2 790. In function block 1070, merchant computer system 130 transmits merchant capture request 915 to payment gateway system 140.

Payment Capture Request Processing

FIG. 12 depicts the detailed steps of processing a payment capture request and generating and transmitting a payment capture request response. Function blocks 1210 through 1245 depict the steps of processing a payment capture request, while function blocks 1250 through 1285 depict the steps of generating and transmitting a payment capture request response. In function block 1210, payment gateway computer system 140 applies its private key to encrypted random key 1160 contained within received merchant capture request 915, thereby decrypting it and obtaining a cleartext version of random key RK-3 1140. In function block 1215, payment gateway computer system 140 applies random key RK-3 1140 to encrypted combined block 1150, thereby decrypting it and obtaining a cleartext version of combined block 1130. Combined block 1130 comprises basic capture request 1110, a copy of merchant computer system's 130 encryption public key certificate 1115 and a copy of merchant computer system's 130 signature public key certificate 1120, as well as merchant digital signature 1125. In function block 1220, payment gateway computer system 140 verifies merchant computer system's 130 encryption public key certificate 1115 and merchant computer system's 130 signature public key certificate 1120. Payment gateway computer system 140 performs this verification by making a call to the certification authorities associated with each certificate. If verification of either certificate fails, payment gateway computer system 140 rejects the capture request.

In function block 1225, payment gateway computer system 140 validates merchant digital signature 1125. Payment gateway computer system 140 performs this validation by calculating a message digest over the contents of the combined basic capture request 1110, the encryption public key certificate 1115 and the signature public key certificate 1120. Payment gateway computer system 140 then decrypts digital signature 1125 to obtain a copy of the equivalent message digest calculated by merchant computer system 130 in function block 1020. If the two message digests are equal, the digital signature 1125 is validated. If validation fails, payment gateway computer system 140 rejects the capture request. In function block 1230, payment gateway computer system 140 applies its private key to encrypted random key RK-2 790 contained within received merchant capture request 915, thereby decrypting it and obtaining a cleartext version of random key RK-2 775. In function block 1235, payment gateway computer system 140 applies random key RK-2 775 to encrypted capture token 780, thereby decrypting it and obtaining a cleartext version of capture token 770.

In function block 1240, payment gateway computer system 140 verifies that a proper transaction is being transmitted between capture token 780 and capture request 1110. A capture token contains data that the gateway generates at the time of authorization. When the authorization is approved, the encrypted capture token is given to the merchant for storage. At the time of capture, the merchant returns the capture token to the gateway along with other information required for capture. Upon receipt of the capture token, the gateway compares a message made of the capture request data and the capture token data and transmits this information over a traditional credit/debit network. If an improperly formatted transaction is detected, payment gateway computer system 140 rejects the capture request. In function block 1245, payment gateway computer system 140 determines the financial institution for which capture is requested by inspection of basic capture request 1110. Payment gateway computer system 140 contacts the appropriate financial institution using a secure means, e.g, a direct-dial modem-to-modem connection, or a proprietary internal network that is not accessible to third parties, and using prior art means, instructs a computer at the financial institution to perform the requested funds transfer after settlement.

Payment Capture Response Generation

Function blocks 1250 through 1285 depict the steps of generating and transmitting a payment capture request response. FIGS. 13A through 13F depict views of the payment capture response and its component parts.

Figure 13A:
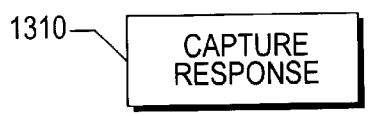
FIGS. 13A through 13F depict views of the payment capture response and its component parts in accordance with a preferred embodiment.

In function block 1250, payment gateway computer system 140 creates a basic capture response 1310. The basic capture request is a data area that includes all the information to indicate whether a capture request was granted or denied. FIG. 13A depicts basic capture response request 1310.

In function block 1255, payment gateway computer system 140 combines basic capture response 1310, and a copy of its signature public key certificate 1320. Payment computer system 140 calculates a digital signature 1325 for the combined contents of the combined block 1330 comprising basic capture response 1310 and the signature public key certificate 1320, and appends the signature to the combination of the combined basic capture response 1310 and the signature public key certificate 1320. The payment gateway computer system calculates digital signature 1325 by first calculating a message digest over the contents of the combined basic capture response 1310 and signature public key certificate 720. The message digest is then encrypted using the merchant computer system's 140 digital signature private key, thus forming a digital signature.

Figure 13B:
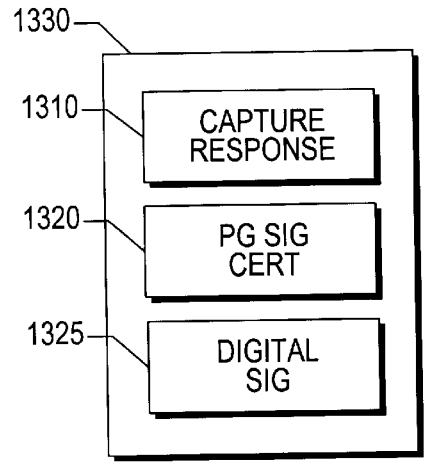
Figure 13C:
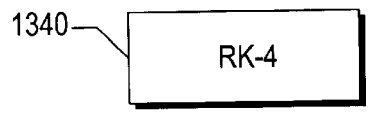
Figure 13D:
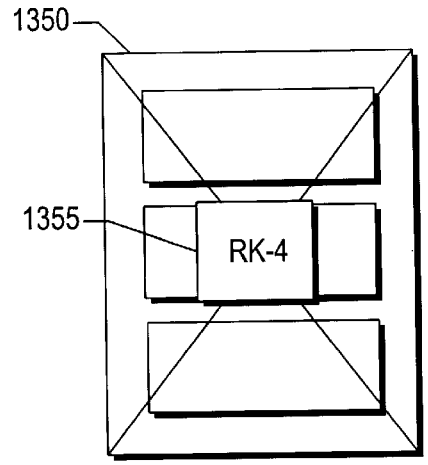
Figure 13E:
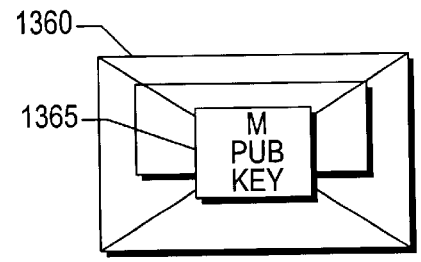
Figure 13F:
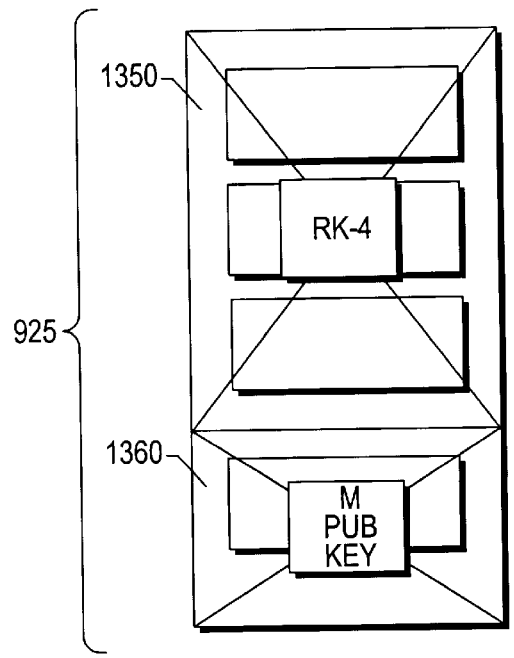

FIG. 13B depicts the combined block 1330 formed by function block 1255 and containing basic capture response 1310, the signature public key certificate 1320, and digital signature 1325. In function block 1260, payment gateway computer system 140 generates a symmetric random encryption key 1340, denoted as RK-4. FIG. 13C depicts random encryption key RK-4 1340. In function block 1275, payment gateway computer system 140 encrypts combined block 1330 using random encryption key RK-4 1340 to form encrypted combined block 1350. FIG. 13D depicts encrypted combined block 1350. The encryption state of encrypted combined block 1350 is graphically shown by random key lock 1355, which indicates that encrypted combined block 1350 is encrypted using random key RK-4 1340. In function block 1275, payment gateway computer system 140 encrypts random encryption key RK-4 1340 using the public key of merchant computer system 130 to form encrypted random key RK-4 1360. FIG. 13E depicts encrypted random key RK-4 1360. The encryption state of encrypted random key 1360 is graphically shown by merchant public key lock 1365, which indicates that encrypted random key 1360 is encrypted using the merchant public key. In function block 1280, payment gateway computer system 140 concatenates encrypted combined block 1350 and encrypted random key RK-4 1360 to form merchant capture response 925. FIG. 13F depicts merchant capture response 925 comprising encrypted combined block 1350 and encrypted random key RK-4 1360. In function block 1285, payment gateway computer system 140 transmits merchant capture response 925 to merchant system 130.

Payment Capture Response Processing

FIG. 14 depicts the detailed steps of processing a payment capture response. In function block 1410, merchant computer system 130 applies its private key to encrypted random key RK-4 1360 contained within received merchant capture response 925, thereby decrypting it and obtaining a cleartext version of random key RK-4 1340. In function block 1420, merchant computer system 130 applies random key RK-4 1340 to encrypted combined block 1350, thereby decrypting it and obtaining a cleartext version of combined block 1330. Combined block 1330 comprises basic capture response 1310, a copy of payment gateway computer system's 140 signature public key certificate 1320, as well as payment gateway digital signature 1325. In function block 1430, merchant computer system 130 verifies payment gateway computer system's 140 signature public key certificate 1320. Merchant computer system 130 performs this verification by making a call to the certification authority associated with the certificate. If verification of the certificate fails, merchant computer system 130 concludes that the capture response is counterfeit and raises an error condition.

In function block 1440, merchant computer system 130 validates payment gateway digital signature 1325. Merchant computer system 130 performs this validation by calculating a message digest over the contents of the combined basic capture response 1310 and the signature public key certificate 1320. Merchant computer system 130 then decrypts digital signature 1325 to obtain a copy of the equivalent message digest calculated by payment gateway computer system 140 in function block 1255. If the two message digests are equal, the digital signature 1325 is validated. If validation fails, merchant computer system 130 concludes that the authorization response is counterfeit and raises an error condition. In function block 1450, merchant computer system 130 stores capture response for later use in by legacy system accounting programs, e.g. to perform reconciliation between the merchant operating merchant computer system 130 and the financial institution from whom payment was requested, thereby completing the transaction. The system of the present invention permits immediate deployment of a secure payment technology architecture such as the SET architecture without first establishing a public-key encryption infrastructure for use by consumers. It thereby permits immediate use of SET-compliant transaction processing without the need for consumers to migrate to SET-compliant application software.

VIRTUAL POINT OF SALE (VPOS) DETAILS

A Virtual Point of Sale (VPOS) Terminal Cartridge is described in accordance with a preferred embodiment. The VPOS Terminal Cartridge provides payment functionality similar to what a VeriFone PoS terminal ("gray box") provides for a merchant today, allowing a merchant to process payments securely using the Internet. It provides full payment functionality for a variety of payment instruments.

Payment Functionality

Figure 15A:
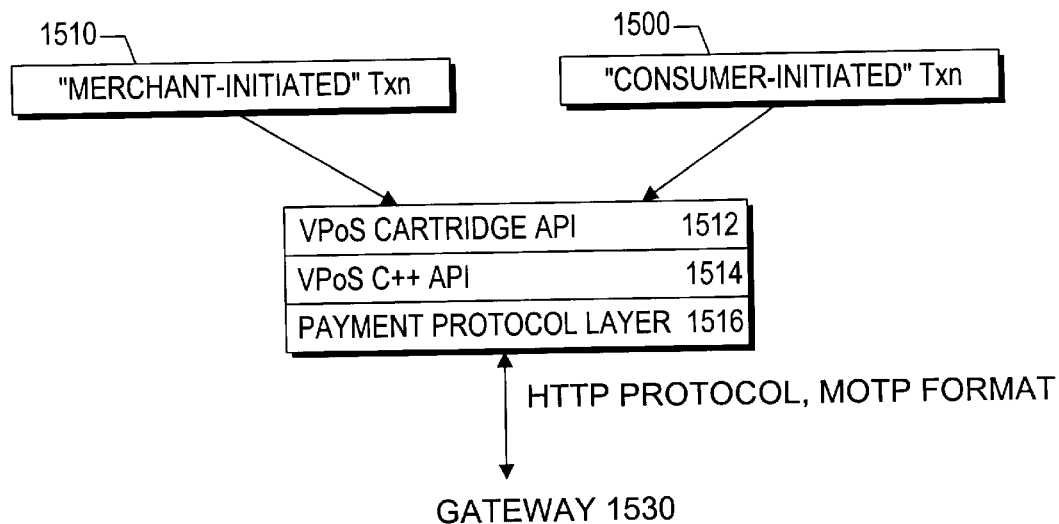
FIG. 15A & 15B depicts transaction processing of merchant and consumer transactions in accordance with a preferred embodiment.

FIG. 15A illustrates a payment processing flow in accordance with a preferred embodiment. The payment functionality provided by the VPOS terminal is divided into two main categories: "Merchant-Initiated" 1510 and "Consumer-Initiated" 1500. Some payment transactions require communication with the acquirer bank through the Gateway 1530. The normal flow of a transaction is via the VPOS Cartridge API 1512 to the VPOS C++ API 1514 into the payment protocol layer 1516 which is responsible for converting into the appropriate format for transmission to the Gateway for additional processing and forwarding to existing host payment authorization systems. Host legacy format refers to an existing authorization system for credit card approval currently utilized with the VeriFone Point of Sale (POS) gray terminals. The output from the payment protocol layer 1516 is transmitted to the authorization processing center via the gateway 1530. These transactions are referred to as "Online Transactions" or "Host Payments." The transactions that can be done locally by the merchant without having to communicate with the acquirer bank are referred to as "Local Functions and Transactions." To support different types of payment instruments, the VPOS Terminal payment functionality is categorized as set forth below.

Host Payment Functionality: These transactions require communication with the final host, either immediately or at a later stage. For example, an Online Authorization-Only transaction, when initiated, communicates with the host immediately. However, an Off-line Authorization-Only transaction is locally authorized by the VPOS terminal without having to communicate with the host, but at a later stage this off-line authorization transaction is sent to the host. Within the Host Payment Functionality some transactions have an associated Payment Instrument, while others do not. These two kinds of transactions are:

Host Financial Payment Functionality: These transactions have a Payment Instrument (Credit Card, Debit Card, E-Cash, E-Check, etc.) associated with them. For example, the "Return" transaction, which is initiated upon returning a merchandise to the merchant.

Host Administrative Payment Functionality: These transactions do not require a payment instrument, and provide either administrative or inquiry functionality. Examples of these transactions are "Reconcile" or the "Batch Close."

Local Functions and Transactions: These transactions do not require communication with the host at any stage, and provide essential VPOS terminal administrative functionality. An example of this is the VPOS terminal configuration function, which is required to set up the VPOS terminal. Another example is the "VPOS Batch Review" function, which is required to review the different transactions in the VPOS Batch or the Transaction Log.

Payment Instruments

A preferred embodiment of a VPOS terminal supports various Payment Instruments. A consumer chooses a payment based on personal preferences. Some of the Payment Instruments supported include:

Credit Cards
Debit Cards
Electronic Cash
Electronic Checks
Micro-Payments (electronic coin)
Smart Cards

LOCAL FUNCTIONS & TRANSACTIONS

| | | | |
|---|---|---|---|
| accum review | /VPOSt/mi/accum/review/ | not allowed | merchant login/password |
| batch review | /VPOSt/mi/batch/review/ | not allowed | merchant login/password |
| cdt review | /VPOSt/mi/cdt/review/ | not allowed | merchant login/password |
| cdt update | /VPOSt/mi/cdt/update/ | allowed | merchant login/password |
| cpt review | /VPOSt/mi/cpt/review | not allowed | merchant login/password |
| cpt update | /VPOSt/mi/cpt/update/ | allowed | merchant login/password |
| clear accum | /VPOSt/accum/clear/ | allowed | merchant login/password |
| clear batch | /VPOSt/mi/batch/clear/ | allowed | merchant login/password |
| hdt review | /VPOSt/mi/hdt/review/ | not allowed | merchant login/password |
| hdt update | /VPOSt/mi/hdt/update/ | allowed | merchant login/password |
| lock VPOS | /VPOSt/mi/lock/ | allowed | merchant login/password |
| query txn | /VPOSt/ci/querytxn/ | not allowed | no access control |
| query txn | /VPOSt/mi/querytxn/ | not allowed | merchant login/password |
| tct review | /VPOSt/mi/tct/review/ | not allowed | merchant login/password |
| tct update | /VPOSt/mi/tct/update/ | allowed | merchant login/password |
| unlock VPOS | /VPOSt/mi/unlock/ | allowed | merchant login/password |

URL Descriptions

This section describes the GET and POST arguments that are associated with each transaction URL. It also describes the results from the GET and POST methods. For URLs that produce any kind of results, the following fields are present in the HTML document that is returned by the VPOS Terminal Cartridge:

| | |
|---|---|
| txnDate | Date of the transaction (mm/dd/yy or dd/mm/yy) |
| txnTime | Time of the transaction (hh:mm:ss GMT or hh:mm:ss local time) |
| merchantId | Merchant ID of the merchant using the VPOS terminal |
| terminalId | VPOS Terminal Id |
| txnNum | Transaction number of the given transaction |
| txnType | Type of transaction |

For URLs that deal with financial transactions, the following fields are present in the HTML document that is returned by the VPOS terminal cartridge:

| | |
|---|---|
| txnAmount | Transaction amount that is being authorized, forced posted, voided, etc. |
| poNumber | Purchase order number |
| authIdentNum | Authorization ID number for the transaction |
| retRefNum | Retrieval reference number for the given transaction |
| piInfo | Payment instrument information. This varies for different payment instruments. For example, in the case of credit cards, the credit card number (piAcctNumber) and expiration date (piExpDate) are returned. |

Accumulate Review

URL Functionality: This is a local information inquiry function that retrieves the local (merchant's) transaction totals (accumulators).

GET Arguments: None.

GET Results: Retrieves the transaction totals for the merchant. Currently, the total is returned as an HTML document. The transaction totals currently returned are:

| | |
|---|---|
| creditAmt | Total Credit Amount since the last settlement logged in the VPOS terminal |
| creditCnt | Total Credit Count since the last settlement logged in the VPOS terminal |
| debitAmt | Total Debit Amount since the last settlement logged in the VPOS terminal |
| debitCnt | Total Debit Count since the last settlement logged in the VPOS terminal |

Note: Accum Review is a local function, as opposed to Balance Inquiry which is done over the Internet with the host.

Adjust

URL Functionality: Corrects the amount of a previously completed transaction.

GET Arguments: None

GET Results: Because the Adjust transaction modifies data on the merchant server, the POST method should be used. Using the GET method returns an HTML form that uses the POST method to perform the transaction.

POST Arguments:

| | |
|---|---|
| pvsTxnNum | Previous transaction number |
| txnAdjustedAmount | The adjusted transaction amount. Note that the original transaction amount is easily retrievable from the previous transaction number. |

POST Results: On success, pvsTxnNum and txnAdjustedAmount are presented in the HTML document, in addition to the transaction fields described above.

Auth Capture

URL Functionality: This transaction is a combination of Auth Only (Authorization without capture) and Forced Post transactions.

GET Arguments: None

GET Results: Because the Auth Capture transaction modifies data on the merchant server side, the POST method should be used. Using the GET method returns an HTML form that uses the POST method to perform the transaction.

POST Arguments:

| | |
|---|---|
| piAcctNumber | Payment Instrument account number, e.g., Visa credit card number |
| piExpDate | Expiration date |
| txnAmt | Transaction amount |

POST Results: On success, an HTML document that contains the transaction fields described above is returned. On failure, an HTML document that contains the reason for the failure of the transaction is returned. The transaction is logged into a VPOS Terminal transaction log for both instances.

Auth Only

URL Functionality: Validates the cardholder's account number for a Sale that is performed at a later stage. The transaction does not confirm the sale to the host, and there is no host data capture. The VPOS captures this transaction record and later forwards it to confirm the sale in the Forced Post transaction request.

GET Arguments: None.

GET Results: Because the Auth Only transaction modifies data on the merchant server side, the POST method should be used. Using the GET method returns an HTML form that uses the POST method to perform the transaction.

POST Arguments:

| | |
|---|---|
| piAcctNumber | Payment Instrument account number, e.g., Visa credit card number |
| piExpDate | Expiration date |
| txnAmt | Transaction amount |

POST Results: On success, an HTML document that contains the transaction fields is returned. On failure, an HTML document that contains the reason for the failure of the transaction is returned. The transaction is logged into VPOS Terminal transaction log for both instances.

NOTE: The /VPOSt/ci/authonly/ URL should be used for customer-initiated transactions. /VPOSt/mi/authonly/ should be used for merchant-initiated transactions.

Balance Inquiry

URL Functionality: Performs an on-line inquiry or the merchant's balance.

GET Arguments: None

GET Results:

| | |
|---|---|
| mrchtBlnceAmt | Merchant balance amount for a given merchant. The balance amount at any given time is the difference between the credit and debit amount since the last settlement between the merchant and the acquirer. |

Batch Review

URL Functionality: Retrieves all records from the transaction log or the batch.

GET Arguments: None

GET Results: The GET method retrieves the transactions that have been batched in the VPOS terminal for future reconciliation. The batch can be cleared from the VPOS terminal after a manual reconciliation between the acquirer and the VPOS. The batch data is retrieved as a set of records and is formatted as a table in the HTML document. The following fields are present in a typical record:

| | |
|---|---|
| nTransType | Transaction type |
| nPurchOrderNo | Purchase order number |
| szAcctNum | Customer's payment instrument account number |
| szExpDate | Customer's payment instrument expiration date |
| szTransAmt | Transaction amount |
| szTransDate | Transaction date |
| szTransTime | Transaction time |
| szRetrievalRefNum | Transaction's retrieval reference number |
| szAuthId | Authorization ID for the transaction |
| szOrigAmt | Original transaction amount |
| szBatchNum | Batch number for the given transaction |
| nCurrencyType | Currency in which the transaction was done |
| InTransNum | Transaction number |

CDT Review

URL Functionality: Displays the VPOS terminal configuration data corresponding to the Card Definition Table (CDT).

GET Arguments: None

GET Results: The GET method returns a default HTML form that contains the current configuration values. The form can be modified and posted using the /VPOSt/mi/cdt/update/ URL to update the card definition table. Not all fields in the card definition table are editable. The following fields are returned in a form to the user:

| | |
|---|---|
| nHostIndex | Index into the Host Definition Table or the acquirer that maps to this card issuer. |
| szPANLo | Low end of the PAN (Primary Account Number) range |
| szPANHi | High end of the PAN range |
| nMaxPANDigit | Maximum number of digits in the PAN for this acquirer. |
| NMinPANDigit | Minimum number of dits in the PAN for the acquirer |
| szCardLabel | Card Issuer's name |
| Transactions Available bit vector | Specifies if a particular transaction is allowed for a given card range. |

(Some of these fields are not editable by a merchant, and still need to be determined.)

CDT Update

URL Functionality: Updates the VPOS terminal configuration data corresponding to the Card Definition Table (CDT).

GET Arguments: None

GET Results: The GET method returns a default HTML form that contains the current configuration values. The form can be filled out and posted using the /VPOSt/mi/cdt/update URL to update the card definition table.

POST Arguments: (Editable CDT fields need to be decided.)

POST Results: (Depends on editable CDT fields, and therefore needs to be decided.)

Clear Accumulator

URL Functionality: Zeroes out the accumulator totals currently resident in the VPOS terminal.

GET Arguments: None.

GET Results: Presents a form that uses the POST method to zero the accumulators.

POST Arguments: None.

POST Results: Zeroes the accumulators/transaction totals in the VPOS terminal.

Clear Batch

URL Functionality: Zeroes out the transaction logs currently batched in the VPOS terminal.

GET Arguments: None.

GET Results: Presents a form that uses the POST method to clear the batch.

POST Arguments: None.

POST Results: Zeroes the transactions that comprise the batch in the VPOS terminal.

Forced Post

URL Functionality: Confirms to the host the completion of a sale, and requests for data capture of the transaction. This is used as a follow-up transaction after doing an Authorization (Online or Off-line) transaction.

GET Arguments: None.

GET Results: Returns the HTML form for performing the Forced Post transaction.

POST Arguments:

| | |
|---|---|
| pvsTxnNum | the previous transaction number from an auth only transaction |

POST Results: On success, pvsTxnNum is presented in the HTML document. On failure, an HTML document is returned that contains the reason for the failure of the transaction.

HDT Review

URL Functionality: Displays the VPOS terminal configuration data corresponding to the Host Definition Table (HDT).

GET Arguments: None

GET Results: The GET method returns a default HTML form that contains the current configuration values. The form can be modified and posted using the /VPOSt/mi/hdt/update URL to update the hosts definition table. Not all fields in the host definition table are editable. The following fields are returned in a form to the user:

| | |
|---|---|
| szTermId | Terminal ID for this VPOS terminal |
| szMerchId | Merchant ID for this VPOS terminal |
| szCurrBatchNum | Current batch number existing on the VPOS |
| szTransNum | Reference number for the next transaction in the VPOS transaction log/batch. This is generated by VPOS and is not editable by the merchant. |
| szTPDU | Transport Protocol Data Unit. Required for building the ISO 8583 packet. |
| lnSTAN | System trace number; message number of the next transaction to be transmitted to this acquirer. |
| szNII | Network International Number. Required for building the ISO 8583 packet. |
| szHostName | Name for identifying the host. |
| nHostType | Host type |
| nNumAdv | Number of off-line transactions that can be piggy-backed at the end of an on-line transaction. |
| Data Capture Required Bit vector: | Specifies for which transactions data capture is required. |

(Some of these fields are not editable by a merchant and need to be determined.)

HDT Update

URL Functionality: Updates the VPOS terminal configuration data corresponding to the Host Definition Table (HDT).

GET Arguments: None

GET Results: The GET method returns a default HTML form that contains the current configuration values. The form can be filled out and posted to the merchant server using the /VPOSt/mi/hdt/update URL to update the host definition table

Unlock VPOS

URL Functionality: Local function that starts the VPOS at the start of the day.

GET Arguments: None.

GET Results: Returns an HTML form that uses the POST method to perform this transaction.

POST Arguments: None.

POST Results: Resets a Boolean flag on the merchant server that enables transactions to be accepted by the VPOS terminal.

Offline Auth

URL Functionality: This transaction is same as the "Authorization Only" transaction, except that the transaction is locally captured by the VPOS terminal without having to communicate with the host. A Forced Post operation is done as a follow-up operation of this transaction.

GET Arguments: None.

GET Results: Because the Offline Auth transaction modifies data on the merchant server side, the POST method should be used. Using the GET method returns an HTML form for using the POST method to perform the transaction.

POST Arguments:

| | |
|---|---|
| piAcctNumber | Payment Instrument account number, e.g., Visa credit card number |
| piExpDate | Expiration date |
| txnAmt | Transaction amount |

POST Results: On success, an HTML document that contains the transaction fields described in Section 4.1 is returned. On failure, an HTML document that contains the reason for the failure of the transaction is returned. The transaction is logged into VPOS terminal transaction log for both instances.

Parameter Download

URL Functionality: Downloads the VPOS configuration information from the host and sets up the VPOS in the event of the configuration data being changed.

GET Arguments: None

GET Results: Retrieves an HTML form that uses the POST method for the parameter download transaction.

POST Arguments: None.

POST Results: Downloads the following parameters from the host and uploads them into the VPOS terminal configuration table.

card/issuer definition table (CDT)
host/acquirer definition table (HDT)
communications parameter table (CPT)
terminal configuration table (TCT)
The various configuration parameters can be reviewed and modified using the URLs for the desired functionality.

Pre Auth

URL Functionality: Used in lodging and hotel establishments to pre-authorize a charge that is completed some time in future.
GET Arguments: None
GET Results: Retrieves the HTML form for posting the pre-authorizaton transaction.
POST Arguments:

| | |
|---|---|
| piAcctNumber | Payment Instrument account number, e.g., Visa credit card number |
| piExpDate | Expiration date |

Pre Auth Comp

URL Functionality: Completes a pre-authorization transaction.
GET Arguments: None
GET Results: Retrieves the HTML form for posting the pre-authorization completion transaction.
POST Arguments:

| | |
|---|---|
| pvsTxnNum | Previous transaction number from an auth only transaction |

POST Results: On success, pvsTxnNum is presented in the HTML document. On failure, an HTML document is returned that contains the reason for the failure of the transaction.

Reconcile

URL Functionality: This transaction is done at the end of the day to confirm to the host to start the settlement process for the transactions captured by the host for that particular VPOS batch.
GET Arguments: None
GET Results: Retrieves the HTML form for posting the Reconcile transaction.
POST Arguments: None.
POST Results: On success, the reconcile function prints any discrepancies in the merchant's batch of transactions and totals vis-a-vis the host's batch of transactions in totals. The output format is a combination of the output of the Batch Review and Accum Review transactions.

Return

URL Functionality: Credits the return amount electronically to the consumer's account when previously purchased merchandise is returned. The VPOS terminal captures the transaction record for this transaction.
GET Arguments: None
GET Results: Retrieves the HTML form for posting the Return transaction.
POST Arguments:
prevTxnNum Reference to the previous transaction number The previous transaction has access to the following fields:

| | |
|---|---|
| txnAmount | Transaction amount |
| piAccountNum | Payment instrument account number |
| piExpDate | Payment instrument expiration date |

POST Results: On success, pvsTxnNum is presented in the HTML document, in addition to

Test Host

URL Functionality: Checks the presence of the host and also the integrity of the link from the VPOS to the host.
GET Arguments: None.
GET Results: On success, an HTML document is returned that reports success in connecting to the host. On failure, an HTML document is returned that reports the error encountered in testing the host.

Lock VPOS

URL Functionality: This local function locks or stops the VPOS terminal from accepting any transactions.
GET Arguments: None.
GET Results: Returns an HTML form that posts the locking of the VPOS terminal.
POST Arguments: None.
POST Results: On success, an HTML document is returned that contains the status that VPOS terminal was successfully. On failure, an HTML document is returned that reports the cause of failure of the operation, e.g., access denied, the VPOS terminal is already locked or is presently processing a transaction, etc.

Void

URL Functionality: Cancels a previously completed draft capture transaction.
GET Arguments: None.
GET Results: Retrieves an HTML form for posting the Void transaction.
POST Arguments:

| | |
|---|---|
| pvsTxnNum | Transaction number from a previous Auth Only transaction. |

Host Logon

URL Functionality: Administrative transaction used to sign-on the VPOS with the host at the start of the day, and also to download encryption keys for debit transactions.
GET Arguments: None
GET Results: Retrieves an HTML form for posting the Host Logon transaction.
POST Arguments: None.
POST Results: Currently, debit card based transactions are not supported. The result is an HTML document indicating the success or failure of the host logon operation.

CPT Review

URL Functionality: Returns the VPOS terminal configuration data corresponding to the Communications Parameter Table (CPT).
GET Arguments: None
GET Results: The GET method returns a default HTML form that contains the current configuration values corresponding to the VPOS terminal's communication parameters. The form can be filled out and posted to the merchant server using the /VPOSt/mi/cpt/update URL to update the communications parameter table. The following fields are returned in a form to the user:

| | |
|---|---|
| szAcqPriAddress | Primary Host address |
| szAcqSecAddress | Secondary Host address |
| szActTerAddress | Tertiary Host address |
| nRespTimeOut | Time-out value (in seconds) before which the VPOS should receive a response from the host |

CPT Update

URL Functionality: Updates the VPOS terminal configuration data corresponding to the Communications Parameter Table (CPT).

GET Arguments: None

GET Results: The GET method returns a default HTML form that contains the current configuration values. The form can be modified and posted to update the communication parameter table.

POST Arguments:

| | |
|---|---|
| szAcqPriAddress | Primary Host address |
| szAcqSecAddress | Secondary Host address |
| szActTerAddress | Tertiary Host address |
| nRespTimeOut | Time-out value (in seconds) before which the VPOS should receive a response from the host |

POST Results: On success, the HTML document returned by the VPOS contains the values set by the merchant. On failure, the HTML document contains the reason for the failure of the invocation of the URL.

TCT Review

URL Functionality: Returns the VPOS terminal configuration data corresponding to the Terminal Configuration Table (TCT).

GET Arguments: None.

GET Results: The GET method returns a default HTML form that contains the current configuration values. The form can be filled out and posted using the /VPOSt/mi/tct/update URL to update the terminal configuration table. The following fields are returned in a form to the user:

| | |
|---|---|
| szMerchName | Merchant name |
| szSupervisorPwd | Supervisor password |
| fVPOSLock | 1 = VPOS locked, 0 = VPOS unlocked |
| szAuthOnlyPwd | Password for initiating auth-only transaction |
| szAuthCaptPwd | Password for initiating auth with capture transaction |
| szAdjustPwd | Password for adjust transaction |
| szRefundPwd | Password for refund transaction |
| szForcedPostPwd | Password for forced post transaction |
| szOfflineAuthPwd | Password for offline auth transaction |
| szVoidPwd | Password for void transaction |
| szPreAuthPwd | Password for pre-authorization transaction |
| szPreAuthCompPwd | Password for pre-authorization completion |

TCT Update

URL Functionality: Updates the VPOS terminal configuration data corresponding to the Terminal Configuration Table (TCT).

GET Arguments: None

GET Results: The GET method returns a default HTML form that contains the current configuration values. The form can be filled out and posted using the /VPOSt/mi/tct/update URL to update the terminal configuration table.

POST Arguments: All arguments in TCT Review functionality are the returned values from the /VPOSt/mi/tct/update the URL.

| | |
|---|---|
| szMerchName | Merchant name |
| szSupervisorPwd | Supervisor password |
| fVPOSLock | 1 = VPOS locked, 0 = VPOS unlocked |
| szAuthOnlyPwd | Password for initiating auth-only transaction |
| szAuthCaptPwd | Password for initiating auth with capture transaction |
| szAdjustPwd | Password for adjust transaction |
| szRefundPwd | Password for refund transaction |
| szForcedPostPwd | Password for forced post transaction |
| szOfflineAuthPwd | Password for offline auth transaction |
| szVoidPwd | Password for void transaction |
| szPreAuthPwd | Password for pre-authorization transaction |
| szPreAuthCompPwd | Password for pre-authorization completion |

POST Results: On success, the POST modifies values of the terminal configuration table parameters. On failure, the HTML document contains the reason for the failure of the transaction.

Query Transactions

URL Functionality: Permits the merchant and customer to query a given transaction corresponding to a transaction number.

GET Arguments:

txnNum Transaction number

GET Results: For a given transaction, the URL returns an HTML document. If a transaction refers to an older transaction, the transaction's entire history is made available.

URL results

Depending upon the method (GET/POST) as well as the success or failure of the HTTP request, different documents are returned to the user. The VPOS terminal provides a framework whereby different documents are returned based upon a number of preferences. Currently the language and content-type are supported as preferences.

A simple framework is proposed here. Each of the transaction has a set of documents associated with it: form for the payment transaction, GET success, GET failure, POST success, and POST failure.

In the directory structure defined below, documents are stored corresponding to the preferences. The top level of the directory structure is the content-type, the next level is language (for NLS support). For example, to create text/html content in US English & French, the directory structure given below would contain the HTML documents for each of the transactions. The VPOS terminal cartridge has a configuration file that allows the user to specify the content-type as well as the language to be used for a cartridge. The first release of the VPOS terminal cartridge supports one content-type and language for each server.

Data Structures & Functions

Functions

A brief description of the Virtual Point of Sale Terminal cartridge functions are provided below. VPOSTInit( ), VPOSTExec( ) and VPOSTShut( ) are the entry points required for each cartridge in accordance with a preferred embodiment. The other functions implement some of the key VPOST cartridge functionality. A source listing of the VPOS code is provided below to further accentuate the detailed disclosure of a preferred embodiment.

VPOSTInit()

```
/* VPOST cartridge Initialization here */
WRBReturnCode
VPOSTInit(void **clientCtx){
    VPOSTCtx *VPOSTCxp ;
    /* Allocate memory for the client context */
    if (!(VPOSTCxp = (VPOSTCtx *)malloc(sizeof(VPOSTCtx))))
                return WRB_ERROR ;
            *clientCtx = (void *)VPOSTCxp ;
            return (WRB_DONE) ;}
```

VPOSTShut()

```
WRBReturnCode
VPOSTShut(void *WRBCtx, void *clientCtx){
            *WRBCtx;    /* not used */
            assert(clientCtx) ;
            /* Free the client context allocated in VPOSTInit() routine
                                        free(clientCtx) ;
                                        return (WRB_DONE) ;}
```

VPOSTExec()

```
/* The driver cartridge routine */
WRBReturnCode
VPOSTExec(void *WRBCtx, void *clientCtx)
{
            VPOSTCtx    *VPOSTCxp ;
            char    *uri ;
            char    *txnMethod ;    /* HTTP method */
            enum eVPOSTTxn      *txn ;    /* VPOST transaction */
            char    *txnOutFile ; /* Output file from transaction */
            char    **txnEnv ; /* environment variables values for transaction */
            char    *txnContent ; /* transaction's POST data content */
            WRBEntry    *WRBEntries;
            int         numEntries;
            VPOSTCxp = (VPOSTCtx *) clientCtx ;
            /* WRBGetURL gets the URL for the current request */
            if (!(uri = WRBGetURL(WRBCtx)))
                    return (WRB_ERROR) ;
            /* WRBGetContent() gets the QueryString/POST data content */
            if (!(txnContent = WRBGetContent(WRBCtx))) {
                    return WRB_ERROR ;
    }
            /* WRBGetParserContent() gets the parsed content */
            if (WRB_ERROR == WRBGEtParsedContent(WRBCtx, &WRBEntries,
            &numEntries)) {
                    return WRB_ERROR ;
    }
    /* WRBGetEnvironment() gets the HTTP Server Environment */
    if (!(txnEnv = WRBGetEnvironment(WRBCtx))) {
            return WRB_ERROR ;
    }
            /* VPOSTGetMethod() gets the method for the current request */
            if (!(method = VPOSTGetMethod(txnEnv))){
                    return (WRB_ERROR) ;
            }
            /* VPOSTGetTxn() gets the VPOST transaction for the request */
            txn = VPOSTGetTxn(uri);
            if (eTxnError == txn) {
                    return (WRB_ERROR) ;
            }
            /* VPOSTExecuteTransaction() executes the VPOST transaction */
            txnOutFile = VPOSTExecuteTransaction(WRBCtx, txn, txnMethod,
            txnEnv, txnContent) ;
            if (!(txnOutFile)) {
                    return (WRB_ERROR) ;
            }
            /* Write out the file */
            VPOSTWriteFile(txnOutFile) ;
            return (WRB_DONE) ;
}
```

VPOSTGetTxn()

```
enum eVPOSTTxn
VPOSTGetTxn(char *uri)
```

-continued

```
{
    /*
     * The function scans the uri and extracts the string
     * corresponding to the transaction and returns it to the
     * caller.
     */
}
```

Transaction Log Format

This section describes the format of a record for the transaction log for the VPOST cartridge.

| Field Name | Field Description |
|---|---|
| nTransType | Transaction Type |
| nPurchOrderNo | Purchase Order Number |
| szAcctNum | Payment Instrument Account number |
| szExpDate | Payment instrument expiration date |
| szTransAmt | Transaction amount |
| szTransDate | Date of transaction (configurable to be mm/dd/yy or dd/mm/yy) |
| szTransTime | Time of transaction (configurable to be GMT or local time) |
| szRetrievalRefNum | Retrieval reference number |
| szAuthId | Authorization ID |
| szOrigAmt | Original transaction amount |
| szBatchNum | Batch number to which this particular transaction belongs in the VPOST batch |
| nCurrencyType | Currency |
| lnTransNum | Transaction number |

Figure 15B:
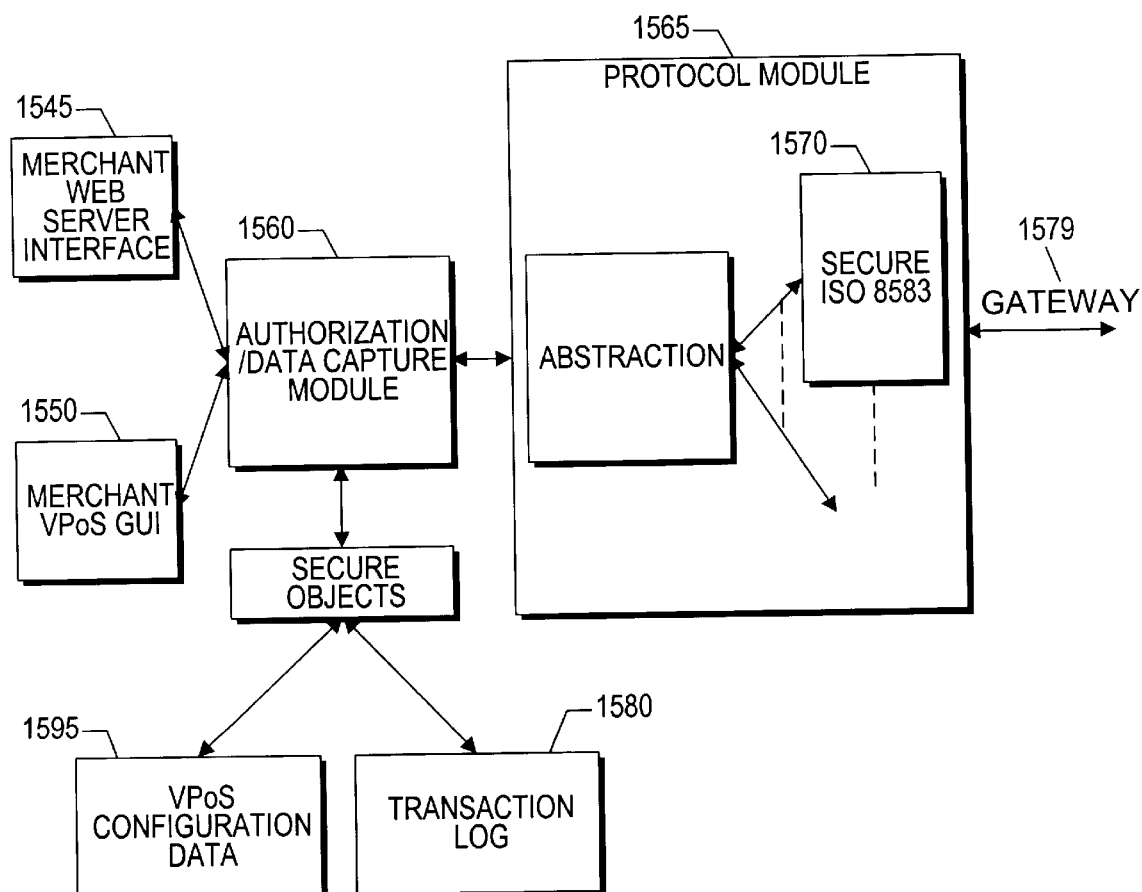

In the block diagram shown in FIG. 15B, the VPOS provides an interface for transactions which are initiated both by the consumer and the merchant. The merchant initiates a transaction from a Graphical User Interface (GUI) 1550 and all the transactions that are initiated by the consumer are routed by the Merchant WEB Server 1545.

The Authorization/Data Capture Module 1560 processes the requests originated by the merchant or the consumer and routes them to the Protocol Module 1565. The Protocol Module is responsible for building the payment protocol request packet (e.g., an SSL-encapsulated ISO 8583 packet) 1570 before sending the request to the Gateway 1579. Then, the Gateway 1579 awaits a response from the Protocol Module 1565, and upon receiving the response, the Gateway 1579 parses the data and provides unwrapped data to the Authorization/Data-Capture Module 1560. The Authorization/Data-Capture Module 1560 analyzes the response and updates the Transaction Log 1580. The Transaction Log 1580 contains information concerning any successfully completed transactions and the accumulators or the transaction totals. The VPOS terminal creates and maintains the Transaction Log 1580, and the VPOS Configuration Data 1585 contains information which is used to configure the behavior of the VPOS. The entire VPOS functionality is thread-safe and hence using the VPOS in a multi-threaded environment does not require any additional interfacing requirements. FIGS. 36–48 are VPOS screen displays in accordance with a preferred embodiment.

Payment Functionality

As discussed above, the different Payment Functionality provided by the VPOS terminal can be divided into two main categories as "Merchant Initiated" and "Consumer Initiated." Some of these transactions require communication with the Gateway and these transactions are referred to as "Online Transactions." The transactions which can be done locally to the merchant without having to communicate are referred to as "Local Functions/Transactions." In order to provide support for many different types of Payment Instruments, the VPOS Payment Functionality have been categorized.

Host payment functionality and transactions require communication with the host either immediately or at a later stage. Each of the host financial payment transactions come to this category and require a Payment Instrument. These transactions can be initiated with different types of Payment Instruments which the VPOS terminal supports.

An authorization without capture transaction is used to validate the card holder's account number for a sale that needs to be performed at a later stage. The transaction does not confirm a sale's completion to the host, and there is no host data capture in this event. The VPOS captures this transaction record and later forwards it to the host to confirm the sale in a forced post transaction request. An authorization without capture transaction can be initiated both by the consumer and the merchant.

A forced post transaction confirms to a host computer that a completion of a sale has been accomplished and requests data capture of the transaction. The forced post transaction is used as a follow-up transaction after doing an authorization (Online or Off-line) transaction. The transaction can be initiated only by the merchant.

The authorization with post transaction is a combination of authorization without capture and forced post transactions. This transaction can be initiated both by the consumer and the merchant.

The offline post transaction is identical to the "authorization without capture" transaction, except that the transaction is locally captured by the VPOS without initiating communication with a host. A forced post operation is done as a follow-up operation of this transaction. This transaction can be initiated by both the consumer and the merchant.

The return transaction is used to credit the return amount electronically to the consumer's account when a purchased merchandise is returned. The VPOS captures the return transaction record when the merchandise is returned, and this transaction can be initiated only by the merchant.

The void transaction cancels a previously completed draft capture transaction. The VPOS GUI provides an interface for retrieving a transaction record required to be voided from the batch and passes it to the Authorization/Data-Capture module after confirmation. The batch record is updated to reflect the voided transaction after getting an approval from the gateway. This transaction can be initiated only by the merchant.

The pre-authorization transaction is identical to the authorization without capture transaction, but the consumers' "open-to-buy" amount is reduced by the pre-authorization amount. An example of this type of transaction is the "check-in" transaction in a hotel environment. A check-in transaction sends a pre-authorization request to the host, so that an amount required for the customers' stay in the hotel is reserved. The pre-authorization transaction is followed by a pre-authorization complete transaction. This transaction can be initiated both by the consumer and the merchant.

The pre-authorization complete transaction is done as a follow-up to the pre-authorization transaction. This transaction informs the host of the actual transaction amount. The pre-authorization complete transaction amount could be more or less than the pre-authorization amount. An example is the "check-out" transaction in a hotel environment. The check-out amount can be less than or more than the check-in amount. This transaction can only be initiated by a merchant.

The adjust transaction is initiated to make a correction to the amount of a previously completed transaction. The adjust transaction can be initiated only by the merchant. The host administrative transactions do not require any payment instrument. The balance inquiry transaction is used for on-line inquiry into the balance of the merchant's account. The batch data or the configuration data is not affected by this transaction.

The reconciliation or close transaction is processed at the end of the day to start the settlement process for the transactions captured by the host for that particular VPOS.

The host log-on transaction is an administrative transaction which is used to synchronize the VPOS with the host at the start of the day and also initiate a fresh batch at the VPOS terminal.

The parameters download transaction is used to download the VPOS configuration information from the host and set-up the VPOS in the event of any change in the configuration data. A test transaction is used to detect the presence of a host and the status of a link from the VPOS to the host.

Local transactions or functions are initiated by a merchant and do not require communication with the gateway. These transactions can only be initiated by a merchant. The totals or accumulators review is a local information inquiry function and is used to retrieve the local (merchant's) totals. The detail transaction or the batch review function is used to retrieve all the records from the transaction log or the batch. The clear batch function is used to start a fresh batch. This transaction is utilized to electronically reconcile the VPOS with the host and to manually reconcile the VPOS with the host. After completing the manual reconciliation processing, the merchant can initiate this transaction to start a fresh batch.

The clear accumulator function is similar to the clear batch functionality and resets all VPOS terminal accumulators to zero. This function is required when the merchant is not able to reconcile the VPOS with the host electronically.

The VPOS unlock or start transaction is a local function used to start the VPOS at the start of the day. The VPOS lock or stop function is used to Lock or stop the VPOS from accepting any transactions. The VPOS configuration setup function is used to setup the VPOS configuration data. The VPOS configuration data is divided into different tables, for example, the Card/Issuer Definition Table (CDT), the Host/acquirer Definition Table (HDT), the Communications Parameters Table (CPT) and the Terminal Configuration Table (TCT). The following sections explain each of these configuration tables in detail.

Payment Instruments

As discussed above, the VPOS terminal supports different Payment Instruments and each of the Payment Functions described above can be initiated by these different Payment Instruments. The consumer making a purchase from a merchant provides a choice of payment methods depending upon their personal preference. The Payment Instrument Class Hierarchy which is used by the different VPOS terminal Payment Functions is described below.

Message Sequence Diagram

Figure 17:
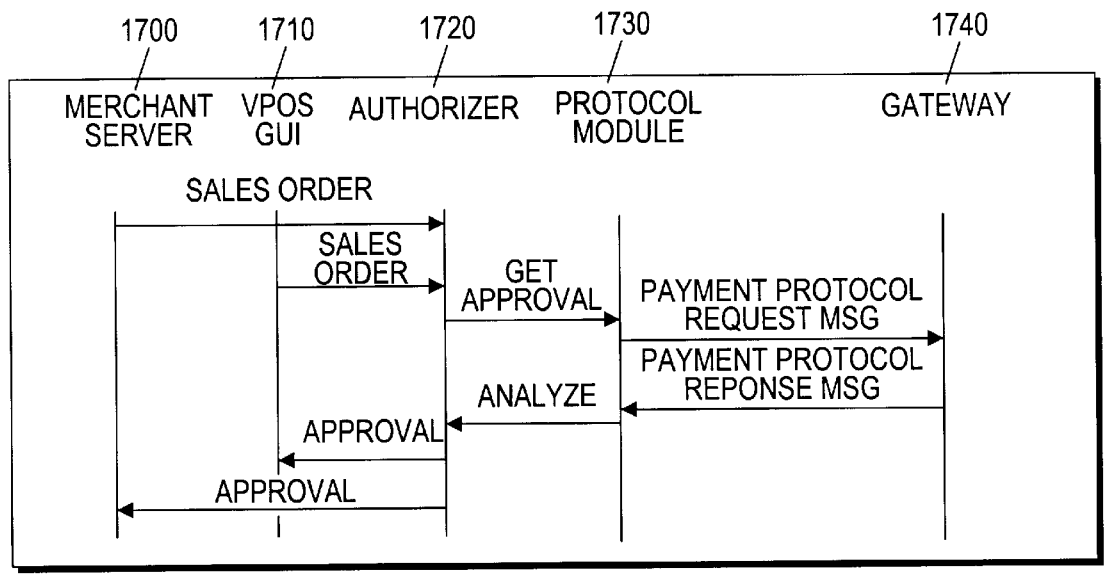
FIG. 17 shows a typical message flow between the merchant, VPOS terminal and the Gateway in accordance with a preferred embodiment.

FIG. 17 shows a typical message flow between the consumer, merchant, VPOS terminal and the Gateway. This section describes the different classes listed in the previous section, their data and members, and defines the type of the transaction that is to be performed. Processing commences at 1700 when a merchant server receives a sales order and passes it via the VPOS Graphical User Interfece (GUI) 1710 to an authorizer 1720 for approval and subsequent protocol processing 1730 and ultimately transmission via the gateway 1740 to the network.

Class Name:
  CVPCLTransaction
Data:
  Transaction Type (int)
  Transaction Date and Time (CPCLDateTime)
  Card Definition Table (CVPCL_CDT)
  Host Definition Table (CVPCL_HDT)
  Communications Parameters Table (CVPCL_CPT)
  Terminal Configuration Parameters (CVPCL_TCT)
  Batch Record (CVPCLBatch)
  Accumulator Record (CVPCLAccum)
Member Functions:
  CVPCLTransaction( );
  EStatus GetTransType( );
  EStatus GetTransDateTime(CPCLDateTime&);
  EStatus SetTransType(const int);
  virtual EStatus InitializeTrans(TVPOSParamsBlk *)=0;
  virtual EStatus ExecuteTrans(TVPOSResultsBlk *)=0;
  virtual EStatus ShutDown( )=0;

Host Transaction Class Definitions

This section contains all the host transaction class definitions.

Host Transaction Class (CVPCLHostTrans)

This is an abstract base class derived from the CVPCLTransaction class and is used for deriving transaction classes which need to communicate with the host either immediately or at a later stage.

Class Name:
  CVPCLHostTrans
Data:
Member Functions:
  CVPCLHostTrans( );

Financial Transaction Class (CVPCLFinancialTrans)

This is an abstract base class derived from the CVPCLHostTrans. This class is used to derive transaction classes which require a payment instrument (e.g., a Credit Card) associated with them to perform the transaction.

Class Name:
  CVPCLFinancialTrans
Data:
  Transaction Amount (CVPCLAmt)

Purchase Order Number (char[ ])
Transaction Number (char[ ])
Authorization Identification Number (char[ ])
Retrieval Reference Number (char[ ])
Batch (CVPCLBatch)
Accumulators (CVPCLAccumulators)
Member Functions:
 CVPCLFinancialTrans( );
 EStatus GetTransAmt(CVPCLAmt&);
 EStatus GetPurchOrderNum(char *);
 EStatus GetTransRefNum(char *);
 EStatus GetRetReiNum(char *);
 EStatus GetAuthld(char *);
 EStatus GetCurrencyType(EPCLCurrency *);
 EStatus SetPurchOrderNum(const char *);
 EStatus SetTransRefNum(const char *)
 EStatus SetRetRefNum(const char *);
 EStatus SetAuthld(const char *);
 EStatus SetCurrencyType (const char *)

Financial Credit Card Transaction Class (CVPCLFinCCTrans)

This is the base abstract class for the financial host transaction which require a Credit Card payment instrument. This class is derived from the CVPCLFinancialTrans.
Class Name:
 CVPCLFinCCTrans
Data:
 Credit Card Payment Instrument (CPCLCreditCard)
Member Functions:
 CVPCLFinCCTrans( );

Credit Card Authorization Only Transaction Class (CVPCL_CCAuthOnly)

This is the class derived from the CVPCLFinCCTrans class and implements the Authorization Only Transaction.
Class Name:
 CVPCL_CCAuthOnly
Data:
Member Functions:
 CVPCL_CCAuthOnlyo;
 EStatus InitializeTrans(TVPOSParamsBlk *);
 EStatus ExecuteTrans(TVPOSResultsBlk *);
 EStatus ShutDownTrans( );
 EStatus FormBatchRec( );

Credit Card Authorization with Capture Transaction Class (CVPCL_CCAuthCapt)

This is the class derived from the CVPCLFinCCTrans class and implements the Authorization with Data Capture Transaction.
Class Name:
 CVPCL_CCAuthCapt
Data:
Member Functions:
 CVPCL_CCAuthCapt( );
 EStatus InitializeTrans(TVPOSParamsBlk *);
 EStatus ExecuteTrans(TVPOSResultsBlk *);
 EStatus ShutDownTrans( );
 EStatus FormBatchRec( );

Credit Card Return Transaction Class (CVPCL_CCReturn)

This is the class derived from the CVPCLFinCCTrans class and implements the Return Transaction.
Class Name:
 CVPCL_CCReturn
Data:
Member Functions:
 CVPCL_CCReturn( );
 EStatus InitializeTrans(TVPOSParamsBlk *);
 EStatus ExecuteTrans(TVPOSResultsBlk *);
 EStatus ShutDownTrans( );
 EStatus FormBatchRec( );

Credit Card Pre-Authorization Transaction Class (CVPCL_CCPreAuth)

This is the class derived from the CVPCLFinCCTrans class and implements the Pre-Authorization Transaction.
Class Name:
 CVPCL_CCPreAuth
Data:
Member Functions:
 CVPCL_CCPreAuth( );
 EStatus InitializeTrans(TVPOSParamsBlk *);
 EStatus ExecuteTrans(TVPOSResultsBlk *);
 EStatus ShutDownTrans( );
 EStatus FormBatchRec( );

Credit Card Off-line Authorization Only Transaction Class (CVPCL_CCOfflineAuth)

This is the class derived from the CVPCLFinCCTrans class and implements the Offline Authorization Class Transaction.
Class Name:
 CVPCL_CCOfflineAuth
Data:
Member Functions:
 CVPCL_CCOfflineAuth( );
 EStatus InitializeTrans(TVPOSParamsBlk *);
 EStatus ExecuteTrans(TVPOSResultsBlk *);
 EStatus ShutDownTrans( );
 EStatus FormBatchRec( );

Credit Card Adjust Transaction Class (CVPCL_CCAdjust)

This is the class derived from the CVPCLFinCCTrans class and implements the Adjust Transaction.
Class Name:
 CVPCL_CCAdjust
Data:
Member Functions:
 CVPCL_CCAdjust( );
 EStatus InitializeTrans(TVPOSParamsBlk *);
 EStatus ExecuteTrans(TVPOSResultsBlk *);
 EStatus ShutDownTrans( );
 EStatus FormBatchRec( );

Credit Card Void Transaction Class (CVPCL_CCVoid)

This is the class derived from the CVPCLFinCCTrans class and implements the Void Transaction.

Class Name:
  CVPCL_CCVoid
Data:
Member Functions:
  CVPCL_CCVoid( );
  EStatus InitializeTrans(TVPOSParamsBlk *);
  EStatus ExecuteTrans(TVPOSResultsBlk *);
  EStatus ShutDownTrans( );
  EStatus FormBatchRec( );

Credit Card Forced Post Transaction Class (CVPCL_CCForcedPost)

This is the class derived from the CVPCLFinCCTrans class and implements the Forced Post Transaction.
Class Name:
  CVPCL_CCForcedPost
Data:
Member Functions:
  CVPCL_CCForcedPost( );
  EStatus InitializeTrans(TVPOSParamsBlk *);
  EStatus ExecuteTrans(TVPOSResultsBlk *);
  EStatus ShutDownTrans( );
  EStatus FormBatchRec( );

Pre-Authorization Complete Transaction Class (CVPCL_CCPreAuthComp)

This is the class derived from the CVPCLFinCCTrans class and implements the Pre-Authorization Completion Transaction.
Class Name:
  CVPCL_CCPreAuthComp
Data:
Member Functions:
  CVPCL_CCPreAuthComp( );
  EStatus InitializeTrans(TVPOSParamsBlk *);
  EStatus ExecuteTrans(TVPOSResultsBlk *);
  EStatus ShutDownTrans( );
  EStatus FormBatchRec( );

Credit Card Balance Inquiry Class (CVPCL_CCBalanceInq)

This class is derived from the CVPCLFinCCTrans class and is used to perform the Merchant Balance Inquiry function.
Class Name:
  CVPCL_CCBalanceInq
Data:
Member Functions
  CVPCL_CCBalanceInq( );
  EStatus InitializeTrans(TVPOSParamsBlk *);
  EStatus ExecuteTrans(TVPOSResultsBlk *);
  EStatus ShutDownTrans( );

Administrative Host Transaction Class (CVPCLAdminHostTrans)

This is an abstract base class derived from the CVPCLHostTrans class and is used to derive the administrative host transaction classes.
Class Name:
  CVPCLAdminHostTrans
Data:
Member Functions:
  CVPCLAdminHostTrans( );
  int GetHostIndex( );
  EStatus SetHostIndex (const int);

Reconcile Transaction Class (CVPCLReconcile)

This is the class derived from the CVPCLAdminHostTrans class and implements the Reconcile or Close functionality.
Class Name:
  CVPCLReconcile
Data:
Member Functions:
  CVPCLReconcile( );
  EStatus InitializeTrans(TVPOSParam sBlk *);
  EStatus ExecuteTrans(TVPOSResultsBlk *);
  EStatus ShutDownTrans( );

Host Log-on Transaction Class (CVPCLHostLogon)

This is the class derived from the CVPCLAdminHostTrans class and implements the Host Log-on Transaction.
Class Name:
  CVPCLHostLogon
Data:
Member Functions:
  CVPCLHostLogon( );
  EStatus InitializeTrans(TVPOSParamsBlk *);
  EStatus ExecuteTrans(TVPOSResultsBlk *);
  EStatus ShutDownTrans( );

Parameters Download Transaction Class (CVPCLParamsDwnld)

This is the class derived from the CVPCLAdminHostTrans class and implements the Parameters Download (VPOS configuration information from the host) functionality.
Class Name:
  CVPCLParamsDwnld
Data;
Member Functions:
  CVPCLParamsDwnld( );
  EStatus InitializeTrans(TVPOSParamsBlk *);
  EStatus ExecuteTrans(TVPOSResultsBlk *);
  EStatus ShutDownTrans( );

Test Transaction Class (CVPCLTestHost)

This is the class derived from the CVPCLAdminHostTrans class and implements the Test functionality which is used to test the host and the link.
Class Name:
  CVPCLTestHost
Data:
Member Functions:
  CVPCLTestHost( );
  EStatus InitializeTrans(TVPOSParamsBlk *);
  EStatus ExecuteTrans(TVPOSResultsBlk *);
  EStatus ShutDownTrans( );

Local Transaction Class Definitions (CVPCLLocalTrans)

This is the abstract base class for all the transactions that are performed locally to the VPOS.

Class Name:
   CVPCLLocalTrans
Data:
   Record Number (int)
   Host Index (int)
Member Functions:
   CVPCLocalTrans( );
   int GetRecNum( );
   int GetHostIndex( )
   EStatus SetRecNum(const int);
   EStatus SetHostIndex(const int);

Virtual POS Lock/Stop Class (CVPCLVPOSLock)

This class implements the VPOS Lock or the Stop Local functionality. Under the locked state the VPOS does not accept any transaction requests. The class is derived from the CVPCLLocalTrans base class.
Class Name:
   CVPCLVPOSLock
Data:
Member Functions:
   CVPCLVPOSLock( );
   EStatus InitializeTrans(TVPOSParamsBlk *);
   EStatus ExecuteTrans(TVPOSResultsBlk *);
   EStatus ShutDownTrans( );

Virtual POS UnLock/Start Class (CVPCLVPOSUnlock)

This class implements the VPOS UnLock or the Start Local functionality. The class is derived from the CVPCLLocalTrans base class.
Class Name:
   CVPCLVPOSUnLock
Data:
Member Functions:
   CVPCLVPOSUnlock( );
   EStatus InitializeTrans(TVPOSParamsBlk *);
   EStatus ExecuteTrans(TVPOSResultsBlk *);
   EStatus ShutDownTrans( );

Transaction Data Administration Class (CVPCLTransDataAdmin)

This is an abstract base class used to derive the classes which are required to review/manage the transaction data which includes the batch data and the accumulator data. The class is derived from the CVPCLLocalTrans base class.
Class Name:
   CVPCLTransDataAdmin
Data:
Member Functions:
   CVPCLTransDataAdmin( );

Batch Review Class (CVPCLBatchReview)

This class is derived from the CVPCLTransDataAdmin base class and implements the batch review functionality.
Class Name:
   CVPCLBatchReview
Data:
Member Functions:
   CVPCLBatchReview( );
   EStatus InitializeTrans(TVPOSParamsBlk *);
   EStatus ExecuteTrans(TVPOSResultsBlk *);
   EStatus ShutDownTrans( );

Clear Batch Class (CVPCLClearBatch)

This class is derived from the CVPCLTransDataAdmin base class and implements the clear batch functionality, which is used to clear the batch in the event of doing a manual reconciliation between the VPOS and the acquirer.
Class Name:
   CVPCLClearBatch
Data:
Member Functions:
   CVPCLClearBatch( );
   EStatus InitializeTrans(TVPOSParamsBlk *);
   EStatus ExecuteTrans(TVPOSResultsBlk *);
   EStatus ShutDownTrans( );

Accumulators Review Class (CVPCLAccumReview)

This class is derived from the CVPCLTransDataAdmin base class and implements the Accumulators Review functionality.
Class Name:
   CVPCLAccumReview
Data:
Member Functions:
   CVPCLAccumReview( );
   EStatus InitializeTrans(TVPOSParamsBlk *);
   EStatus ExecuteTrans(TVPOSResultsBlk *);
   EStatus ShutDownTrans( );

Clear Accumulators Class (CVPCLClearAccum)

This class is derived from the CVPCLTransDataAdmin base class and implements the Accumulators Clear functionality.
Class Name:
   CVPCLClearAccum
Data:
Member Functions:
   CVPCLClearAccum( );
   EStatus InitializeTrans(TVPOSParamsBlk *);
   EStatus ExecuteTrans(TVPOSResultsBlk *);
   EStatus ShutDownTrans( );

VPOS Configuration Data Administration Class (CVPCLConfigDataAdmin)

This is an abstract base class and is used to derive classes which implement the functionality for managing the VPOS configuration data. The class is derived from the CVPCLLocalTrans base class.
Class Name:
   CVPCLConfigDataAdmin
Data:
Member Functions:
   acquirer Data or the Host Definition Table Review Class (CVPCL_HDTReview)
   This class is derived from the CVPCLConfigDataAdmin class and implements the Host Definition Table Review functionality Class Name:
 CVPCL_HDTReview
Data:
Member Functions:
 CVPCL_HDTReview( );
 EStatus InitializeTrans(TVPOSParamsBlk *);
 EStatu s ExecuteTrans(TVPOSResultsBlk *);
 EStatus ShutDownTrans( );

Issuer Data or the Card Definition Table Review Class (CVPCL_CDTReview)

This class is derived from the CVPCLConfigDataAdmin class and implements the Card Definition Table Review functionality.
Class Name:
 CVPCL_CDTReview
Data:
Member Functions:
 CVPCL_CDTReview( );
 EStatus InitializeTrans(TVPOSParamsBlk *);
 EStatus ExecuteTrans(TVPOSResultsBlk *);
 EStatus ShutDownTrans( );

Communication Parameters Table Review Class (CVPCL_CPTReview)

This class is derived from the CVPCLConfigDataAdmin class and implements the Communications Parameters Table Review functionality.
Class Name:
 CVPCL_CPTReview
Data:
Member Functions:
 CVPCL_CPTReview( );
 EStatus InitializeTrans(TVPOSParamsBlk *);
 EStatus ExecuteTrans(TVPOSResultsBlk *);
 EStatus ShutDownTrans( );

Terminal Configuration Table Review Class (CVPCL_TCTReview)

This class is derived from the CVPCLConfigDataAdmin class and implements the Terminal Configuration Table Review functionality.
Class Name:
 CVPCL_TCTReview
Data:
Member Functions:
 CVPCL_TCTReview( );
 EStatus InitializeTrans(TVPOSParamsBlk *);
 EStatus ExecuteTrans(TVPOSResultsBlk *);
 EStatus ShutDownTrans( );
acquirer Data or the Host Definition Table Update Class (CVPCL_HDTUpdate)

This class is derived from the CVPCLConfigDataAdmin class and implements the Host Definition Table Update functionality.

Class Name:
 CVPCL_HDTUpdate
Data:
Member Functions:
 CVPCL_HDTUpdate( );
 EStatus InitializeTrans(TVPOSParamsBlk *);
 EStatus ExecuteTrans(TVPOSResultsBlk *);
 EStatus ShutDownTrans( );

Issuer Data or the Card Definition Table Update Class (CVPCL_CDTUpdate)

This class is derived from the CVPCLConfigDataAdmin class and implements the Card Definition Table Update functionality.
Class Name:
 CVPCL_CDTUpdate
Data:
Member Functions:
 CVPCL_CDTUpdate( );
 EStatus InitializeTrans(TVPOSParamsBlk *);
 EStatus ExecuteTrans(TVPOSResultsBlk *);
 EStatus ShutDownTrans( );

Communications Parameters Table Update Class (CVPCL_CPTUpdate)

This class is derived from the CVPCLConfigDataAdmin class and implements the Communications Parameters Table Update functionality.
Class Name:
 CVPCL_CPTUpdate
Data:
Member Functions:
 CVPCL_CPTUpdate( );
 EStatus InitializeTrans(TVPOSParamsBk *);
 EStatus ExecuteTrans(TVPOSResultsBlk *);
 EStatus ShutDownTrans( );

Terminal Configuration Table Update Class (CVPCL_TCTUpdate)

This class is derived from the CVPCLConfigDataAdmin class and implements the Terminal Configuration Table Update functionality.
Class Name:
 CVPCL_TCTUpdate
Data:
Member Functions:
 CVPCL_TCTUpdate( );
 EStatus InitializeTrans(TVPOSParamsBlk *);
 EStatus ExecuteTrans(TVPOSResultsBlk *);
 EStatus ShutDownTrans( );

Batch Class (CVPCLBatch)

This class defines the batch record and the operations which are performed on the batch.
Class Name:
 CVPCLBatch
Data:
 Batch Record Structure (TVPOSBatchRec) // Definition of the TVPOSBatchRec is as below,

```
typedef struct_VPOSBatchRec
{
        char      szTransAmt[];
        char      szTransDate[];
        char      szTransTime[];
        char      szRetrievalRefNum[];     // Trans. Ref. No. sent by the host
        char      szAuthId[];              // Approval Code sent by the host
        char      szOrigAmt[];             // Original amount for - Adjust
        char      szPurchOrderNum[];
        char      szBatchNum[];
        EPCLTransType    TransType;
        EPCLPmtInst      PmtInst;
        EPCLCurrency     CurrencyType;
        EPCLDecimals     NumDecDigits;
        unsigned int nTransRefNum;         // Running Ref. Number gen. by the
                                           // /VPOS for every approved txn.
        unsigned long lnSTAN;              // Sys. Trace Number incr. by VPOS
                                           // for every trans. that is trans. to host
        TPmtInstData     PayInstData;
}TVPOSBatchRec;
```

Member Functions:

```
CVPCLBatch();
EStatus SetTransType(const EPCLTransType);
EStatus SetRetRefNum(const char *);
EStatus SetAuthId(const char *);
EStatus SetPurchOrderNum(const char *);
EStatus SetTransRefNum(const long);
EStatus SetTransAmt(const char *);
EStatus SetBatchNum(const char *);
EStatus SetSTAN(const long);
EStatus SetDateMMDDYYYY(const char *);
EStatus SetTimeHHMMSS(const char *);
EStatus SetPmtInst(const EPCLPmtInst);
EStatus SetCCAcctNum(const char *);
EStatus SetCCExpDate(const char *);
EStatus SetOrigAmt(const char *);
EStatus GetBatchRec(TVPOSBatchRec *);
EStatus InitBatch();
EStatus OpenBatch(const char *, FILE **, const char *);
EStatus CloseBatch(FILE *);
EStatus AddBatchRec ();           // Adds a record to the batch
EStatus GetBatchRec (const long); // Gets a record from the batch
EStatus UpdateBatchRec (const long);  // Update batch record with NR
EStatus DeleteBatchRec (const long);  // Deletes the batch record
```

Accumulator Class (CVPCLAccum)

This class defines the Accumulator record and the operations on the accumulators.

Class Name:
  CVPCLAccum
Data:
  Credit Amount (char szCreditAmt[AMT_SZ+1])
  Credit Count (int nCreditCnt)
  Debit Amount (char szDebitAmt[AMT_SZ+1])
  Debit Count (int nDebitCnt)
Member Functions:
  int OpenAccum(int fhandle);
  int GetAccum (int nAccumType, int *pnAccumCnt, char *pszAccumAmt);
  int CloseAccum(int fHandle);
  int CleanAccum( );

Host Definition Table Class (CVPCL_HDT)

This class defines the Host Definition Table record and the operations on the table.

Class Name:
  CVPCL_HDT
Data:
  Host Definition Table Record Structure (TVPOSHDTRec)
  The TVPOSHDTRec structure contains the following fields,

```
typedef struct_VPOSHDTRec
{
    char      szTermId[];
    char      szMerchId[];
    char      szBatchNum[];
    char      szTPDU[];
    char      szNII[];
    char      szHostName[];
    EPCLHostProtType    HostProtType;
    EPCLHostProtSubType HostProtSubType;
    // Data Capture Required Flags
    VPOSBool  fAuthOnlyDC;
    VPOSBool  fAuthCaptDC;
    VPOSBool  fForcedPostDC;
    VPOSBool  fAdjustDC;
    VPOSBool  fReturnDC;
    VPOSBool  fOfflineAuthDC;
    VPOSBool  fVoidDC;
    VPOSBool  fPreAuthDC;
    VPOSBool  fPreAuthCompDC;
    unsigned int nNumAdv;       // Max. No. of piggy-back trans. allowed
    unsigned int nTransRefNum;
    unsigned long lnSTAN;       // Systems Trace Number
}TVPOSHDTRec;
```

Member Functions:
```
CVPCL_HDT( );
EStatus CleanHDT( );
EStatus LoadHDTRec(const int);
EStatus SaveHDTRec(const int);
EStatus GetNumRecs(int *);
EStatus GetHDTRec(TVPOSHDTRec *);
EStatus GetTermId(char *);
EStatus GetMerchId(char *);
EStatus GetBatchNum(char *);
EStatus GetTransRefNum(unsigned int *);
EStatus GetTPDU(char *);
EStatus GetNII(char *);
EStatus GetHostName(char *);
EStatus GetHostProtType(EPCLHostProtType *);
EStatus GetHostProtSubType(EPCLHostProtSubType *);
```

```
EStatus GetNumAdv(unsigned int *);
EStatus GetSTAN(unsigned long *);
EStatus GetAuthOnlyDC(VPOSBool *);
EStatus GetAuthCaptDC(VPOSBool *);
EStatus GetAdjustDC(VPOSBool *);
EStatus GetReturnDC(VPOSBool *);
EStatus GetForcedPostDC(VPOSBool *);
EStatus GetOfflineAuthDC(VPOSBool *);
EStatus GetVoidDC(VPOSBool *);
EStatus GetPreAuthDC(VPOSBool *);
EStatus GetPreAuthCompDC(VPOSBool *);
EStatus SetHDTRec(TVPOSHDTRec *);
EStatus SetTermId(const char *);
EStatus SetMerchId(const char *);
EStatus SetBatchNum(const char *);
EStatus SetTransRefNum(const unsigned int);
EStatus SetTPDU(const char *);
EStatus SetSTAN(const unsigned long);
EStatus SetNII(const char *);
EStatus SetHostName(const char *);
EStatus SetHostProtType(const EPCLHostProtType);
EStatus     SetHostProtSubType(const EPCLHostProtSubType);
EStatus SetNumAdv(const int);
EStatus SetAuthOnlyDC(const VPOSBool);
EStatus SetAuthCaptDC(const VPOSBool);
EStatus SetAdjustDC(const VPOSBool);
EStatus SetReturnDC(const VPOSBool);
EStatus SetForcedPostDC(const VPOSBool);
EStatus SetOfflineAuthDC(const VPOSBool);
EStatus SetVoidDC(const VPOSBool);
EStatus SetPreAuthDC(const VPOSBool);
Statu s SetPreAuthCompDC(const VPOSBool);
```

Card Definition Table Class (CVPCL_CDT)

This class defines the Card Definition Table record and the operations on the table.
Class Name:
  CVPCL_CDT
Data:
  Card Definition Table Record Structure (TVPOSCDTRec)
  The TVPOSCDTRec structure contains the following fields,

```
typedef struct_VPOSCDTRec
{
  char    szPANLo[];
  char    szPANHi[];
  char    szCardLabel[];
  int     nHostIndex;
  int     nMinPANDigit;
  int     nMaxPANDigit;
  // Transaction Allowed Flags
  VPOSBool fAuthOnlyAllwd;
  VPOSBool fAuthCaptAllwd;
  VPOSBool fForcedPostAllwd;
  VPOSBool fAdjustAllwd;
  VPOSBool fReturnAllwd;
  VPOSBool fOfflineAuthAllwd;
  VPOSBool fVoidAllwd;
  VPOSBool fPreAuthAllwd;
  VPOSBool fPreAuthCompAllwd;
}TVPOSCDTRec;
```

Member Functions:
```
CVPCL_CDT( );
EStatus CleanCDT( );
EStatus LoadCDTRec(const int);
EStatus SaveCDTRec(const int);
EStatus GetNumRecs(int *);
EStatus GetCDTRec(TVPOSCDTRec *);
EStatus GetPANLo(char *);
EStatus GetPANHi(char *);
EStatus GetCardLabel(char *);
EStatus GetCDTHostIndex(int *);
EStatus GetMinPANDigit(int *);
EStatus GetMaxPANDigit(int *);
EStatus GetAuthOnlyAllwd(VPOSBool *);
EStatus GetAuthCaptAllwd(VPOSBool *);
EStatus GetAdjustAllwd(VPOSBool *);
EStatus GetReturnAllwd(VPOSBool *);
EStatus GetOfflineAuthAllwd(VPOSBool *);
EStatus GetVoidAllwd(VPOSBool *);
EStatus GetPreAuthAllwd(VPOSBool *);
EStatus GetPreAuthCompAllwd(VPOSBool *);
EStatus GetForcedPostAllwd(VPOSBool *);
EStatus SetCDTRec(TVPOSCDTRec *);
EStatus SetHostIndex(const int);
EStatus SetMinPANDigit(const int);
EStatus SetMaxPANDigit(const int);
EStatus SetPANLo(const char *);
EStatus SetPANHi(const char *);
EStatus SetCardLabel(const char *);
EStatus SetAuthOnlyAllwd(const VPOSBool);
EStatus SetAuthCaptAllwd(const VPOSBool);
EStatus SetAdjustAllwd(const VPOSBool);
EStatus SetReturnAllwd(const VPOSBool);
EStatus SetForcedPostAllwd(const VPOSBool);
EStatus SetOfflineAuthAllwd(const VPOSBool);
EStatus SetVoidAllwd(const VPOSBool);
EStatus SetPreAuthAllwd(const VPOSBool);
EStatus SetPreAuthCompAllwd(const VPOSBool);
```

Communications Parameters Table Class (CVPCL_CPT)

This class defines the communications parameters table and the operations on the table.
Class Name:
  CVPCL_CPT
Data:
  Communications Parameters Table Record Structure (TVPOSCPTRec)
  The TVPOSCPTRec structure contains the following fields,

```
typedef struct_VPOSCPTRec
{
    char    szAcqPriAddress[];
    char    szAcqSecAddress[];
    char    szAcqTerAddress[];
    int     nRespTimeOut;
}TVPOSCPTRec;
```

Member Functions:
   CVPCL_CPT( );
   EStatus CleanCPT( );
   EStatus LoadCPTRec(const int);
   EStatus SaveCPTRec(const int);
   EStatus GetNumRecs(int *);
   EStatus GetCPTRec(TVPOSCPTRec *);
   EStatus GetAcqPriAddress(char *);
   EStatus GetAcqSecAddress(char *);
   EStatus GetAcqTerAddress(char *);
   EStatus GetRespTimeOut(int *);
   EStatus SetCPTRec(TVPOSCPTRec *);
   EStatus SetAcqPriAddress(const char *);
   EStatus SetAcqSecAddress(const char *);
   EStatus SetAcqTerAddress(const char *);
   EStatus SetRespTimeOut(const int);

Terminal Configuration Table Class (CVPCL_TCT)

This class defines the VPOS terminal configuration parameters table and the operations on the table.
Class Name:
   CVPCL_TCT
Data:
   Terminal Configuration Table Record Structure (TVPOSTCTRec)
   The TVPOSTCTRec structure contains the following fields,

```
typedef struct_VPOSTCTRec
{
    char      szMerchName[];
    VPOSBool  fVPOSLock;     // VPOS Lock/Unlock Toggle Flag
}TVPOSTCTRec;
```

Member Functions:
   CVPCL_TCT( );
   EStatus LoadTCTRec( );
   EStatus SaveTCTRec( );
   EStatus CleanTCT( );
   EStatus GetTCTRec(TVPOSTCTRec *);
   EStatus GetMerchName(char *);
   EStatus GetVPOSLock(VPOSBool *);
   EStatus SetMerchName(const char *);
   EStatus SetVPOSLock(const VPOSBool);

Amount Class (CVPCLAmount)

This class defines the amount data items and the operations on them.

Class Name:
   CVPCLAmount
Data:
   Amount (char[ ])
   Currency Type (EPCLCurrency)
Member Functions:
   CVPCLAmount( );
   EStatus Initialize(const CPCLAmount&);
   EStatus Initialize(const char *);
   EStatus Initialize(const long);
   void operator=(const char *);
   void operator=(const long);
   EStatus GetAmount(char *);
   operator const char * ( ) const;
   operator const long ( );

Payment Instruments Class (CPCLPmtInst)

Figure 16:
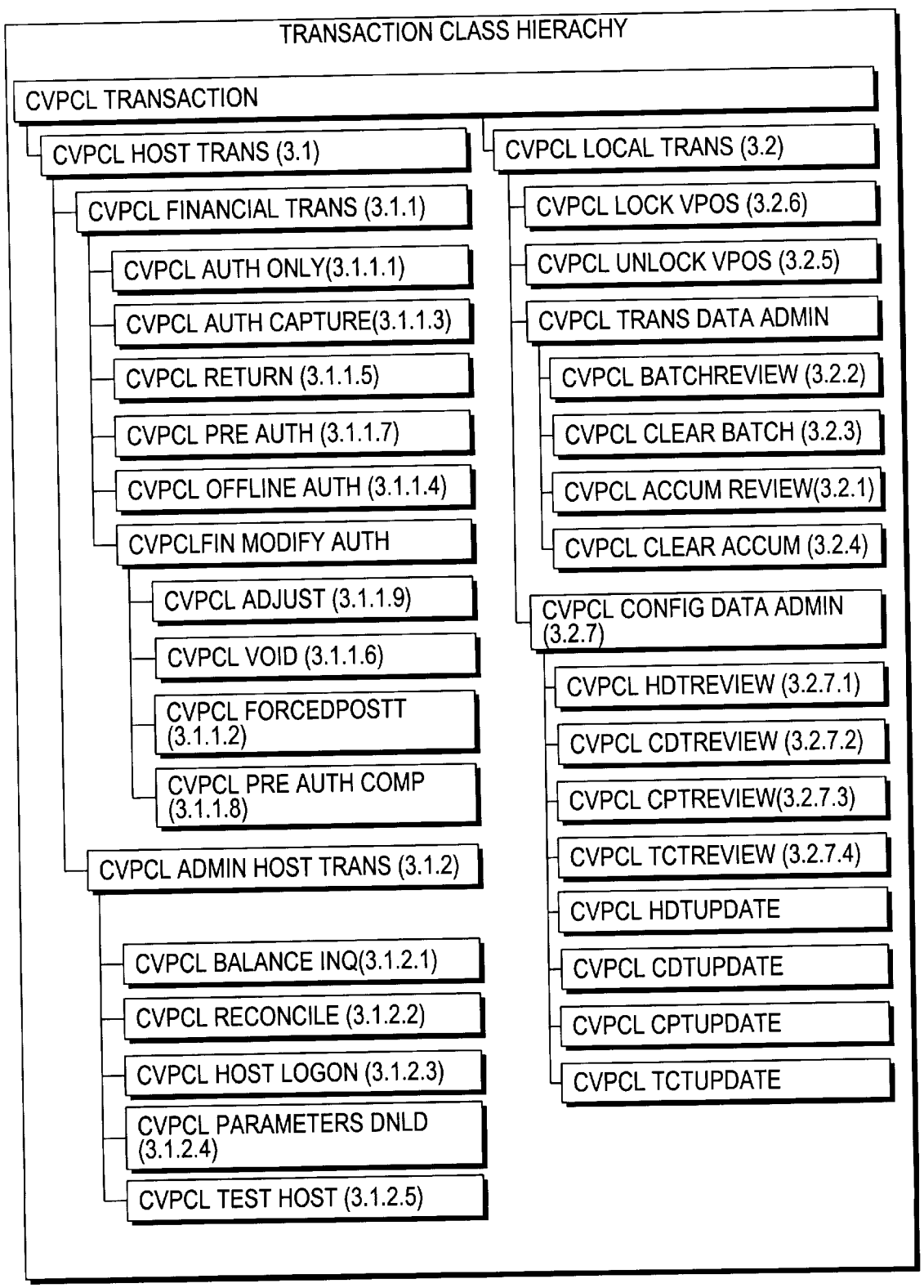
FIG. 16 illustrates a transaction class hierarchy block diagram in accordance with a preferred embodiment.

This section defines the Payment Instrument Class hierarchy. FIG. 16 illustrates a transaction class hierarchy in accordance with a preferred embodiment.
Class Name:
   CPCLPmtInst
Data:
   Payment Instrument Type (EPCLPmtInst)
Member Functions:
   CPCLPmtInst( );
   EStatus GetPmtInstType(EPCLPmtInst *);

Bank Cards Class (CPCLBankCard)

This class is derived from the CPCLPmtInst class and implements the bank cards class.
Class Name:
   CPCLBankCard
Data:
   Account Number (char[ ])
   Expiration Date (CPCLDateTime)
   Index into the CDT table (int)
Member Functions.
   CPCLBankCard( );
   EStatus Initialize( );
   EStatus SetAcctNum(const char *);
   EStatus SetExpDate(const char *);
   EStatus GetAcctNum(char *);
   EStatus GetExpDate(char *);
   EStatus ValidateCard( );
   int GetCDTIndex( );
   VPOSBool DoLuhnCheck( );
   VPOSBool DoCardRanging( );
   EStatus DoValidateExpDate( );

Credit Cards Class (CPCLCreditCard)

This class is derived from the CPCLBankCard class and has the same data and the methods as the CPCLBankCard class.
Class Name:
   CPCLCreditCard
Data:
Member Functions:
   CPCLCreditCard( );

Debit Cards Class (CPCLDebitCard)

This class is derived from the CVPCLBankCard class and implements the debit card class.
Class Name:
   CPCLDebitCard
Data:
   Card Holder Encrypted PIN (char[ ])
Member Functions:
   CPCLDebitCard( );
   EStatus GetEncryptedPIN(char *);
   EStatus SetEncryptedPIN(char *);

VPOS Class Library Interface and API Definition

This section explains the classes which provide the interface to the VPOS class library.

Data Structures required for the VPOS Interface Class

Transaction Parameters Structure (TVPOSParamsBlk)—This structure is a subset of all the transaction parameters required for the different transactions.

```
typedef struct_VPOSParamsBlk
{
        char szTransAmt[];      // Without decimal point.
                                // Left most two digits implied to be decimal digits
    char szPurchOrderNum[];
        char szRetRefNum[];
    char szBatchNum[];
        char szNewBatchNum[];
        char szOrigAmt[];
        char szCPSData[];
        char szAuthId[];        // Auth Id for offline auth-only transaction
        int HostIndex;
        unsigned int nTransRefNum;
        VPOSBool fVPOSLock;
        ECPSDataType eCPSType ;
        EPCLTransType TransType;
        EStatus TransResult;
        EPCLPmtInst PmtInst;
        EPCLCurrency CurrencyType;
        EPCLDecimals NumDecDigits;
        EVPCLAccumType AccumType;
        TPmtInstData PayInstData;
        union_VPOSConfigData
        {
            TVPOSHDTRec srHDTRec;
            TVPOSCDTRec srCDTRec;
            TVPOSCPTRec srCPTRec;
            TVPOSTCTRec srTCTRec;
        } VPOSConfigData;
        void *Context;              // Context from the calling interface
        EStatus (*VPOSCallBack)(TVPOSResultsBlk *, void *);
} TVPOSParamsBlk;
```

Transaction Results Structure (TVPOSResultsBlk)—This structure contains all the fields returned from the host and other fields which are required for doing terminal data capture.

```
typedef struct_VPOSResultsBlk
{
    char szNewBatchNum[];
    int nHostIndex;
    EStatus TransResult;
    TVPOSBatchRec srBatchRec;
    TVPOSAccumRec srAccumRec;
    char szCardLabel[];
    TVPOSHDTRec srHDTRec;
    TVPOSCDTRec srCDTRec;
    TVPOSCPTRec srCPTRec;
    TVPOSTCTRec srTCTRec;
}TVPOSResultsBlk;
```

The various status codes for the enumeration EStatus are detailed below.

VPOS Interface Class (CVPOSInterface)

This class provides the interface to the VPOS Transaction Class Library.
Class Name:
   CVPOSInterface
Data:
Member Functions:
   CVPOSInterface( );
   // Creates the Transaction Object, takes care
   // of other initialization and executes the transaction.
   CVPCLTransaction *pclTransFactory(TVPOSParamsBlk *);

EStatus DestroyTrans(CVPCLTransaction *);

VPOS API Definition

This section explains in the VPOS API which are required for interfacing with the VPOS Class Library. All the different VPOS transactions can be initiated using the API defined in this section.

VPOS Terminal Architecture

Figure 25:
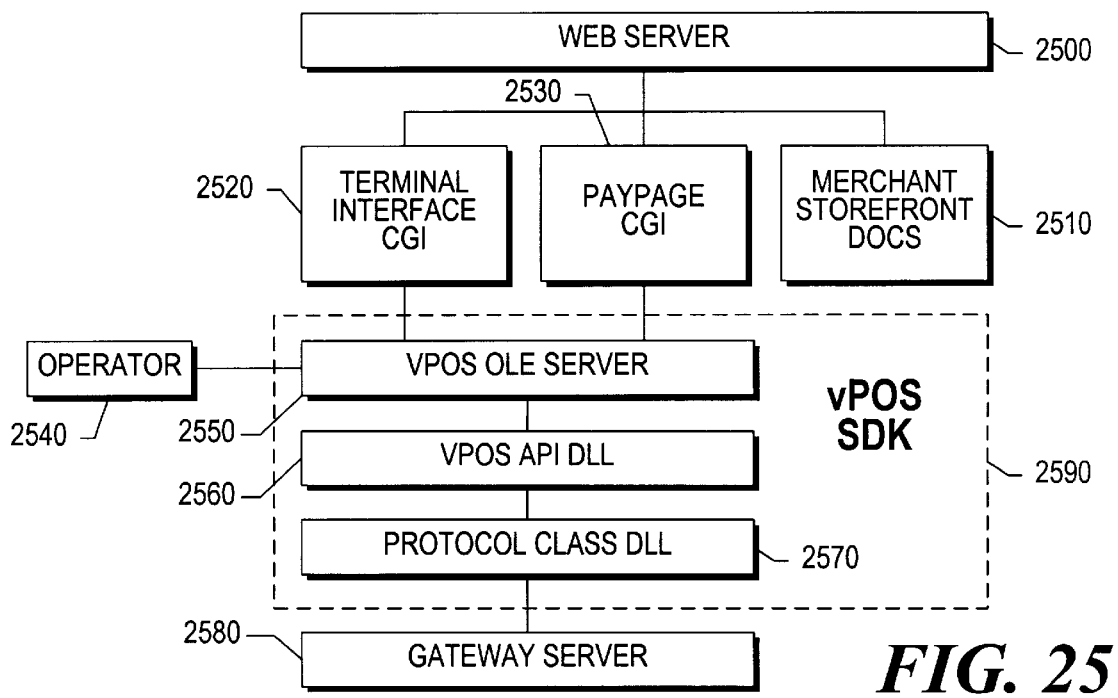
FIG. 25 is a block diagram of the VPOS Terminal Architecture in accordance with a preferred embodiment.

FIG. 25 is a block diagram of the VPOS Terminal Architecture in accordance with a preferred embodiment. The Internet 2500 provides the communication processing necessary to enable the VPOS Terminal architecture. The terminal interface CGI 2520 communicates via the Internet to provide information to the VPOS OLE Server 2550 which formats information in accordance with the VPOS API DLL 2560 which uses the protocol class DLL 2570 to flesh out the message for delivery to the Gateway Server 2580. The collection of the VPOS OLE Server 2550, VPOS API DLL 2560 and the Protocol Class DLL 2570 make up the VPOS Software Development ToolKit (SDK) which are used to enable VPOS applications for interfacing with an Operator 2540.

VPOS/GATEWAY Architecture

The architecture of the Virtual Point of Sale (VPOS) and Virtual Gateway (GATEWAY) architecture maintains SET compliance while providing support for additional message types that are not enabled in SET. The architecture includes isolation of cryptographic details in a single module to facilitate single version government approval while maximizing the flexibility of the system for customization and facilitating transfer of updated versions on an acquirer specific basis. FIG. 18 is a block diagram of the extended SET architecture in accordance with a preferred embodiment. Processing commences at function block 1800 for a consumer-originated transaction via the World Wide Web (WWW) or 1810 for a merchant-originated transaction on the Internet. In either case control passes immediately to the WWW server 1820 for the transaction to be appropriately formatted and the appropriate interface page presented, whether the transaction is a store front 1822, shopping cart 1824, pay page 1826, standard terminal administration 1828-1830 transaction, or an extended terminal transaction 1834. If processing requires authentication of the transaction, then control passes through the Virtual Point of Sale (VPOS) Application Programming Interface (API) library 1840 for SET compliant transactions and through the VPOS API extensions library for extensions to the SET protocol. Then, at function block 1842, if the transaction is SET compliant, and function block 1864 if the transaction is not SET compliant, a library of protocol stack information is used to conform the message before it is transmitted to a Gateway site for ultimate delivery to a bank host 1874 for authorization.

Extended SET messages are processed at the Gateway site on a two track basis with the division criteria being SET compliance (which will change over time as more functionality is put into SET) or SET extensions. Set compliant messages are processed via the protocol stack library 1862, while SET extensions are processed via the protocol stack extension library 1864. Then, at function block 1870 the gateway engine processes SET and Host specific code including gateway administration extensions 1872 that bypass the normal processing and flow directly from the merchant and consumer server 1820 to the gateway administration extensions 1872 to the Gateway Engine 1870.

As described above, there are three channels by which messages are exchanged between VPOS 1846 and GATEWAY 1856.

1. Standard SET messages

The standard SET messages are originated by the merchant software either via a pay page 1826 directly controlled by the consumer, or via an operator interface consisting of a set of HTML pages and associated executables launched by the pages (e.g. pay page 1826 and standard terminal administration 1828–1830.)

Each SET message type (e.g., authorization v. capture) transmits a different set of data and each requires a different Protocol Data Unit (PDU) to describe its encoding. Examples of how Standard SET messages are encoded are given in the SET documentation previously incorporated by reference.

2. Extended SET messages

The Extended SET messages are utilized as an "escape mechanism" to implement acquirer-specific messages such as settlement/reconciliation, employee logon/logoff, and parameter download. The messages are developed as a set of name-value pairs encapsulated in a PKCS-7 wrapper and wrapped in Multipurpose Internet Mail Extensions (MIME), described in a book by N. Borenstein & N. Freed, "RFC 1521: MIME (Multipurpose Internet Mail Extensions) Part One: Mechanisms for Specifying and Describing the Format of Internet Message Bodies" (September 1993). The name-value pairs can have arbitrary (8-bit) data, so arbitrary items can be passed through the extended SET channel, including executable programs and Dynamic Load Libraries (DLL)s.

Figure 18B:
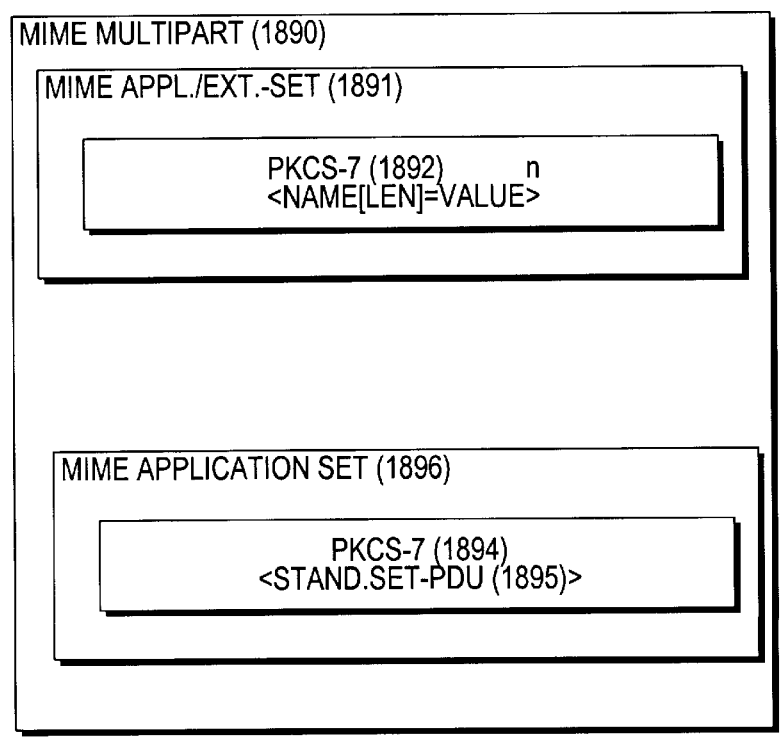
FIGS. 18A–E are block diagrams of the extended SET architecture in accordance with a preferred embodiment.

FIG. 18B illustrates a multipart MIME message with one Extended SET message and one Standard SET authorizing message. MIME is utilized as an outer wrapper 1890 to allow an Extended SET message 1891 to be transmitted as a component of messages embedded in one MIME multipart message. In this manner, a standard SET message can be sent with an Extended SET message in one VPOS/GATEWAY communication transaction.

Embedding the Extended SET messages in a PKCS-7 wrapper enables the same message authentication to occur as in standard SET messages. Thus, for SET-compliant and non-SET-compliant messages, the same mechanism may be used to restrict which entities the VPOS or Gateway will trust in any communications. An important concept in Extended SET is that all messages, of any type, are sent in a uniform name/value pair format, thus allowing a single Protocol Data Unit to suffice for any type of message sent through the Extended SET channel. Since arbitrary data may be sent this way, a mechanism must be provided to preclude the use of the Extended SET channel by parties other than approved financial institutions. If this is not ensured, then the NSA and the US Department of Commerce will not approve the software for export.

SET itself to some degree ensures that this Extended SET channel is used only by financial institutions. The protocol stack extension library only processes messages that have been signed by a financial institution SET certificate that is in turn signed by a payment instrument brand certificate (such as Visa or MasterCard). Stronger control over the Extended SET channel can be achieved by further restricting processing of messages to those signed (either instead of or in addition to the financial institution SET certificate) by a second certificate belonging to a third-party agency, either governmental or private (e.g., VeriFone, as manufacturer of the software).

In this way, a particular set of Extended SET messages can be implemented by Bank X, and a different set of messages by Bank Y. If a VPOS has an extended terminal transaction interface as shown in FIG. 15A at block 1834 for Bank X, and has been configured to only accept messages from a Gateway with Bank X's certificate, then it will be able to communicate those messages to a Gateway that has the certificate for Bank X, and accepts messages of the types in Bank X's message set. The VPOS will not be able to connect to the Bank Y gateway, or to any other system that purports to communicate via Extended SET. This restriction is further secured by utilizing a public key certificate that is "hard wired" into VPOS, and which is distributed only to gateways that use the Extended SET mechanism.

Figure 18A:
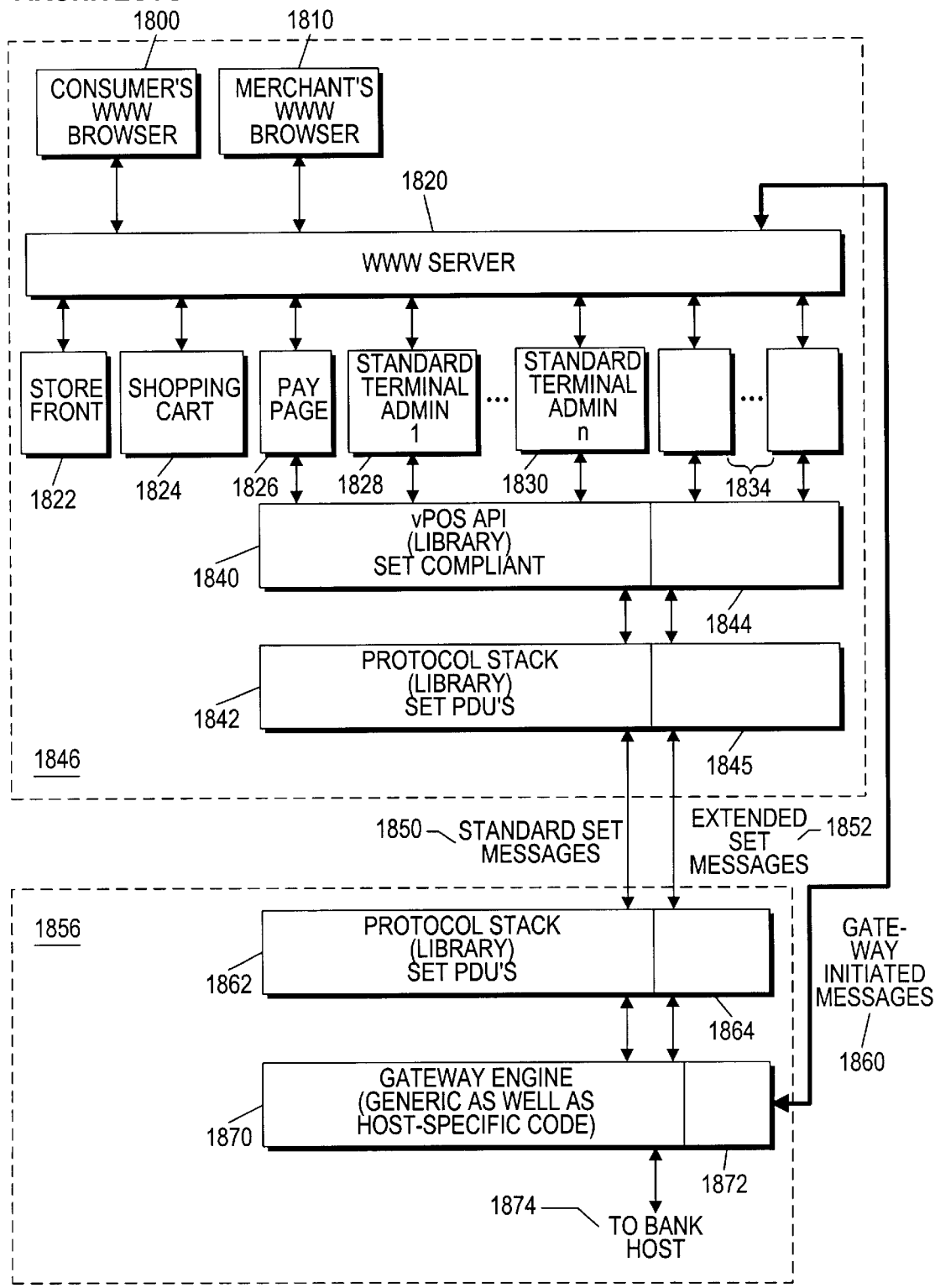
Figure 18C:
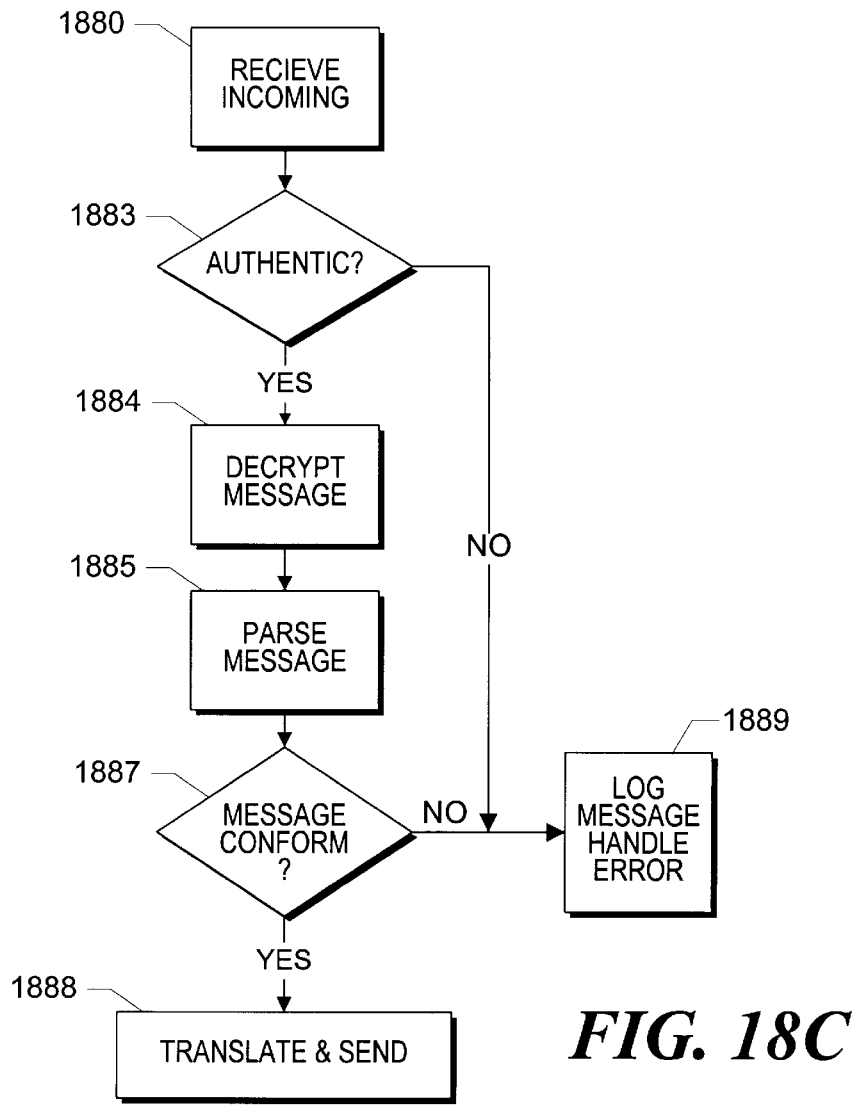

FIG. 18C is an example flowchart of message processing in accordance with a preferred embodiment. Processing commences at function block 1880 when a message is received by an HTTPS server or other listener and passed to decision block 1883 to determine if the sending VPOS has transmitted an authentic message and if the VPOS is authorized to communicate with this gateway. If the message is not authentic, then the message is logged as an error and the error is handled as shown in function block 1889. If the message is authentic, then the message is decrypted at function block 1884 and the PDU parses the message into name/value pairs. Then, based on the message type and the extended SET version information, the remaining message is parsed at function block 1885 and the message is checked for conformance to the appropriate specification as shown at decision block 1887. If the message does not conform, then it is logged and the error handled at function block 1889. If the message conforms to the proper specification in decision block 1887 then the message is translated into the appropriate host format and sent to the host as shown in function block 1888. Thus, when a gateway receives an incoming message from a VPOS and parses the Extended SET portion of the message, a single MIME message can transmit a SET message and/or an Extended Set Message.

An export license for the encryption can be obtained on a case-by-case basis, and since there will be potentially millions of VPOS's, it is desirable to obtain a commodities jurisdiction for the VPOS, to enable a single version of the VPOS (rather than one version for each bank) to be supported by the VPOS architecture. The architecture described here ensures that the single version of VPOS, no matter how it is configured with extended terminal transaction interfaces, cannot be used to communicate any data other than that contained in the extended SET messages that have been approved for export by the US government to be used exclusively for a specific bank.

Figure 18D:
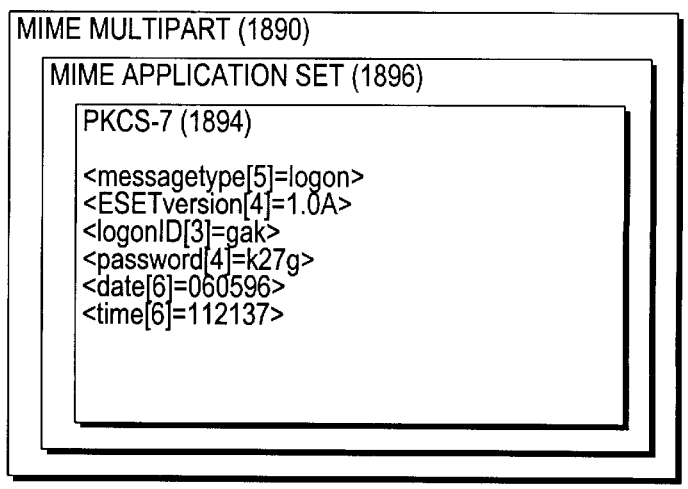

FIG. 18D is an example of a simple message between VPOS and Gateway using the Extended SET channel enabling an employee to sign on, or "logon" to a given terminal in accordance with the subject invention. The message must contain the employee's logon ID, a password to be verified by the bank host computer, and the date and time as shown at 1894.

While the contents of the message are shown without encryption in FIG. 18D, it should be noted that the information (including the logon password) are SET encrypted inside the PKCS-7 wrapper 1894. Certain fields may be designated as mandatory for an Extended SET message, to allow the Gateway or VPOS to decide how to handle the message. For the sake of clarity, in this message 1894, only two fields, "messagetype" and "ESETversion", are mandatory. These fields inform the Gateway that this message is of type "logon," and that the VPOS is using version "1.0A" of the ESET message formats defined for the Gateway. In this embodiment, the length indicator "[5]" is used to distinguish the length (in bytes) of the field of type "messagetype" in the message. In this way, there are no special end-of-data characters, and therefore arbitrary data need not have any "escaped" characters.

It should be noted that using escaped characters will work equally well. Total message integrity is assured by the digital signatures in the PKCS-7 wrapper. This does not, however, preclude the use of other checksumming schemes for additional pinpointing of transmission or encoding errors. The messagetype and ESETversion name/value pairs facilitate Gateway look up of what name/value pairs are expected in the "logon" message. Some name/value pairs may be mandatory, and others may be optional.

Figure 18E:
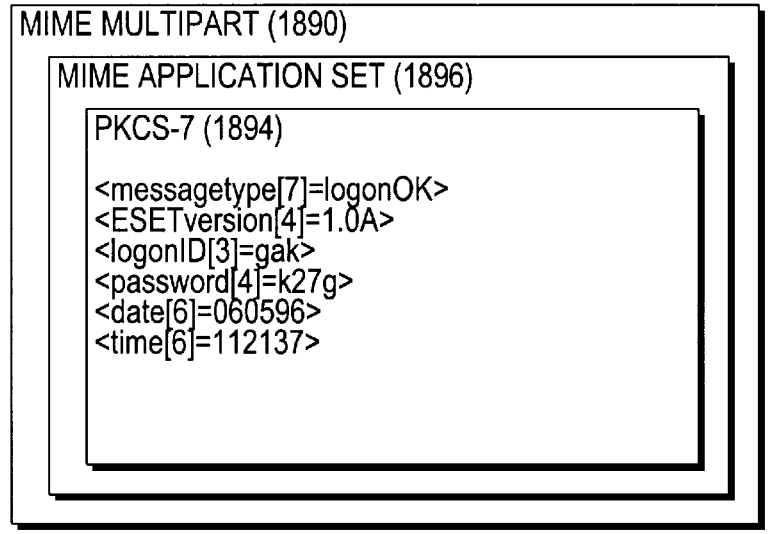

FIG. 18E is an example of a simple message between VPOS and Gateway using the Extended SET channel enabling an employee to sign on, or "logon" to a given terminal in accordance with the subject invention. In response to the logon request message from a VPOS, the Gateway may respond with a "logon accepted" message 1894, as depicted in FIG. 18E, which VPOS, upon receipt and authentication, then uses to unlock the terminal for that user.

Figures 49, 50:
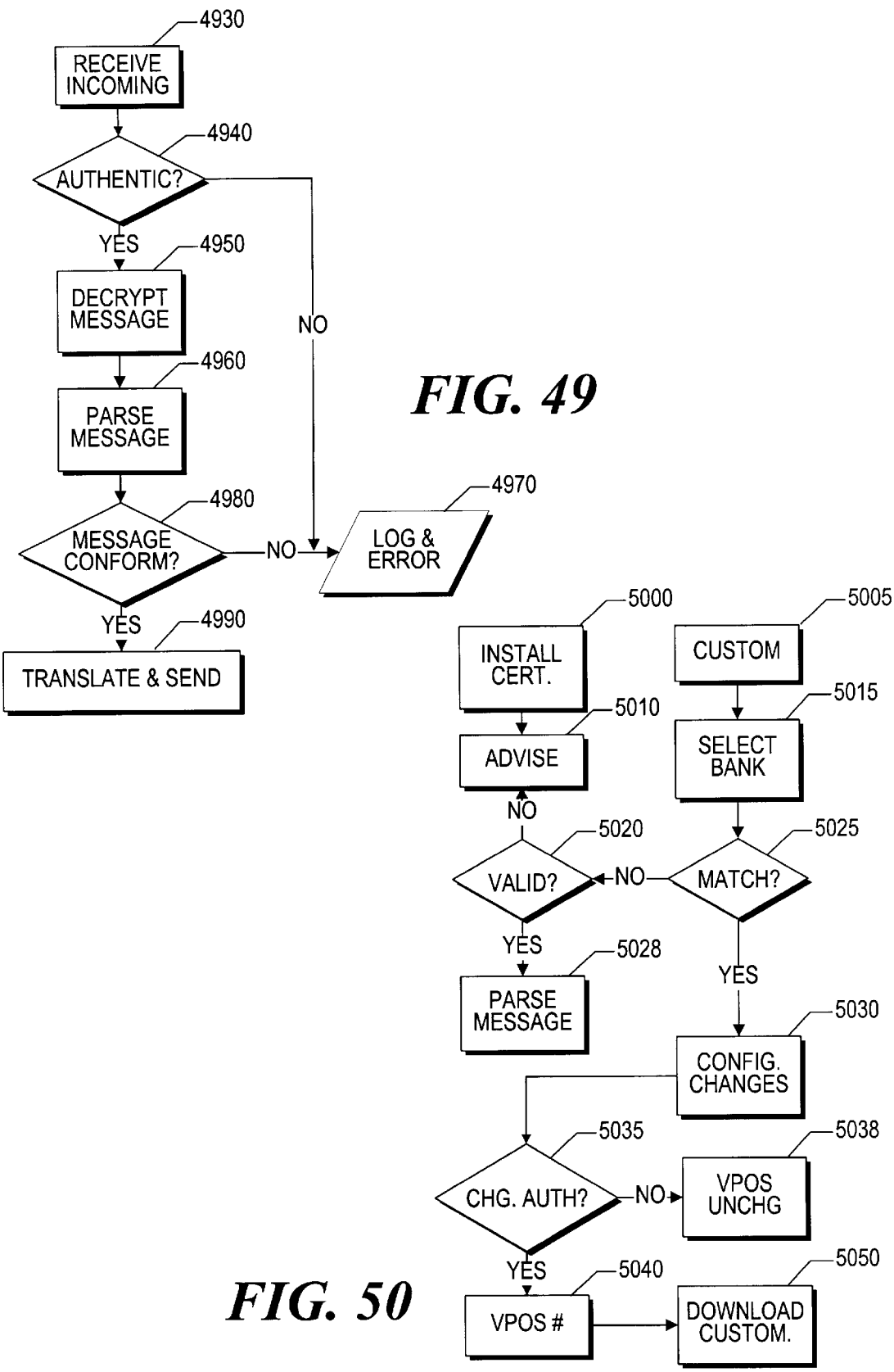
FIG. 49 shows how the VPOS authenticates an incoming response to a request in accordance with a preferred embodiment.
FIG. 50 is a flowchart for the merchant interaction with the Test Gateway in accordance with a preferred embodiment.

FIG. 49 shows how the VPOS authenticates an incoming response to a request in accordance with a preferred embodiment. Processing commences at function block 4930 when a message is received by the HTTPS, SET server, or other listener that originated the request to which this reponse corresponds. The message is passed to decision block 4940 to determine if the sending Gateway has transmitted an authentic message and if the gateway is authorized to communicate with this VPOS. If the message is not authentic, then the message is logged as an error or possible attack and the error is handled as shown in function block 4970. If the message is authentic, then the message is decrypted at function block 4950 and the PDU parses the message into name/value pairs. Then, based on the message type and the extended SET version information, the remaining message is parsed at function block 4960 and the message is checked for conformance to the appropriate specification as shown at decision block 4980. If the message does not conform, then it is logged and the error handled at function block 4970. If the message conforms to the proper specification in decision block 4980 then the message is translated into a standardized argument string to be passed to the appropriate executable or code entry point in the VPOS, as shown in function block 4990. Thus, when a VPOS receives an incoming message from a Gateway and parses the Extended SET portion of the message, the message may cause VPOS to execute a program that takes action or queries the user to take action.

3. Gateway-initiated messages

Since all SET messages between a merchant and an acquirer are currently merchant-initiated (as specified in the SET documentation), there must be a separate mechanism for initiating a message from a gateway, for example to request the upload of management information base (MIB) data, or to download new parameters. This is accomplished by requiring the gateway to send a message to the merchant via a MIME-encapsulated PKCS-7 conformant message containing name-value pairs to the merchant server directly, rather than to the SET module. This channel is shown in FIG. 18A at block 1860.

The message is verified for origination from the acquirer, and is utilized to either initialize a merchant action, such as to update the merchant's administration page (for example by blinking a message saying, "PLEASE RE-INITIALIZE YOUR TERMINAL"), or by initiating a request/response message pair originating from the merchant (for example, "HERE ARE THE CONTENTS OF MY MIB"). This is achieved by calling one of the extended terminal transaction interfaces (FIG. 18A at 1834), which in turn initiates a SET or Extended SET transaction.

Gateway Customization via the Extended SET Channel

Gateway customization in extended SET is extremely powerful and a novel concept for VPOS processing. Each VPOS contains one or more "serial numbers" unique to each copy of the software (a serial number may be embedded in the software, or may be a component of a public key certificate used in the software). Once a merchant has selected an acquirer and obtained the appropriate certificates, the VPOS can be customized utilizing the communication link and messages containing customization applications.

A bank distributes VPOS via different sales channels. The first is direct from a bank to an existing merchant with whom the bank already has an existing relationship. In this case, a version of VPOS already customized for a bank is sent to the merchant, either directly by a bank, or through a third-party distributor or service bureau. The customizations may involve modification or replacement of, for example, a store front 1822, shopping cart 1824, pay page 1826, standard terminal administration transaction interface 1828–1830 or an extended terminal transaction interface 1834. This is a standard model of distribution of software that is customized for small target market segments.

The more interesting case, and the one that concerns the novel use of the Extended SET channel, is where the potential merchant acquires, through some non-bank channel, a "generic" VPOS which has not yet been customized to interact with a specific bank. This VPOS can communicate with a "test gateway", which the merchant may use to experiment with the various features of VPOS and to test the integration of the VPOS into a total online storefront.

In order to actually transact business over the Internet, the merchant must first obtain a merchant ID from the merchant bank with which he signs an acquiring agreement. For online payment processing, the merchant must also obtain an appropriate set of digital credentials in the form of public key certificates and possibly additional passwords, depending on the financial institution. Once these credentials are obtained, the merchant is ready to customize the already-obtained VPOS to communicate with a merchant bank's gateway.

Using the built-in "serial number" certificate and the Test Gateway public key certificate (which is "hard-wired" into the VPOS software), it is possible to securely download a particular bank's customization applications to a specific copy of the VPOS software. Once the VPOS is appropriately configured, the last stage of customization download is to configure the VPOS so that it only responds to a public key certificate of the merchant's acquirer. This process is illustrated here in the context of a merchant who obtains a VPOS that talks to the VeriFone test gateway, and desires to customize the VPOS to interact with a gateway at a bank.

The merchant has purchased a VPOS from a non-bank channel. The version communicates with the VeriFone Test Gateway. The merchant uses the gateway to learn about using VPOS, and to test the integration of his storefront system with his payment system. The merchant also obtains certificates for payment processing from a bank, the merchant bank of choice for the merchant. The merchant is now ready to customize VPOS to talk to the bank gateway. The flowchart for the merchant interaction with the Test Gateway is shown in FIG. 50.

The merchant begins at function block 5000, where the newly-obtained merchant SET certificates are installed in the VPOS. The merchant then directs the VPOS to connect to the VeriFone Test Gateway, by selecting this option from the VPOS terminal administration home page 5005. The choice of this option invokes an extended terminal admin page from the default set of such pages supplied with the generic version of VPOS. This program guides the customization process.

The merchant, interacting with the extended terminal admin page, navigates to the list of gateways which is maintained by the Test Gateway, and selects the bank to connect by selecting from the list of banks, at function block 5015. During this process, the merchant's public key certificates are uploaded to the Test Gateway, and checked (at decision block 5025) to verify that the certificates have been signed by the bank to customize the bank for the VPOS. If the certificates do not match, the merchant is advised of the situation in function block 5010, and must select a different bank. If the certificates are not valid SET certificates as detected at decision block 5020, the merchant is advised at function block 5028, and the session terminates. If the certificates are valid and match the selected bank, customization continues at function block 5030.

The extended terminal administration program in VPOS receives a list of the customizations from the Test Gateway that must be performed to specialize the VPOS for a specific bank. Some of these customizations are mandatory, while others are optional. In function block 5030, the VPOS advises the merchant of the customizations, prompting for any choices that must be made by the merchant. The merchant's actions at this point drive decision block 5035, in which the VPOS either returns itself to the "generic" state and terminates the interaction, or begins the configuration of the VPOS, depending on the merchant's confirmation of the request to begin the configuration.

If the merchant has authorized the changes, control is passed to function block 5040 where, the POS stores the certificates of any gateways that it will allow future configuration changes to be initiated from in its database. This may be only a specific bank, such as a bank and the Test Gateway, or other combinations. If only a single, non-Test, bank-owned, gateway is allowed to download changes, the VPOS is no longer customizable for any other bank. Then, a new copy would be purchased by the merchant to have it customized for another bank. If the Test Gateway is still allowed to customize the VPOS, the merchant could switch to another merchant bank and have the current VPOS updated to work with the new bank.

In function block 5050, the customizations are downloaded to the VPOS. The downloads comprise a set of HTML pages and a set of executable programs or scripts that read data from the merchant, perform various functions, and present data to the merchant. In general, the customizations downloaded may augment or replace in part or in whole any and all of function blocks 1822, 1824, 1826, 1828, 1830, or 1834 in FIG. 18A. At a minimum, the terminal "home page" will be replaced so that it points to the new functionality. At this point, the customization of the VPOS has been completed, and the merchant may now begin sending payment requests to the merchant bank or processor through the VPOS.

Thread Safe VPOS—TID Allocation

Physical terminals process a single transaction at a time since clerks are usually only able to process one transaction at a time. Web Servers can process many transactions at a time, so payment requests can often occur simultaneously. Thus, the VPOS Software must have support for multi-tasking and provide support for multiple threads to be active at the same time in the same system as well as the same process. This requirement is relatively straight forward. However, the authorizing banks require that all transaction requests include a Terminal ID (TID), and, for many banks, no single TID may be active in any two transaction requests that overlap in time. Thus, the VPOS requires dynamic allocation of TIDs to requesting threads.

One way of providing for multiple TID's is to assign a "base" TID, and either an "extension" (a set of extra digits appended to the base), or an increment (a number which is added to the base to obtain the complete TID). While such a solution can be used for the majority of banks and processors, not all banks/processors can accommodate this solution. One example is First Data Corporation. For its ENVOY protocol, the terminal ID must use the Luhn check as recited in an ISO remark, which adds a checksum digit to the terminal ID to reduce chances of fraud or of mistyped information. Thus, to be general enough to handle all bank/processor situations, a pool of TID's is used. The TID's stored in the pool need not be a sequential set of numbers; in fact they can be alpha/special/numeric combinations, and the TID's need have no relation to one another. In a preferred embodiment, a TID is represented as a token in a pool that can be associated with a particular transaction.

To provide for this requirement, the VPOS provides a TID pool in tabular form in a database management system (DBMS). This table has two columns: TID NAME & Allocation date/time. If the TID date is null, then the TID is not in use and may be assigned. A date/time field is utilized to allow TID allocations to expire. TID requests are made utilizing a SQL query on the TID Pool to find the first null or expired date/time, which is replaced with the current date/time and the TID name returned.

REMOTE VPOS

The unique architecture of the Cardholder 120, Merchant 130 and Gateway 140, as shown in FIG. 1B, provides communication capability between the modules utilizing the Internet to support linkages 150 and 170. Since the Internet is so pervasive, and access is available from virtually any computer, utilizing the Internet as the communication backbone for connecting the cardholder, merchant and access to the authorizing bank through a gateway allows the merchant VPOS software to be remotely located from the merchant's premises. For example, the cardholder could pay for goods from any computer system attached to the Internet at any location in the world. Similarly, the merchant VPOS system could be located at a central host site where merchant VPOS systems for various merchants all resided on a single host with their separate access points to the Internet. The merchant could utilize any other computer attached to the Internet utilizing a SSL or SET protocol to query the remote VPOS system and obtain capture information, payment administration information, inventory control information, audit information and process customer satisfaction information. Thus, without having to incur the overhead of maintaining sufficient computer processing power to support the VPOS software, a merchant can obtain the information necessary to run a business smoothly and avoid hiring IS personnel to maintain the VPOS system.

VPOS Multi-Merchant Processing

Multiple merchant processing refers to the ability of a plurality of merchants to process their individual VPOS transactions securely on a single computer. The architecture relies on each payment page obtaining the merchant name in a hidden field on the payment page. The VPOS engine receives the merchant name with a particular transaction and synchronizes the processing utilizing a Set Merchant method. This command causes the VPOS API to look up a unique registry tree based on the merchant name. This process causes the VPOS engine to engage the appropriate configuration to process the transaction at hand utilizing a Registry Tree. A registry tree contains Card Definition Tables (CDT)s, acquirer Definition Tables (ADT)s, Merchant Definition Tables (MDT)s, Protocol Configuration Tables (PCT)s, etc. The CDTs point to specific ADTs since each supported card can be supplied by a distinct acquirer. This is one form of split connection. Each of the ADTs in turn point to PCTs, and some acquirers can support multiple parallel gateways. A merchant's name refers to a unique database in the database management system which contains for example, TIDs.

So, for example, to fully qualify a particular merchant in a multi-merchant system, the acquirer Definition Table is queried to ascertain the particular Gateway (VFITest), then if Bank of America requires verification of network communication information, the particular CardDT is accessed with for example VISA. The particular merchant will service VISA transactions utilizing a particular acquirer. The particular piece of merchandise will also be detailed in a data base. Finally, the merchant Configurations will also be stored in the database to facilitate E-mail and name lookup.

VPOS CLIENT

The interaction between the VPOS and a client commences when a pay page solicits parameters of a transaction. Then, the parameters are validated to be sure the payment instrument, for example, cardnumber is not null. Then, a transaction object is created, eg. AUTHONLY, and the object is initialized and stuffed with parameters of the transaction, eg. ao.setpan(accnum), and the object is executed. This execution invokes the VPOS engine. The VPOS engine further validates the parameters based on the particular merchant's configuration. For example, some merchants do not accept American Express Cards, but will take Visa, and all merchants check the expiration date of the card. Assuming a valid and acceptable card has been tendered, then a TID is assigned (expiring, existing TIDs) or block a new TID from the TID Pool. This generates a STAN, XID, RRPID unique tag and creates an initial record in the transaction database which is flagged as before gateway processing in case the transaction crashes and must be backed out. Then the protocol parameters are identified in the registry based on card type, and a particular acquirer identified. Then, a protocol object is created and executed to extract results from the protocol object and the before gateway "bit" is flipped to again flag the location of the transaction in the process as it is submitted to the Gateway.

The results received back from the Gateway are placed into a transaction object with is reported back to the pay page and ultimately back to the pay page user.

VPOS Merchant Pay Customization

A novel feature of the VPOS software provides payment page customization based on a merchant's preferences. This feature automatically lists cards that are accepted by a particular merchant based on the active terminal configuration. Each approved card for a particular merchant is linked to the display via an URL that provides a pointer to the credit card information supported by the merchant. Each card has an entry in a data structure referred to as the Card Definition Table (CDT).

Figure 19:
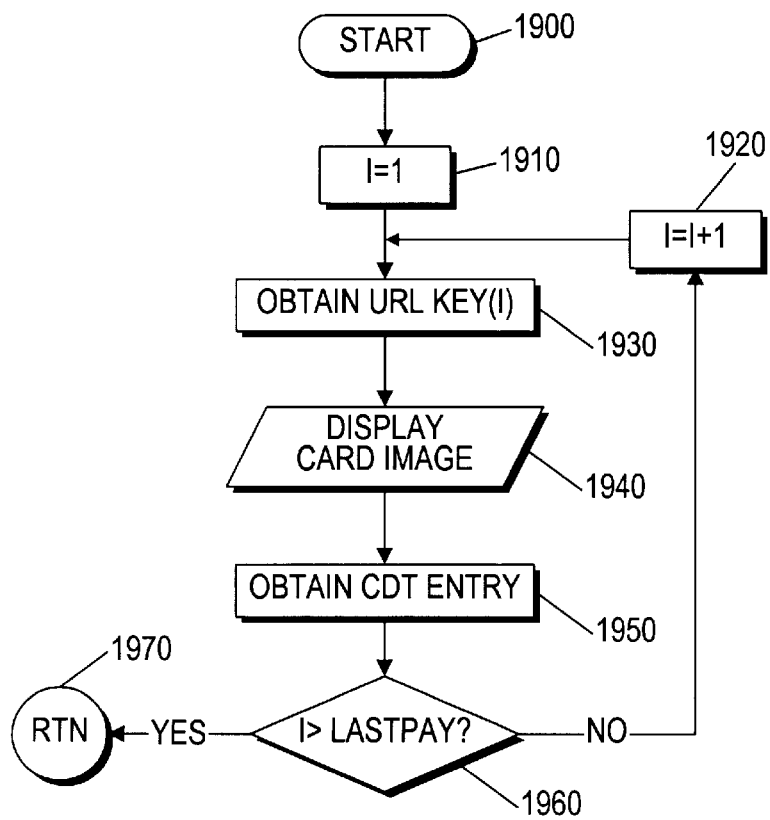
FIG. 19 is a flowchart of VPOS merchant pay customization in accordance with a preferred embodiment.

A preferred embodiment of the VPOS merchant pay customization software in accordance with a preferred embodiment is provided in FIG. 19 which illustrates the logic utilizing a flowchart, and a listing of the source code below. Processing commences at terminal 1900 and immediately flows to function block 1910 where an index variable is initialized for stepping through each of the accepted payment instruments for the merchant's page. Then, at function block 1930, a URL key is obtained associated with the current merchant pay page and index value. The URL key is a registry key name that points to a picture of a credit card that the merchant has associated with the pay page and which the merchant accepts as payment. At output block 1940 the card image associated with the URL key is obtained and displayed on the terminal. The CDT entry is obtained at function block 1950 utilizing the URL key. The CDT is utilized for storing information associated with each card. Then, at decision block 1960, a test is performed to determine if the last payment method card has been processed and displayed on the merchant display. If not, then the index is incremented at function block 1920 and the loop reiterated to process the next card at function block 1930. If all the cards have been processed, then control is returned to the merchant program for processing the transaction at terminal 1970.

Figure 20A:
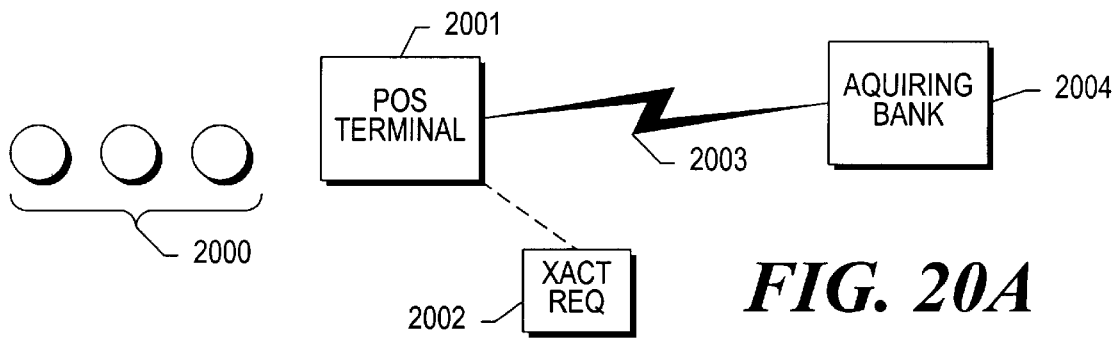
FIGS. 20A–20H are block diagrams and flowcharts setting forth the detailed logic of thread processing in accordance with a preferred embodiment.

FIGS. 20A through 20H are block diagrams and flowcharts setting forth the detailed logic of thread processing in accordance with a preferred embodiment. FIG. 20A illustrates a prior art approach to POS processing utilized in most grocery stores and department stores today. POS Terminal 2001 accepts transactions provided to it one at a time by customers 2000. For each transaction, POS Terminal 2001 builds a transaction request 2002 and transmits it to acquiring bank 2004 over communications link 2003.

Figure 20B:
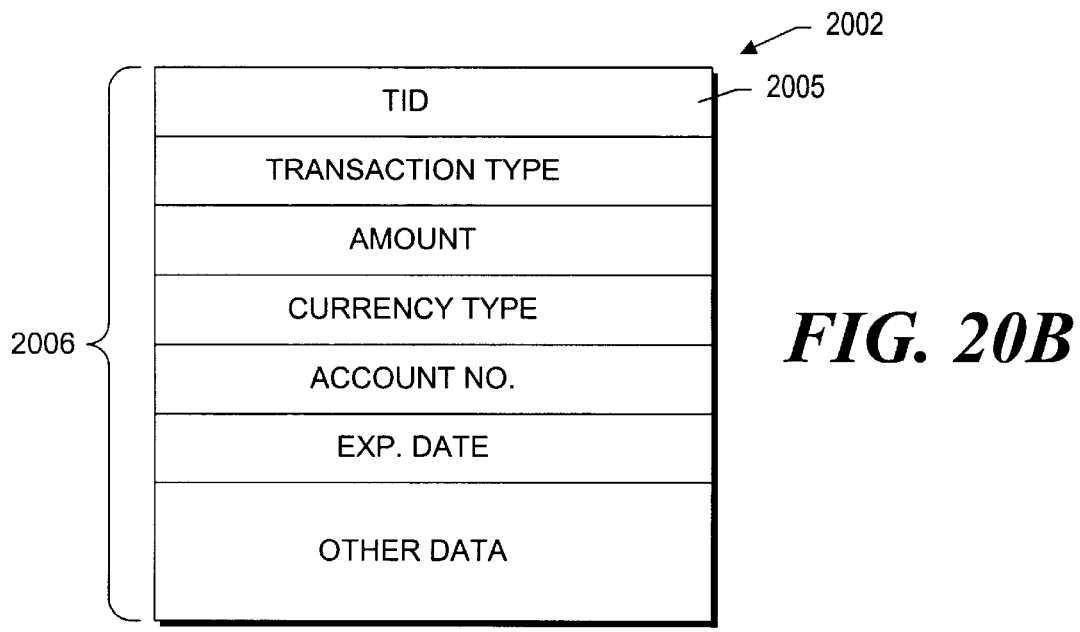

FIG. 20B is a data structure 2002 representing a POS transaction request in accordance with a preferred embodiment. The data structure 2002 includes a TID field 2005, which identifies the physical terminal from which the transaction originates. In addition to the TID field, the data structure also includes other data 2006 necessary to process a transaction. This data includes such fields as a transaction type, a transaction amount, a currency type 20 (such as U.S. dollars), credit card account number, credit card expiration date, etc.

Figure 20C:
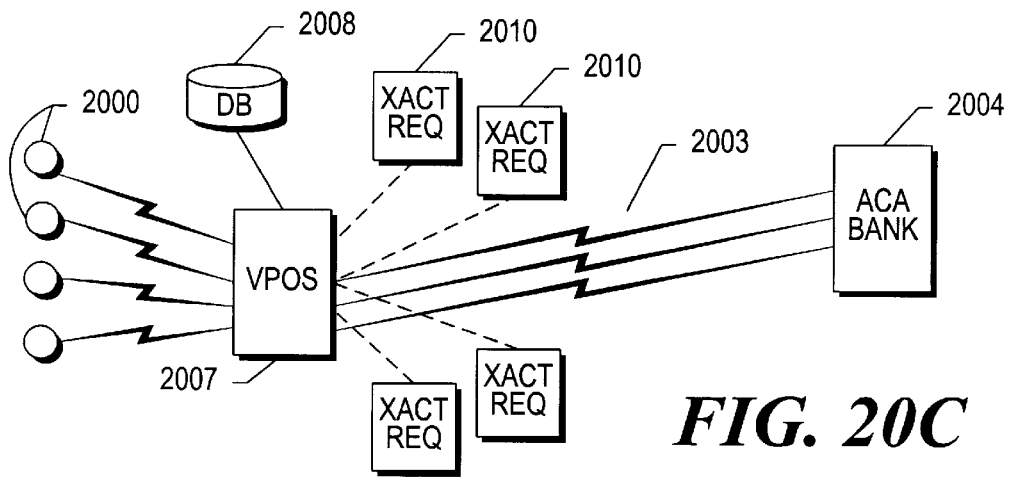

FIG. 20C illustrates a VPOS architecture with account requests being processed by a single acquiring bank. VPOS 2007 processes a plurality of customers 2000 concurrently. For each such customer 2000, VPOS 2007 builds a data structure 2010, representing the transaction to be performed for that customer. Each data structure 2010 contains a unique "virtual terminal" ID. VPOS 2007 selects a virtual terminal ID using database 2008. For each data structure 2010, VPOS 2007 initiates communication with acquiring bank 2004 using communication link 2003.

Figure 20D:
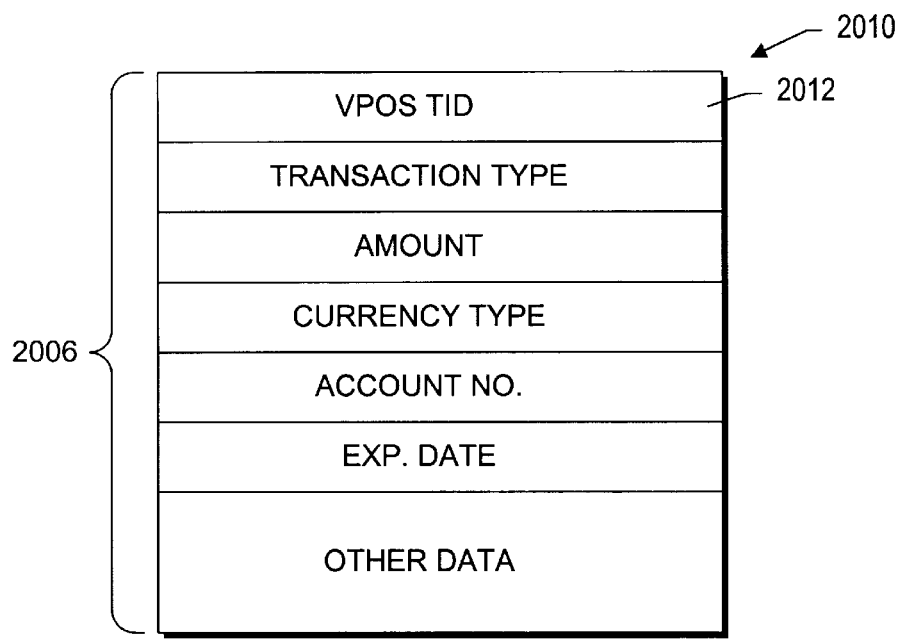

FIG. 20D is a data structure 2010 representing a VPOS transaction request in accordance with a preferred embodiment. The data structure 2010 includes a TID field 2012, which identifies a virtual terminal ID associated with a particular transaction. In addition to the TID field 2012, the data structure also includes other data 2006 necessary to process a transaction. This data includes such fields as a transaction type, a transaction amount, a currency type (such as U.S. dollars), credit card account number, credit card expiration date, etc.

Figure 20E:
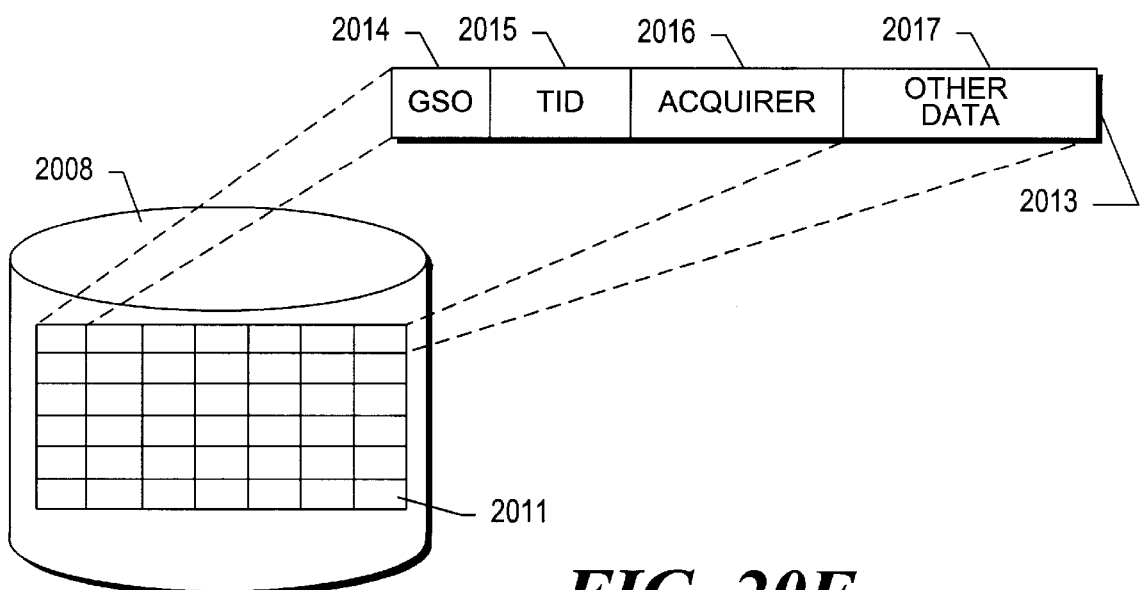

FIG. 20E illustrates a TID allocation database 2008 in accordance with a preferred embodiment. Database 2008 includes a TID allocation table 2011. TID allocation table 2011 includes a plurality of rows, one for each TID used by each acquiring bank. One such row 2013 is illustrated in detail. Row 2013 includes a good/service order (GSO) identifier 2014, which identifies the order being transmitted; a TID field 2015, which identifies a terminal ID that may be used with a particular acquiring bank; and an acquiring bank field 2016, which identifies the acquiring bank for which the TID is valid. In addition, row 2013 may optionally include other fields 2017 that may be used in conjunction with the order processing. A null GSO value indicates that the TID/acquirer combination is not currently in use.

Figure 20F:
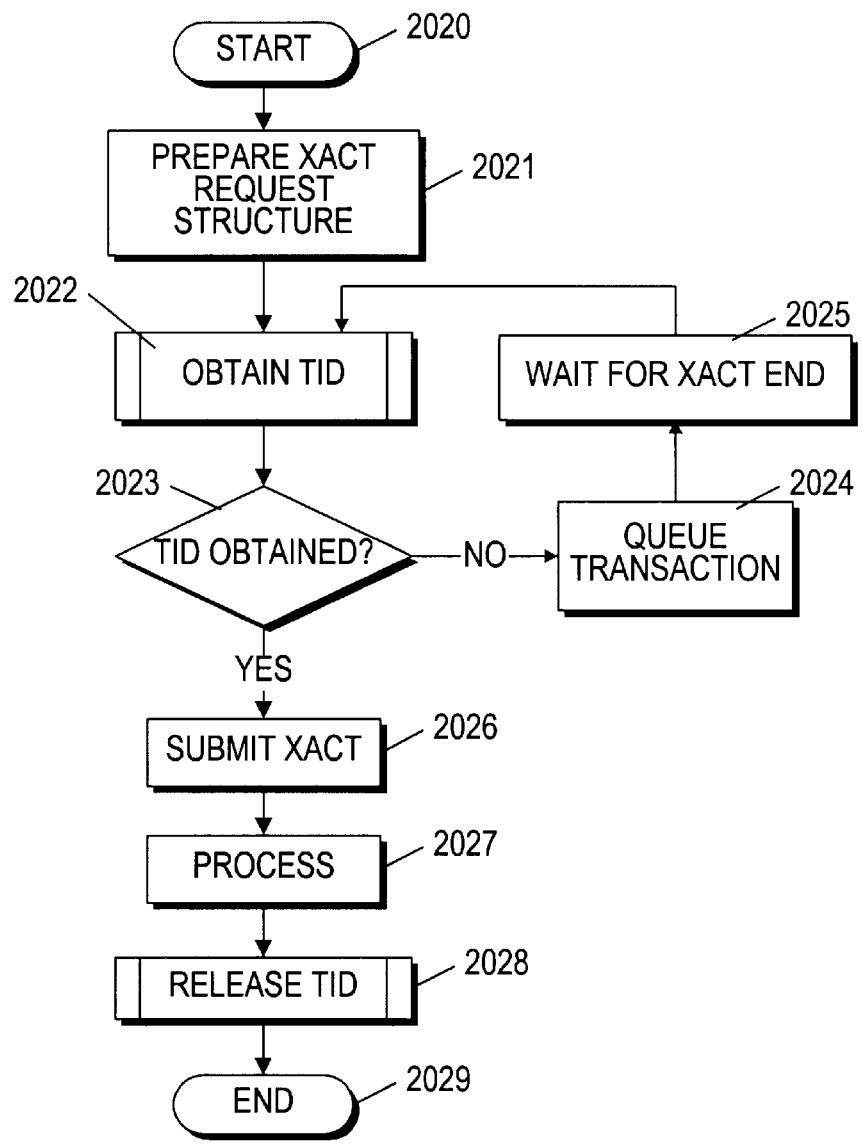
Figure 20G:
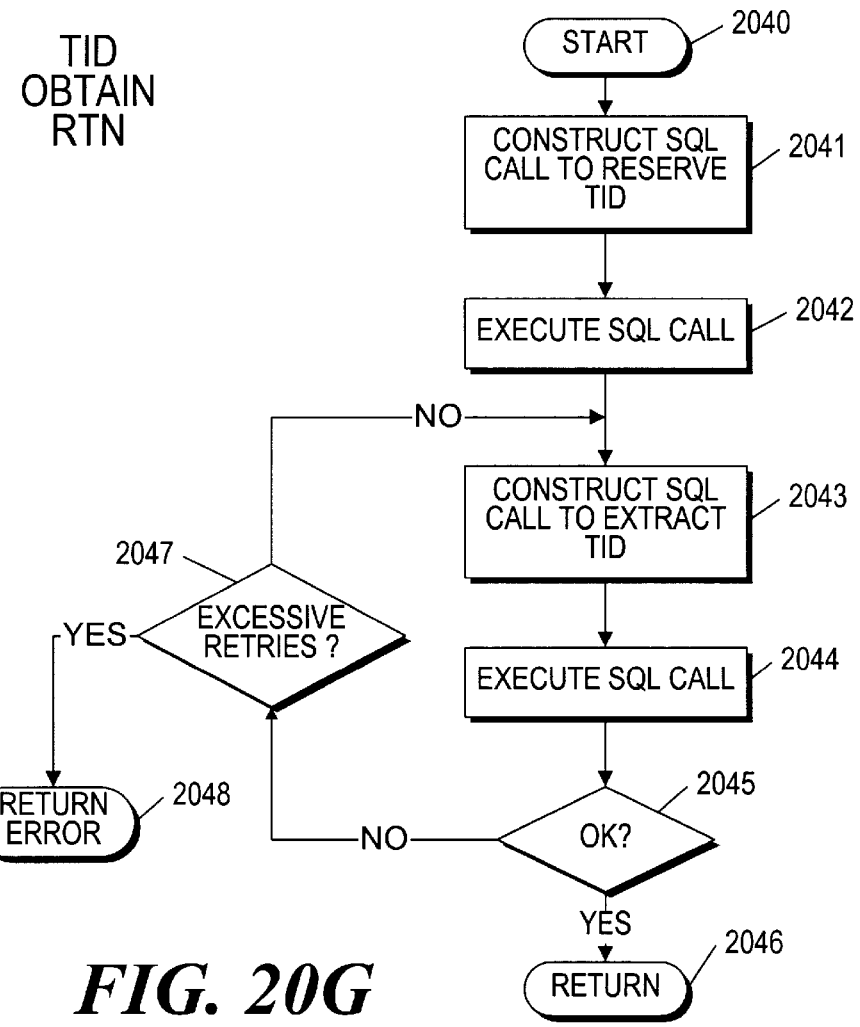
Figure 20H:
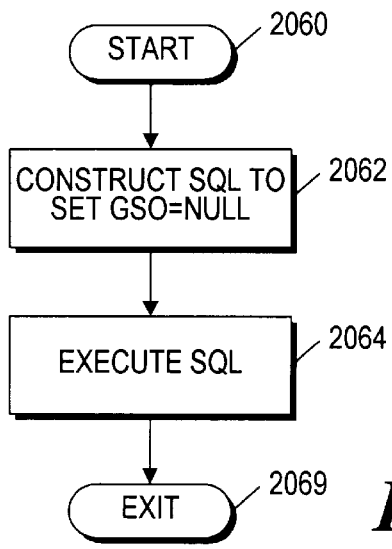

FIGS. 20F through 20H are flowcharts of the detailed logic used to perform virtual terminal ID allocation. FIG. 20F illustrates the main line operation of virtual TID allocation. In step 2020, execution begins. In step 2021, a skeletal transaction request structure is prepared. In step 2022, the main line routine obtains a virtual TID for inclusion within the transaction request structure, as will be more fully disclosed with reference to FIG. 20G, below. In step 2023, the routine verifies that a TID was obtained. If the TID was not obtained, for example, if more transactions are currently being processed than there are TIDs, then execution continues to step 2024. In step 2024, the transaction request is put on a queue for future processing. In step 2025, the routine waits for a transaction process to end, which would free up a TID in use. At that point, control resumes from step 2022, and the routine again attempts to obtain a TID.

If the TID was successfully obtained in step 2023, control proceeds to step 2026. In step 2026, the routine submits the transaction to the acquiring bank. In step 2027, the transaction is processed. In step 2028, the routine makes a database call to free up the TID that was used in the transaction. In step 2029, transaction processing ends.

FIG. 20G depicts in detail the process of obtaining a TID from the database. Execution begins in step 2040. In step 2041, the routine constructs a database call to reserve a TID for processing, for example, by constructing an SQL statement to retrieve a TID row from the database. In step 2042, the routine executes the database call that was constructed in step 2041. In step 2043, the routine constructs a second database call to extract the TID from the row that was reserved in step 2042. In step 2044, the database call constructed in step 2043 is executed to obtain the TID. In step 2045, a return code is checked to verify whether the TID was successfully obtained. If the TID was successfully obtained, control proceeds to step 2046, which returns to the calling program. If, however the TID was not obtained, control proceeds to step 2047. In step 2047, the routine checks to see whether an excessive number of retries have already been attempted. If there have been an excessive number of retries, control proceeds to step 2048, which exits with an error indication. If there has not been an excessive number of retries, control proceeds once again to step 2043 to retry the extraction operation.

FIG. 20H depicts the operation of releasing a TID that had been used in a prior transaction. Execution begins in step 2060. In step 2062, the routine constructs a database call to update the row for the selected TID so that the value for the good and service order is null, thereby indicating that the selected TID is not associated with any good or service order, and is therefore free for reuse. In step 2064, the routine executes the SQL statements constructed in step 2062, thereby releasing the TID for use in future transactions. In step 2069, the routine returns to the calling program.

A source code listing for the transaction request processing is provided below in accordance with a preferred embodiment.

```
#include "rr.h"
#ifndef __NT
#define __NT
extern void __setenvp( );
#endif
///////////////////////////////////////////////////////
// AcquireBillHtml
// On Pay page, output form entries to acquire billing information
///////////////////////////////////////////////////////
EStatus AcquireBillHtml(CWSINT& clWSINT, int nTot, CProf& clProfile, EPCLCurrency
eCurrency) {
    // Current time
    time_t tNow; //figure out current year for Credit card expiry
    struct tm *tmNow;
    char szYear[DB_YEAR_SZ + 1];
    char szAmount[FORMATTED_CURRENCY + 1];
    time(&tNow);
    tmNow = localtime(&tNow);
    strftime(&szYear[0], (size_t)DB_YEAR_SZ + 1, "%Y", tmNow); //needs extra 1 for null
    int nYear = atoi(szYear);
/*<TH>Payment Type</TH>\n<TD><INPUT SIZE = 20 NAME=b_instrument VALUE=\""\
        << clProfile.m_b_instrument << "\"></TD>"\
        <<"*/
    clWSINT << "<CENTER><TABLE BORDER=0><CAPTION ALIGN = TOP><B>Bill
To</B></CAPTION>\n";
    clWSINT <<"<TR ALIGN=LEFT><TH>Account Number</TH><TD COLSPAN = 5><INPUT
SIZE = 56 MAXLENGTH = "
        ACCT_NUM_SZ <<" NAME=b_card> </TD></TR>\n";
    clWSINT <<"<TR ALIGN=LEFT><TH>Name on Card</TH><TD><INPUT SIZE= 20
MAXLENGTH=" << NAME_SZ
        << "NAME=b_name VALUE=\"" << clProfile.m_b_name
        << "\"> </TD><TH>Expiration</TH><TD>Month <SELECT NAME =
b_expire_month><OPTION> 01\n <OPTION> 02\n" <<
        "<OPTION> 03\n <OPTION> 04\n<OPTION> 05\n<OPTION> 06\n<OPTION>
07\n<OPTION> 08\n<OPTION> 09\n" <<
        "<OPTION> 10\n<OPTION> 11\n<OPTION> 12\n</SELECT> Year <SELECT
NAME = b_expire_year><OPTION>" <<nYear <<
        "<OPTION>" <<nYear + 1 <<"<OPTION>" <<nYear + 2 <<"<OPTION>" <<nYear
+ 3 << "<OPTION>" <<nYear + 4 <<
        "</SELECT></TD></TR>\n";
    //<TH>Expires</TH><TD>Month <INPUT SIZE=3 NAME=b_expire_month> Year <INPUT
SIZE=5 NAME=b_expire_year></TD></TR>\n";
    clWSINT <<"<TR ALIGN=LEFT><TH>Address Line 1</TH><TD COLSPAN=5><INPUT
SIZE=56 MAXLENGTH="<<ADDR_SZ
        <<"NAME=b_addr1 VALUE=\"" << clProfile.m_b_addr1 << "\"> </TD></TR>\n";
    clWSINT <<"<TR ALIGN=LEFT><TH>Address Line 2</TH><TD COLSPAN=5><INPUT
SIZE=56 MAXLENGTH="<<ADDR_SZ
        <<" NAME=b_addr2 VALUE=\"" << clProfile.m_b_addr2 <<"\"> </TD></TR>\n";
    clWSINT <<"<TR ALIGN=LEFT><TH>City</TH><TD><INPUT MAXLENGTH=" <<
CITY_SZ <<" NAME=b_city VALUE=\""
        clProfile.m_b_city <<"\"> </TD>" <<"<TH>State/Province</TH><TD><INPUT
MAXLENGTH=" << STATE_SZ
        <<" NAME=b_state VALUE=\"" << clProfile.m_b_state << "\"> </TD></TR>\n";
    clWSINT <<"<TR ALIGN=LEFT><TH>Country</TH><TD><INPUT MAXLENGTH=" <<
COUNTRY_SZ
        <<" NAME=b_country VALUE=\"" <<clProfile.m_b_country <<"\">
</TD><TH>Zip/Postal Code</TH><TD><INPUT MAXLENGTH="
        <<ZIP_SZ <<" NAME=b_zip VALUE=\"" <<clProfile.m_b_zip << "\">
</TD></TR>\n";
    clWSINT <<"<TR ALIGN=LEFT><TH>Email</TH><TD><INPUT MAXLENGTH=" <<
BEMAIL_SZ <<" NAME=b_email VALUE=\""
        <<clProfile.m_b_email << "\"> </TD>"    <<"<TH>Phone</TH><TD><INPUT
MAXLENGTH=" <<BPHONE_NUM_SZ
        <<" NAME=b_phone VALUE=\""    << clProfile.m_b_phone << "\">
</TD></TR>\n";
    clWSINT <<"</TABLE></CENTER><P>\n";
    //NPW <<" NAME=b_addr1></TD>" <<"<TH>Payment
Instrument</TH>\n<TD><SELECT NAME =b_instrument>";
    //hack from ini (bug) which pay instruments supported
    //NPW clWSINT <<"<OPTION> Credit Card\n" << "<OPTION> Debit
Card\n</SELECT></TD></TR>\n";
    CurrFormat(nTot, eCurrency, szAmount);
    clWSINT <<"<CENTER><FONT SIZE=5>Total =" << szAmount <<
"</FONT></CENTER>";
    return (eSuccess);
}
///////////////////////////////////////////////////////
//PayButtonsHtml
// Output buttons on pay page: return to shop, pay, pay window,
// modify order
```

```
////////////////////////////////////////////////////
void PayButtonsHtml(CWSINT& clWSINT, char* pszShopUrl, CRRReg& clReg) {
    char *pszHomeUrl = clWSINT.LookUp("home_url");
    char *pszModifyUrl = clWSINT.LookUp("modify_url");
    char *pszSoftUrl = clWSINT.LookUp("soft_url");
    if (!pszHomeUrl) pszHomeUrl = pszShopUrl; //Home Page
    //if (!pszModifyUrl) pszModifyUrl = pszShopUrl; //Shopping Cart typically
    clWSINT <<"<CENTER><H4>By pressing the Pay! button I agree to pay the above total
amount<br> according to the card issuer agreement<H4></CENTER>\n";
    clWSINT <<"<CENTER>\n<A HREF ="<< pszShopUrl <<"> <IMG SRC=" <<
clReg.m_szReturnShop <<" BORDER = 0></A>\n";
#ifdef SC
    clWSINT <<"<INPUT TYPE = IMAGE NAME = gso SRC ="<< clReg.m_szModifyOrder <<
"BORDER = 0>\n";
#else
    if (pszModifyUrl)
        clWSINT <<"<A HREF ="<<pszModifyUrl<<"> <IMG SRC=" <<
clReg.m_szModifyOrder <<" BORDER = 0></A>\n";
#endif
    clWSINT <<"<INPUT TYPE = HIDDEN NAME = home_url VALUE ="<< pszHomeUrl <<
">\n"
        <<"<INPUT TYPE = IMAGE NAME = VPOS SRC ="<< clReg.m_szPay <<" BORDER =
0>\n"
        <<"<INPUT TYPE = HIDDEN NAME = shop_url VALUE ="<< pszShopUrl <<">\n"
        <<"<INPUT TYPE = HIDDEN NAME = store VALUE ="<< clWSINT.Lookup("store") <<
">\n"; //Can't be NULL or error previously
    if (pszSoftUrl)
        clWSINT <<"<INPUT TYPE = HIDDEN NAME = soft_url VALUE ="<< pszSoftUrl
<<">\n";
    clWSINT <<"</CENTER>\n";
}
////////////////////////////////////////////////////
// DisplayPayPage
// Outputs billing form, buttons, and static gso
////////////////////////////////////////////////////
EStatus DisplayPayPage(CWSINT& clWSINT, CRRReg& clReg, int nError) {
    EStatus eStat;
    char szFileLine[BUFFER_SZ + 1];
    char *pszTag, *pszRefererUrl, *pszShopUrl, *pszExePath, *pszServerName;
    time_t tNow;
    int nTagExist = FALSE;
    HKEY hCardsKey; //To enumerate cards
    long retCode;
    int nNoCards;
    DWORD dwtype, dwlen;
    HKEY hCardKey;
    char szCardBuf[MAX_PATH + 1], szCardPic[MAX_PATH + 1];
#ifdef SC
    CPOLBk clBkGso;
#else
    char *pszTxn, *pszGsoNum, *pszGsoO paque, *pszTot;
#endif
    // Shipping headers. If come from gso page and cookies are not set, set.
    CProf *pProfile;
    pProfile = new CProf( );
    if (!pProfile) return (eRRNewFailed);
    eStat = pProfile->Init(clWSINT);
    if (eStat != eSuccess) return (eStat); //Init failed
#ifdef SC /*No session cookie for the pay page. This means the user will either use a long
        term cookie or type in their info each time*/
    clWSINT <<"Set-Cookie: profile=" <<pProfile->GetCookieLine( ) <<"; path=/\n";
/*    if (clWSINT.LookUp("Server Name")).
        clWSINT <<"; domain = << clWSINT.LookUp("Server Name") <<";\n;*/
#endif
#ifdef SC
    //Shipping filled in?
    if (!(pProfile->m_s_name[0] && pProfile->m_s_addr1[0] && pProfile->m_s_city[0] &&
pProfile->m_s_state[0] &&
        pProfile->m_s_zip[0] && pProfile->m_s_country[0] && pProfile->m_s_ship[0])) {
        eStat = DisplayGsoPage(clWSINT, clReg ERROR_DISPLAY); //bug, return
correct?
        return eStat;
    }
    //Creates shopping basket from CGI/Cookies
    eStat = clBkGso.Init(clWSINT, *pProfile, clReg);
    if (eStat != eSuccess) return (eStat); //eRRBasketCreateError
    //Cookies then other headers
    clBkGso.ToCookies(clWSINT, REGULAR);
#endif
    //clWSINT <<"Pragma: no-cache\n";
```

-continued

```
        clWSINT <<"Content-type: text/html\n\n";
        //Where to position the page. if all information is filled in, here.
        if (!nError) {clWSINT <<"<A NAME=jump></A>";}
        //Output HTML
        ifstream ifPay;
        ifPay.open(clReg.m__szPayTemplate, ios::in|ios::nocreate);
        if (ifPay.fail( )) return (eRRCantOpenPayTemplate); //couldn't read pay template file
        //HTML Template
        while (ifPay) {
                ifPay.getline(szFileLine, BUFFER_SZ);
                if (!(pszTag = strstr(szFileLine, DYNAMIC_TAG)))
                        clWSINT << szFileLine <<"\n";
                else {
                        nTagExist = TRUE;
                        //Null the tag, Output the beginning of the line,
                        //make the dynamic basket call, output the rest of the line
                        if (strlen(szFileLine) == strlen(DYNAMIC_TAG))
                                pszTag[0] = NULL;
                        else {
                                pszTag[0] = (char) NULL;
                                pszTag += strlen(DYNAMIC_TAG) + 1; //was 9
                        }
                        clWSINT << szFileLine;
                        //Dynamic call
                        pszRefererUrl = clWSINT.Lookup("Referer");
                        if (!pszRefererUrl) return (eRRNoRefererUrl);
                        pszExePath = clWSINT.LookUp("Executable Path");
                        if (!pszExePath) return (eRRNoExePath);
                        pszServerName = clWSINT.LookUp("Server Name);
                        if (!pszServerName) return (eRRNoServerName);
                        clWSINT <<"<FORM METHOD = POST ACTION = http";
                        if (clReg.m__nUseSSL)
                                clWSINT <<"s";
                        clWSINT <<"://" << pszServerName << pszExePath << "#jump>";
                        /*clWSINT <<"<FORM METHOD = POST ACTION =" << pszExePath <<
"#jump>";*/
                        // Setting Long Cookies
                        clWSINT <<"<CENTER>If you wish to have billing and shipping defaults
set in your browser, check this box"
                                <<"<INPUT TYPE = CHECKBOX
NAME=long_cookies></CENTER>\n";
                        //Fill it in message
                        if (nError) {
                                clWSINT <<"<A NAME=jump></A>";
                                clWSINT <<"<CENTER><H4>You must fill in <I>all</I>of the
billing information except for <I>address line 2</I> and <I>email</I>.</H4></CENTER>";
                        }
                        //GsoNum
#ifdef_SC
                        time(&tNow); //For multithreading, append instantiation number
                        clWSINT <<"<TABLE ALIGN=RIGHT><TR><TH>Order
Number</TH><TD>" << tNow
                                <<"</TD></TR></TABLE><BR CLEAR=ALL>\n<INPUT
TYPE=HIDDEN NAME=b_gso_num VALUE =" << tNow <<">\n";
#else
                        //Pay page API: transaction type, GSO #, gso opaque
                        pszGsoNum = clWSINT.LookUp("b_gso_num");
                        if (pszGsoNum)
                                clWSINT <<"<TABLE ALIGN=RIGHT><TR><TH>Order
Number</TH><TD>" << pszGsoNum
                                        <<"</TD></TR></TABLE><BR CLEAR=ALL>\n<INPUT
TYPE=HIDDEN NAME=b_gso_num VALUE =" << pszGsoNum <<">\n";
                        else {
                                time(&tNow); //For multithreading, append instantiation number
                                clWSINT <<"<TABLE ALIGN=RIGHT><TR><TH>Order
Number</TH><TD>" << tNow
                                        <<"</TD></TR></TABLE><BR CLEAR=ALL>\n<INPUT
TYPE=HIDDEN NAME=b_gso_num VALUE =" << tNow <<">\n";
                        }
                        //Some pay page only specifics: transaction to execute, gso opaque
                        pszTxn = clWSINT.LookUp("transaction");
                        if (pszTxn)
                                clWSINT <<"<INPUT TYPE=HIDDEN NAME=transaction VALUE =
"<< pszTxn <<">\n";
                        pszGsoOpaque = clWSINT.LookUp("gso_opaque");
                        if (pszGsoOpaque)
                                clWSINT <<"<INPUT TYPE=HIDDEN NAME=gso_opaque VALUE =
\"" << pszGsoOpaque << "\">\n";
#endif
#ifdef_SC
```

```
                    //Bill to information & Payment Instrument
                    eStat = AcquireBillHtml(clWSINT, clBkGso.GetTot( ), *pProfile,
(EPCLCurrency) clReg.m_eDefaultCurrency);
#else
                    //Pay Page alone requires a total
                    pszTot = clWSINT.LookUp("total");
                    if (!pszTot) return (eRRNoPayTotal);
                    eStat = AcquireBillHtml(clWSINT, atoi(pszTot), *pProfile, (EPCLCurrency)
clReg.m_eDefaultCurrency);
                    clWSINT <<"<INPUT TYPE=HIDDEN NAME=total VALUE =" << pszTot <<
">\n";
#endif
                    if (eStat != eSuccess) return (eStat); //error from db? within
AcquireBillHtml
                    clWSINT <<"<P>\n";
                    //Output Buttons on Form
                    pszShopUrl = clWSINT.LookUp("shop_url");
                    if (!pszShopUrl)
                            PayButtonsHtml(clWSINT, pszRefererUrl, clReg);
                    else
                            PayButtonsHtml(clWSINT, pszShopUrl, clReg);
                    //Registry Card LookUp
                    clWSINT <<"<CENTER><TABLE CELLSPACING = 5><TR><TH>Cards
Accepted:</TH>";
                    RegOpenKeyEx(clReg.m_hStoreKey, "API\\CDT", 0, KEY_READ,
&hCardsKey);
                    dwlen = sizeof(int);
                    RegQueryValueEx(hCardsKey, "NoOfRows", 0, &dwtype,
(LPBYTE)&nNoCards, &dwlen);
                            for (int i = 0; i < nNoCards; i++) {
                                    RegEnumKey(hCardsKey, i, szCardBuf, MAX_PATH + 1);
                                    RegOpenKeyEx(hCardsKey, szCardBuf, 0, KEY_READ,
&hCardKey);
                                    dwlen = MAX_PATH + 1;
                                    retCode = RegQueryValueEx(hCardKey, "CardPicture", 0,
&dwtype, (LPBYTE)szCardPic, &dwlen);
                                    if (retCode != ERROR_SUCCESS) return eRRRegistryFailure;
                                    clWSINT <<"<TD><IMG SRC =" << szCardPic <<"></TD>";
                                    RegCloseKey(hCardKey);
                            }
                            RegCloseKey(hCardsKey);
                            clWSINT <<"</TR></TABLE></CENTER>";
                            clWSINT <<"</FORM>\n<HR>\n";
#ifdef_SC
                            //Output static HTML Table
                            clBkGso.ToHtml(clWSINT, NOEDIT);
                            //Output static Shipping information
                            StaticShipHtml(clWSINT, *pProfile); //Also NO_EDIT
                            clWSINT <<"<HR>\n";
#else
                            //Pay page alone takes and passes through a gso
                            if (pszGsoOpaque)
                                    clWSINT << pszGsoOpaque << "\n";
#endif
                            //Rest of Line from template file
                            if (pszTag)      clWSINT << pszTag;
                }
        }
        if (nTagExist != TRUE)
                return(eRRNoDynamicTag);
        else
                return (eSuccess);
}
/////////////////////////////////
//Receipt Page
/////////////////////////////////////////////////////////////////
////////////////#ifdef_SC
/////////////////////////////////////////////////////
// StaticShipHtml
// On Pay page, output Static table of shipping information
// based on cookies set in prior page
/////////////////////////////////////////////////////
void StaticShipHtml(CWSINT& clWSINT, CProf clProfile) {
        clWSINT <<"<CENTER><TABLE CELLSPACING=10><CAPTION ALIGN = TOP><B>Ship
To<B></CAPTION>\n";
        clWSINT <<"<TR><TH ALIGN=LEFT>Name</TH><TD>" << clProfile.m_s_name <<
"</TD>" <<
                "<TH ALIGN=LEFT>Address Line 1</TH><TD>" << clProfile.m_s_addr1 <<
"</TD></TR>\n";
        clWSINT <<"<TR><TH ALIGN=LEFT>Address Line 2</TH><TD>" << clProfile.m_s_addr2
```

```
<<"</TD>" <<
        "<TH ALIGN=LEFT>City</TH><TD>" << clProfile.m_s_city <<"</TD></TR>\n";
    clWSINT <<"<TR><TH ALIGN=LEFT>State/Province</TH><TD>" << clProfile.m_s_state
<<"</TD>" <<
        "<TH ALIGN=LEFT>Zip/Postal Code</TH><TD>" << clProfile.m_s_zip <<
"</TD><TR>\n";
    clWSINT <<"<TR><TH ALIGN=LEFT>Country</TH><TD>" << clProfile.m_s_country <<
"</TD>" <<
        <TH ALIGN=LEFT>Shipping Method</TH><TD>" << clProfile.m_s_ship <<
"</TD></TR>\n";
    clWSINT <<"</TABLE></CENTER><P>";
}
#endif
///////////////////////////////////////////////////
// StaticBillHtml
// On Receipt page, output static table of billing information
///////////////////////////////////////////////////
void StaticBillHtml(CWSINT& clWSINT, CProf clProfile) {
    / *<TH>Payment Type</TH>\n<TD>" << clProfile.m_b_instrument
            <<"</TD>*/
    clWSINT <<"<CENTER><TABLE CELLSPACING=10><CAPTION ALIGN = TOP><B>Bill
To<B></ CAPTION>\n";
    clWSINT <<"<TR ALIGN=LEFT><TH>Account Number</TH><TD COLSPAN=3>" <<
clProfile.m_b_card <<"</TD><TR>\n";
    clWSINT <<"<TR ALIGN=LEFT><TH>Name on Card</TH><TD>" << clProfile.m_b_name
<<
        "</TD><TD><B>Expires:</B><I>Month</I>" << clProfile.m_b_expire_month <<
"<I>Year</I>" << clProfile.m_b_expire_year <<"</TD></TR>\n";
    clWSINT <<"<TR ALIGN=LEET><TH>Address Line 1</TH><TD COLSPAN=3>" <<
clProfile.m_b_addr1 << "</TD></TR>\n";
    clWSINT <<"<TR ALIGN=LEFT><TH>Address Line 2</TH><TD COLSPAN=3>" <<
clProfile.m_b_addr2 <<"</TD></TR>\n";
        clWSINT <<"<TR ALIGN=LEFT><TH>City</TH><TD>" << clProfile.m_b_city <<"</TD>"
            <<"<TH>State/Province</TH><TD>" << clProfile.m_b_state <<"</TD></TR>\n";
    clWSINT <<"<TR ALIGN=LEFT><TH>Country</TH><TD>" << clProfile.m_b_country <<
        "</TD><TH>Zip/Postal Code</TH><TD>" << clProfile.m_b_zip <<
"</TD></TR>\n";
    clWSINT <<"<TR ALIGN=LEFT><TH>Email</TH><TD>" << clProfile.m_b_email <<
"</TD>"
        <<"<TH>Phone</TH><TD>" << clProfile.m_b_phone <<"</TD></TR\n";
    clWSINT <<"</TABLE></CENTER><P>\n";
}
```

Default Gateway Configuration

The VPOS is initially shipped enabled to connect to a default gateway with a single instance of a gateway defined that accesses a predefined site for testing of an installation before bringing it online in a production mode. The test installation contacts and converses with an actual gateway that simulates live transactions. After the installation checks out utilizing a set of test transactions, the test gateway downloads the pre-checked customizations to the installation so that it can switch over to the production acquirer. This download processing is enabled in extensions to SET.

Internet Transaction Gateway

Payment methods that issue cards for conducting business utilize four major entities. These entities are the issuer, consumer, merchant and the acquirer. The issuing bank that provides the consumer with a credit card are usually not the same bank as the acquiring bank that serves the merchant. When the consumer utilizes a credit card to pay for a purchase, the merchant swipes the card through the POS terminal which makes a connection to the merchant's acquirer via the telephone network and transmits an authorization request with data read from the magnetic stripe. The acquirer's host processor, depending on the card number, will either perform local processing or switch the request to the correct issuing bank's host processor through the interchange network. In a few seconds, the authorization response is returned to the originating POS indicating either an approval or a rejection.

The Internet is a viable infrastructure for electronic commerce. Ubiquitous browser software for the World Wide Web provides around-the-clock access to a large base of information content provided by Web servers. Utilizing a preferred embodiment, consumers using browsers can shop at virtual stores and malls presented as Web pages managed by the merchants' servers. Consumers can make purchases and pay for them using credit cards or other digital payment instruments in a secure manner. For such Internet-based payments to be authorized, a "gateway" is necessary at the back end to channel transactions to legacy processors and interchange networks.

Figure 21A:
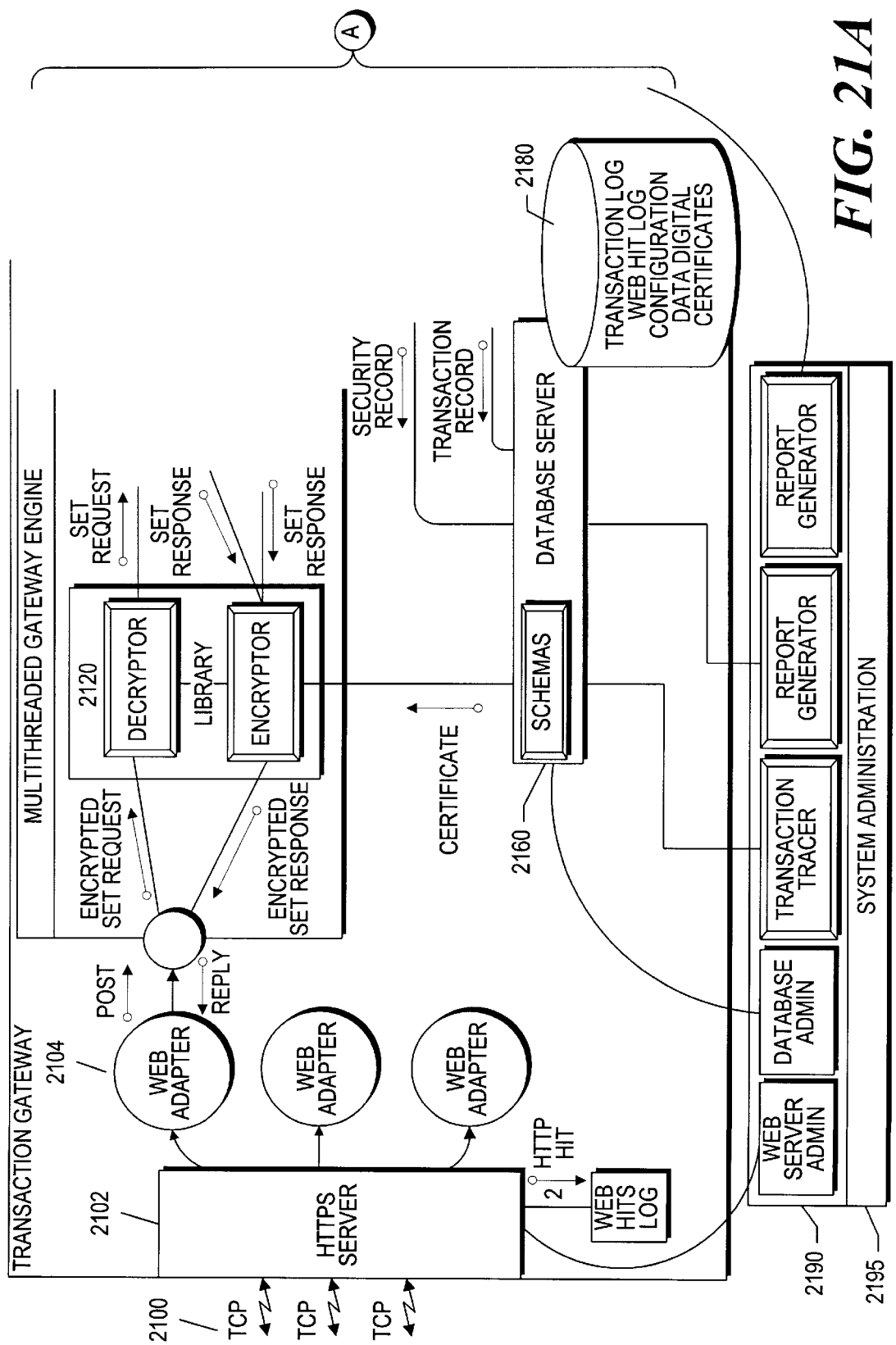
FIG. 21 is a detailed diagram of a multithreaded gateway engine in accordance with a preferred embodiment.
Figure 21B:
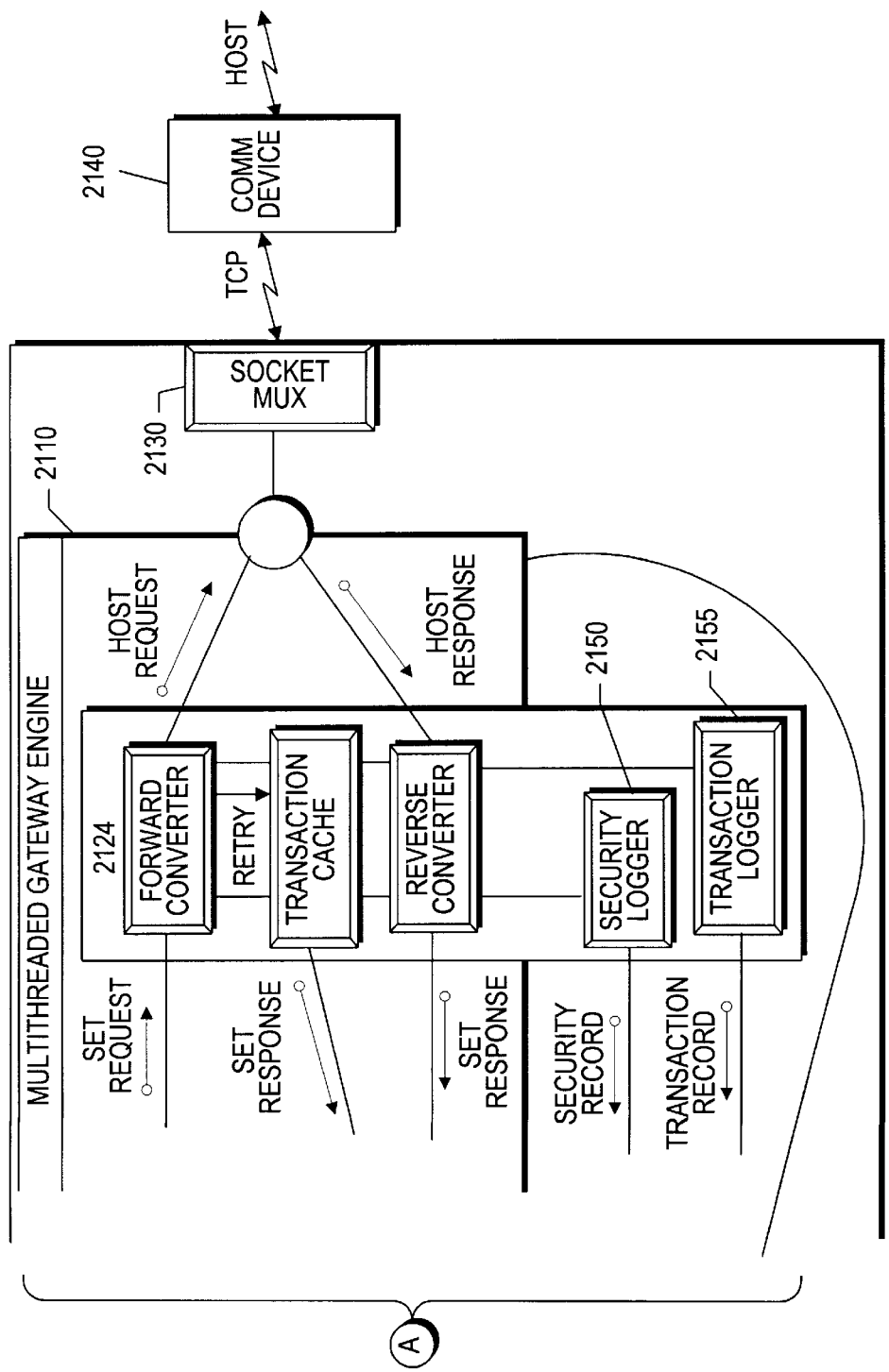

FIG. 21 is a detailed diagram of a multithreaded gateway engine in accordance with a preferred embodiment. Processing commences when a TCP transaction 2100 is received by a HTTPS Server 2102 and parsed to an appropriate Web Adaptor 2104 which posts an encrypted set transaction to the multithreaded gateway engine 2110. The encrypted SET request is received at a decryptor 2120, decrypted into a standard SET transaction and authenticated for converting by the forward converter 2124. Inside the forward converter 2124, decides if the request is an original request, and honest retry attempt or a replay attack. The converted transaction is passed to the socket multiplexor 2130 to communicate via an existing communication link 2140 to a host computer. A security logger 2150 is also utilized for passing security records back via a database server 2160 to a database administration application 2190. A transaction logger 2155 also utilizes the database server 2160 to capture transaction logs in a database 2180. Other system administration tasks 2195 include a web server administration task 2190 which logs web hits in a log 2170.

FIG. 22 is a flow diagram in accordance with a preferred embodiment. Processing flows from customers 2200 that are paying for products over the Internet or other communication medium utilizing HTTPS or other protocols to one or more merchants 2210, 2220 or 2230 to a gateway 2240 which directs transactions to a particular host processor 2250 for authorization processing in accordance with the present invention.

Internet Payment Authorization

The Gateway is a secure computer system that mediates transactions between the merchants' servers and a payment processor. The Gateway supports secure communications between merchants using the Internet on one side, and a processor using standard secure financial networks on the other side. Between the two interfaces, the Gateway maintains a detailed log of all transactions, whether in-progress, completed, or failed. The Gateway accepts transactions from merchants and converts them into legacy compatible formats before forwarding them to the host processor. Responses from the host, after the reverse conversions, will be returned to the originating merchants.

Figure 23:
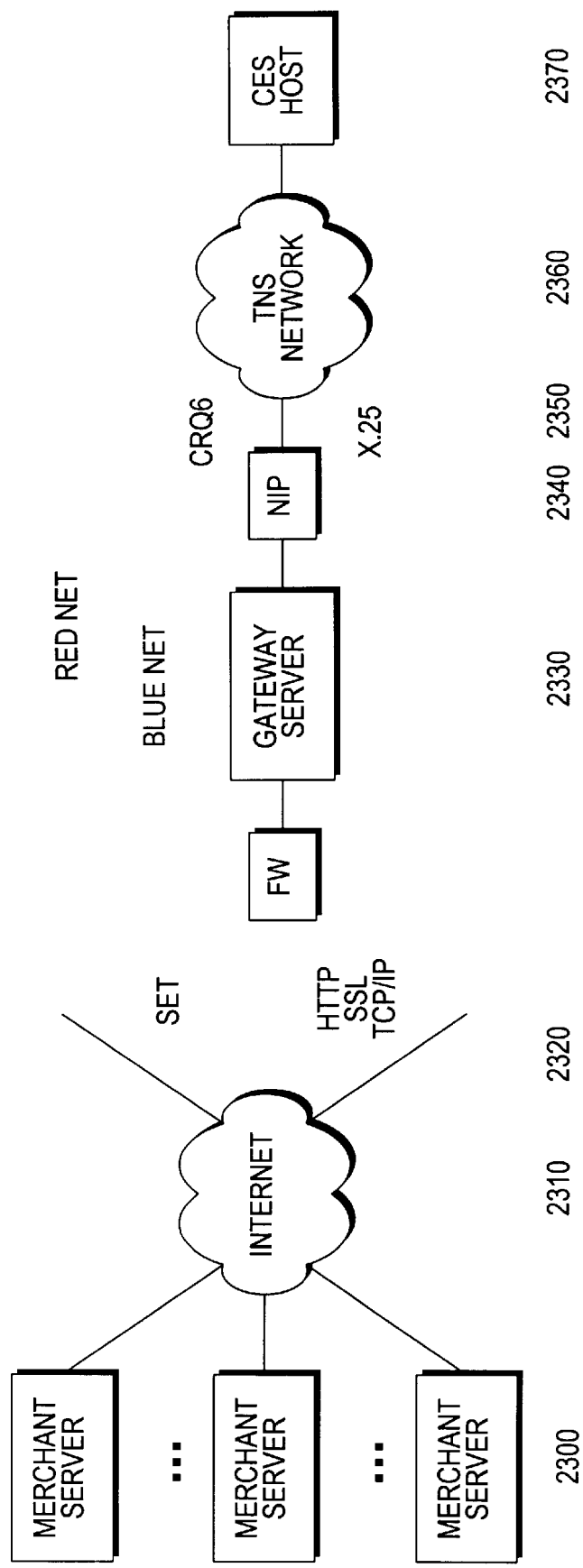
FIG. 23 illustrates a Gateway's role in a network in accordance with a preferred embodiment.

The Gateway performs many functions, including:

- Receives encrypted credit card transactions from the merchants via the Internet
- Unwraps and decrypts transactions
- Authenticates digital signatures of transactions based on certificates
- Supports all transaction types and card types
- Accepts concurrent transactions from each of the merchant servers
- Converts transaction data to legacy formats; forwards the mapped requests (in the clear) to a payment processor over existing communication links
- Converts transaction responses, correlates them with the original requests, and sends the mapped responses back to the merchants
- Provides logging, monitoring, reporting, and system administration FIG. 23 illustrates a Gateway's 2330 role in a network in accordance with a preferred embodiment. The Gateway 2330 strictly conforms to all SET stipulations regarding certificate management, PKCS signed data encapsulation, PKCS encrypted data encapsulation, ASN.1 representation, DER encoding, MIME encapsulation, and message sequencing. A merchant server 2300 communicates via the Internet 2310 using the SET protocol 2320 through a gateway server 2330 using a network interface processor 2340 to communicate to a legacy network 2360 in, for example the X.25 protocol 2350. The legacy host 2370 ultimately receives and processes the transaction from the merchant server 2300 without modification to its code.

Internet Communication Protocols

As discussed above, the TCP/IP protocol suite is utilized at the transport level. At the application level, in compliance with SET, all requests arrive at the Gateway in MIME encapsulated HTTP format. Similarly, all responses from the Gateway to the merchant servers will be transferred in HTTP. The HTTP protocol stipulates that a request-response pair will go through the same TCP connection and that the originator, in this case a merchant server, will establish a connection to send the request and will take down the connection when it has received the response.

Host Payment Protocols

Message conversions performed by the Gateway will be significantly more than format transliterations: per-protocol differences in data elements and message semantics must be considered carefully. Some of the transaction types that are supported are listed below.

| Transaction Types |
| --- |
| Credit card sale with capture |
| Credit card sale without capture |
| Credit card sale with capture including AVS (MasterCard and VISA) |
| Credit card sale without capture including AVS (MasterCard and VISA) |
| Credit card return (Credit) |
| Credit card post authorization (Force Post) |
| Credit card post authorization (Force Post) with partial reversal support, enhanced authorization data, and AVS result code (VISA) |
| Credit card sale with capture - Void |
| Credit card return (Credit) - Void |
| Totals request (for balancing) |

Host Communications Protocols

A virtual, private network between the Gateway and the host processor is established to expedite host communication. In addition, two Network Interface Processors (NIP) s—a "near end" NIP that interfaces to the Gateway and a "far end" NIP that interfaces to the host. The NIPs will handle virtual connections between themselves. The far-end NIP will take care of specific communication details. The near-end NIP is an IP-addressable device that converts between TCP messages and packets. It is installed on a public network 2330, which is a LAN outside the corporate firewall. The Gateway, on the secure public network 2330, utilizes TCP/IP 2320 to communicate with the near-end NIP.

GATEWAY FEATURES

Because the Gateway must sustain reliable operations and enable graceful evolution, it is designed with some important attributes, including: Security, Availability, Performance, Scalability, and Manageability.

Security

Channel Security

At the application level, SET provides signed and encrypted data encapsulations of payment information portions of the transaction messages. Transport-level encryption of the entire message packet is required for additional security. The HTTPS protocol—i.e., HTTP over SSL 3.0—is utilized between the merchants and the Gateway. The virtual connections between the near-end NIP and the host are part of a private network. The termination will occur outside the firewall. Data between the Gateway and the host is sent in the clear with no encryption. In this network configuration, a transaction between a merchant's VPOS and the host will cross the firewall four times: SET request from VPOS to Gateway, legacy request from Gateway to NIP, LEGACY response from NIP back to Gateway, and SET response from Gateway back to VPOS.

Certificate Management

Payment Protocol Certificates

The Gateway uses certificates to authenticate the two parties involved in each MOSET transaction. Through a Certificate Authority, one certificate is issued for the Gateway and one certificate for each of the merchant servers.

Secure Channel Certificates

SSL will require separate certificates for the Gateway and the merchants.

Availability

Site redundancy and location redundancy allows the Gateway to sustain service through virtually instantaneous recovery from internal failures or external disasters that cause physical damages to the system. Minimum-outage recovery is possible with redundant configurations of important components.

Site Redundancy

The Gateway supports connections to a proprietary bank network and supports mirrored disk arrays.

Location Redundancy

The Gateway architecture supports location redundancy where a secondary remote system is connected to the primary system via dedicated WAN links for software-driven database duplication.

Scalability

The Gateway software architecture, the choice of third-party software components, and the selection of hardware platforms enable the system to gracefully adapt and evolve to take on new demands in different dimensions.

The Gateway resides on an HP 9000 that is housed in a standard 19" EIA rack.

Gateway Hardware Configuration

| Server Hardware Description |
| --- |
| K-Class SMP Server - Model K420 - Standard Configuration |
| 120 MHz PA-RISC 7200 CPU |
| 128 MB ECC RAM |
| Built-in I/O includes Fast/Wide/Differential SCSI-2, EtherTwist 802.3 LAN, AUI, RS-232C Connectors, Centronics Parallel Port, and Internal Modem |
| 650 MB CD-ROM Drive |
| HP-UX 10.10 Operating System (with two-user license) |
| 4 HP-PB Slots |
| Additions |
|    1 SCSI-2 Disk Controller |
|       to support disk mirroring over dual SCSI-2 buses |
|    1 2 GB Internal SCSI-2 Disk Drive, 20 MB/s transfer rate, |
|       not mirrored for systems software and swap space |
|    1 4 GB External High-Availability Disk Arrays |
|       for databases - total of 4 × 2 MB modules required |
|    1 4 GB DAT drive with data compression |
|    1 HP-PB Slot Expansion Option |
|       provides 4 additional HP-PB slots for peripheral controllers |
|    2 FDDI interface cards (each card uses 2 HP-PB slots) |
|    1 Option for eight-user license for HP-UX |

Cryptographic Hardware

Figure 24:
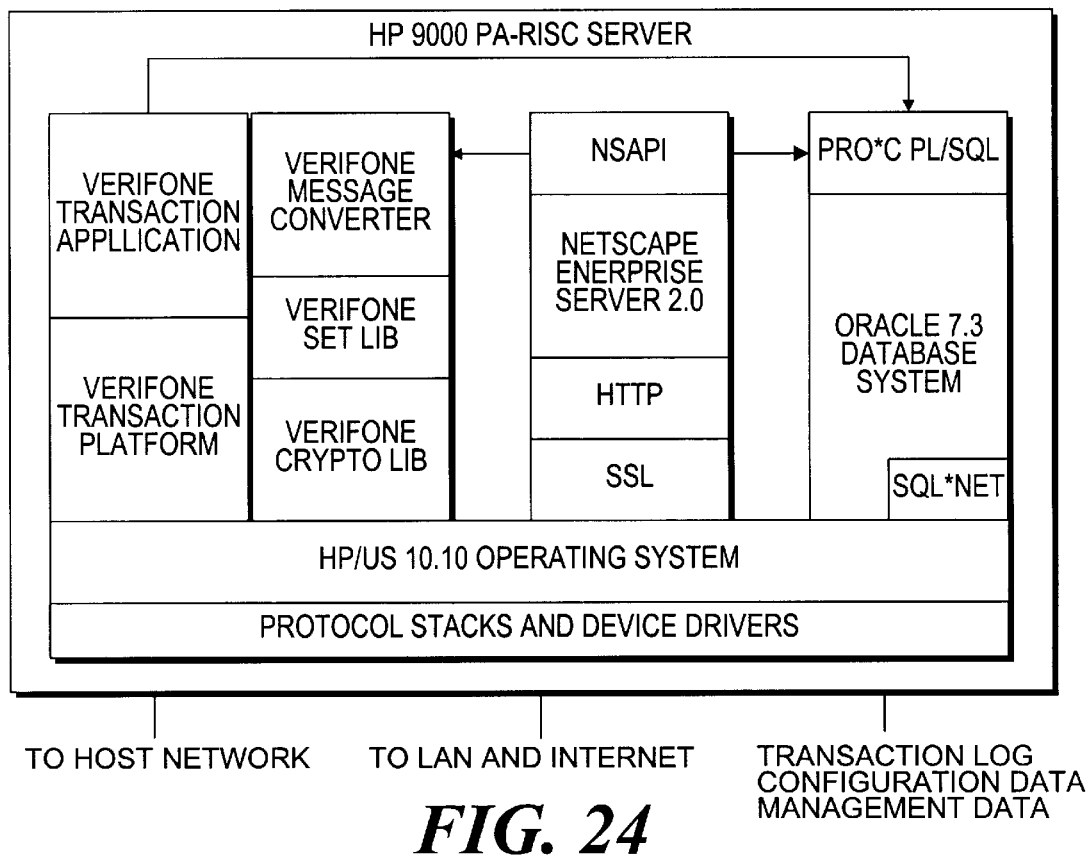
FIG. 24 is a block diagram of the Gateway in accordance with a preferred embodiment.

The encryption and decryption algorithms used in processing SET/SSL messages require significant computational power. A "security processor" is deployed with the Gateway to boost the performance of cryptographic algorithms. The processor is a networked peripheral device to the HP 9000 server. It provides cryptographic services suitable for SET/SSL processing, and its services are accessible via calls to software libraries running on HP-UX. FIG. 24 is a block diagram of the Gateway in accordance with a preferred embodiment.

Gateway Architecture

Operating System Software

The Gateway runs under the HP-UX Version 10.10 operating system and is upgraded to support future significant system releases. HP-UX 10.10 conforms to major standards, including:

X/Open UNIX 95 (conforming with the Single UNIX Specification, SPEC 1170)

X/Open Portability Guide Issue 4 Base Profile (XPG4) OSF AES

IEEE POSIX 1003.1 and 1003.2

AT&T System V Interface Definition (SVID3 base and kernel extensions subset) Level 1 API support UC Berkeley Software Distribution 4.3 (BSD 4.3) including such features as job control, fast file system, symbolic links, long file names, and the C shell System V.4 File System Directory Layout This compliance with various software standards assures that while a preferred embodiment of the invention is disclosed in association with a best mode of practicing the invention other similar software and hardware environments can be readily substituted without undue experimentation.

Relational Database Management System (RDBMS) Software

The Gateway uses Oracle7 Server version 7.3 as the RDMBS and will be upgraded to use future significant system releases. The multi-threaded, multi-server architecture of Oracle7 provides applications with scalability to high-volume transaction workloads. When deployed with the HP 9000 K-Class platform, Oracle7 performs a symmetrically parallel database operation across all available processors. In addition, Oracle7 includes options for creating high-availability systems:

The Oracle7 Parallel Server option extends the reliability of applications by transparently harnessing the power of clustered computers in a single logical processing complex that can tolerate individual machine failures.

Oracle7 Symmetric Replication provides high data availability. Data can be replicated from the primary system to one or more alternative sites.

HTTP Server

The Gateway utilizes Netscape's Enterprise Server 2.0 as the HTTP server. The server is designed for large-scale Internet commerce deployment, Enterprise Server 2.0 achieves performance and reliability with such features as optimized caching, SMP support, enhanced memory management, and SNMP-based performance monitoring. Efficient process management features minimize system load and increase server reliability. Security features are provided using the SSL 3.0 protocol.

Protocol Stacks

Internet and LAN—The TCP/IP protocol stack will be provided as part of the HP-UX operating system.

Other Application-Level Protocols Application-level protocols enable client-server interoperability. Each of the following protocols are transported using TCP or UDP.

HTML. HTML will be used to define screens for Gateway system administration.

HTTP. The HTTP layer is part of Enterprise Server 2.0. The server is administered with a Web browser.

SQL*Net. The Gateway's Oracle7 database can be accessed by administration clients using SQL*Net.

Administration software can establish database connectivity to retrieve data for generating transaction reports.

SNMP. Enterprise Server 2.0 can be monitored using SNMP. The Gateway utilizes SNMP for remote system management.

Transaction Performance Monitoring and Measurement

The "hits" performance indicators are available from the Web server. Statistics can be generated at any time to highlight the load pattern or to pinpoint the time when the server was most active.

Gateway statistics about transaction requests (by transaction type) and transaction results (e.g., success, failed due to host, failed due to authentication, etc.) can be determined at any time for a particular time interval by generating a report.

The Gateway is upgradeable to interoperate with a real-time event monitoring system such as OpenVision's Performance Manager.

TokenOpaque Contents

The Gateway requires information captured at the time of an AuthReq that must be repeated to the host at the time of the associated CapReq. The mechanism of choice (built into SET) for this is enabled utilizing this data in the TokenOpaque token of the CapToken which is sent in an AuthRes. This CapToken is stored at the Merchant system and represented to the Gateway at the time of the CapReq. The format of an TokenOpaque is an OctetString.

The following general format (not specific to LEGACY) is proposed for capturing this information:

| Field Name | Field Data Type | Explanation/Example |
|---|---|---|
| VersionName | char(8) | e.g. "LEGACY" |
| VersionRevision | char(8) | e.g. "1.0" (generally <major, minor>) |
| PILength | integer | length of PI data |
| PI | unsigned char(PILength) | strongly encrypted |
| HostSpecDataLength | integer | length of host specific data |
| HostSpecData | unsigned char(HostSpecDataLength) | host specific data |

Host Specific Data (LEGACY-only)

For "LEGACY" version "1.0", it is proposed that newline separated "name[length]=value" pairs be used to store the host specific data. A null character will terminate the host specific data. The following host specific data (name value pairs) will need to be included:

BrandID

CPSACIFlag

CPSTransactionId

CPSValidationCode

VisaResponseCode

MerchantCategoryCode

EntryMode

NOTE: PI contains PAN and ExpiryDate.

Certificate Processing

Merchants require a mechanism for verifying legitimate cardholders is of valid, branded bankcard account numbers. A preferred embodiment utilizes technology to link a cardholder to a specific bankcard account number and reduce the incidence of fraud and thereby the overall cost of payment processing. Processing includes a mechanism that allows cardholder confirmation that a merchant has a relationship with a financial institution allowing it to accept bankcard payments. Cardholders must also be provided with a way to identify merchants they can securely conduct electronic commerce. Merchant authentication is ensured by the use of digital signatures and merchant certificates.

In a preferred embodiment, a holder of a payment instrument (cardholder) surfs the web (Internet) for required items. This is typically accomplished by using a browser to view on-line catalog information on the merchant's World Wide Web page. However, order numbers can be selected from paper catalogs or a CD-ROM and entered manually into the system. This method allows a cardholder to select the items to be purchased either automatically or manually. Then, the cardholder is presented with an order form containing the list of items, their prices, and totals. The totals could include shipping, handling and taxes for example. The order form is delivered electronically from the merchant's server or created on the cardholder's computer by electronic shopping software. An alternative embodiment supports a negotiation for goods by presenting frequent shopper identification and information about a competitor's prices.

Once the price of goods sold and the means of payment has been selected, the merchant submits a completed order and the means for payment. The order and payment instructions are digitally signed by cardholders who possess certificates. The merchant then requests payment authorization from the cardholder's financial institution. Then, the merchant sends confirmation of the order, and eventually ships the goods or performs the requested services from the order. The merchant also requests payment from the cardholder's financial institution.

Figure 1C:
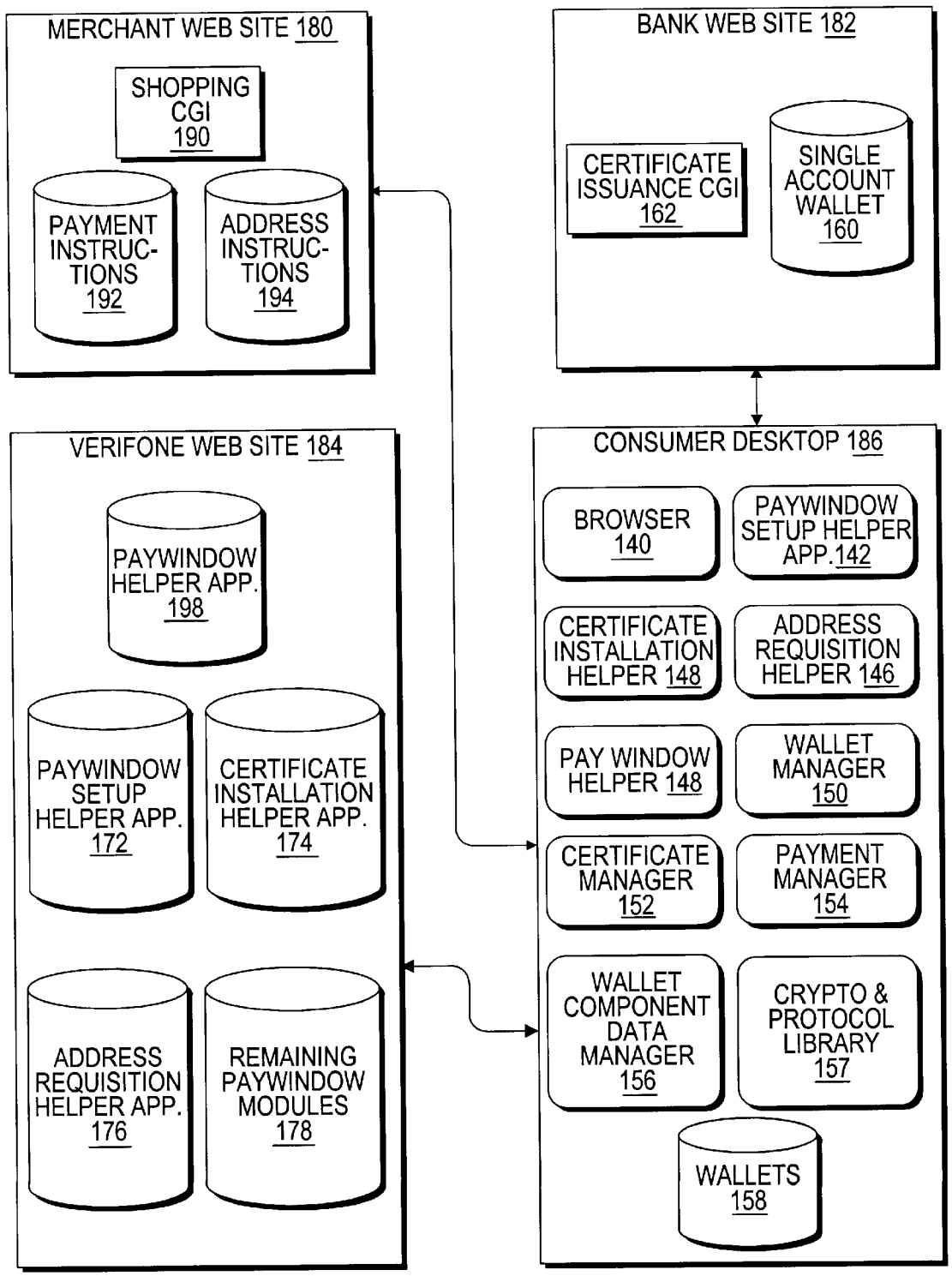
FIG. 1C is a block diagram of the system in accordance with a preferred embodiment.

FIG. 1C is a block diagram of a payment processing system in accordance with a preferred embodiment. The Certificate Issuance at the Bank Web Site 162 resides at the bank web site 182. It is utilized for issuing SET complaint/X.500 certificates to consumers. The implementation of this system may vary from one bank to another. However, the system gathers consumer's personal information, and after processing the information, the system issues a certificate along with a payment instrument to the consumer.

The Single Account Wallet 160 at the bank web site 182 represents the MIME message that is created by the Certificate Issuance system. This MIME message contains a VeriFone wallet. The VeriFone wallet contains a single payment instrument and the certificate associated with it. For security reasons, the private key is not included in the wallet. The has to specify a private key before using the instrument for payment. When the consumer is issued the certificate, this MIME message is sent to the browser. The browser launches the Certificate Installation application 174, 144 which is defined as a helper application in the browser. The Certificate Installation application 174, 144 reads the MIME message and install the wallet into the wallet database 158.

Various helper applications 198, 172, 174, 176 are provided to make the consumer's shopping experience easy and efficient including the following helper applications. The Paywindow helper application 198 is utilized by the consumer to authorize the payment to the merchant, to administer their wallets, to review their previously completed payment transactions and to perform housekeeping activities on the wallets. This application is defined as a 'helper' application on the consumer's desktop. The browser launches this application when the merchant system sends a MIME message requesting payment.

The PayWindow Setup Helper application 172 is used by the consumer to install helper applications and other modules from the web site onto the consumer desktop. When a consumer attempts to install an application for a first time, the consumer does not have a helper application on the desktop. Thus, the first time installation of an application requires a consumer to perform two steps. First the user must download the system package to their desktop and then the user must run setup to decompress and install the system. Thereafter, whenever the consumer gets a new release of system software, the browser launches this helper application which in turn installs the appropriate other system modules.

The Certificate Installation Helper Application 174 is utilized to install a wallet that is issued by a bank. When the bank's certificate issuance web system sends the MIME message containing the VeriFone wallet, the browser launches this application. This application queries a consumer to determine if the payment instrument contained in the wallet is to be copied to an existing wallet or to be kept in the new wallet. This application then installs the payment instrument and the certificate into the wallet database 158.

The Certificate Issuance CGI scripts 162 and the Single Account Wallet 160 at the Bank Web Site 182 is processed as described in the native system. The Certificate Installation Applet of the Bank Web Site 182 is utilized by the Certificate Issuance CGI scripts 162 system to deliver a consumer's certificate to the consumer's desktop.

Figure 26:
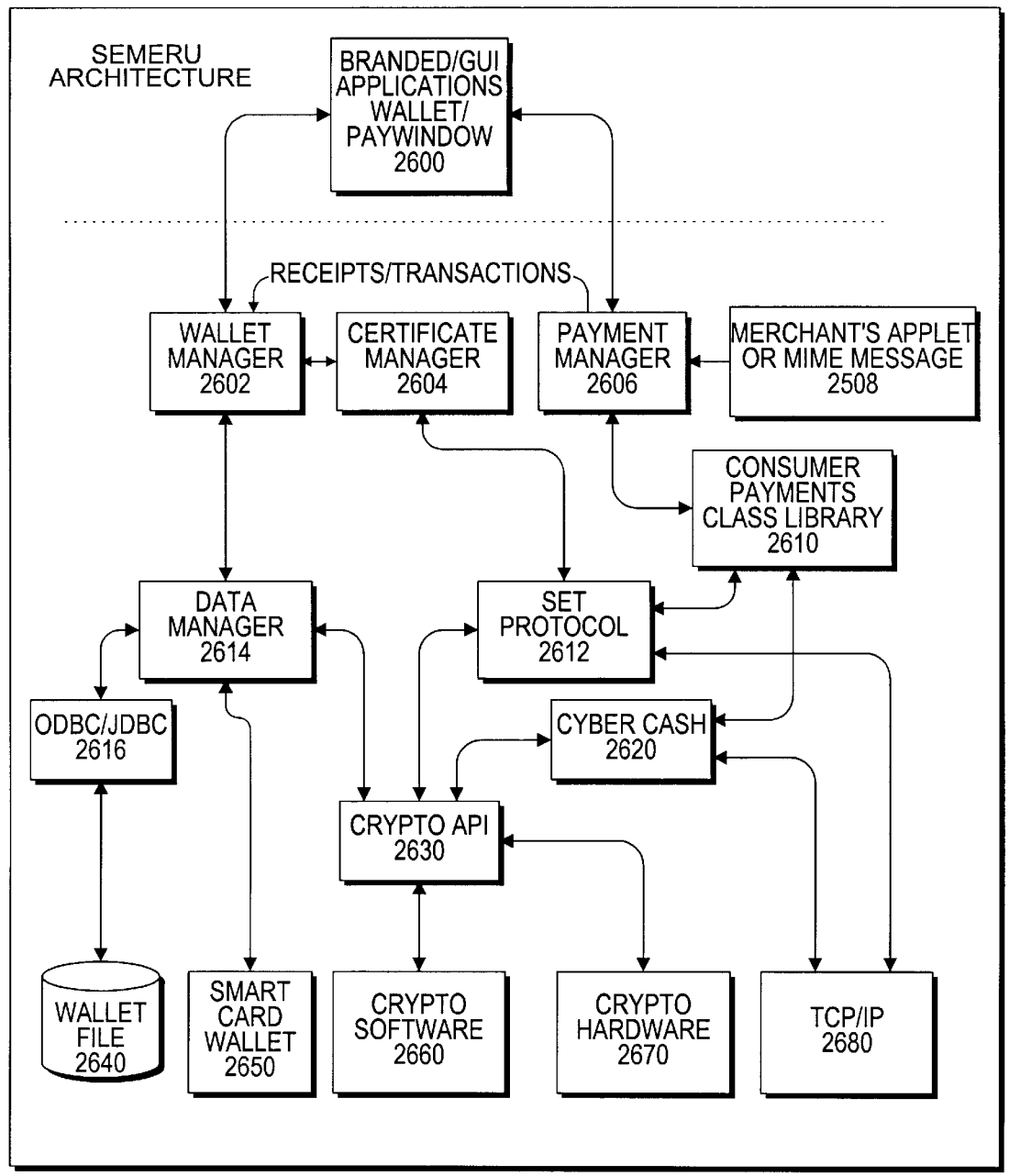
FIG. 26 is an architecture block diagram in accordance with a preferred embodiment.

FIG. 26 is an architecture block diagram in accordance with a preferred embodiment of the subject invention. Processing commences at function block 2600 where the Graphical User Interface (GUI) part of the application is initialized. The GUI application 2600 provides the consumer with support for ordering and making payments during the shopping process. There are also GUI components provided for wallet creation; importing, certificate and payment method creation and maintenance; and for transaction register review and reporting. The screen designs, and their associated logic, for the helper applications and applets are individually discussed in detail below.

The Certificate Manager 2604 manages the automatic downloading of a consumer's certificate from a bank, validation of a consumer's and a merchant's certificates and automatic requisition of certificate renewal.

The Payment Manager 2606 coordinates and completes the payment request that is received from the merchant system. The payment request is received via a MIME message in the native code implementation or via an applet in the Java implementation. The payment request received contains the final GSO, Ship-To name, merchant certificate, merchant URL, coupons and the payment amount. The payment manager 2606 then communicates with the payment related GUI component to interact with the consumer to authorize and complete the payment transaction. The Payment Manager 2606 is also responsible for determining the payment protocol based on the consumer's payment instrument and the merchant's preferred payment protocol.

Figure 27:
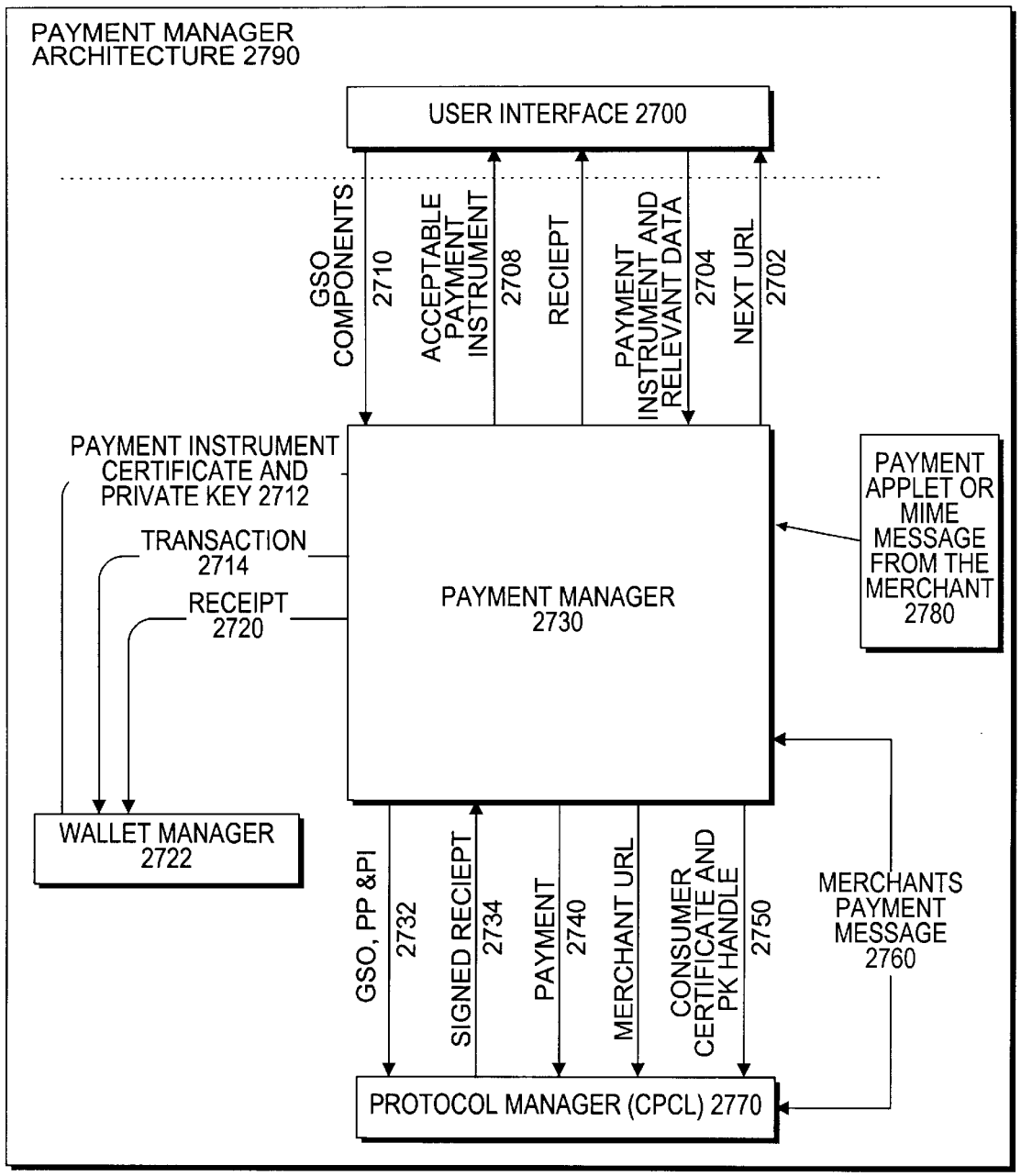
FIG. 27 is a block diagram of the payment manager architecture in accordance with a preferred embodiment.

The Payment Manager 2606 includes a well defined Application Programming Interface (API) which enables OEMs to interface with the payment manager 2606 to make payments to specific HTTP sites. The detailed logic associated with the payment manager 2606 is presented in FIG. 27.

The payment manager 2606 enforces standard operations in the payment process. For example the receipt and the transaction record can automatically be transferred to the Wallet file once the payment is completed. The payment manager architecture in accordance with a preferred embodiment is presented in FIG. 27. A user interfaces with the payment manager 2730 via a user interface 2700 that responds to and sends a variety of transactions 2710, 2708, 2706, 2704 and 2702. The transactions include obtaining the next record, payment record, receipt, acceptance of the payment instrument and GSO components. In turn, the payment manager 2730 sends transactions 2714 and receipts 2720 to the wallet manager 2722 and receives payment instruments, certificates and private keys from the wallet manager 2722.

The payment manager 2730 also sends and receives transactions to the protocol manager 2770 including a merchant's payment message 2760, a consumer certificate and PK handle 2750, a merchant URL 2742, a payment 2740, a signed receipt 2734 and a GSO, Selected Payment Protocol and Selected Payment Instrument 2732. The payment manager 2730 also accepts input from the payment applet or MIME message from the merchant as shown at function block 2780. One aspect of the payment processing is a Consumer Payments Class Library (CPCL) 2770 which encapsulates the payment protocols into a single API. By encapsulating the payment protocols, applications are insulated from protocol variations. A SET Protocol provides an implementation of the client-side component of the Secure Electronic Transaction (SET) Protocol. A complete implementation of the client-side component of the CyberCash micro-payment protocol is also provided.

The Wallet Manager 2722 provides a standard interface to the wallet. It defines the wallet database structures and the payment instrument data structures, controls the access to the wallet and provides concurrency checking if more than one application attempts to open the same wallet. The interface to the wallet manager 2722 is published to allow OEMs to interface with the wallet manager and access the wallet database. The wallet manager consists of the following sub-components:

Wallet Access. This component provides an interface to read and write wallet information.

Transaction Manager. This component provides an interface to read and write transaction corresponding to a wallet into the wallet database.

Payment Instrument Manager. This component manager provides a common interface to the specific payment instrument access components.

Credit Card Access, Debit Card Access, Check Access. These components deal with a specific payment instrument.

A Data Manager provides storage and retrieval of generic data items and database records. It is assumed that data fields, index fields or entire data records can be marked as encrypted and the encryption process is largely automated. The data manager has no specific knowledge of database records appropriate to different payment methods. This layer is separated out so as to reduce changes required when new payment methods arc introduced. However RSA key pairs and certificates might be considered as "simple" data types. This component also provides an abstraction which supports wallet files on computer disk or contained in smart cards.

The Open Data Base Connectivity (ODBC)/Java Data Base Connectivity (JDBC) component provides Data Base Connectivity where formal database components are required. An embodiment of the Smart Card Wallet allows wallet data to be stored and/or secured by a cryptographic token.

A preferred embodiment includes a single file or directory of files comprising a "wallet" which contains personal information and information about multiple payment methods with the preferred implementation. These payment methods (Visa cards, debit cards, smart cards, micropayments etc.) also contain information such as account numbers, certificates, key pairs, expiration dates etc. The wallet is envisaged to also contain all the receipts and transaction records pertaining to every payment made using the wallet. A Cryptographic API component provides a standard interface for RSA and related cryptographic software or hardware. This support includes encryption, signature, and key generation. Choice of key exchange algorithm, symmetric encryption algorithm, and signature algorithm should all be configurable. A base class stipulates generic behavior, derived classes handle various semantic options (e.g. software based cryptography versus hardware based cryptography.)

The Cryptographic Software portion provides RSA and DES support. This may be provided utilizing the SUN, RSA or Microsoft system components depending on the implementation selected for a particular customer. Cryptographic Hardware creates a lower level API which can underpin the Cryptography API and be utilized to replace Cryptography Software with an off the shelf cryptography engine. The message sequence charts describe the flow of messages/data between the consumer, the browser and/or the various major components of the Semeru system. The major components of the system are the Merchant system which includes the VPOS, the PayWindow, and the Payment Gateway. The merchant system allows a consumer to shop, accept the payment transactions sent by the PayWindow application, and send payment transactions to the acquiring bank. The Consumer Payments Class Library (CPCL) module is a layer within the application which sends the payment transactions, securely, from the consumer to the merchant.

Figure 28:
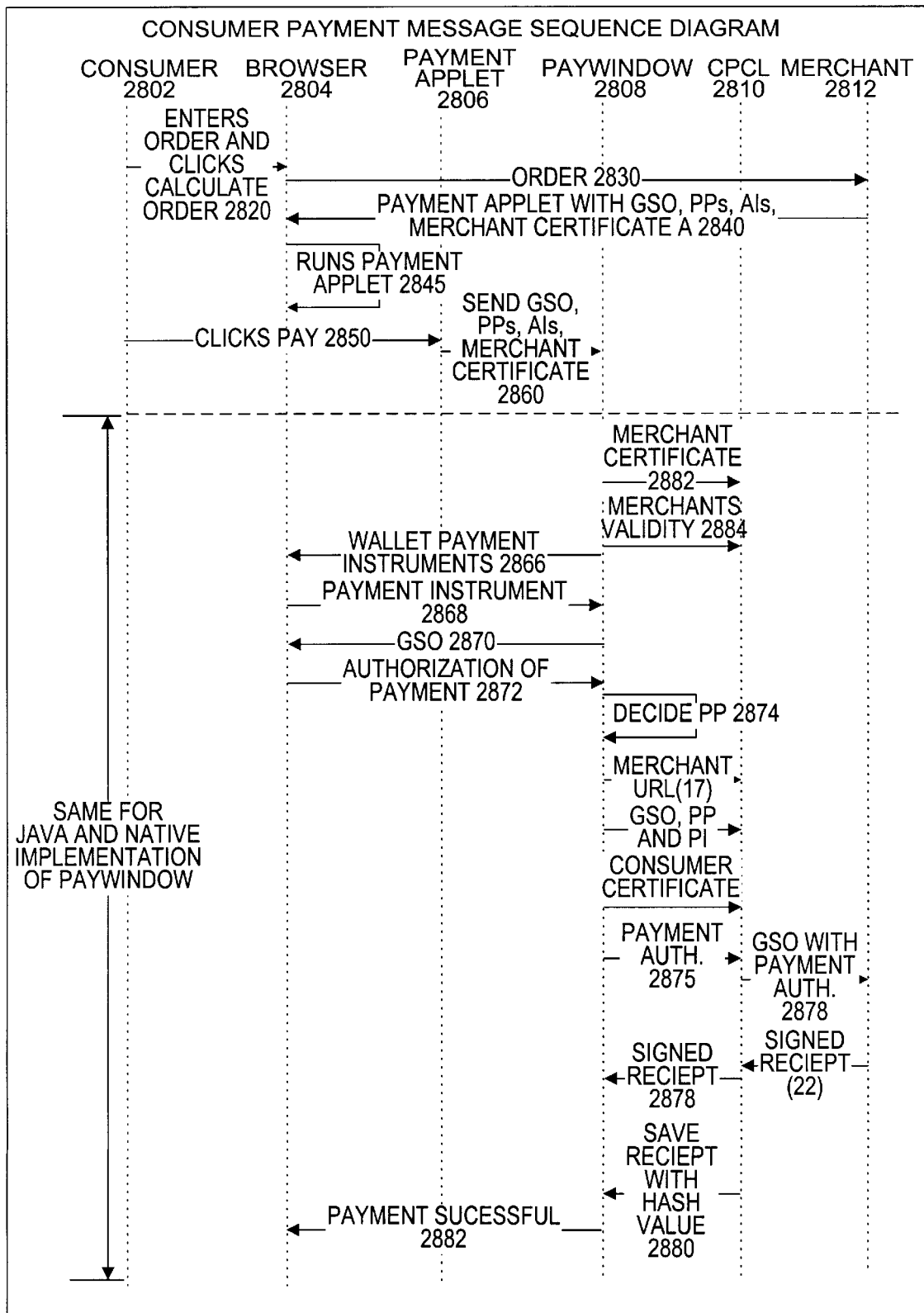
FIG. 28 is a Consumer Payment Message Sequence Diagram in accordance with a preferred embodiment of the invention.

FIG. 28 is a Consumer Payment Message Sequence Diagram in accordance with a preferred embodiment of the invention. The diagram presents the flow of messages between the consumer, the browser, the merchant system, the PayWindow application, and CPCL. This message flow describes the payment process from the time an order is completed and the consumer elects to pay, to the time the payment is approved and the receipt is returned to the consumer. The difference between the Native implementation and Java implementation of the PayWindow application is in the delivery of the order information to the PayWindow. Once the order information is received by the PayWindow, the flow of messages/data is the same for both implementations. In the case of the Native implementation, the order information is delivered via a MIME message. This MIME message is sent to the PayWindow by the browser via a document file. In the Java implementation, the order information is delivered to the PayWindow by an applet. The merchant system sends an applet with the order information to the browser which in turn delivers the order to the PayWindow. Once the order is received, the PayWindow interacts with the consumer and the Protocol modules for the completion of the payment process.

Enters Order and Clicks Calculate Order 2820

This message represents the consumer order entry and the clicking of the 'Calculate Order' button. The consumer's shopping experience is all condensed into this one message flow for the purpose of highlighting the payment process. The actual implementation of the shopping process varies, however, the purpose does not, which is the creation of the order.

Order 2830

This message represents the order information which is sent by the browser to the merchant via an HTML form.

Payment Applet with GSO, PPPs, AIs, merchant certificate and URL 2840

On receipt of the order, the merchant system calculates the payment amount. This message represents the HTML page which is sent by the merchant system detailing the payment amount along with the Java payment applet which contains the GSO, PPPs, AIs, merchant certificate and URL.

Run Payment Applet 2845

The Java enabled browser runs the Payment applet. The applet displays a button called "Pay" for the consumer to click. This is embedded in the HTML page delivered by the merchant.

Clicks Pay 2850

This message represents the clicking of the Pay button on the browser by the consumer after confirming the payment amount.

GSO, PPPs, AIs, merchant certificate and URL 2860

This message represents the GSO, PPPs, AIs, merchant certificate and the merchant URL carried by the Java applet. The Java applet now delivers these to the PayWindow application.

Merchant certificate 2862

This message represents the merchant's certificate which is sent to the CPCL module for checking the validity of the merchant.

Merchant's validity 2864

The CPCL modules examines the merchant's certificate and sends this message to the PayWindow indicating whether or not the merchant is a valid merchant.

Wallet, Payment Instruments 2866

This message represents the wallets and payment instruments that is displayed to the consumer. Not all payment instruments from a wallet are shown to the consumer. Only the ones accepted by the merchant are shown.

Payment Instrument 2868

This message represents the payment instrument selected by the consumer. This message is created in the current design when the user double clicks on the payment image in the "Select Payment Method" Window.

GSO 2870

This indicates that the GSO is displayed to the consumer in the "Make Payment Authorization" screen.

Authorization of Payment 2872

This message represents the authorization of the payment by the consumer. The consumer authorizes the payment by clicking the 'Accept' button on the "Payment Authorization" screen.

Decide Payment Protocol 2874

Once the consumer authorizes the payment, the payment protocol is decided by PayWindow based on the merchant's Payment Protocol Preferences and the consumer selected payment instrument.

Payment Authorization 2875

These messages represent the merchant's URL, the GSO, payment protocol (PP) to use, account number, certificate and the private key handle (PK) associated with the payment instrument which is sent to the protocol module.

GSO with Payment Authorization 2876

This message represents the payment instructions which is sent by the protocol module to the Merchant system. The GSO, PI, consumer certificate and PK is packaged based on the payment protocol.

Signed Receipt 2878

This message represents the digitally signed transaction receipt received by the protocol module from the merchant.

Save Receipt with hash value 2880

The digitally signed transaction receipt is saved by the PayWindow for future reference.

Payment Successful 2882

This indicates that the transaction receipt and the 'payment successful' have been displayed to the consumer.

Certificate Processing

A payment instrument must be certified by a "certificate issuing authority" before it can be used on a computer network. In the case of credit card payments, the issuer may be one of the card issuing banks, but it might also be a merchant (eg SEARS), a transaction acquiring bank or an association such as VISA or Mastercard.

Payment instrument information is stored in the consumer's wallet. The certificate which authorizes the payment instrument will be stored along with that data in a secured database. The process of acquiring a certificate is described below. A certificate can be delivered to a consumer in a preconfigured wallet. The consumer receives a wallet which contains the certificate together with the necessary details associated with a payment instrument including a payment instrument bitmap which is authorized by a certificate issuing authority or the agencies represented by the issuing authority.

Obtaining a Certificate

A consumer will deliver or cause to be delivered information to a certificate issuing authority. FIG. 29 is an illustration of a certificate issuance form in accordance with a preferred embodiment. A user may fill out the form on-line, on paper and mail it in, or get his bank or credit card company to deliver it. The consumer delivered data will usually contain a public key belonging to a security key pair generated by consumer software. This information will normally be mailed to the consumer's address and actuated by a telephone call from the consumer. The certificate authority takes this information and uses it to validate that he is indeed entitled to use the payment method. This processing normally takes a few days to accomplish. Information will normally be exchanged with the organization issuing the payment method in the physical space if there is one, and with credit agencies. The certificate information is loaded into the consumer's software to enable payment processing to proceed online.

In some cases the consumer will be able to select details about a payment instrument holder (wallet) he desires to own. This may be the icon representing a holder, the access password or other information. After creating the certificate, the issuing authority can use information received in the certificate application to create a custom payment instrument holder ready to use. This payment instrument holder will contain the following information. Payment instrument information including card number 2900 and expiration date 2902. Personal information including name 2904, address 2906, social security number 2908 and date of birth 2910.

Figure 30:
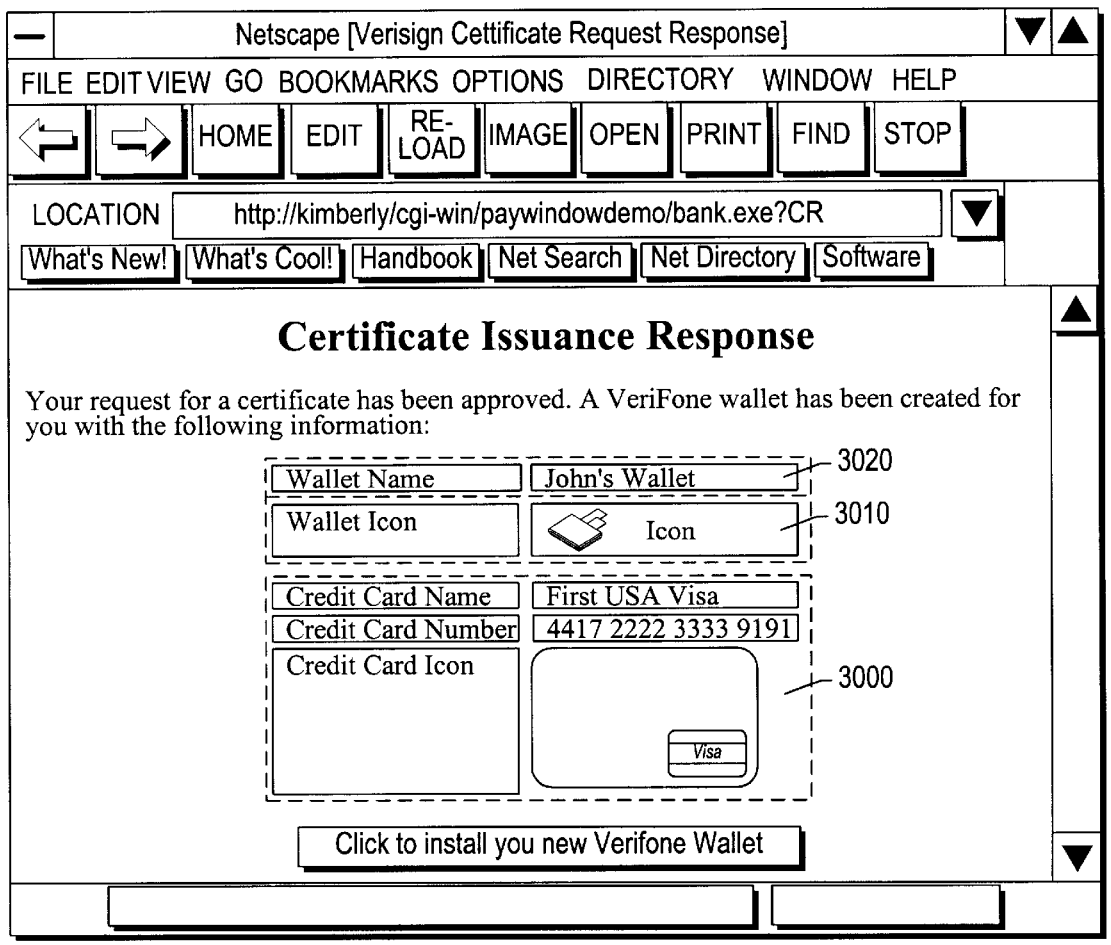
FIG. 30 illustrates a certificate issuance response in accordance with a preferred embodiment.
Figure 31:
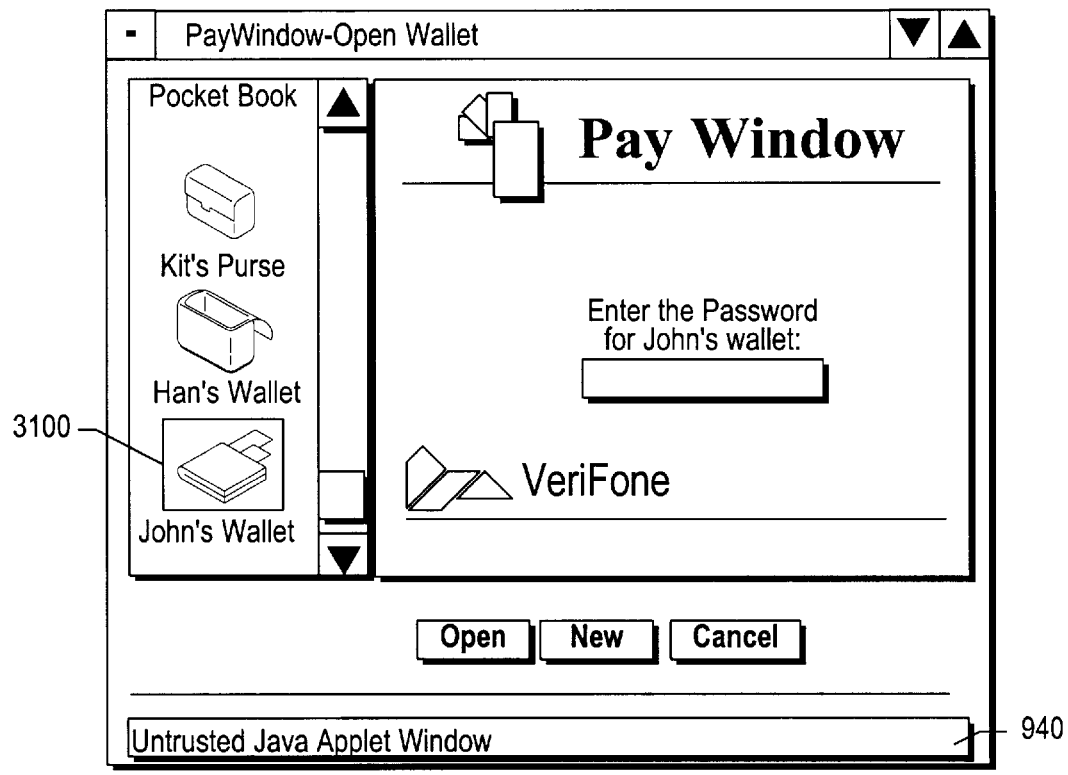
FIG. 31 illustrates a collection of payment instrument holders in accordance with a preferred embodiment.
Figure 32:
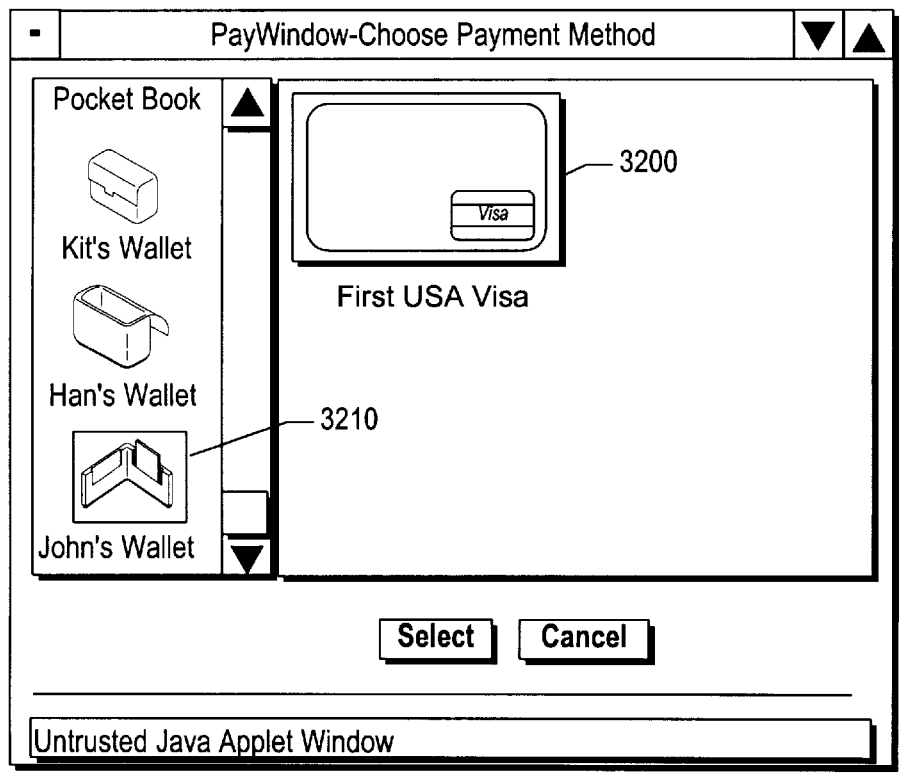
FIG. 32 illustrates the default payment instrument bitmap in accordance with a preferred embodiment.

The associated certificate (eg X509 standard), an associated public key or in some cases public/private key pair (eg RSA), and an approved bitmap representing the payment instrument are provided to the requesting consumer. FIG. 30 illustrates a certificate issuance response in accordance with a preferred embodiment. An approved bitmap for a VISA card is shown at 3000. Also a default payment holder 3010 and a default payment holder name are provided with the certificate issuance. After the consumer aquires the payment instrument holder 3010, the payment instrument holder is immediately visible to him in his collection of payment instrument holders. FIG. 31 illustrates a collection of payment instrument holders in accordance with a preferred embodiment. The predefined payment instrument holder 3100 is the same JOHN's WALLET that was predefined based on defaults by the certificate issuance form. FIG. 32 illustrates the default payment instrument bitmap 3200 associated with the predefined payment instrument holder 3210 resulting from the consumer filling in and obtaining approval for a VISA card.

Figure 33:
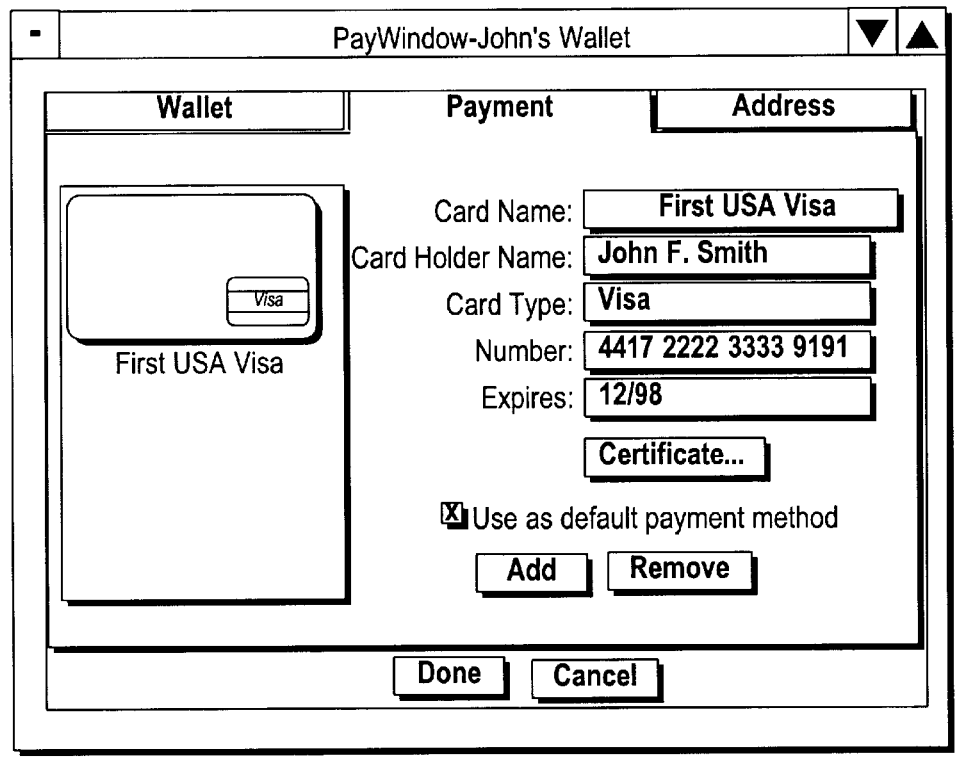
FIG. 33 illustrates a selected payment instrument with a fill in the blanks for the cardholder in accordance with a preferred embodiment.
Figure 34:
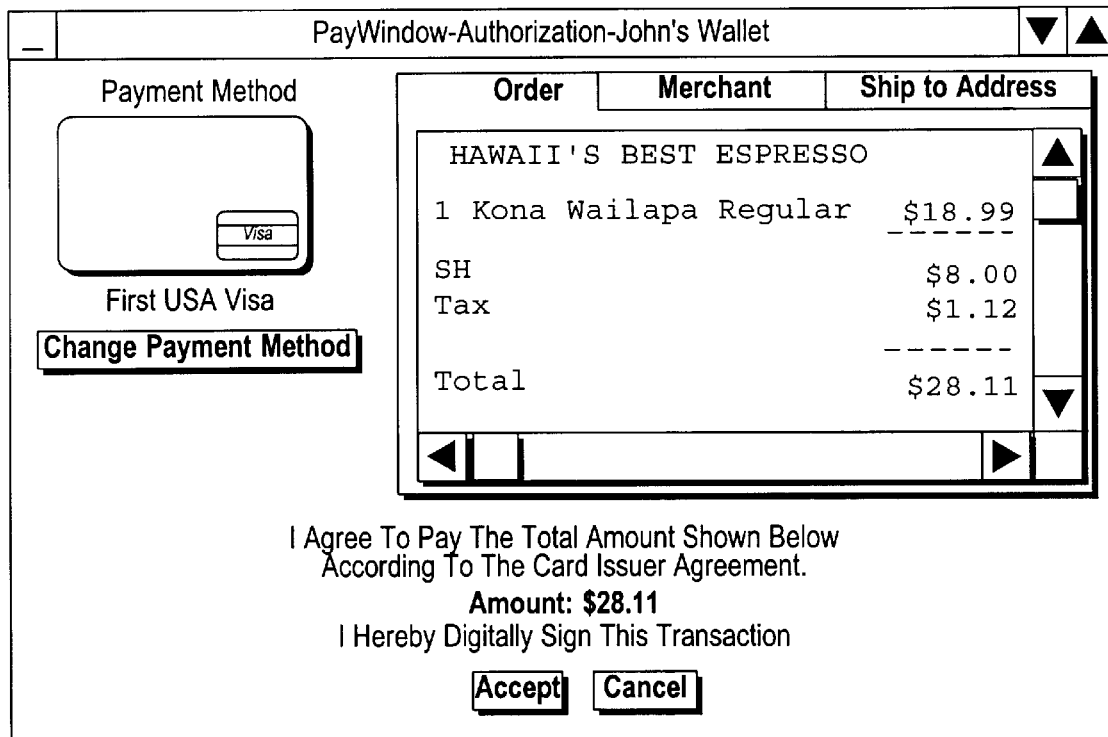
FIG. 34 illustrates a coffee purchase utilizing the newly defined VISA card in accordance with a preferred embodiment of the invention.

FIG. 33 illustrates a selected payment instrument with a fill in the blanks for the cardholder in accordance with a preferred embodiment. Next time the payment instrument holder is opened in a payment context the certificate issuing authority's approved instrument bitmap can be used to select the payment instrument and utilize it to make purchases. FIG. 34 illustrates a coffee purchase utilizing the newly defined VISA card in accordance with a preferred embodiment of the invention.

Figure 35:
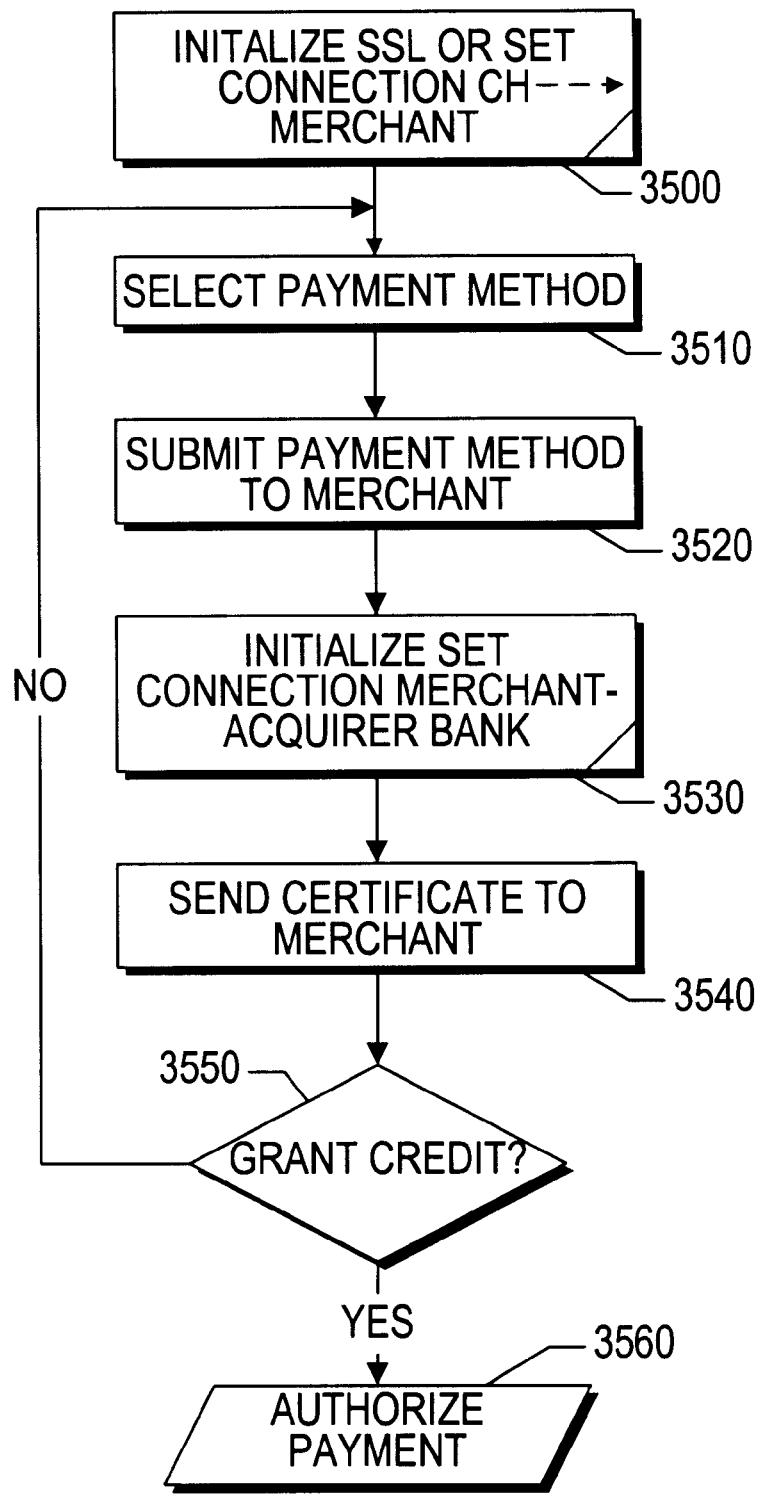
FIG. 35 is a flowchart of conditional authorization of payment in accordance with a preferred embodiment.
Figure 36:
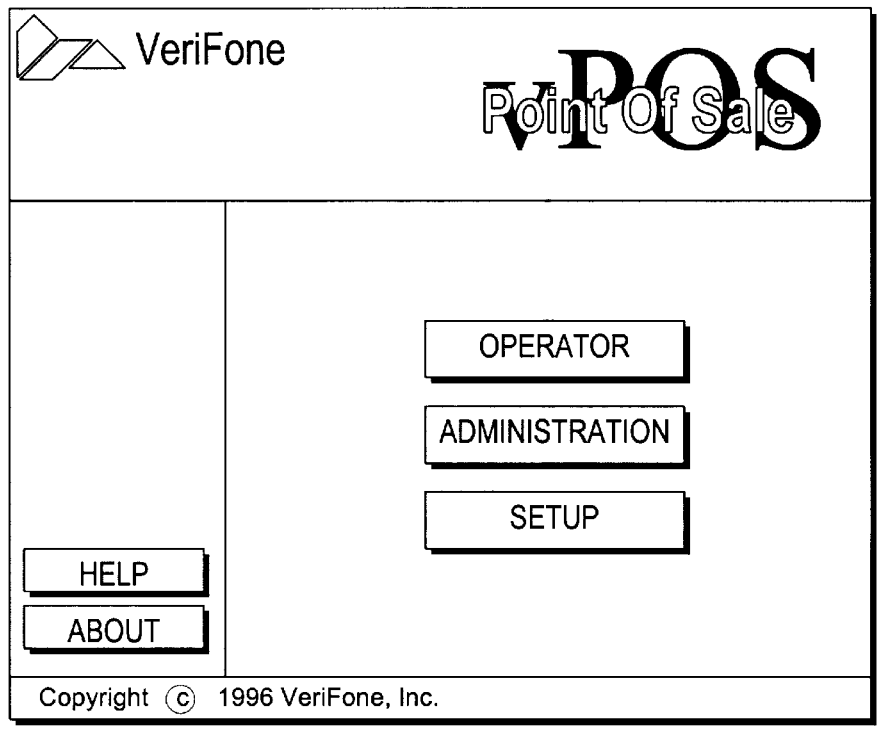
Figure 37:
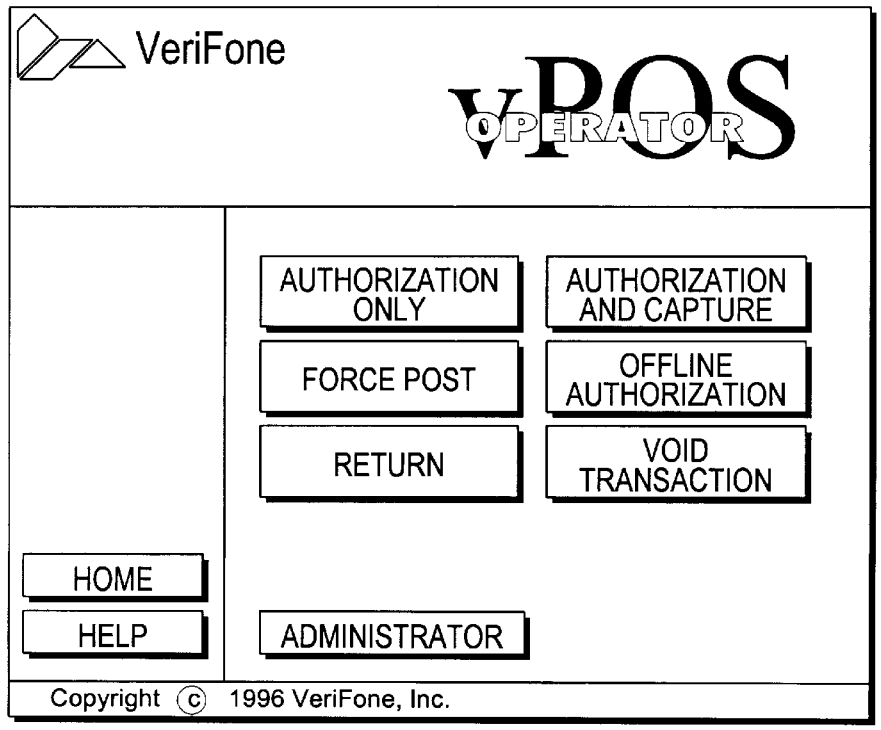
Figure 38:
Figure 39:
Figure 44:
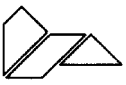
Figure 45:
Figure 46:
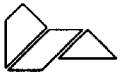
Figure 47:

FIG. 35 is a flowchart of conditional authorization of payment in accordance with a preferred embodiment. Processing commences at 3500 where the program initializes the connection between the cardholder and the merchant for the purposes of shopping. After the cardholder completes shopping, a new SSL connection is established which provides authenticating information to the merchant. At this point the merchant is able to execute payment functionality (based on SSL or SET) conditionally, based upon the quality and character of the digital signature and the certificate used to validate said signature. Then, at function block 3510, the cardholder selects the payment instrument for the particular transaction. Payment instruments could include VISA, MASTERCARD, AMERICAN EXPRESS, CHECK, SMARTCARD or DEBIT CARDS. The payment method is then submitted to the merchant at function block 3520. The merchant then initializes the SET connection to the acquiring bank at function block 3530 if the connection is not already established. Then, at function block 3540, the certificate is submitted to the merchant from the acquiring bank. The certificate includes a public key portion and a private key used as an irrebutable digital signature to authenticate the parties to the transaction. The certificate also includes information on the level of credit risk which allows a merchant to conditionally decide on the authorization or rejection of credit under a particular payment instrument based on their risk level and the merchant's personal comfort level with the ability of the cardholder to pay. This processing has not previously been possible because the information returned from the authorizing bank did not include a level of credit risk a cardholder posed, it only contained credit rejected or approved.

Figure 51:
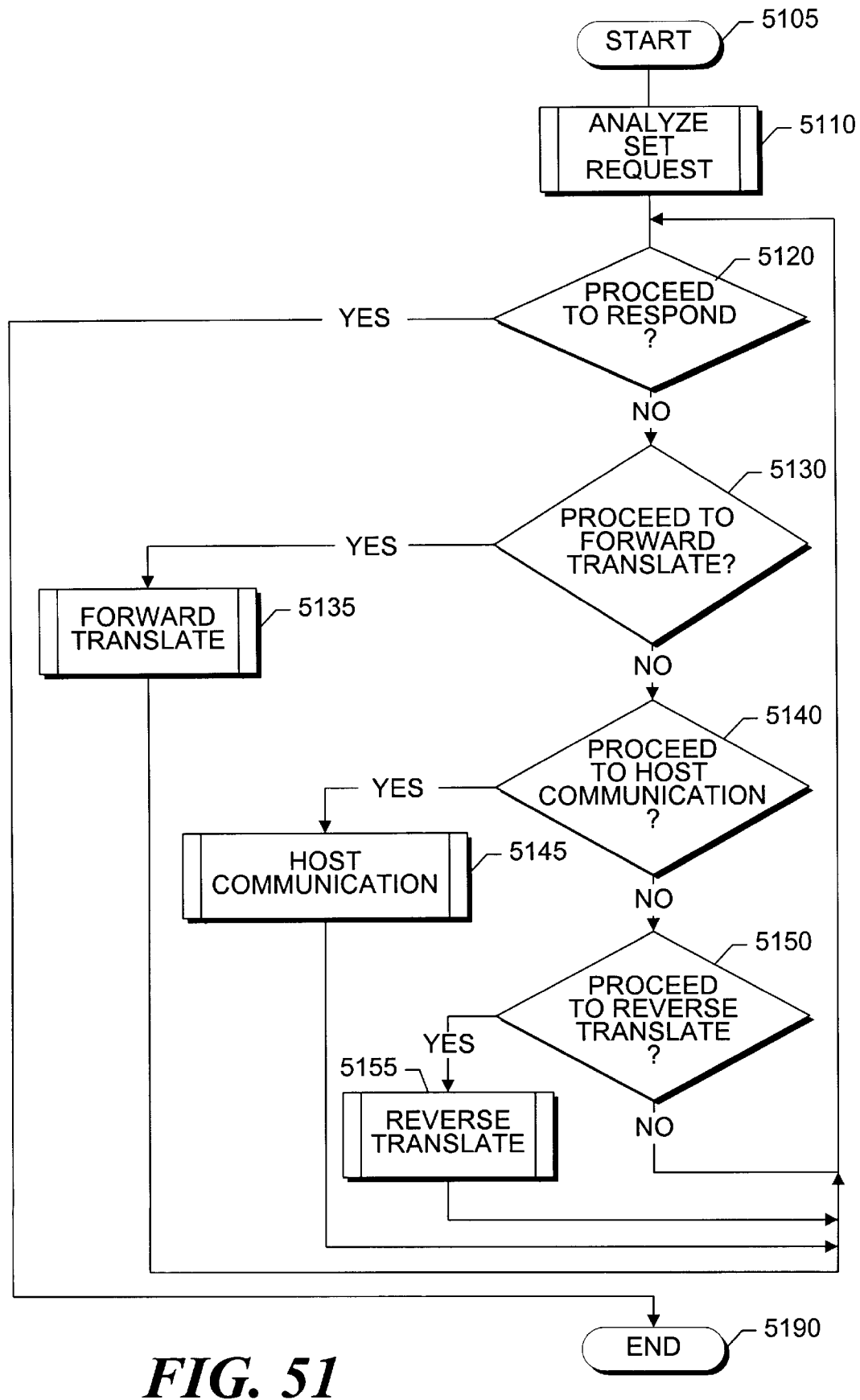
FIGS. 51–61 are flowcharts depicting the detailed logic of the gateway in accordance with a preferred embodiment.

A detailed description of the gateway internals is presented below in accordance with a preferred embodiment.
Gw_ClearSetRequestHandler FIG. 51 depicts a flow diagram for the GatewayClearSetRequestHandler routine. Execution begins in Step 5105. In Step 5110 an SET analysis routine is called to analyze the SET equest, as will be more fully disclosed below. Step 5110 sets a status flag indicating the next tage to be performed by the Gateway. In Step 5120 the Gateway checks to see whether the tatus is set to indicate that a response should be provided to the user. If so, execution proceeds to Step 5190, which ends the request handling routine and returns control to a calling routine, which then provides a response to the user. Otherwise execution proceeds to Step 5130. In Step 5130, the Gateway checks to see if the status is set to indicate that forward translation is required. Forward translation is necessary to translate an outgoing message into a format that can be understood by the host computer. If forward translation is indicated, execution proceeds to Step

5135. In Step 5135, the outgoing message is forwarded translated, as more fully disclosed below with respect to FIG. 53. If no forward translation is indicated, for example, if an already-translated transaction is being retried, execution proceeds to Step 5140. In Step 5140, the Gateway checks to see if the next step is communication to the host. If so, the Gateway proceeds to Step 5145, and initiates host communication as will be more fully discussed below with respect to FIG. 54. If not, execution proceeds to Step 5150. In Step 5150, the Gateway checks to see whether reverse translation is indicated. Reverse translation translates a response from a host into a format useable by the calling routine. If reverse translation is indicated, execution proceeds to Step 5155, and the reverse translation is performed, as will be more fully discussed below with respect to FIG. 55. In any case, after either forward translation in Step 5135, host communication in Step 5145, or reverse translation in Step 5155, control returns to Step 5120 for further processing. As will be more fully disclosed below, the forward translation, host communication, and reverse translation routines manipulate status indicators to prevent the occurrence of an infinite loop.

The Gw_ClearSetRequestHandler routine as depicted in FIG. 51 may be implemented using the following C++ code:

```
int Gw_ClearSetRequestHandler(CPCLRequest*pRequest)
{
    gwAction        action;
    char            fatalError;
    CPCLCCRequest   *pVehicle = (CPCLCCRequest*)pRequest;
    CGW_Engine      *setTrans = (CGW_Engine*)pVehicle-
>GetContext( );
action = setTrans->AnalyzeSetRequest(pVehicle,&fatalError);
while ((action!=GW_PROCEED_TO_RESPOND)&&(!fatalError)){
    switch (action){
        case GW_PROCEED_TO_FWD_XLAT:
            action = setTrans->TranslateForward(pVehicle);
            break;
        case GW_PROCEED_WITH_HOST_COMMS:
            action = setTrans->DoHostCommunication(pVehicle);
            break;
        case GW_PROCEED_TO_REV_XLAT:
            action = setTrans->TranslateReverse(pVehicle);
            break;
        case GW_PROCEED_TO_RESPOND:
        default:
            break;
    }
}
// Response should be built, return up the protocol
// stack so that it will encode and then crypt our response.
    if (fatalError)}
        // Set an error code for the protocol stack.
        pVehicle->SetError(eEInvalidRequest);
        return(0);
    }
    else {
        return(1);
    }
}
```

AnalyzeSetRequest

Figure 52A:
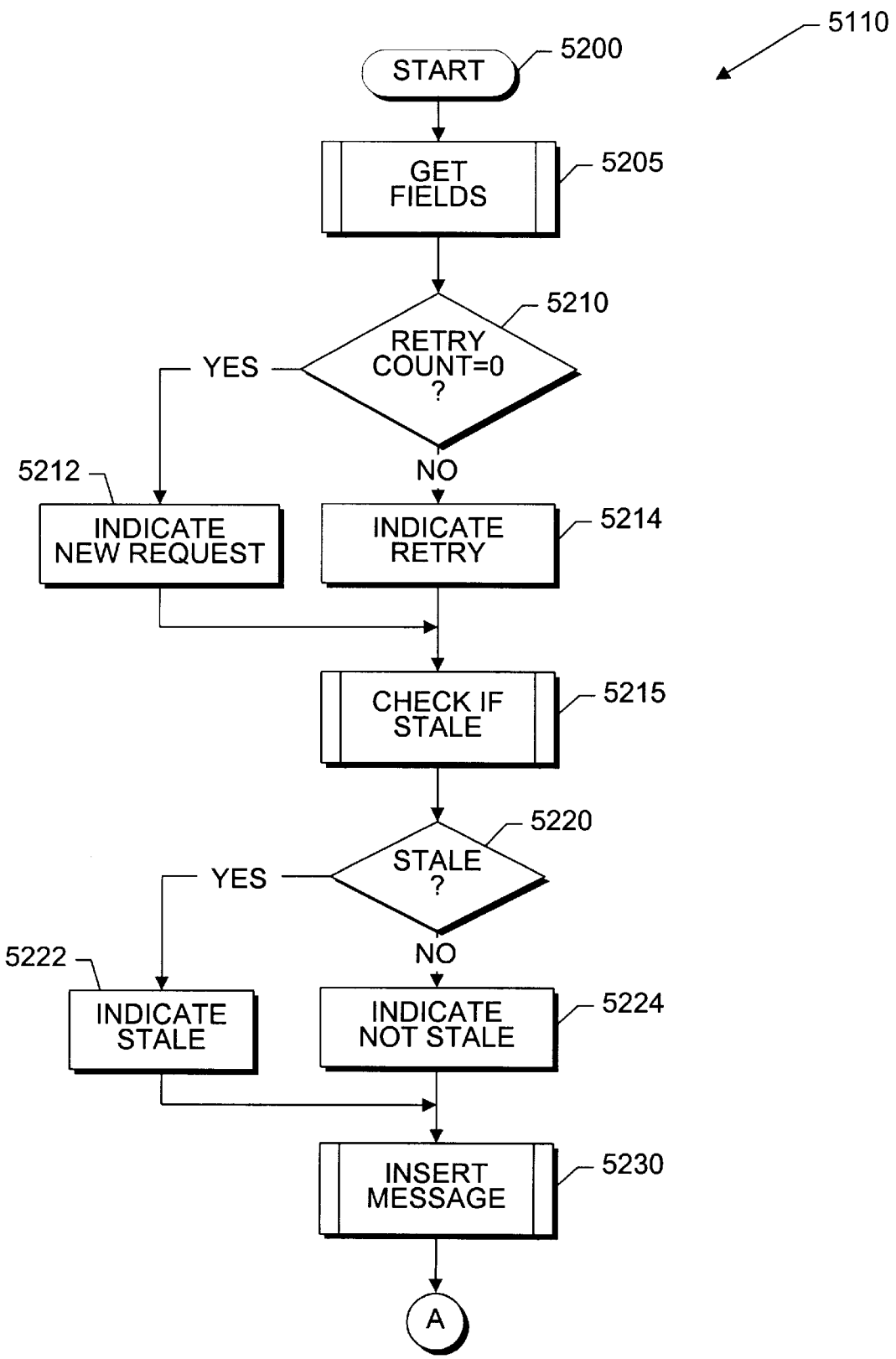
Figure 52B:
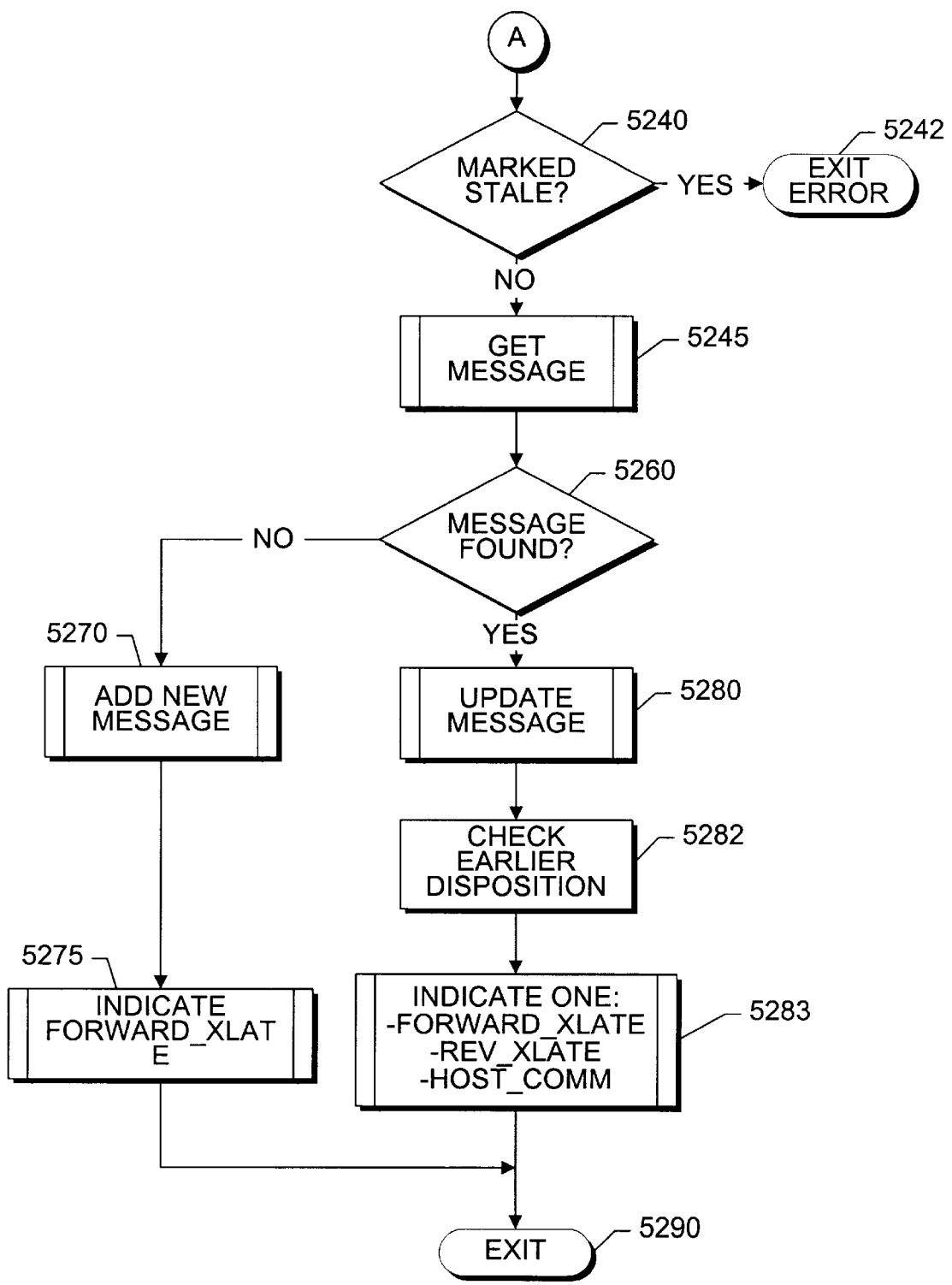

FIGS. 52A and 52B describe the AnalyzeSetRequest routine. This routine is by Step 5110 as illustrated in FIG. 51. Execution begins in Step 5200. In Step 5205 the various fields in the SET record are obtained, as will be more fully disclosed below with respect to FIGS. 56A and 56B. In Step 5210 the Gateway checks the retry count. A retry count is zero indicates that the request being analyzed is a new request, and control proceeds to Step 5212, indicating a new request. If the retry account is non-zero, this means that the request is a retry of a prior request, and control proceeds to Step 5214 where a retry is indicated.

Following either step 5212 or 5214, execution proceeds to Step 5215. In Step 5215 the Gateway checks to see whether the request represents a "stale request," as will be more fully described below with respect to FIG. 57. In Step 5220, the Gateway tests the result of the stale check from Step 5215. If the request is stale it is marked as stale in Step 5222. Otherwise the record is marked as not stale in Step 5224. Following either Step 5222 or Step 5224, control proceeds to Step 5230. In Step 5230 a message representing the SET request is inserted into the database for tracking purposes, and control proceeds to Step 5240.

In Step 5240 the Gateway checks to see if the request had been marked stale in Step 5222. If so, it proceeds to Step 5242, exiting with an error condition. In Step 5245, the Gateway attempts to retrieve from the database a message corresponding to the current SET request, as will be fully disclosed below with respect to FIG. 59. Step 5260 checks to see whether the message was successfully retrieved from the database. If the message was not found in the database, this indicates that the SET request represents a new message, and control proceeds to Step 5270. In Step 5270 a new message representing the SET request is added to the database, as is more fully disclosed below with respect to FIG. 60. Because this is a new request, it must be processed from the beginning, including forward translation. Therefore, after the new message is added in Step 5270, control proceeds to Step 5275. In step 5275, where a status flag is set indicating that the next step to be performed for this message is for translation. If the message was found in Step 5260, this indicates that the request represents a request that is already in progress. Therefore, control proceeds to Step 5280 to update the database with current information representing the request status. The update process is described in further detail with respect to FIG. 61, below. Following Step 5280, control proceeds to Step 5282. In Step 5282 the Gateway checks to see the disposition in which the SET request was left as a result of partial processing. This is done, for example, by interrogating fields in the database record that indicate the steps that have already been performed for this request. In Step 5283, based upon this status information, the Gateway indicates the next stage of processing to be performed: either forward translation, reverse translation, or communication with the host. After this status has been set, whether for a new request in Step 5275, or for an already-existing request in Step 5283, control proceeds to Step 5290, which exits the AnalyzeSetRequest routine, returning control to Step 5110 in FIG. 51.

The AnalyzeSetRequest routine as depicted in FIGS. 52A and 52B may be implemented using the following C++ code:

```
gwAction CGW_Engine::AnalyzeSetRequest(CPCLCCRequest*pVehicle, char
*fatalError)
{
    gwAction        action;
    gwDBRC          dbrc;
    gwRC            rc;
```

```
        int             retryCount;
        char            staleMsgFlag;
        *fatalError=_FALSE; // Default to "all is OK".
        // Extract the key SET fields that are required. The key
        // SET fields contain the primary key elements of the "setmsg"
        // table.
        if ((rc=GetSetKeyFields(pVehicle))!=GW_SUCCESS){
            switch(rc){
               case GW_NOT_SUPPORTED:
                   BuildSetErrorResponse(pVehicle,ISO_RESP_FUNC_NOT_SUPP);
                   break;
               default:
                   BuildSetErrorResponse(pVehicle,ISO_RESP_SYS_MALFUNC);
                   break;
           }
           *fatalError=_TRUE; // Only place we return this!
           return (GW_PROCEED_TO_RESPOND);
}
else {
       // Set this so that the front-end will be able to tell
       // whether enough information was derived from the request
       // in order to do update the "setmsg" log.
       m_haveKeyFields = 1;
}
// If the count of SET messages with current xid and rrpidbase is
// non-zero then the message is an honest retry otherwise it
// is a new request.
if ((dbrc=Gwdb_GetSetMsgRetryCount(&retryCount))==GWDB_SUCCESS){
       if (retryCount == 0)
            m_setRequestClass=GW_SREQCL_NEW_REQUEST;
       else
            m_setRequestClass=GW_SREQCL_HONEST_RETRY;
}
else {
       BuildSetErrorResponse(pVehicle,ISO_RESP_SYS_MALFUNC);
       GW_LogError(LOG_ERR, "Gwdb_GetSetMsgRetryCount( ): %d", dbrc);
       return (GW_PROCEED_TO_RESPOND);
}
// Check whether the message is stale. If it is, we still
// insert it into the database shortly but we will not process
// it.
Gwdb_IsSetMsgStale(&staleMsgFlag);
if(staleMsgFlag==_TRUE)
       m_setRequestDisposition=GW_SREQDI_STALE;
else
       m_setRequestDisposition=GW_SREQDI_OK; // Not stale.
// Log the "SET message" in the database. If the insert fails
// then we must have a replay attack!
dbrc = Gwdb_InsertSetMsg( );
switch (dbrc){
       case GWDB_SUCCESS:
            break;
       case GWDB_DUPLICATE_ON_INSERT:
            BuildSetErrorResponse(pVehicle,ISO_RESP_SECURITY_VIOLATION);
            dbrc = Gwdb_InsertReplayAttack( );
            if (dbrc != GWDB_SUCCESS){
                 GW_LogError(LOG_ERR, "Gwdb_InsertReplayAttack( ): %d", dbrc);
            }
            return (GW_PROCEED_TO_RESPOND);
            break;
       default:
            BuildSetErrorResponse(pVehicle,ISO_RESP_SYS_MALFUNC);
            GW_LogError(LOG_ERR, "Gwdb_InsertSetMsg( ): %d", dbrc);
            return (GW_PROCEED_TO_RESPOND);
            break;
}
// If the message is stale do no more.
if (m_setRequestDisposition==GW_SREQDI_STALE){
         BuildSetErrorResponse(pVehicle,ISO_RESP_SECURITY_VIOLATION);
         return (GW_PROCEED_TO_RESPOND);
}
// If we reach this far in this function then:
//       i) the request is new or an honest retry AND
//       ii) the request is not stale AND
//       iii) a setmsg record has been added for this request.
// If there is already a "host message" then update the key
// with the new retry count. If there was not a "host message"
// then insert one.
dbrc = Gwdb_GetHostMsg( );
switch(dbrc){
```

-continued

```
    case GWDB_SUCCESS:
        dbrc = Gwdb_UpdateHostMsgKeys( );
        break;
    case GWDB_ROW_NOT_FOUND:
        dbrc = Gwdb_InsertHostMsg( );
        if (dbrc != GWDB_SUCCESS){
            BuildSetErrorResponse(pVehicle,ISO_RESP_SYS_MALFUNC);
        }
        return(GW_PROCEED_TO_FWD_XLAT);
        break;
    default:
        BuildSetErrorResponse(pVehicle,ISO_RESP_SYS_MALFUNC);
        GW_LogError(LOG_ERR "Gwdb_GetHostMsg( ): %d", dbrc);
        return (GW_PROCEED_TO_RESPOND);
        break;
}
if (dbrc != GWDB_SUCCESS){
        BuildSetErrorResponse(pVehicle,ISO_RESP_SYS_MALFUNC);
        GW_LogError(LOG_ERR, "Gwdb_UpdateHostMsgKeys( ): %d", dbrc);
        return (GW_PROCEED_TO_RESPOND);
}
// If this request is an honest retry then determine if we
// can "short circuit" a) the forward translation, b) the
// communications to the host or c) the reverse translation
// all of which will save time.
if (m_setRequestClass==GW_SREQCL_HONEST_RETRY){
        switch (m_hostResponseDisposition){
        case GW_HRESDI_UNKNOWN:
            action = GW_PROCEED_TO_FWD_XLAT;
            break;
        case GW_HRESDI_RECEIVED_OK:
            action = GW_PROCEED_TO_REV_XLAT;
            break;
        case GW_HRESDI_REV_XLAT_FAILED:
            action = GW_PROCEED_TO_REV_XLAT;
            break;
        case GW_HRESDI_RECEIVE_FAILED:
        case GW_HRESDI_TIMEOUT:
            action = GW_PROCEED_WITH_HOST_COMMS;
            break;
        default:
            break;
        }
    }
    return(action);
}
```

TranslateForward

Figure 53:
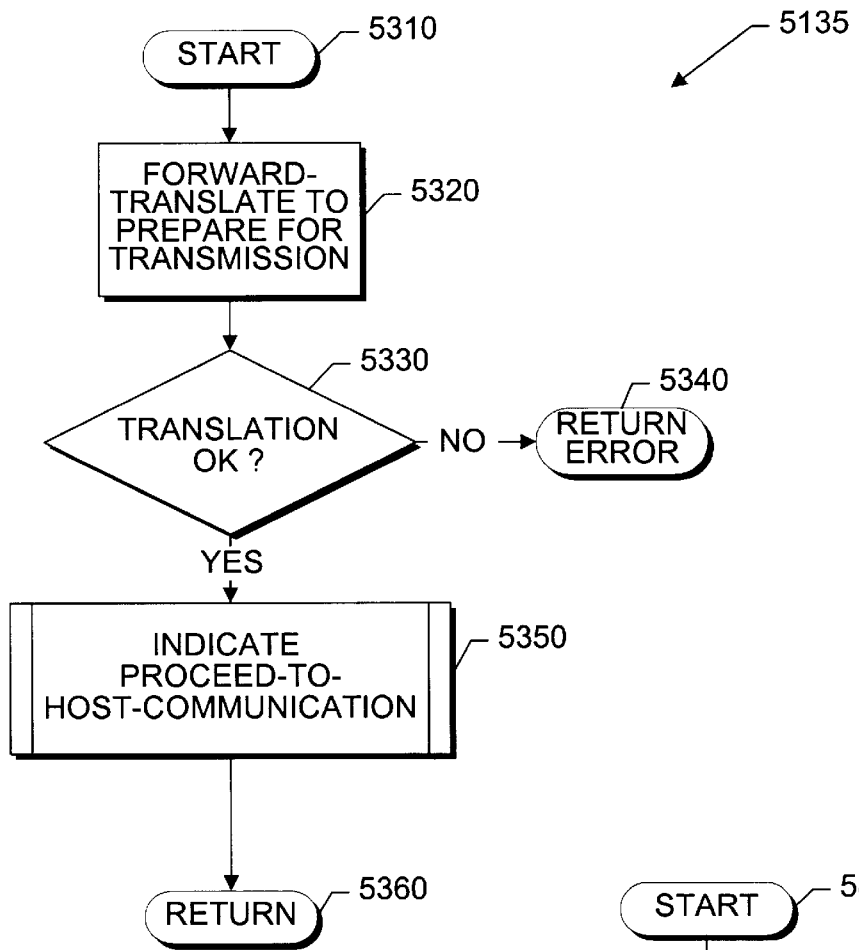

FIG. 53 depicts the execution of the TranslateForward routine, which is called by Step 5135 in FIG. 51. Execution begins at Step 5310. In Step 5320, the Gateway forward-translates the request to prepare it for transmission to the host. Forward translation consists of packaging the fields in the request into a format that is understandable by the legacy system at the financial institution. The exact format of the translated request will vary from institution to institution. However, in general, the format will consist of a fixed length record with predetermined fields, using a standard character set such as ASCII or EBCDIC. In Step 5330, the Gateway checks to see whether the translation was successfully performed. If not control proceeds to Step 5340, which returns an error condition. If the translation was successful, control proceeds to Step 5350. In Step 5350, the Gateway sets a status flag to indicate that the next stage to be performed for this SET request is to proceed to host communication. This will be used in the next iteration of the Gw_ClearSetRequestHandler routine as depicted in FIG. 51. After the status is set in Step 5350, the translate forward routine returns control in Step 5360.

The TranslateForward routine as depicted in FIG. 51 may be implemented using the following C++ code:

```
gwAction CGW_Engine::TranslateForward(CPCLCCRequest*pVehicle)
{
    gwRC        rc;
    gwDBRC      dbrc;
    rc = HM_TranslateForward(m_hostSpecificMessagepVehicle);
    if (rc == GW_SUCCESS){
        return (GW_PROCEED_WITH_HOST_COMMS);
    }
    m_hostRequestDisposition= GW_HREQDI_FWD_XLAT_FAILED;
    BuildSetErrorResponse(pVehicle,ISO_RESP_FORMAT_ERR);
    dbrc = Gwdb_UpdateHostMsgRequestDisp( );
```

```
    if (dbrc != GWDB_SUCCESS){
        GW_LogError(LOG_ERR, "Gwdb_UpdateHostMsgRequestDisp( ): %d",
dbrc);
    }
    return(GW_PROCEED_TO_RESPOND);
}
```

DoHostCommunication

Figure 54:
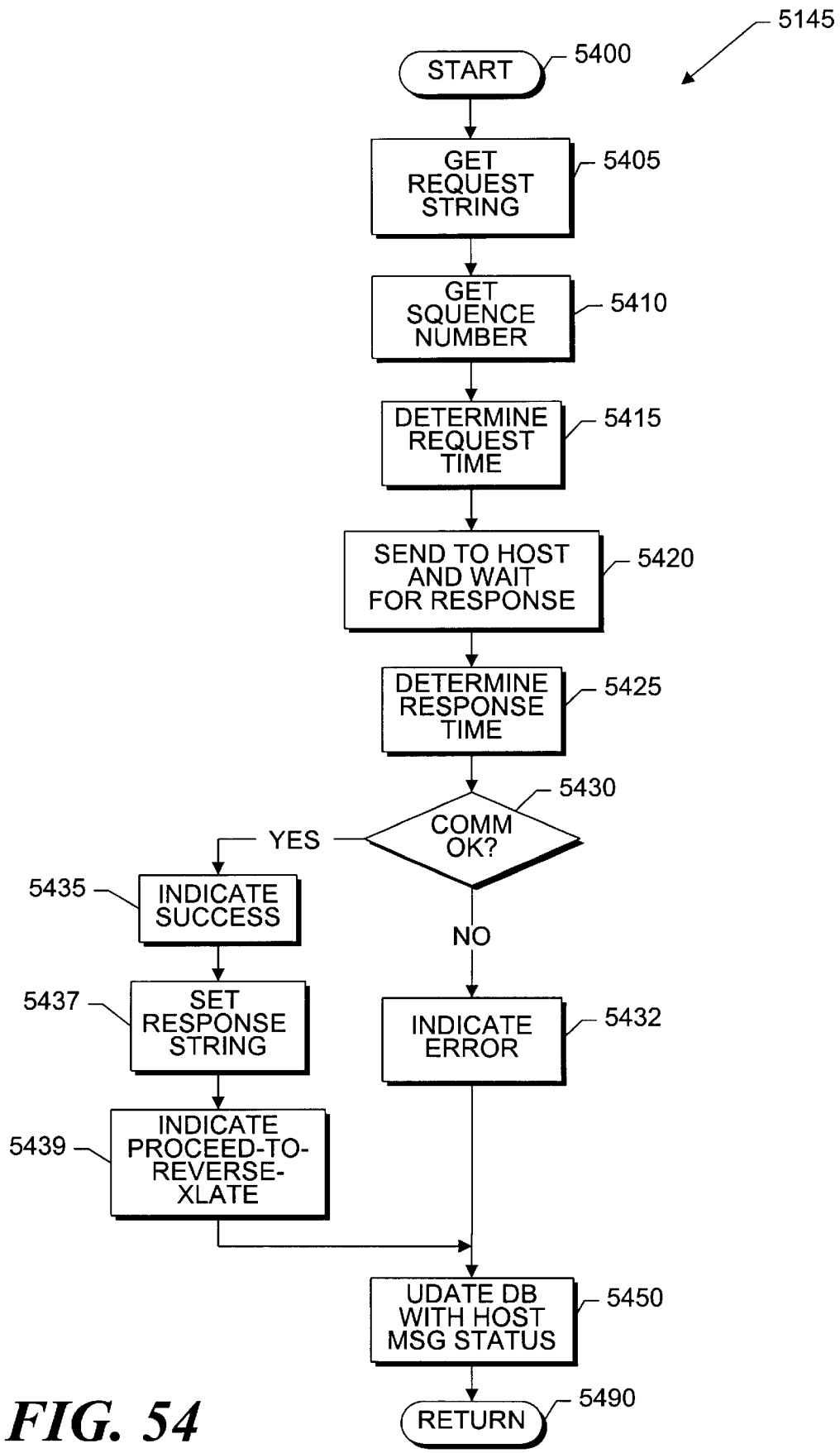

FIG. 54 depicts the step of host communication, as shown in Step 5145 in FIG. 51. Execution begins in Step 5400. In Step 5405 the Gateway obtains from the request object the string representing the request text. In Step 5410 it obtains the sequence number for the request. In Step 5415 the Gateway determines the current time, in order to record the time at which the request is made. In Step 5420 the Gateway sends the request to the host and waits for a response from the host. When a response is received, execution continues in Step 5425. In Step 5425, the Gateway again checks the current time, thereby determining the time at which a response was received. In Step 5430, the Gateway checks to see whether the communication was successfully performed. If a communication was not successful, the Gateway records that an error occurred in Step 5432. If the communication was successful, the Gateway, in Step 5435, indicates that the request was successfully sent and responded to. In Step 5437, the Gateway sets the response string based upon the response received in Step 5420. In Step 5439 the Gateway sets a status to indicate that reverse translation of the received response is required. Regardless of whether the communication was successful or unsuccessful, execution continues to Step 5450. In Step 5450, the database is updated with status information from the host communication. In Step 5490, control is returned to the calling routine.

The DoHostCommunication routine as depicted in FIG. 54 may be implemented using the following C++ code:

```
gwAction CGW_Engine::DoHostCommunication(CPCLCCRequest*pVehicle)
    gwHMRC          hmrc;
    gwDBRC          dbrc;
    gwAction        action = GW_PROCEED_TO_RESPOND;
    unsigned char   hostRequestMessage[HOSTREQ_SZ+1];
    int             hostRequestLength = 0;
    unsigned char   hostResponseMessage[HOSTREQ_SZ+1];
    int             hostResponseLength = 0;
    long            sequenceNo;
    HM_GetRequestString(m_hostSpecificMessage,&hostRequestMessage[0],
                        &hostRequestLength);
    HM_GetSequenceNo(m_hostSpecificMessage,&sequenceNo);
    time(&m_hostRequestTime);
    hmrc = SendToHostAndWait(
                    &hostRequestMessage[0],hostRequestLength,
                    &hostResponseMessage[0],&hostResponseLength);
    time(&m_hostResponseTime);
    switch(hmrc){
        case GWHM_SUCCESS:
            m_hostRequestDisposition= GW_HREQDI_SENT_OK;
            m_hostResponseDisposition= GW_HRESDI_RECEIVED_OK;
            HM_SetResponseString(m_hostSpecificMessage,&hostResponseMessage[0],
                        hostResponseLength);
            action = GW_PROCEED_TO_REV_XLAT;
            break;
        case GWHM_SEND_FAILED:
            m_hostRequestDisposition= GW_HREQDI_SEND_FAILED;
            m_hostResponseDisposition= GW_HRESDI_UNKNOWN;
            break;
        case GWHM_RCV_FAILED:
            m_hostRequestDisposition= GW_HREQDI_SENT_OK;
            m_hostResponseDisposition= GW_HRESDI_RECEIVE_FAILED;
            break;
        case GWHM_RCV_TIMEOUT:
            m_hostRequestDisposition= GW_HREQDI_SENT_OK;
            m_hostResponseDisposition= GW_HRESDI_TIMEOUT;
            break;
        default:
            break;
    }
    if (hmrc != GWHM_SUCCESS){
        BuildSetErrorResponse(pVehicle,ISO_RESP_ISSUER_INOP);
    }
    dbrc = Gwdb_UpdateHostMsgAllInfo(sequenceNo,
                    &hostRequestMessage[0],hostRequestLength,
                    &hostResponseMessage[0],hostResponseLength);
```

```
        if (dbrc != GWDB_SUCCESS){
            BuildSetErrorResponse(pVehicle,ISO_RESP_SYS_MALFUNC);
            GW_LogError(LOG_ERR, "Gwdb_UpdateHostMsgAllInfo( ): %d", dbrc);
        }
        return (action);
}
```

TranslateReverse

Figure 55:
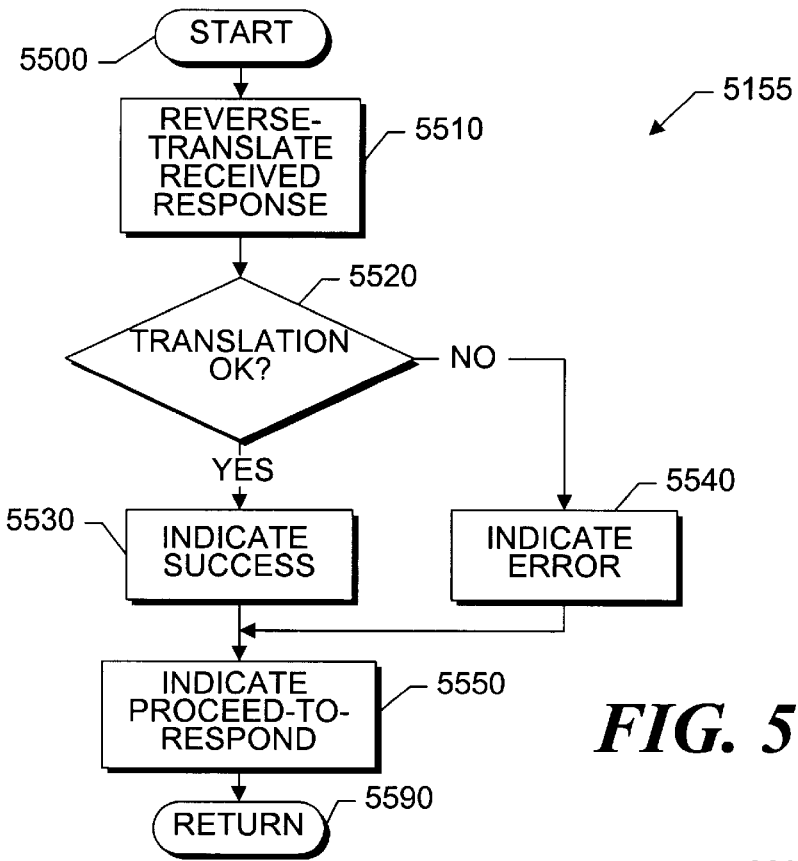

FIG. 55 depicts the operation of the TranslateReverse routine, as executed in Step 5155 in FIG. 51. Execution begins at Step 5500. In Step 5510 the Gateway reverse-translates the response received from the legacy system host. Reverse translation consists of extracting data from the data records received from the legacy system, and placing them in objects so that they are useable by the Gateway. In Step 5520, the Gateway checks to verify that translation was successful. If translation was successful control proceeds to Step 5530, where a status flag is set indicating a successful translation. If translation was not successful, control proceeds to Step 5540, in which the Status Flag is set to indicate an unsuccessful translation. Regardless of whether translation was successful or unsuccessful, execution proceeds to Step 5550. In Step 5550, a status flag is set to indicate that the next stage for the request is to provide a response from the Gateway. This step is always executed, because, regardless of whether the translation or any other aspect of the transaction was successful, a response indicating either success or failure must be returned by the Gateway. Control then proceeds to Step 5590, in which the TranslateReverse routine returns control to the calling routine in FIG. 51. It will be seen that the TranslateForward routine in FIG. 53, the DoHostCommunication routine depicted in FIG. 54, and the TranslateReverse routine depicted in FIG. 55, each alter the status of the request. As a result as the loop depicted in FIG. 51 executes a particular request will proceed through all three stages and finally to exit in Step 5190.

The TranslateReverse routine as depicted in FIG. 55 may be implemented using the following C++ code:

```
gwAction CGW_Engine::TranslateReverse(CPCLCCRequest*pVehicle)
{
    gwRC        rc;
    gwDBRC      dbrc;
    rc = HM_TranslateReverse(m_hostSpecificMessagepVehicle);
    if (rc == GW_SUCCESS){
            // Success; we have a normal PDU to send back to VPOS!
            // If there is any problem further to this (eg: PCL/ASN libs)
            // that the frond-end is responsible for calling the method
            // LogSetErrorResponse( )on this engine instance.
            m_setResponseClass= GW_SRESCL_APP_NORMAL_PDU;
            m_setResponseDisposition= GW_SRESDI_SENT_OK;
            HM_GetResponseCode(m_hostSpecificMessage,m_setResponseCode);
    }
    else{
            m_hostResponseDisposition= GW_HRESDI_REV_XLAT_FAILED;
            BuildSetErrorResponse(pVehicle,ISO_RESP_INVALID_RESPONSE);
            dbrc = Gwdb_UpdateHostMsgResponseDisp( );
            if (dbrc != GWDB_SUCCESS){
                GW_LogError(LOG_ERR "Gwdb_UpdateHostMsgResponseDisp( ):
%d", dbrc);
            }
    }
    // Whether there was a translation error or not we need to respond.
    return (GW_PROCEED_TO_RESPOND);
}
```

GetSetKeyFields

Figure 56A:
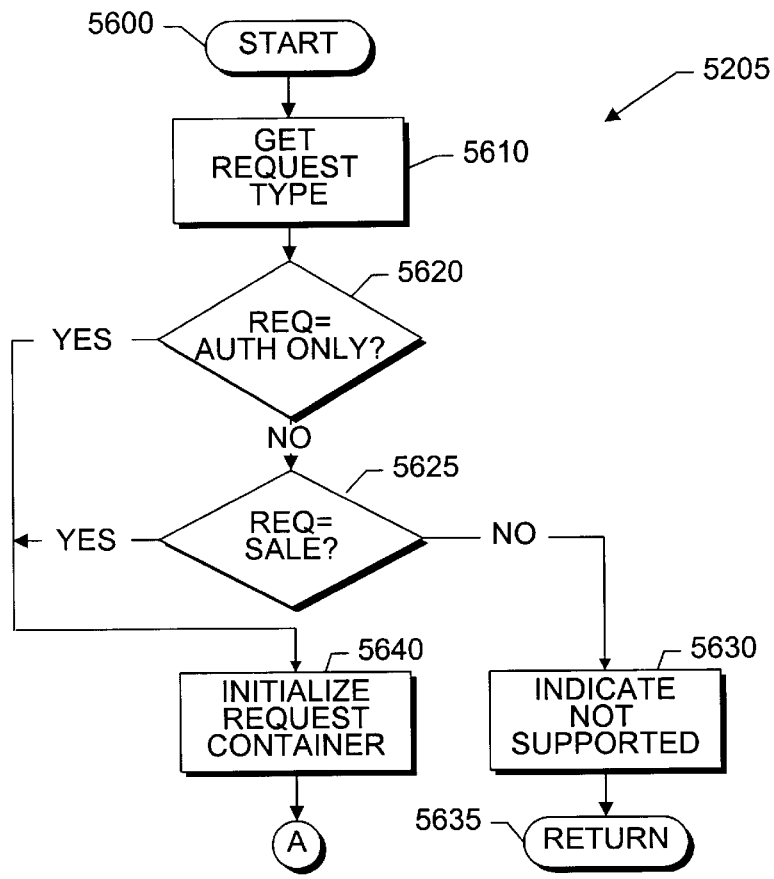
Figure 56B:
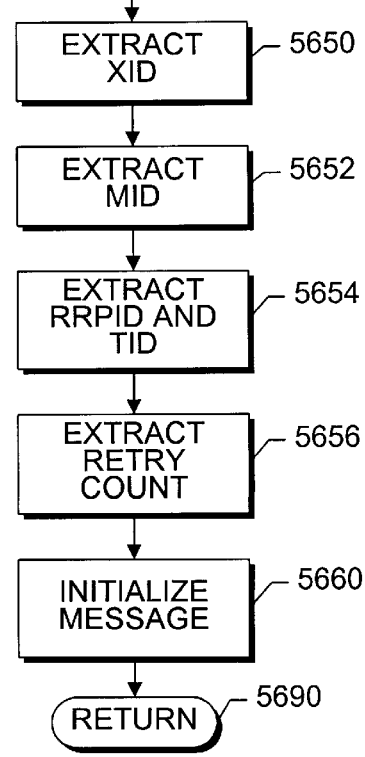

FIGS. 56A and 56B describe the GetSetKeyFields routine. This routine is called by Step 5205 as illustrated in FIG. 52A. Execution begins in Step 5600. In Step 5610, the Gateway interrogates the request object to determine the request type. In Step 5620, the Gateway determines whether the request type is for authorization only. If the request type is not for authorization only, execution proceeds to Step 5625. In Step 5625, the Gateway checks to see whether the request type is for a sale. If the request type is neither for authorization only nor for a sale, execution proceeds to Step 5630. In Step 5360, the Gateway indicates that the request type is not a supported request, and proceeds to Step 5635, where it returns to the caller.

If the request type is either for authorization only or for a sale, execution proceeds with Step 5640. In step 5640, the Gateway initializes a container object to represent the request. In Step 5650, the Gateway extracts the transaction identifier (XID) for the transaction. In Step 5652, the Gateway extracts the merchant identifier (MID) for the transaction. In Step 5654, the Gateway extracts the request/response pair ID (RRPID) and the terminal identifier (TID) for the request. In Step 5656, the Gateway extracts the retry count associated with the current request. In Step 5660, a message data area is initialized with the extracted contents. The message area can then be used for further processing by the called routine. In Step 5690, the GetSetKeyFields routine returns control to the caller.

The GetSetKeyFields as depicted in FIGS. 56A and 56B may be implemented using the following C++ code:

```
gwRC CGW_Engine::GetSetKeyFields(CPCLCCRequest*pVehicle)
{
    gwRC            transRc = GW_SUCCESS;
    unsigned int    got;
    *char           s_RrpidTid[2*XID_SZ];
    unsigned long   rrpid;
    unsigned long   tidOffset;
        m_setKeyFields.reqType = pVehicle->GetRequestType( );
        switch(m_setKeyFields.reqType){
        case CPCLRequest::CCAuthOnly:
        case CPCLRequest::CCSale:
            {
            // Initial cast to correct subclass.
            CASNAuthorizationRequestDataContainer*s_req =
                ((CPCLCCAuthOnlyRequest*)pVehicle)->GetRequestContainer( )-
>get_data( )->get_data( );
// xid
        s_req->get_transaction_id( )->get_x_id( )->
        get_value((unsigned char*)&m_setKeyFields.xid,XID_SZ,&got);
// mid
#ifdef JUNE_3RD
        strncpy(m_setKeyFields.mid,"42581", MID_SZ);
#else
        // TODO: get code from Deepak for pulling MID out of s_req!
        strncpy(m_setKeyFields.mid,"42581", MID_SZ);
        //bah!
#endif
// --------------------------------------------
    // NOTE: We have agreed with VPOS team that the RRPID field
    //       will contain the following:
    //
    //       <rrpid><space><tid><null>
    //
    // where <rrpid> is a string representing the rrpid value
    // and <tid> is a string representing the tid value.
    //
// ------------------------------------------------
        memset(s_RrpidTid, '\0', sizeof(s_RrpidTid));
        s_req->get_AuthorizationRequestData_extensions( )->
            get_auth_req_res_pair_id( )->
            get_value((unsigned char *)&s_RrpidTid, sizeof(s_RrpidTid),&got);
        // get rrpid and offset to the tid.
    sscanf(s_RrpidTid, "%d %n",&rrpid,&tidOffset);
        // rrpidBase and retryCount
        m_setKeyFields.retryCount= rrpid % 100;
        m_setKeyFields.rrpidBase= rrpid - m_setKeyFields.retryCount;
        // tid
    strncpy(m_setKeyFields.tid,(s_RrpidTid+tidOffset),TID_SZ);
        // reqDate
        GW_GetTimeFromASNTime(&(m_setKeyFields.merchantTime),
            s_req->get_authorization_request_date( ));
        break;
        }
    case CPCLRequest::CCAuthReversal:       // == Void
    case CPCLRequest::CCCreditReversal:
    case CPCLRequest::CCCapture:
    case CPCLRequest::CCCredit:             // == Refund Return
    case CPCLRequest::CCCaptureReversal:    // == Void
    // case eBalInquiry:
    transRc = GW_NOT_SUPPORTED;
        break;
    default:
        transRc = GW_NOT_SUPPORTED;
        break;
    }
    // Initialize the host message will with the key fields "in the clear"!
    if (m_hostSpecificMessage== NULL){
        transRc = GW_FAILED;
    }
    else {
        HM_Initialize(m_hostSpecificMessage,&m_setKeyFields);
    }
    return (transRc);
}
```

Gwdb_IsSetMsgStale

Figure 57:
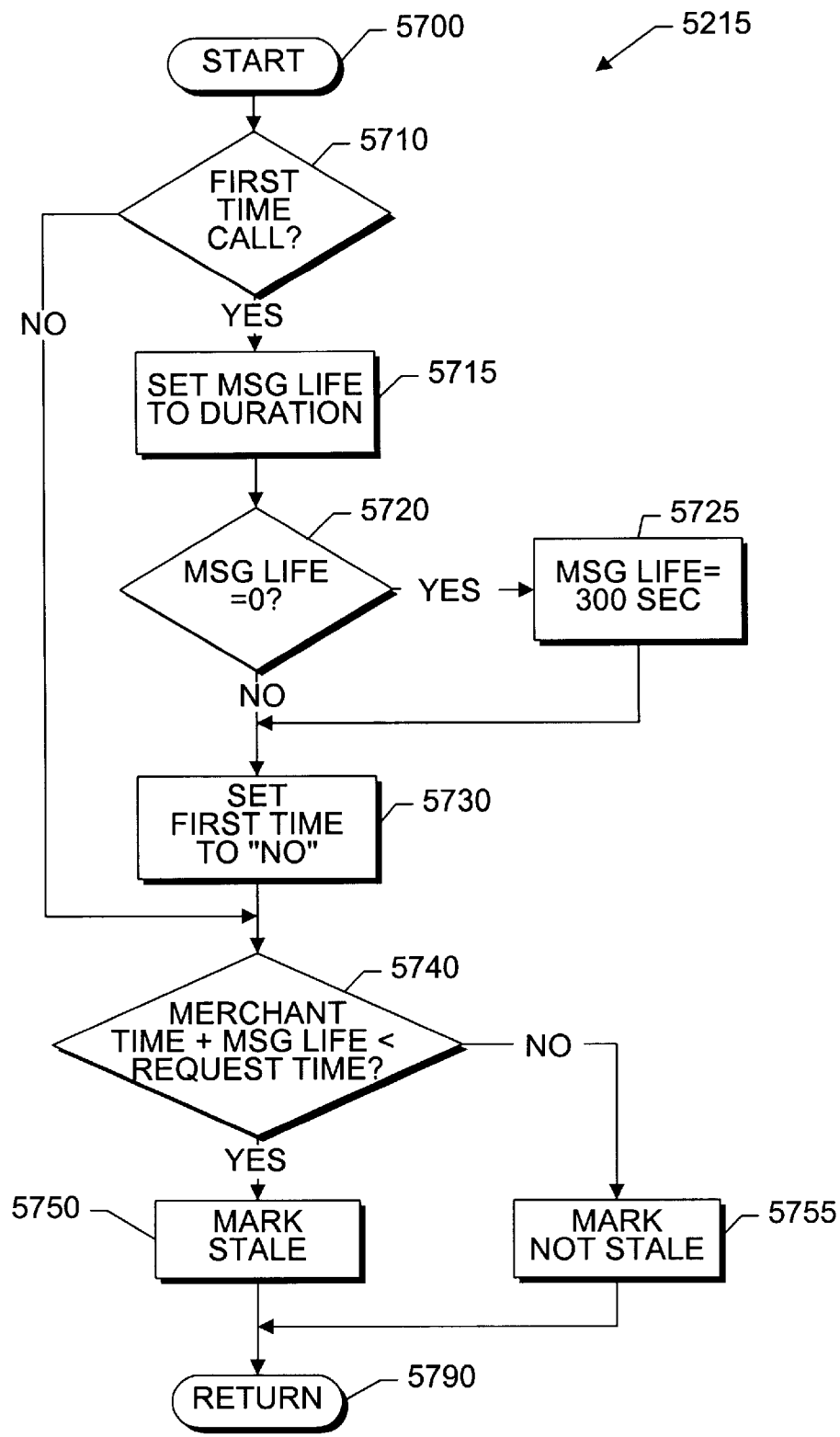

FIG. 57 depicts the Gwdb_IsSetMsgStale routine. This routine is called by Step 5215 as illustrated in FIG. 52A.

Execution begins in Step 5700. In Step 5710, the Gateway checks to see whether this is the first time the Gwdb_IsSetMsgStale has been called for this request. If this is the first time, Steps 5715 through 5730 are performed; otherwise those steps are skipped. In Step 5715, a field representing the message life is initialized to a predetermined duration. The message life is a field that will be used to determine how long the message representing the transaction will remain valid. The use of the message life field prevents a transaction that is effectively lost due to extensive processing delays from being processed. In Step 5720, the Gateway checks to see if the value of the message life is equal to zero. If the message life is equal to zero, a default value, i.e., 300 seconds or 5 minutes, is assigned to the message life in Step 5725. In Step 5730, an indicator for this request is set to indicate that first time processing has already been performed for this request. This flag is the same flag interrogated in Step 5710, and is used to prevent successive reinitialization of the message life field.

In Step 5740, the Gateway checks to see whether the merchant's time stamp, plus the value of the message life, is less than the time of the request. If so, then the request is considered stale, and is marked stale in Step 5750. If not, the request is not stale, and is marked not stale in Step 5755. Following either of Step 5750 or 5755, the Gwdb_IsSetMsgStale exits in Step 5790. The Gwdb_IsSetMsgStale routine as depicted in FIG. 57 may be implemented using the following C++ code:

```
void CGW_Engine::Gwdb_IsSetMsgStale(char*staleFlag)
{
    static char gotStaleDuration=0;
    static long setMsgLife;
    static char  *funcName="Gwdb_IsSetMsgStale";
    // Only get this once per process lifetime.
    if (gotStaleDuration==0) {
        FILE *fp;
        char  durationf[INI_MAXLNSZ+1];
        if ((fp=OpenIniFile())!=NULL) {
            setMsgLife=0;
            (void)iniGetParameter(fp,"GATEWAYADMIN","SetMsgLife",
duration);
            setMsgLife=atol(duration); // could return 0; handled later.
            (void)CloseIniFile(fp);
        }
        if(setMsgLife == 0) {
            setMsgLife = 5 * 60; // Default to 5 minutes;
        }
gotStaleDuration= 1;
    }
// If the message has expired its lifetime.
    if ((m_setKeyFields.merchantTime+setMsgLife)<m_setRequestTime)
            *staleFlag=_TRUE;     // request is stale.
        else
            *staleFlag=_FALSE; // honour request, it is not stale.
return;
}
```

Gwdb_InsertSetMsg

Figure 58:
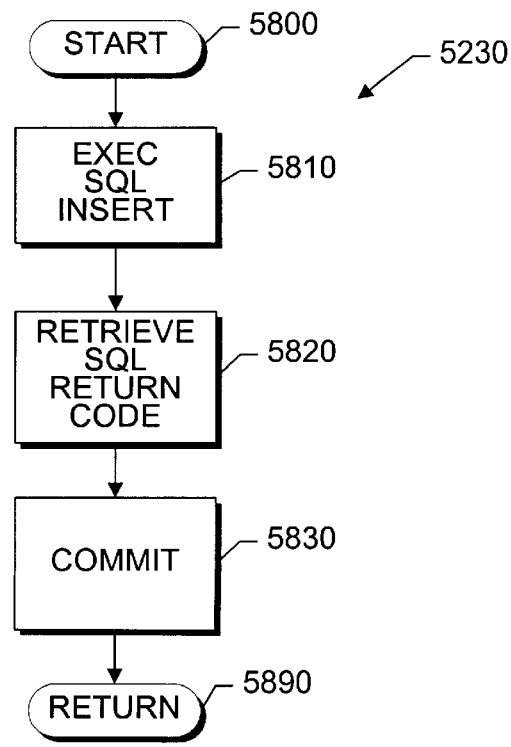

FIG. 58 depicts the Gwdb_InsertSetMsg routine. This routine is called from Step 5230 as illustrated in FIG. 52A. Execution begins in 5800. In Step 5810, the routine invokes a database insert function by, for example, executing an SQL INSERT command. In Step 5820, the database return code is obtained in order to be used as a return code from the Gwbd_InsertSetMsg routine. In Step 5830, a database commit function is performed, thereby instructing the database engine to commit the database changes to a permanent recording, i.e., by writing the information to the file, and/or by journalizing the change made by INSERT function. In Step 5890, the routine returns control to the calling program.

The Gwdb_InsertSetMsg as depicted in FIG. 58 may be implemented using the following C++ code:

```
gwDBRC CGW_Engine::Gwdb_InsertSetMsg()
{
EXEC SQL BEGIN DECLARE SECTION;
    // Key.
    char    *h_xid              =&(m_setKeyFields.xid[0]);
    long    h_rrpidBase         =m_setKeyFields.rrpidBase;
    int     h_retryCount        =m_setKeyFields.retryCount;
// Columns to insert into.
    char    *h_mid              =&(m_setKeyFields.mid[0]);
    char    *h_tid              =&(m_setKeyFields.tid[0]);
    char    h_merchantTime[26];
    int     h_requestType       =(int)m_setKeyFields.reqType;
char h_requestTime[26];
    int     h_requestClass      =(int)m_setRequestClass;
    int     h_requestDisposition =(int)m_setRequestDisposition;
char    h_responseTime[26];
    int     h_responseClass         =(int)m_setRequestClass;
    int     h_responseDisposition   =(int)m_setResponseDisposition;
    char    *h_responseCode         =m_setResponseCode;
EXEC SQL END DECLARE SECTION;
static char *funcName="Gwdb_InsertSetMsg";
    gwDBRC dbrc;
GW_MakeDateString(h_merchantTime,&(m_setKeyFields.merchantTime));
    GW_MakeDateString(h_requestTime,&m_setRequestTime);
    GW_MakeDateString(h_responseTime,&m_setResponseTime);
EXEC SQL INSERT INTO setmsg
    (
        xid, rrpidbase, retrycount, mid, tid,
        merchanttime,
        requesttype,
        requesttime,
        requestclass,requestdisposition,
        responsetime,
        responseclass,responsedisposition,responsecode
    )
    VALUES
    (
        :h_xid, :h_rrpidBase, :h_retryCount, :h_mid, :h_tid,
        TO_DATE(:h_merchantTime,'DY MON DD HH24:MI:SSYYYY'),
        :h_requestType,
        TO_DATE(:h_requestTime,'DY MON DD HH24:MI:SSYYYY'),
        :h_requestClass, :h_requestDisposition,
        TO_DATE(:h_responsTime,'DY MON DD HH24:MI:SSYYYY'),
        :h_responseClass, :h_responseDisposition, :h_responseCode
    );
    dbrc = Db_Error(funcName);
(void) Db_Commit(funcName);
return (dbrc);
}
```

Gwbd_GetHostMsg

Figure 59:
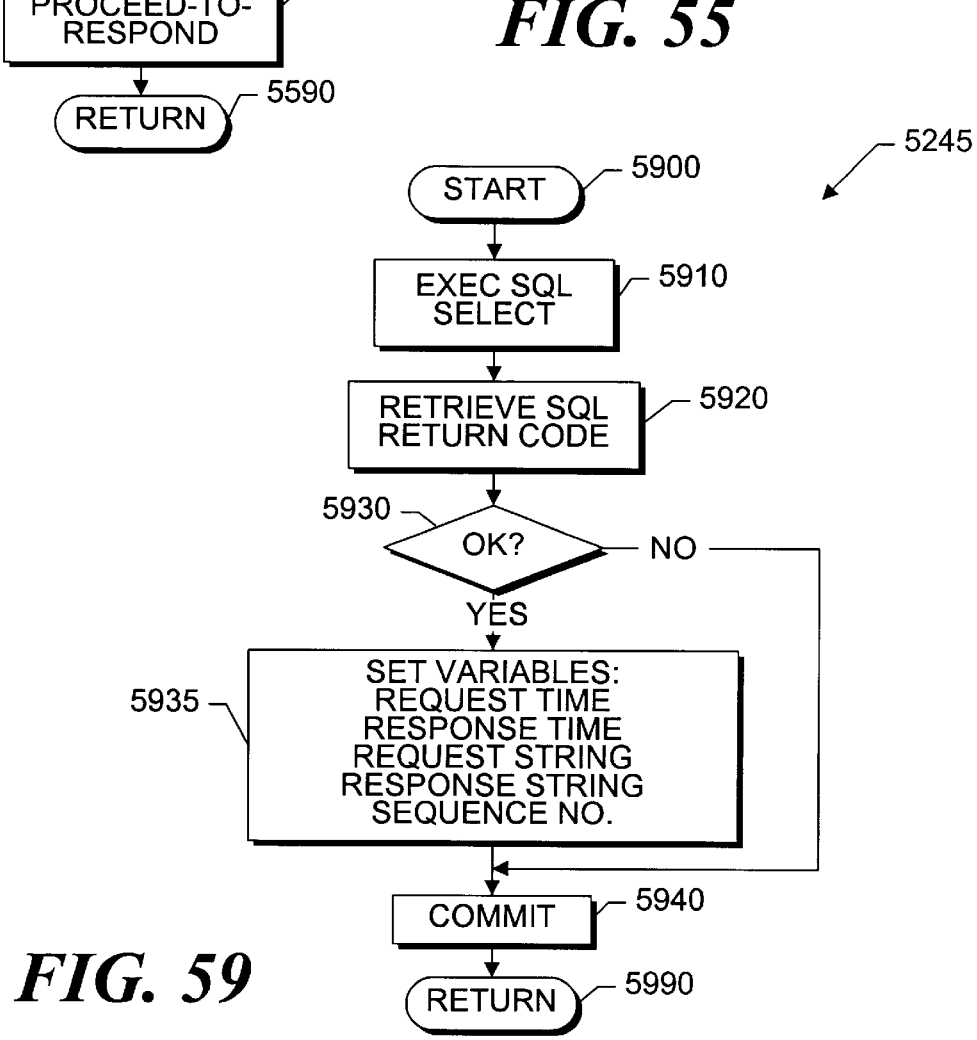

FIG. 59 depicts the Gwbd_GetHostMsg routine. This routine is called by Step 5245 as shown in FIG. 52B. Execution begins in Step 5900. In Step 5910, the routine invokes a database select function by, for example, executing an SQL SELECT command. In Step 5920, the database return code is obtained in order to be used as a return code from the Gwbd_InsertSetMsg routine. In Step 5930, the Gateway checks to see whether the database retrieve operation was successfully performed. If so, execution proceeds to Step 5935. In Step 5935, the Gateway sets a number of status variables from the values retrieved from the database records. This includes the time the request was made, the time a response was received, the contents of the request string, the contents of the response string, and a sequence number for this request. In Step 5940, a commit operation is performed. In Step 5900, control returns to the calling program.

The Gwdb_GetHostMsg as depicted in FIG. 59 may be implemented using the following C++ code:

```
gwDBRC CGW_Engine::Gwdb_GetHostMsg()
{
    struct tm   requestTimeTM;
    struct tm   responseTimeTM;
EXEC SQL BEGIN DECLARE SECTION;
    // Key.
    char    *h_xid              =&(m_setKeyFields.xid[0]);
    long    h_rrpidBase         =m_setKeyFields.rrpidBase;
// Indicator Variables.
    short h_requestStringInd;
    short h_responseStringInd;
// Columns to retreive.
```

```
    long     h_sequenceNo      =0;
    int          *h_reqYear = &requestTimeTM.tm_year;
    int          *h_reqMonth = &requestTimeTM.tm_mon;
    int          *h_reqDay = &requestTimeTM.tm_mday;
    int          *h_reqHour = &requestTimeTM.tm_hour;
    int          *h_reqMinute = &requestTimeTM.tm_min;
    int          *h_reqSecond = &requestTimeTM.tm_sec;
    int          *h_requestDisposition = (int*)&m_hostRequestDisposition;
    VARCHAR h_requestString[128];
    int          *h_resYear = &responseTimeTM.tm_year;
    int          *h_resMonth = &responseTimeTM.tm_mon;
    int          *h_resDay = &responseTimeTM.tm_mday;
    int          *h_resHour = &responseTimeTM.tm_hour;
    int          *h_resMinute = &responseTimeTM.tm_min;
    int          *h_resSecond = &responseTimeTM.tm_sec;
    int          *h_responseDisposition = (int *)&m_hostResponseDisposition;
    VARCHAR h_responseString[128];
EXEC SQL END DECLARE SECTION;
    static char   *funcName = "Gwdb_GetHostMsg";
    gwDBRC dbrc;
    // Set the "tm" structures to null. Set tm_isdst to -1 so that the
    // mktime() function will determine if whether Daylight Savings Time
    // is active.
    memset(&requestTimeTM,'\0', sizeof(tm));
    requestTimeTM.tm_isdst=-1;
    memset(&responseTimeTM,'\0', sizeof(tm));
    responseTimeTM.tm_isdst=-1;
    EXEC SQL SELECT
        sequenceno,
        TO_NUMBER(TO_CHAR(requesttime,'YYYY'))-1900, // see "man
mktime"
        TO_NUMBER(TO_CHAR(requesttime,'MM'))-1,     // see "man
mktime"
        TO_NUMBER(TO_CHAR(requesttime,'DD')),
        TO_NUMBER(TO_CHAR(requesttime,'HH24')),
        TO_NUMBER(TO_CHAR(requesttime,'MI')),
        TO_NUMBER(TO_CHAR(requesttime,'SS')),
        requestdisposition,requeststring,
        TO_NUMBER(TO_CHAR(responsetime,'YYYY'))-1900, // see "man mktime"
        TO_NUMBER(TO_CHAR(responsetime,'MM'))-1,     // see "man mktime"
        TO_NUMBER(TO_CHAR(responsetime,'DD')),
        TO_NUMBER(TO_CHAR(responsetime, 'HH24')),
        TO_NUMBER(TO_CHAR(responsetime,'MI')),
        TO_NUMBER(TO_CHAR(responsetime,'SS')),
responsedisposition,responsestring
    INTO
:h_sequenceNo,
:h_reqYear, :h_reqMonth, :h_reqDay, :h_reqHour, :h_reqMinute, :h_reqSecond,
:h_requestDisposition, :h_requestString: h_requestStringInd,
:h_resYear, :h_resMonth, :h_resDay, :h_resHour, :h_resMinute, :h_resSecond,
:h_responseDisposition, :h_responseString:h_responseStringInd
    FROM
        hostmsg
    WHERE
        xid = :h_xidAND
        rrpidbase = :h_rrpidBase;
dbrc = Db_Error(funcName);
if (dbrc == GWDB_SUCCESS) {
    if (h_requestStringInd==-1) h_requestString.len=0;
    if (h_responseStringInd==-1) h_responseString.len=0;
    m_hostRequestTime = mktime( &requestTimeTM);
    m_hostResponseTime = mktime( &responseTimeTM);
        HM_SetRequestString(m_hostSpecificMessage,
            h_requestString.arr,
            h_requestString.len);
        HM_SetResponseString(m_hostSpecificMessage,
            h_responseString.arr,
            h_responseString.len);
        HM_SetSequenceNo(m_hostSpecificMessage,h_sequenceNo);
    }
(void) Db_Commit(funcName);
return (dbrc);
}
```

Gwdb_InsertHostMsg

Figure 60:
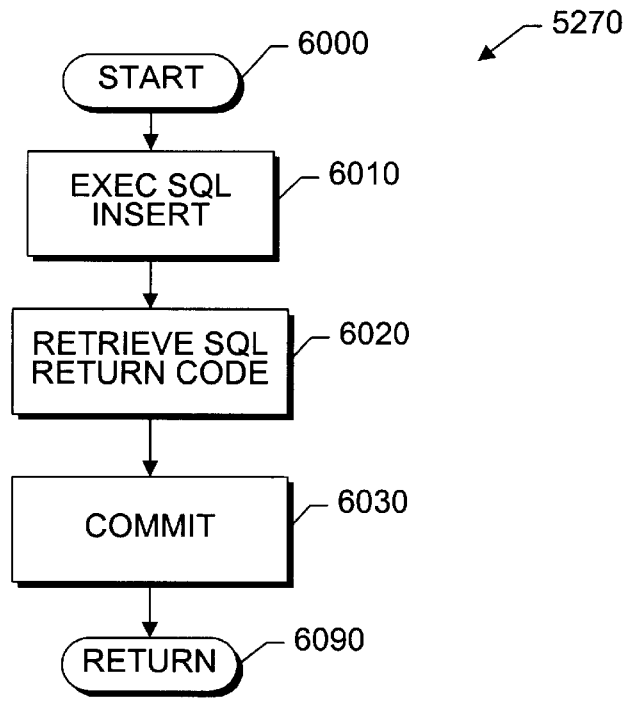

FIG. 60 depicts the Gwdb_InsertHostMsg routine. This routine is called by Step 5270 as illustrated in FIG. 52B. Execution begins in Step 6000. In Step 6010, the routine invokes a database insert function by, for example, executing an SQL INSERT command. In Step 6020, the database return code is obtained in order to be used as a return code from the Gwbd_InsertSetMsg routine. in Step 6040, a commit operation is performed. In Step 6090, the routine returns control to the calling program.

The Gwdb_InsertHostMsg as depicted in FIG. 60 may be implemented using the following C++ code:

Step 6100. In Step 6110, the routine invokes a database update function by, for example, executing an SQL UPDATE command. In Step 6120, the database return code is obtained in order to be used as a return code from the

```
gwDBRC CGW_Engine::Gwdb_InsertHostMsg()
{
EXEC SQL BEGIN DECLARE SECTION;
    // Key.
    char    *h_xid              =-&(m_setKeyFields.xid[0]);
    long    h_rpidBase          =m_setKeyFields.rrpidBase;
    int     h_retryCount        =m_setKeyFields.retryCount;
// Columns to insert into.
    long    h_sequenceNo        =0;
    char    h_requestTime[26];
    int     h_requestDisposition = (int) m_hostRequestDisposition;
    char    h_responseTime[26];
    int     h_responseDisposition =(int) m_hostResponseDisposition;
EXEC SQL END DECLARE SECTION;
    static char   *funcName= "Gwdb_InsertHostMsg";
    gwDBRC dbrc;
    GW_MakeDateString(h_requestTime,&m_hostRequestTime);
    GW_MakeDateString(h_responseTime,&m_hostResponseTime);
    EXEC SQL INSERT INTO hostmsg
        (
        xid, rrpidbase, retrycount,
        sequenceno,
        requesttime,
        requestdisposition,
        responsetime,
        responsedisposition
        )
    VALUES
        (
        :h_xid, :h_rrpidBase, :h_retryCount,
        :h_sequenceNo,
        TO_DATE(:h_requestTime,'DY MON DD HH24:MI:SSYYYY',
        :h_requestDisposition,
        TO_DATE(:h_responseTime,'DY MON DD HH24:MI:SSYYYY'),
        :h_responseDisposition
        );
    dbrc = Db_Error(funcName);
    (void) Db_Commit(funcName);
    return (dbrc);
}
```

Gwdb_UpdateSetMsgResponseInfo

Figure 61:
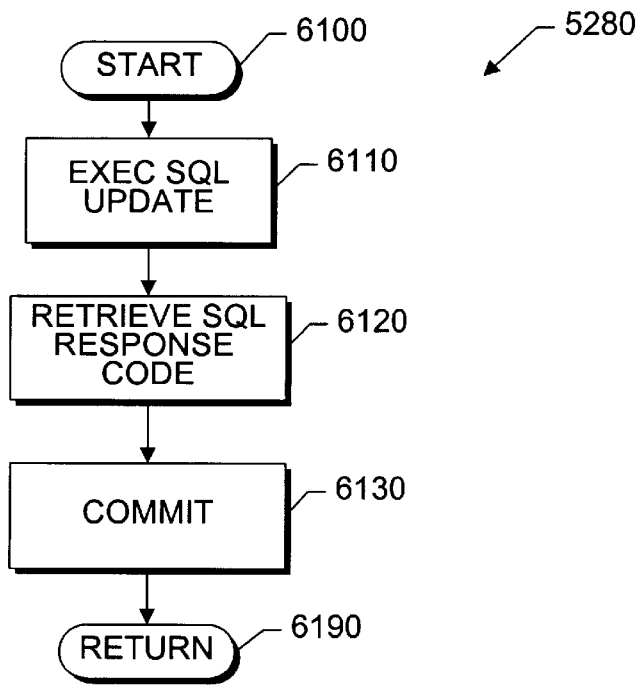

FIG. 61 depicts a flow diagram for the Gwdb_UpdateSetMsgResponseInfo routine. Execution begins at Gwbd_UpdateSetMsgResponseInfo routine. In Step 6190, the routine returns control to the calling program. The Gwdb_UpdateSetMsgResponseInfo as depicted in FIG. 61 may be implemented using the following C++ code:

```
gwDBRC CGW_Engine::Gwdb_UpdateSetMsgResponseInfo()
{
EXEC SQL BEGIN DECLARE SECTION;
    // Key.
    char    *h_xid              =&(m_setKeyFields.xid[0]);
    long    h_rrpidBase         =m_setKeyFields.rrpidBase;
    int     h_retryCount        =m_setKeyFields.retryCount;
    // Columns to update.
    char    h_responseTime[26];
    int     h_responseClass     =(int) m_setResponseClass;
    int     h_responseDisposition =(int) m_setResponseDisposition;
    char    *h_responseCode     =m_setResponseCode;
EXEC SQL END DECLARE SECTION;
    static char   *funcName = "Gwdb_UpdateSetMsgResponseInfo";
    gwDBRC dbrc;
    GW_MakeDateString(h_responseTime,&m_setResponseTime);
    EXEC SQL UPDATE setmsg SET
    responsetime=TO_DATE(:h_responseTime,'DY MON DD HH24:MI:SSYYYY'),
        responseclass = :h_responseClass,
        responsedisposition = :h_responseDisposition,
        responsecode = :h_responseCode
    WHERE
        xid =:h_xidAND
```

-continued

```
    rrpidbase = :h__rrpidBaseAND
    retrycount = :h__retryCount;
    dbrc = Db__Error(funcName);
    (void) Db__Commit(funcName);
    return (dbrc);
}
```

Figure 62:
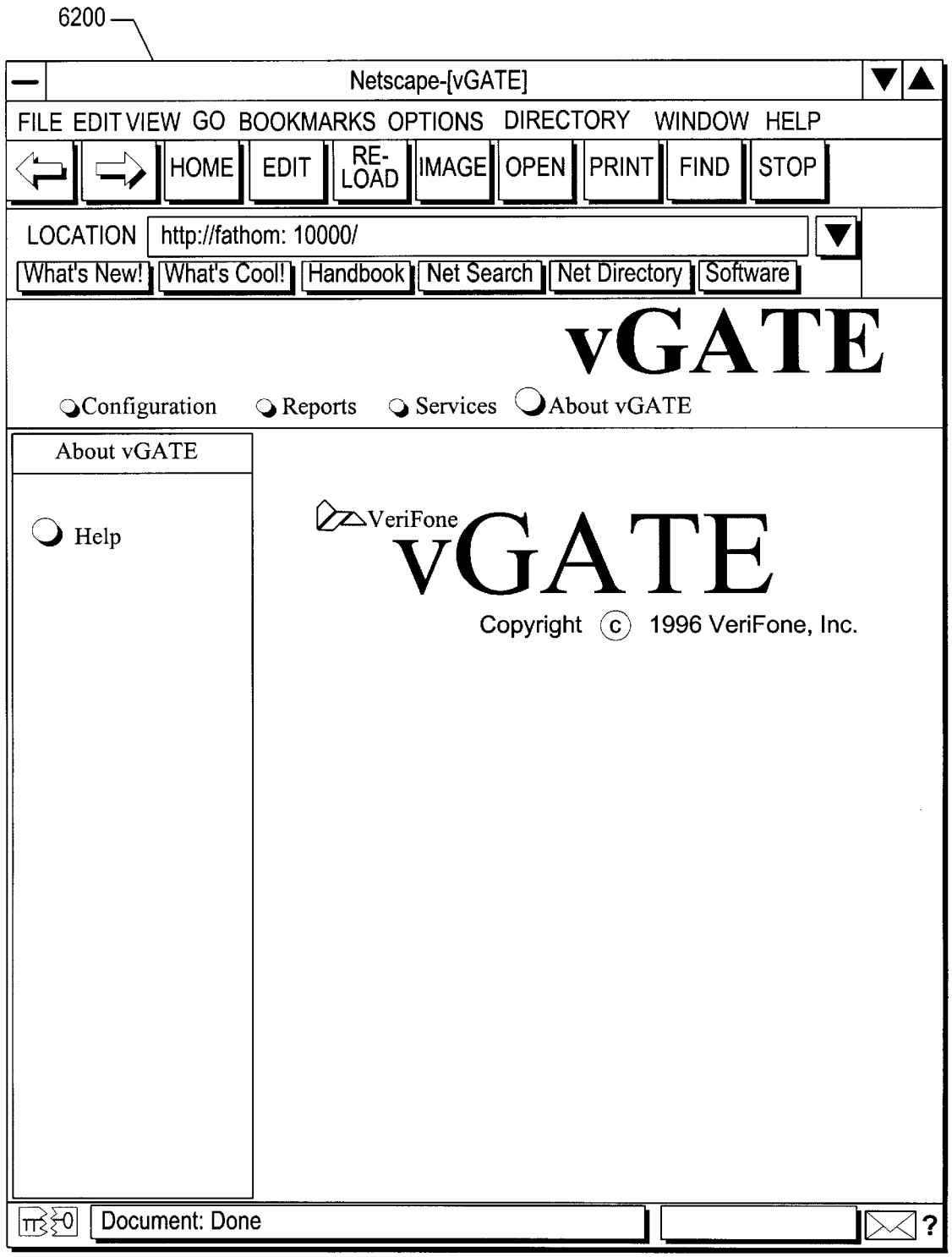
FIG. 62 is the main administration display for the Gateway in accordance with a preferred embodiment.
Figure 63:
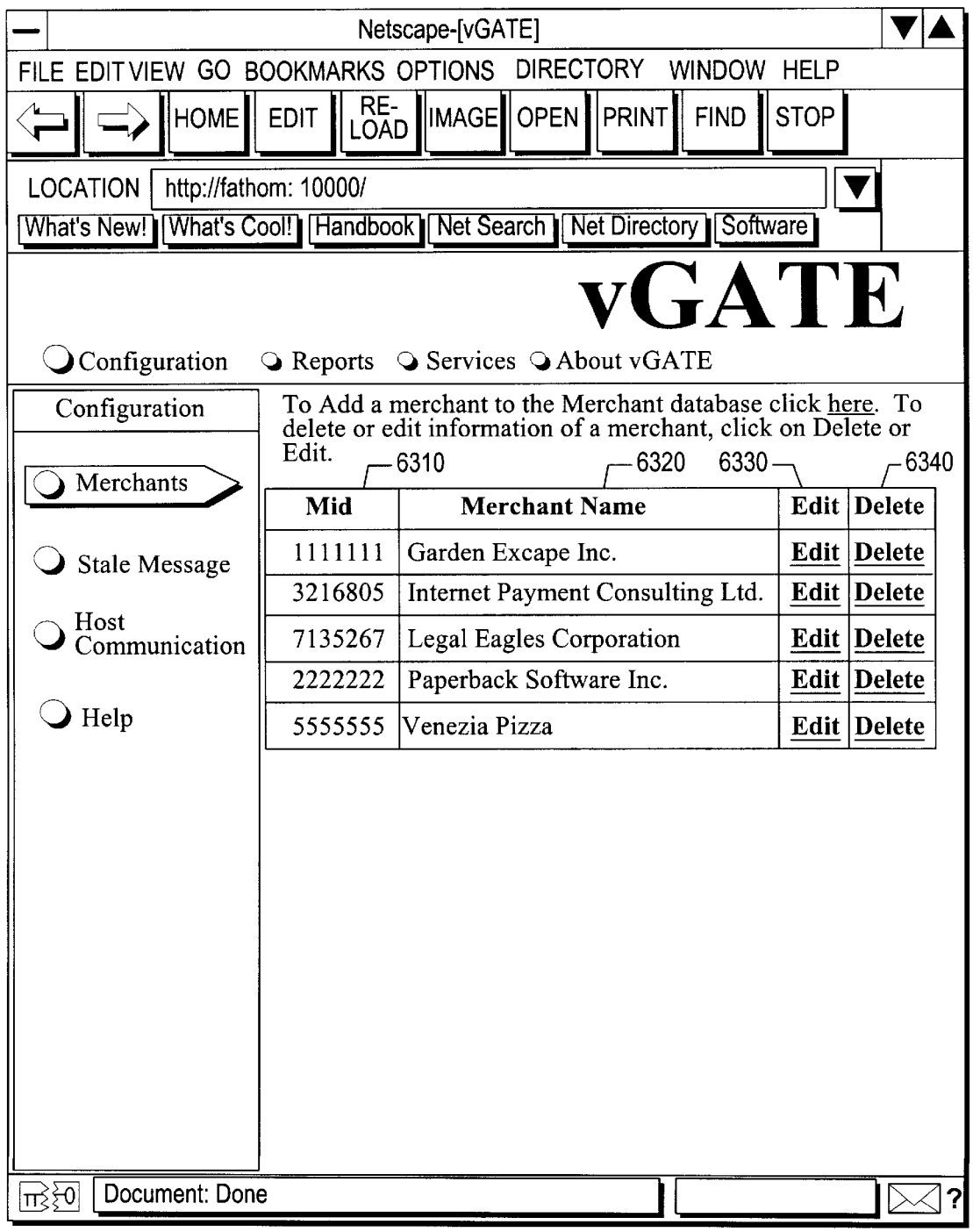
FIG. 63 is a configuration panel in accordance with a preferred embodiment.
Figure 64:
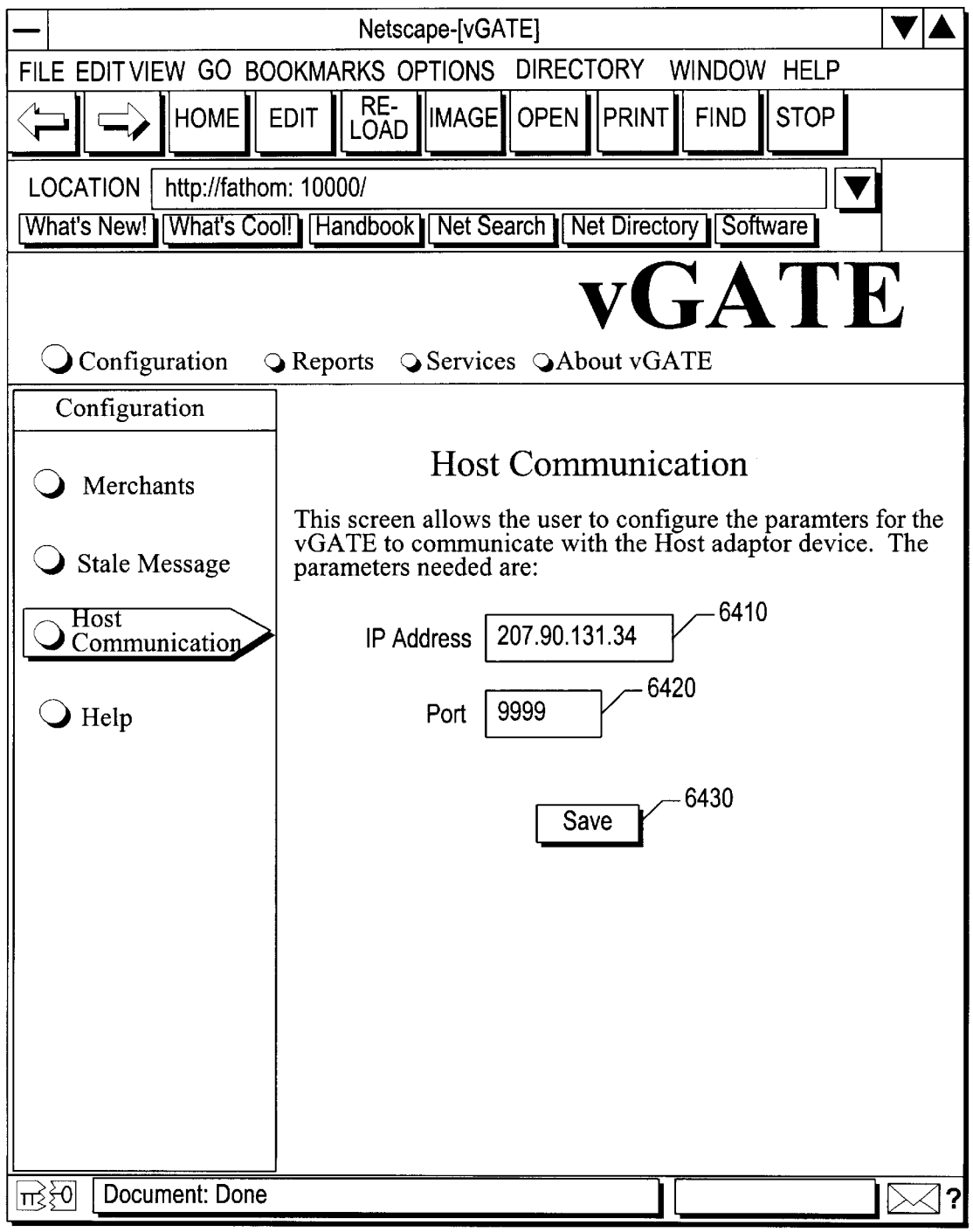
FIG. 64 is a host communication display for facilitating communication between the gateway and the acquirer payment host in accordance with a preferred embodiment.
Figure 65:
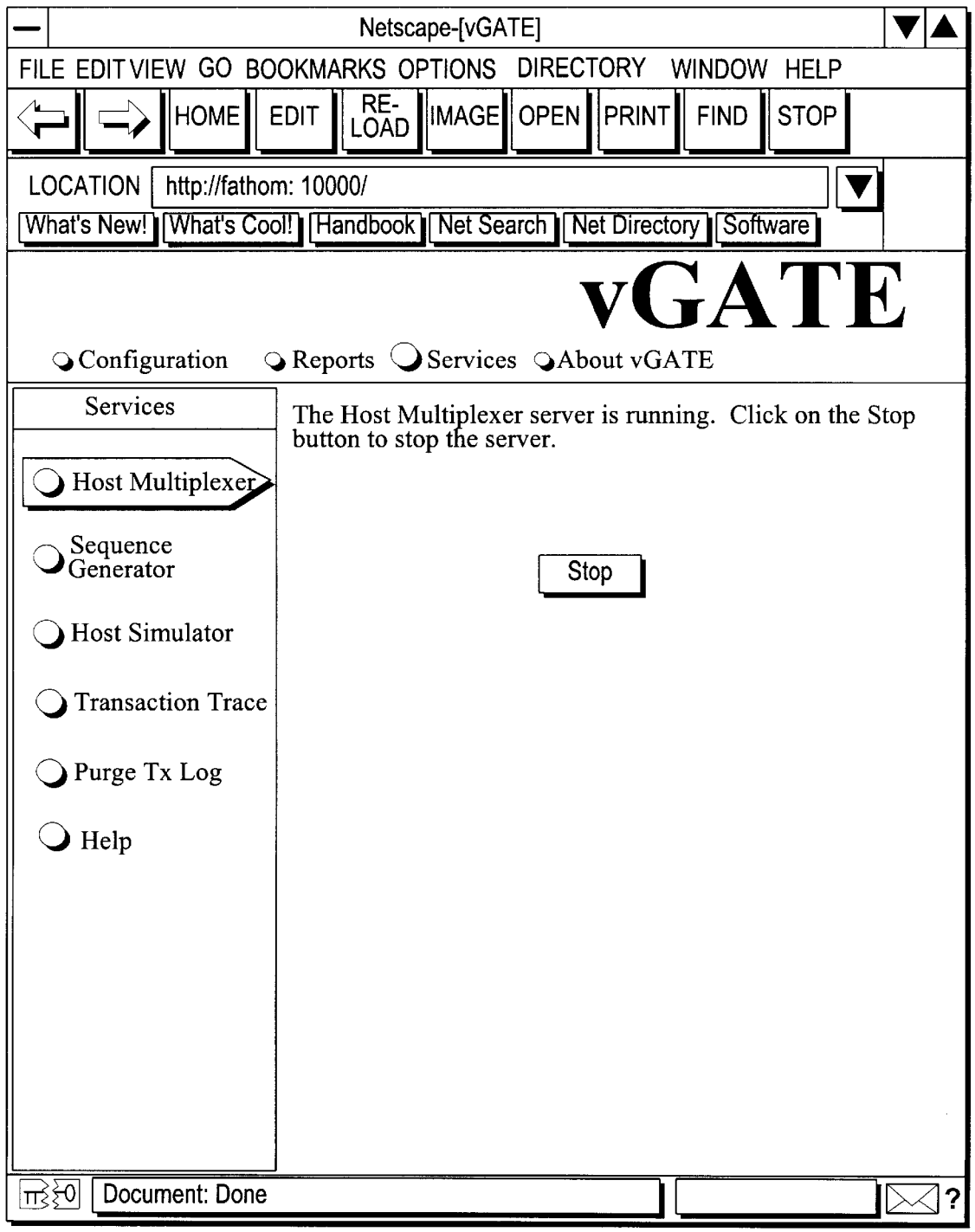
FIG. 65 is a Services display in accordance with a preferred embodiment.
Figure 66:
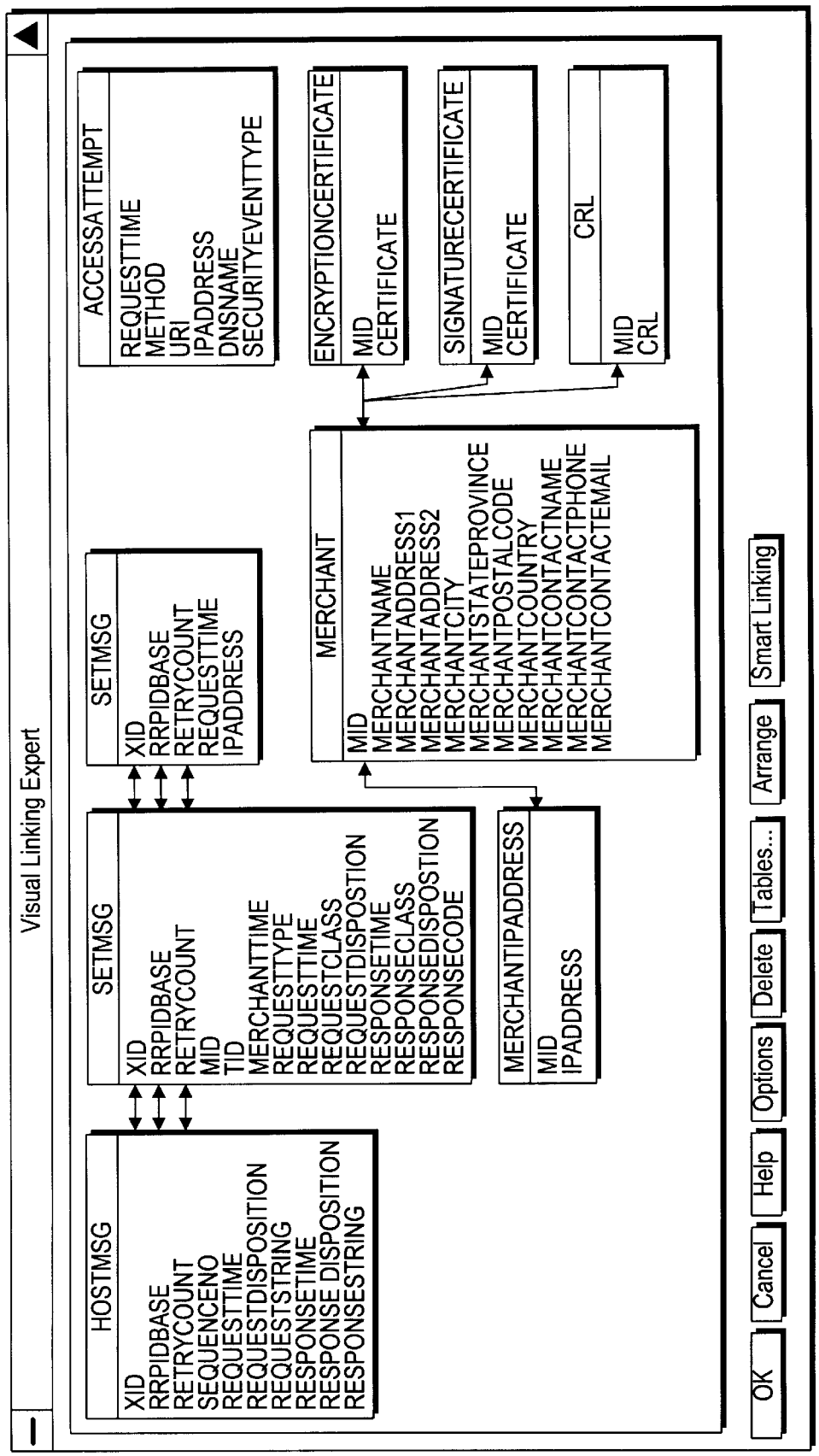
FIG. 66 is a graphical representation of the gateway transaction database in accordance with a preferred embodiment.

FIG. 62 is the main administration display for the Gateway in accordance with a preferred embodiment. A set of menu selections are presented at 6200 which will be described in more detail for each display. FIG. 63 is a configuration panel in accordance with a preferred embodiment. The configuration panel provides access to management information for configuring a gateway management information database. The Merchant Identifier (Mid) 6310 is a thirty character, alphanumeric field that uniquely defines a merchant. The Merchant Name 6320 is a fifty character, alphanumeric field, the Edit 6330 and Delete field 6340 are hyperlinks to detailed panels for modifying information in the management information database. FIG. 64 is a host communication display for facilitating communication between the gateway and the acquirer payment host. The IP Address Field 6410 contains the Internet Protocol address for communicating via TCP/IP to the Internet. The TCP logical port field 6430 uniquely identifies the port for accessing the Internet, and the SAVE field 6430 invokes storing of the host communication information in the database. FIG. 65 is a Services display in accordance with a preferred embodiment. This display initiates portions of the Gateway such as the host mulitplixer 2130 of FIG. 21. FIG. 66 is a graphical representation of the gateway transaction database in accordance with a preferred embodiment. Each of the fields represents a portion of the internet database schema in accordance with a preferred embodiment.

Gateway System Administration

As described above, the gateway is a secure computer system that mediates Internet based payment transactions between merchant servers and the acquiring bank's card processing host. The gateway supports secure communications between merchants using the Internet and acquirers using private financial networks and maintains appropriate logs of all transactions.

Figure 67:
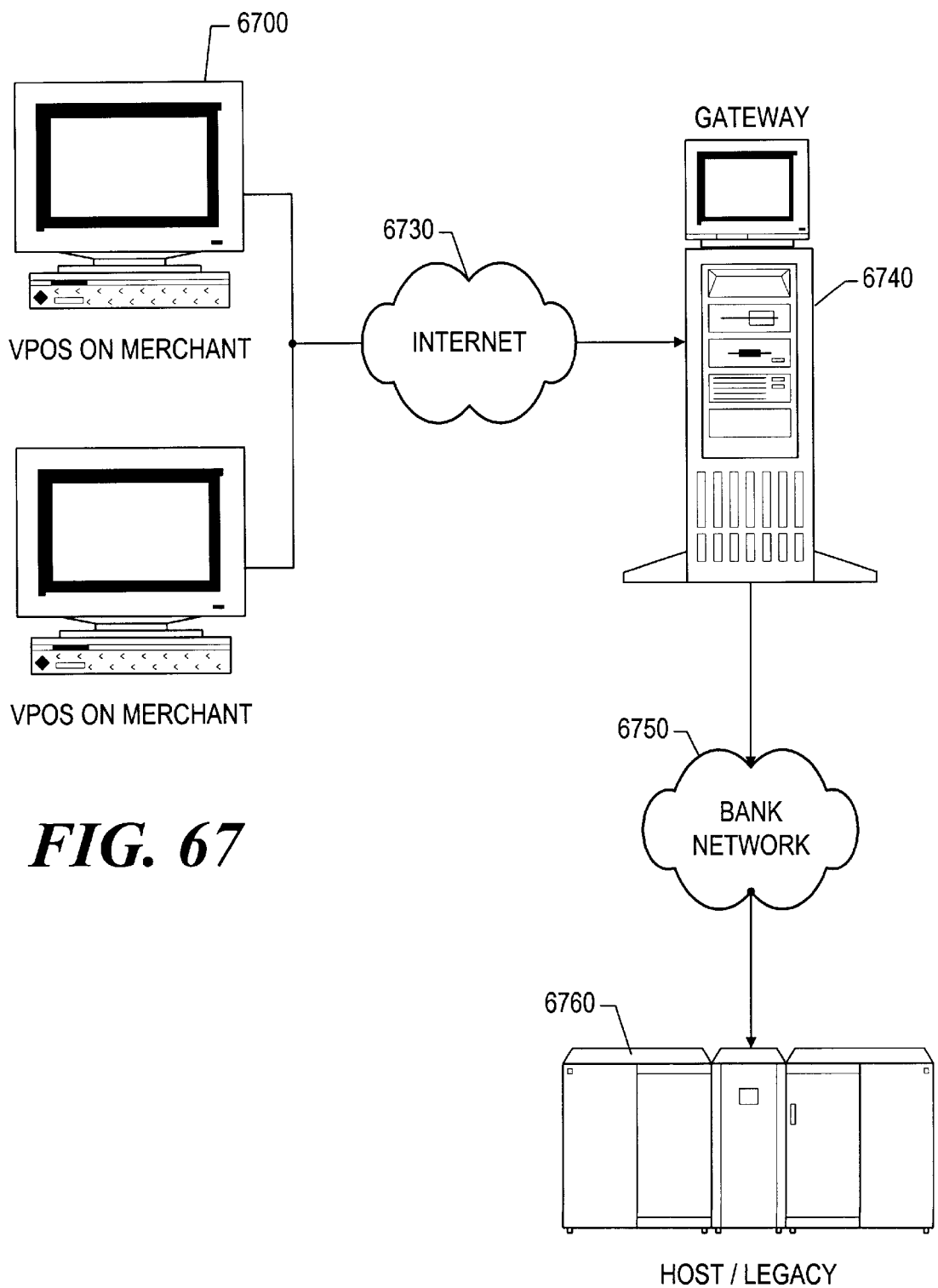
FIG. 67 illustrates the gateway hardware architecture in accordance with a preferred embodiment.

FIG. 67 illustrates the gateway hardware architecture in accordance with a preferred embodiment. Internet 6730 based merchants communicate transaction information via merchant servers 6700 running the VPOS software described earlier to a gateway 6740. The gateway 6740 performs all conversion necessary to route transaction requests through the bank network 6750 to the host processor 6760. Results from the host legacy system 6760 are routed back through the bank network 6750 to the gateway 6740 which transfers the information through the Internet 6730 to the merchant system 6700.

Figure 68:
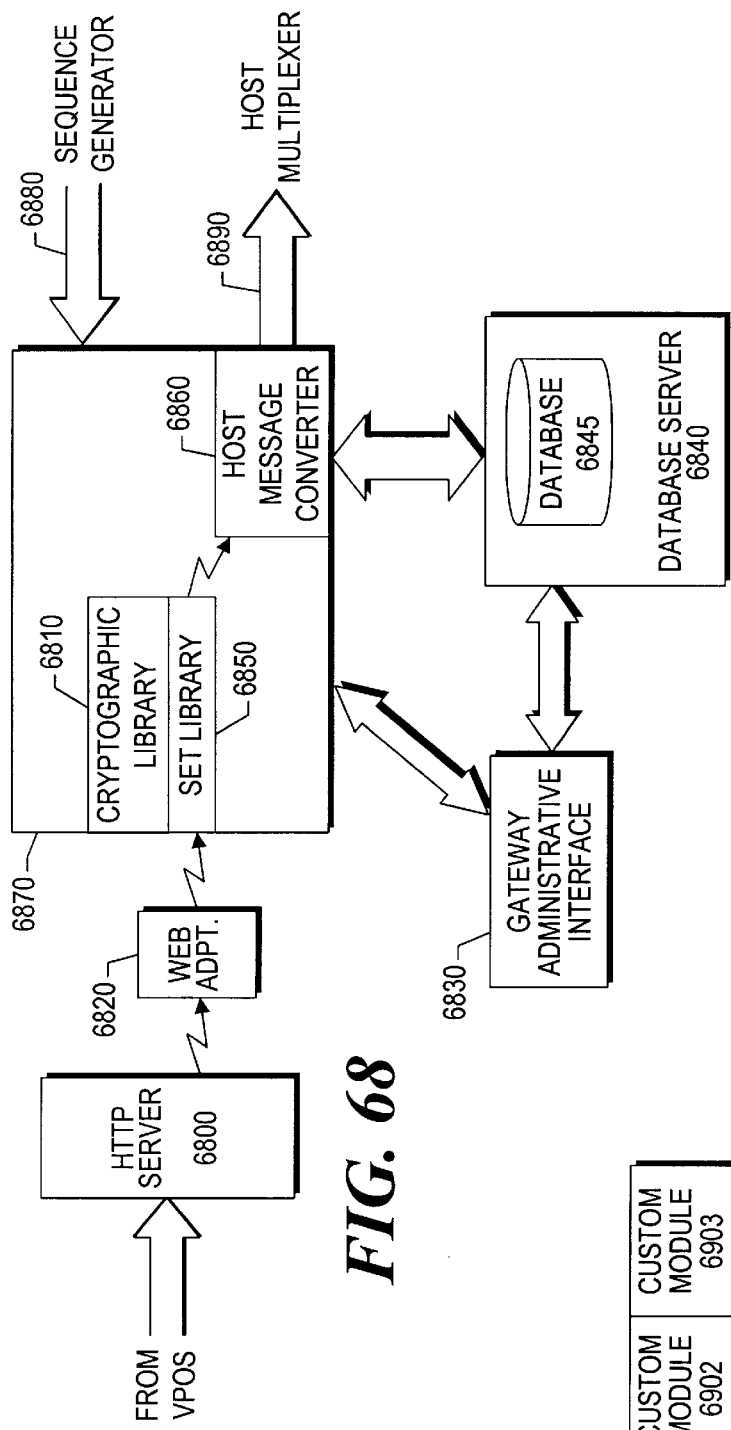
FIG. 68 is a block diagram setting forth the gateway software architecture in accordance with a preferred embodiment.

FIG. 68 is a block diagram setting forth the gateway software architecture in accordance with a preferred embodiment. The gateway 6870 includes an SSL-compliant HTTP server 6800 that ensures transport-level security of HTTP communication between the gateway 6870 and the acquirer's data operations center. The VPOS transmits SET requests utilizing HTTP and public key certificates are used to facilitate authentication of merchant and gateway identity. The HTTP server 6800 facilitates the communication between the gateway 6870 and the VPOS terminals over the Internet utilizing HTTP. The VPOS terminals are configured to communicate with the gateway utilizing the gateway IP address and port number. The HTTP server 6800 also supports HTML pages for gateway system administration, and utilizes Netscape's Enterprise Server 2.0 to support URL access to the port number. The administrative information contained on the gateway can be accessed by any commercial browser if the user has appropriate authority to access the gateway.

The gateway web adaptor 6820 is a Common Gateway Interface (CGI) program that is invoked by the HTTP Server 6800 when a request arrives from a VPOS terminal. The web adaptor 6820 extracts the contents of a posted transaction and passes it to the SET library 6850 which decrypts the SET request into a plain text SET object utilizing the cryptographic library 6810. The SET library 6850 then calls the gateway engine 6870 to convert the plaintext SET object into a host specific request message utilizing the host message converter 6860. When a response is received, it is passed to the SET library 6850 for encryption utilizing the cryptographic library 6810. The encrypted SET response is sent back to the VPOS terminal. An error is logged if an invalid HTTP request is detected, if the library cannot decrypt the SET response, or if the library cannot encrypt the SET response. Stale messages are rejected.

For credit card transactions, the gateway 6870 supports Secure Electronic Transaction (SET) requests providing for message encryption, authentication and encapsulation. The SET library 6850, converts SET requests into messages that are processed by the Host Message Converter. The SET Cryptographic library 6810 performs the following functions. 1) Converts an encrypted byte stream from an HTTP message sent by a POST method from a VPOS terminal to a plaintext SET object representing the request; and 2) converts a plaintext SET object representing the response into an encrypted byte stream which is transmitted back to the originating VPOS terminal. The SET library 6850 uses the cryptographic library for all standards based security operations. The cryptographic library also provides an interface to the cryptographic hardware.

The host message converter 6860 converts messages to bank-specific formats and routes messages to the appropriate host processor. The converter 6860 also converts messages from the host processor to the format used by the SET library 6850. The multi-threaded gateway engine 6870 utilizes SET decryption and encryption and the host message converter 6860 to support simultaneous SET requests from multiple VPOS terminals. The gateway also determines whether a plaintext SET request is an original request, an honest retry attempt, or a replay attack. The possible results include for an honest retry, possibly because an earlier response did not reach the VPOS, the gateway looks up the response from the database and returns it. If it is a replay attack, an error is logged. If it is an original request, then the VPOS engine proceeds to convert it to a host-specific request message. Then, it sends the request out to the remote host via the gateway host multiplexer 6890 and waits for a response. The gateway also logs all intermediate processing states, request messages and response messages, and groups all protocol-specific processing actions in a module with common API functions. The gateway also converts host responses to plaintext SET response objects, logs an error if the forward conversion fails, logs an error if the host multiplexer 6890 cannot send the request, logs an error if the gateway times out the response and logs an error if the reverse conversion fails.

The gateway host multiplexer 6890 communicates with the host based on the host's IO address and port number. If the host does not support TCP/IP, a link-level protocol converter must be installed. The gateway host multiplexer also sends multiple request messages to the host, serializes them, and receives messages asynchronously from the host and matches each of them with the corresponding request message which allows a particular gateway process to stop waiting and proceed with the reverse conversion.

The gateway 6870 stores all transaction information in a relational database 6845 controlled by a database server 6840 and specifically designed for high transaction volume. The database also records the details and state of every transaction processed by the gateway and generates transaction reports utilizing the gateway administrative interface. The sequence generator 6880 supplies the gateway with unique sequence numbers utilized in host request messages for identification of each transaction. An optional host simulator resides on the gateway server and transparently simulates a host for testing purposes. The gateway host communication configuration screen can utilize the IP address and port address of the host simulator to simulate a host processor that receives host requests and supplies host responses for testing purposes, and returns an authorization approval response message appropriately formatted. During normal transaction processing the host simulator is disabled and the gateway communication configuration screen contains the IP address and port number of the host processor.

The gateway includes a set of tools for administering gateway, database, operating system and Web server software. Also, the database schemas and the gateway administrative interface allows system administrators to create custom database reports to remotely monitor gateway performance. A gateway merchants display is provided to manage the merchant information on a gateway. Merchants can be added, deleted or modified using a display. The gateway also incorporates a system variable reflective of the maximum length of time to allow for a transaction request to reach the gateway from the VPOS terminal. If the stale message time limit is exceeded, then the transaction request is rejected and the merchant must resend the transaction. All of the gateway tools are accessible from commercial browsers assuming the user requesting the access has appropriate authorization.

The gateway provides a secure server that mediates transactions between merchants VPOS (Virtual Point-Of-Sale) servers and a financial institution's host processor. The gateway supports secure communications between merchants using the Internet on one side, and the host processor using legacy secure financial networks on the other side. Between the two interfaces, the gateway maintains a detailed log of all transactions, whether completed or in-progress. The gateway can handle multiple requests simultaneously and is designed to be easily scaled to handle a high transaction load.

The gateway accepts transactions from merchants over the Internet and converts them to a host-specific format before forwarding them to a host processor belonging to an existing financial network. Responses from the host, after the reverse conversions, are returned to the originating merchants over the Internet. Transactions between VPOS and the gateway are made secure by utilizing the SET protocol for all communication.

GATEWAY CORE ENGINE COMPONENTS

This document details a software interface between the gateway core engine software component and the host message specific software that implements the host specific financial message formatting and conversion functions.

The gateway performs the following functions:

1. Receives encrypted payment requests from merchants, as HTTP POST messages via the Internet.
2. Unwraps and decrypts the requests.
3. Authenticates digital signatures of the requests based on certificates.
4. Supports transaction types and card types as required by a financial institution.
5. Accepts concurrent VPOS transactions from each of the merchant servers.
6. Converts transaction data to host-specific formats and forward the mapped requests (in the clear) to the host processor using the existingfinancial network.
7. Receives transaction responses from the host.
8. Converts the responses from host-specific formats and correlate the mapped responses with the original requests.
9. Encrypts the responses, encapsulates them in HTTP reply messages, and sends them back to the originating merchants over the Internet.
10. Provides transaction logging in a relational database, symbolic transaction tracing, performance reporting, and other system administration functions.

The Host Message interface is the interface between the gateway core engine and the host specific functions that implement steps 6 through 8 in the above list. There may be more than one Host Message implementation but only one vGATE core software implementation.

Host Message Interface

Purpose

The Host Message interface grew from the desire to separate the core functions of the gateway software from those functions that are host specific. There are a variety, currently over 1,400 understood by VeriFone equipment and software, of legacy financial networks and protocols that exist worldwide. We expect to have great demand for our VPOS and gateway payment solutions and must be in a position to quickly develop and deploy our Internet payment solutions for the top Banks and acquirers. The Host Message interface (HM interface) will be used by the various software development organizations of VeriFone to develop software that will enable the gateway product to be deployed with existing financial networks without changing the interface point to the financial network. Gateway, along with VPOS allows the acquirers to offer Internet Payment solutions to their Merchant base without changing their current financial networks.

The VPOS software, although it too can be customized and branded for a particular acquirer, is not as tightly coupled with the financial network as is gateway. The protocol between the VPOS and gateway that is currently used is SET and this protocol, in principle, isolates the VPOS software from the legacy network that it is ultimately connected to (via gateway).

Overview

The host specific portion of gateway are accessed by the gateway core engine by calling the functions contained in the Host Message implementation. The software that implements the host message interface is linked to the gateway core engine software either statically or dynamically (shared object libraries in UNIX or DLLs on Windows NT). The Host Message API is defined in this document.

The software that implements the host message interface must be re-entrant. The gateway engine will call the host message interface from either a process or a thread. The gateway engine is designed to be multi-threaded and will be capable of handling multiple requests simultaneously.

The host message interface is a "C" based API. The implementation of the host specific library must be implemented in "C++" as some of the data that is needed is contained in "C++" objects and is only accessible using the methods for those objects. The host specific software need only use very basic features of "C++" and need not be completely designed and or programmed using object-oriented techniques.

Transaction Types

There are currently seven transaction types, or payment request types, that can arrive at gateway from VPOS. Each of these request types has an associated request object and response object. There are methods that are made public for each of these request objects that allow the host specific module to "get" the data from the incoming request in order to build the host specific request. There are also public "methods" for the response object allowing the host specific functions to "set" the response data that will be communicated by the gateway engine back to VPOS.

VGATE API

Figure 69:
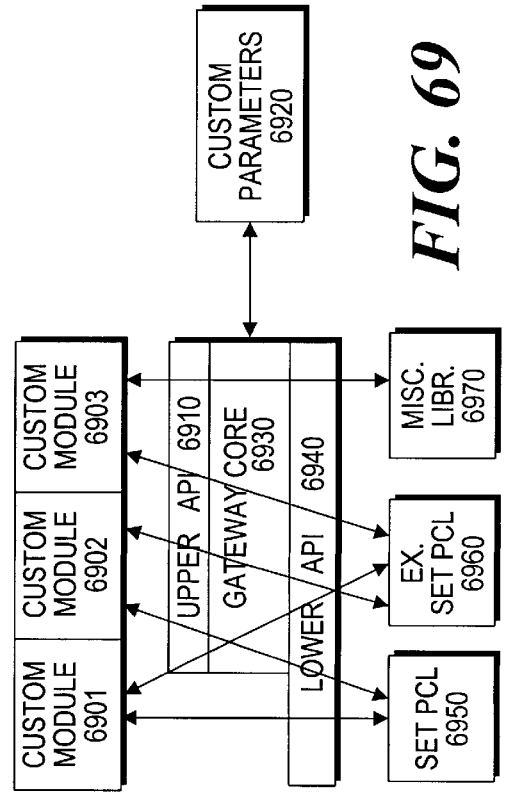
FIG. 69 is a block diagram setting forth the gateway components and interfaces in accordance with a preferred embodiment.

FIG. 69 illustrates the gateway components and interfaces in accordance with a preferred embodiment. The gateway API specifies the expected behaviors and information exchange for transaction processing functions, transaction data structures, SET access functions, certificate management functions, string utility functions and system configuration parameters. The architecture includes three distinct sections to enhance distribution of the functions. The upper API 6910 consists of concise functions which are available via a call out interface to custom modules 6901–6903 provided by application developers. The lower API 6940 allows the gateway 6930 and the custom modules 6901–6903 to call in to reusable helper functions 6950–6970 which facilitate isolation from possible future fluctuations in structural definitions of SET data elements. The system configuration custom parameters 6920 include the more static information elements required for such things as the network address of the host or its proxy equipment, timeout values, expected length of certain messages and other system configuration information. These parameters are specified as name-value pairs in the gateway system initialization file.

The vGATE SET Access API shields application developers from the structural complexities of the SET (Secure Electronic Transaction) protocol by providing high-level access functions to SET-defined data elements and allowing the use of such functions to be integrated seamlessly with the translations of a particular acquirer-specific message format. The need for the SET Access API is twofold: first, program abstraction and, second, separation of concerns. The forest of deeply nested data structures generated from compiling the textual SET ASN.1 definitions is very tedious to traverse, and direct exposition to multiple levels of pointer manipulation is a major distraction in developing acquirer-driven custom applications for vGATE. Furthermore, the SET proposed standard, still in draft form, has been and is expected to be going through various revisions in which the ASN. 1 definitions are changed significantly. Any code that is involved in directly accessing the container structures will have to be rewritten.

The above two software-engineering considerations are serious enough to warrant a solution using abstract representations and access methods. The vGATE SET Access API provides the application developers with a set of predefined classes for each of the SET messages with simple access methods to get data from, and set values to, the different elements of the SET protocol data units. The present content of the API is a current implementation of the PCL (Payment Class Library) 6950. In using the SET Access API, vGATE application developers will be able to insulate their code from all future fluctuations in SET structural definitions. For example, extensions to SET are segregated from the standard SET functions utilizing an extend SET PCL 6960.

The system is partitioned to separate design concerns at different levels and to allow for graceful adaptations by external modules. The language was selected for the API by recognizing, classifying, distilling and exposing the programmatic activities that are typically required for translating legacy payment protocols and in communicating with host processors. Within a generic framework of reusable, prefabricated components (the core gateway), points of access have been defined to allow customization activities to occur (gateway API). The resulting architecture allows a software developer to focus on custom applications by freeing them from the underlying operational details already handled by the gateway core engine.

The gateway core handles basic transaction management (control flow, logging, error detection and recovery), internal interprocess communication, relational database access, communication with vPOS terminals over the Internet, interfacing with a host processor via a legacy network, and overall system administration. Whereas the gateway controls the processing of payment messages, it has no embedded knowledge of any acquirer-specific payment protocols.

The custom applications for a particular acquirer can be developed in C or C++ and linked to the gateway core software either statically or dynamically. If they are dynamically linked, then they are considered "shared objects" on Unix or "dynamic link libraries" on Windows NT. A gateway installation consists of the core gateway engine and the custom modules designed for a particular acquirer.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for processing gateway administrative information accumulated at a gateway between a network and a host system utilizing a gateway administrative interface, comprising the steps of:
    (a) receiving transaction information at the gateway from the network;
    (b) processing the transaction information for future transmission to the host system;

(c) storing gateway administrative information relating to the transaction information in a database located at the gateway;

(d) receiving requests for gateway administrative information at the gateway administrative interface from a network application and translating the requests into a query for the database;

(e) submitting the query to the database;

(f) receiving the requested gateway administrative information from the database in response to the query; and (g) transmitting the gateway administrative information to the network application.

2. A method as recited in claim 1, wherein the network application is a browser that utilizes the Internet to communicate with the gateway administrative interface.

3. A method as recited in claim 1, wherein the gateway administrative information includes dynamic tracing of transactions.

4. A method as recited in claim 1, wherein the gateway administrative information includes status information.

5. A method as recited in claim 1, wherein the gateway administrative information includes exception information associated with transactions.

6. A method as recited in claim 1, wherein the network application communicates with the gateway administrative interface using a HTTP protocol.

7. A method as recited in claim 1, wherein the gateway administrative interface provides system configuration parameters to the gateway.

8. A method as recited in claim 1, wherein the gateway administrative interface activates gateway functions.

9. A system for processing gateway administrative information accumulated at a gateway between a network and a host system utilizing a gateway administrative interface, comprising;

(a) a network adaptor that receives encrypted transaction information at the gateway from the network;

(b) a software code segment that decrypts the transaction information;

(c) an application program interface to access custom modules and process the transaction information;

(d) a database located at the gateway that stores gateway administrative information relating to the transaction information;

(e) a gateway administrative interface that receives requests for gateway administrative information from a network application and translates the requests into a query for the database;

(f) a software code segment that submits the query to the database;

(g) a software code segment that receives the requested gateway administrative information from the database in response to the query; and (h) a software code segment that transmits the requested gateway administrative information to the network application.

10. A system as recited in claim 9, wherein the network application is a browser that utilizes the Internet to communicate with the gateway administrative interface.

11. A system as recited in claim 9, wherein the gateway administrative information includes dynamic tracing of transactions.

12. A system as recited in claim 9, wherein the gateway administrative information includes status information on transactions.

13. A system as recited in claim 9, wherein the gateway administrative information includes exception information associated with transactions.

14. A system as recited in claim 9, wherein the network application communicates with the gateway administrative interface using a HTTP protocol.

15. A computer program embodied on a computer-readable medium for processing gateway administrative information accumulated at a gateway between a network and a host system utilizing a gateway administrative interface, comprising:

(a) a code segment that receives encrypted transaction information at the gateway from the network;

(b) a code segment that decrypts the transaction information;

(c) an application program interface to access one or more custom modules and process the transaction information;

(d) a code segment that stores gateway administrative information in a database at the gateway;

(e) a code segment that receives requests for gateway administrative information from a network application and translates the requests into a query for the database;

(f) a code segment that submits the query to the database;

(g) a code segment that receives the requested gateway administrative information from the database in response to the query; and (h) a code segment that transmits the gateway administrative information to the network application.

16. A computer program as recited in claim 15, wherein the network application is a browser that utilizes the Internet to communicate with the gateway administrative interface.

17. A computer program as recited in claim 15, wherein the gateway administrative information includes dynamic tracing of transactions.

18. A computer program as recited in claim 15, wherein the gateway administrative information includes status information.

19. A computer program as recited in claim 15, wherein the gateway administrative information includes exception information associated with transactions.

20. A computer program as recited in claim 15, wherein the network application communicates with the gateway administrative interface using a HTTP protocol.

* * * * *